(12) United States Patent (10) Patent No.: US 8,881,060 B2
Chaudhri et al. (45) Date of Patent: Nov. 4, 2014

(54) DEVICE, METHOD, AND GRAPHICAL USER INTERFACE FOR MANAGING FOLDERS

(75) Inventors: Imran Chaudhri, San Francisco, CA (US); Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 12/888,370

(22) Filed: Sep. 22, 2010

(65) Prior Publication Data

US 2011/0252374 A1    Oct. 13, 2011

Related U.S. Application Data

(60) Provisional application No. 61/321,872, filed on Apr. 7, 2010.

(51) Int. Cl.
| G06F 3/048 | (2013.01) |
| H04N 7/14 | (2006.01) |
| G06F 3/0482 | (2013.01) |
| G06F 3/0481 | (2013.01) |
| G06F 3/0488 | (2013.01) |
| G06F 9/44 | (2006.01) |
| G06F 3/0486 | (2013.01) |
| H04N 7/15 | (2006.01) |

(52) U.S. Cl.
CPC ............. H04N 7/147 (2013.01); G06F 3/0482 (2013.01); G06F 3/04817 (2013.01); G06F 3/04886 (2013.01); G06F 9/4443 (2013.01); G06F 3/04812 (2013.01); G06F 3/0486 (2013.01); H04N 7/15 (2013.01)
USPC ........... 715/835; 715/810; 715/748; 715/769; 715/770

(58) Field of Classification Search
USPC .......................................... 715/769, 770, 748
See application file for complete search history.

(56) References Cited

U.S. PATENT DOCUMENTS

| 5,572,238 A | 11/1996 | Krivacic |
| 5,736,974 A | 4/1998 | Selker |
| 5,745,116 A | 4/1998 | Pisutha-Arnond |
| 5,745,718 A | 4/1998 | Cline et al. |

(Continued)

FOREIGN PATENT DOCUMENTS

| EP | 1 003 098 A2 | 5/2000 |
| EP | 1 186 997 A2 | 3/2002 |

(Continued)

OTHER PUBLICATIONS

Invitation to Pay Additional Fees dated Jan. 5, 2011, in International Application No. PCT/US2010/050056, which corresponds to U.S. Appl. No. 12/888,362 (Chaudhri).

(Continued)

*Primary Examiner* — Daeho Song
(74) *Attorney, Agent, or Firm* — Morrison & Foerster LLP

(57) ABSTRACT

A multifunction device displays a plurality of selectable user interface objects on the display. In response to detecting the first input, the device moves a first object in the plurality of selectable user interface objects across the display to a location on the display that is proximate to a second object in the plurality of selectable user interface objects. In response to detecting that the first input meets predefined folder-creation criteria while the first object is proximate to the second object, the device creates a folder that contains the first object and the second object.

21 Claims, 99 Drawing Sheets

(56) References Cited

U.S. PATENT DOCUMENTS

| | | | |
|---|---|---|---|
| 5,798,752 A | 8/1998 | Buxton et al. | |
| 5,801,699 A | 9/1998 | Hocker et al. | |
| 6,160,551 A | 12/2000 | Naughton et al. | |
| 6,545,669 B1 | 4/2003 | Kinawi et al. | |
| 6,597,345 B2 | 7/2003 | Hirshberg | |
| 6,874,128 B1 | 3/2005 | Moore et al. | |
| 7,010,755 B2 | 3/2006 | Anderson et al. | |
| 7,080,326 B2 | 7/2006 | Molander et al. | |
| 7,088,340 B2 | 8/2006 | Kato | |
| 7,155,667 B1 | 12/2006 | Kotler et al. | |
| 7,173,603 B2 | 2/2007 | Kawasome | |
| 7,194,698 B2 | 3/2007 | Gottfurcht et al. | |
| 7,237,240 B1 | 6/2007 | Chen et al. | |
| 7,287,232 B2 | 10/2007 | Tsuchimura et al. | |
| 7,403,211 B2 | 7/2008 | Sheasby et al. | |
| 7,415,677 B2 | 8/2008 | Arend et al. | |
| 7,444,390 B2 | 10/2008 | Tadayon et al. | |
| 7,478,437 B2 | 1/2009 | Hatanaka et al. | |
| 7,480,872 B1 | 1/2009 | Ubillos | |
| 7,584,278 B2 | 9/2009 | Rajarajan et al. | |
| 7,594,185 B2 | 9/2009 | Anderson et al. | |
| 7,596,766 B1 | 9/2009 | Sharma et al. | |
| 7,636,898 B2 | 12/2009 | Takahashi | |
| 7,791,755 B2 | 9/2010 | Mori | |
| 7,840,907 B2 | 11/2010 | Kikuchi et al. | |
| 7,843,454 B1 | 11/2010 | Biswas | |
| 7,904,832 B2 | 3/2011 | Ubillos | |
| 7,908,569 B2 | 3/2011 | Ala-Rantala | |
| 8,065,618 B2 | 11/2011 | Kumar et al. | |
| 8,152,640 B2 | 4/2012 | Shirakawa et al. | |
| 8,156,175 B2 | 4/2012 | Hopkins | |
| 8,161,419 B2 | 4/2012 | Palahnuk et al. | |
| 8,255,808 B2 | 8/2012 | Lindgren et al. | |
| 2001/0038394 A1 | 11/2001 | Tsuchimura et al. | |
| 2002/0057287 A1 | 5/2002 | Crow et al. | |
| 2002/0078037 A1 | 6/2002 | Hatanaka et al. | |
| 2002/0097261 A1 | 7/2002 | Gottfurcht et al. | |
| 2002/0143949 A1 | 10/2002 | Rajarajan et al. | |
| 2002/0167683 A1* | 11/2002 | Hanamoto et al. | 358/1.14 |
| 2003/0080991 A1 | 5/2003 | Crow et al. | |
| 2003/0160825 A1* | 8/2003 | Weber | 345/769 |
| 2003/0169288 A1 | 9/2003 | Misawa | |
| 2003/0189597 A1 | 10/2003 | Anderson et al. | |
| 2004/0008224 A1 | 1/2004 | Molander et al. | |
| 2004/0119757 A1 | 6/2004 | Corley et al. | |
| 2004/0160462 A1 | 8/2004 | Sheasby et al. | |
| 2005/0012862 A1 | 1/2005 | Lee | |
| 2005/0043987 A1 | 2/2005 | Kumar et al. | |
| 2005/0177796 A1* | 8/2005 | Takahashi | 715/769 |
| 2006/0004685 A1* | 1/2006 | Pyhalammi et al. | 707/1 |
| 2006/0020903 A1 | 1/2006 | Wang et al. | |
| 2006/0026535 A1 | 2/2006 | Hotelling et al. | |
| 2006/0080617 A1 | 4/2006 | Anderson et al. | |
| 2006/0112347 A1 | 5/2006 | Baudisch | |
| 2006/0117372 A1 | 6/2006 | Hopkins | |
| 2006/0284852 A1 | 12/2006 | Hofmeister et al. | |
| 2007/0032267 A1 | 2/2007 | Haitani et al. | |
| 2007/0050726 A1 | 3/2007 | Wakai et al. | |
| 2007/0061745 A1 | 3/2007 | Anthony et al. | |
| 2007/0065044 A1 | 3/2007 | Park et al. | |
| 2007/0136351 A1 | 6/2007 | Dames et al. | |
| 2007/0150834 A1 | 6/2007 | Muller et al. | |
| 2007/0157089 A1 | 7/2007 | van Os et al. | |
| 2007/0174785 A1 | 7/2007 | Perttula | |
| 2007/0179938 A1 | 8/2007 | Ikeda et al. | |
| 2007/0209004 A1 | 9/2007 | Layard | |
| 2008/0014917 A1 | 1/2008 | Rhoads et al. | |
| 2008/0040668 A1 | 2/2008 | Ala-Rantala | |
| 2008/0094369 A1 | 4/2008 | Ganatra et al. | |
| 2008/0117461 A1* | 5/2008 | Mitsutake et al. | 358/1.16 |
| 2008/0136785 A1 | 6/2008 | Baudisch et al. | |
| 2008/0148182 A1 | 6/2008 | Chiang et al. | |
| 2008/0184112 A1 | 7/2008 | Chiang et al. | |
| 2008/0215980 A1 | 9/2008 | Lee et al. | |
| 2008/0229254 A1 | 9/2008 | Warner | |
| 2008/0244119 A1 | 10/2008 | Tokuhara et al. | |
| 2008/0307350 A1 | 12/2008 | Sabatelli et al. | |
| 2009/0007017 A1 | 1/2009 | Anzures et al. | |
| 2009/0009815 A1 | 1/2009 | Karasik et al. | |
| 2009/0055748 A1 | 2/2009 | Dieberger et al. | |
| 2009/0113350 A1 | 4/2009 | Hibino et al. | |
| 2009/0122018 A1 | 5/2009 | Vymenets et al. | |
| 2009/0132965 A1* | 5/2009 | Shimizu | 715/853 |
| 2009/0138827 A1 | 5/2009 | van Os et al. | |
| 2009/0144653 A1 | 6/2009 | Ubillos | |
| 2009/0158200 A1 | 6/2009 | Palahnuk et al. | |
| 2009/0172606 A1 | 7/2009 | Dunn et al. | |
| 2009/0178008 A1 | 7/2009 | Herz et al. | |
| 2009/0222766 A1 | 9/2009 | Chae et al. | |
| 2009/0228807 A1 | 9/2009 | Lemay | |
| 2009/0228825 A1 | 9/2009 | van Os et al. | |
| 2009/0278806 A1 | 11/2009 | Duarte et al. | |
| 2010/0058182 A1 | 3/2010 | Jung | |
| 2010/0077333 A1 | 3/2010 | Yang et al. | |
| 2010/0146451 A1 | 6/2010 | Jun-Dong et al. | |
| 2010/0153878 A1 | 6/2010 | Lindgren et al. | |
| 2010/0191701 A1 | 7/2010 | Beyda et al. | |
| 2010/0214216 A1 | 8/2010 | Nasiri et al. | |
| 2010/0223563 A1 | 9/2010 | Green | |
| 2010/0248788 A1 | 9/2010 | Yook et al. | |
| 2010/0262591 A1 | 10/2010 | Lee et al. | |
| 2010/0262634 A1 | 10/2010 | Wang | |
| 2010/0287505 A1 | 11/2010 | Williams | |
| 2011/0010672 A1 | 1/2011 | Hope | |
| 2011/0029934 A1 | 2/2011 | Locker et al. | |
| 2011/0087981 A1 | 4/2011 | Jeong et al. | |
| 2011/0099299 A1 | 4/2011 | Vasudevan et al. | |
| 2011/0119610 A1 | 5/2011 | Hackborn et al. | |
| 2011/0148786 A1 | 6/2011 | Day et al. | |
| 2011/0179097 A1 | 7/2011 | Ala-Rantala | |
| 2011/0179368 A1 | 7/2011 | King et al. | |
| 2011/0239155 A1 | 9/2011 | Christie | |
| 2011/0246918 A1* | 10/2011 | Henderson | 715/769 |
| 2011/0246929 A1 | 10/2011 | Jones et al. | |
| 2011/0252372 A1 | 10/2011 | Chaudhri | |
| 2011/0289423 A1 | 11/2011 | Kim et al. | |
| 2011/0289448 A1 | 11/2011 | Tanaka | |
| 2011/0310058 A1 | 12/2011 | Yamada et al. | |
| 2011/0314422 A1 | 12/2011 | Cameron et al. | |
| 2012/0030623 A1 | 2/2012 | Hoellwarth | |
| 2012/0036460 A1 | 2/2012 | Cieplinski et al. | |
| 2012/0042272 A1 | 2/2012 | Hong et al. | |
| 2012/0117506 A1 | 5/2012 | Koch et al. | |
| 2012/0124677 A1 | 5/2012 | Hoogerwerf et al. | |

FOREIGN PATENT DOCUMENTS

| | | |
|---|---|---|
| EP | 1 271 295 A2 | 1/2003 |
| EP | 1 956 472 A1 | 8/2008 |
| WO | WO 98/44431 A2 | 10/1998 |
| WO | WO 2008/017936 A2 | 2/2008 |

OTHER PUBLICATIONS

International Search Report and Written Opinion dated May 13, 2011, in International Patent Application No. PCT/US2010/050056, which corresponds to U.S. Appl. No. 12/888,362 (Chaudhri).

Bott et al., "Table of Contents/Chapter 20: Putting Pictures on Folder Icons," Microsoft Windows XP Inside Out Deluxe, Sceond Edition, Oct. 2004, pp. 1-8 and 669. http://proquest.safaribooksonline.com/book/operating-systems/9780735642171.

Collomb, "Improving drag-and-drop on wall-size displays," 2005 proceedings of Graphics Interface, pp. 25-32.

Microsoft Help and Support, "How to Arrange or Move Icons on the Desktop," 2 pages, http://support.microsoft.com/kb/289587, 2011.

Microsoft, "Putting Pictures on Folder I con," Microsoft Manual, XP Inside Out, Second Edition, 2007, 2 pages.

Microsoft Windows (Copyright 2009), 2 pages.

Nishida et al., "Drag-and-Guess: Drag-and-Drop with Prediction," INTERACT '07 Proceedings of the 11th IFIP TC 13 International Conference on Human-Computer Interaction, Sep. 2007, pp. 461-474.

(56) References Cited

OTHER PUBLICATIONS

Ren et al., "The Adaptive Hybrid Cursor: A Pressure-Based Target Selection Technique for Pen-Based User Interfaces," INTERACT '07 Proceedings of the 11th IFIP TC 13 International Conference on Human-Computer Interaction, Sep. 2007, pp. 310-323.
Windows XP, "Enable or disable AutoArrange desktop icons in Windows XP," Windows Tutorials, Nov. 19, 2009, http://www.freemailtutorials.com/microsoftWindows/autoArrangeIconsOnTheDesktop.php, 3 pages.
International Preliminary Report on Patentability dated Oct. 18, 2012, in International Patent Application No. PCT/US2010/050056, which corresponds to U.S. Appl. No. 12/888,362, 21 pages (Chaudhri).
Office Action dated Jul. 20, 2012, in U.S. Appl. No. 12/888,362, 17 pages (Chaudhri).
Office Action dated Jul. 31, 2012, in Chinese Patent Application No. 201010592864.9, which corresponds to U.S. Appl. No. 12/888,362, 6 pages (Chaudhri).
Office Action dated Jun. 15, 2012, in U.S. Appl. No. 12/848,062, 12 pages (Hoellwarth).
Office Action dated Jul. 9, 2012, in U.S. Appl. No. 12/849,767, 17 pages (Cieplinski).
Office Action dated Jul. 31, 2012, in U.S. Appl. No. 12/888,366, 11 pages (Chaudhri).
Office Action dated Sep. 10, 2012, in U.S. Appl. No. 12/888,373, 14 pages (Chaudhri).
Office Action dated Jun. 7, 2012, in U.S. Appl. No. 12/888,375, 12 pages (Chaudhri).
Final Office Action dated Nov. 7, 2012, in U.S. Appl. No. 12/888,375, 14 pages (Chaudhri).
Office Action dated Oct. 2, 2012, in U.S. Appl. No. 12/888,376, 13 pages (Chaudhri).
Office Action dated Sep. 13, 2012, in U.S. Appl. No. 12/888,377, 14 pages (Chaudhri).
Leeon, N., LG Tritan (U.S. Cellular), CNET editors' review. updated Sep. 25, 2009, 4 pages.
Final Office Action dated January 3, 2013, received in U.S. Appl. No. 12/888,362. 16 pages (Chaudhri).
Final Office Action dated Dec. 12, 2012, received in U.S. Appl. No. 12/848,062, 14 pages (Hoellwarth)
Notice of Alicwence dated Jan. 8, 2013, received in U.S. Appl. No. 12/849,767, 11 pages (Cleplinksi).
Notice of Allowance dated Dec. 14, 2012, received in U.S. Appl. No. 12/888,366, 14 pages (Chaudhri).
Notice of Aliowance dated Feb. 22, 2013, received in U.S. Appl. No. 12/888,373, 15 pages (Chaudhri).
Final Office Action dated Feb. 8, 2013, received in U.S. Appl. No. 12/888,376, 14 pages (Chaudhri).
Notice of Allowance dated Jan. 30, 2013, received in U.S. Appl. No. 12/888,375, 15 pages (Chaudhri).
Office Action dated Aug. 23, 2013, received in Australian Patent Application No. 2010350739, which corresponds to U.S. Appl. No. 12/888,362, 3 pages (Chaudhri).
Office Action dated May 6, 2013, received in Chinese Patent Application No. 201010592864.9, which corresponds to U.S. Appl. No. 12/888,362, 6 pages (Chaudhri).
Office Action dated Dec. 4, 2013, received in Korean Patent Appiication No. 2012 7029270, which corresponds to U.S. Appl. No. 12/888,362, 4 pages (Chaudhri).
Office Action dated Sep. 30, 2013, received in U.S. Appl. No. 12/888,375, 15 pages (Chaudhri).

\* cited by examiner

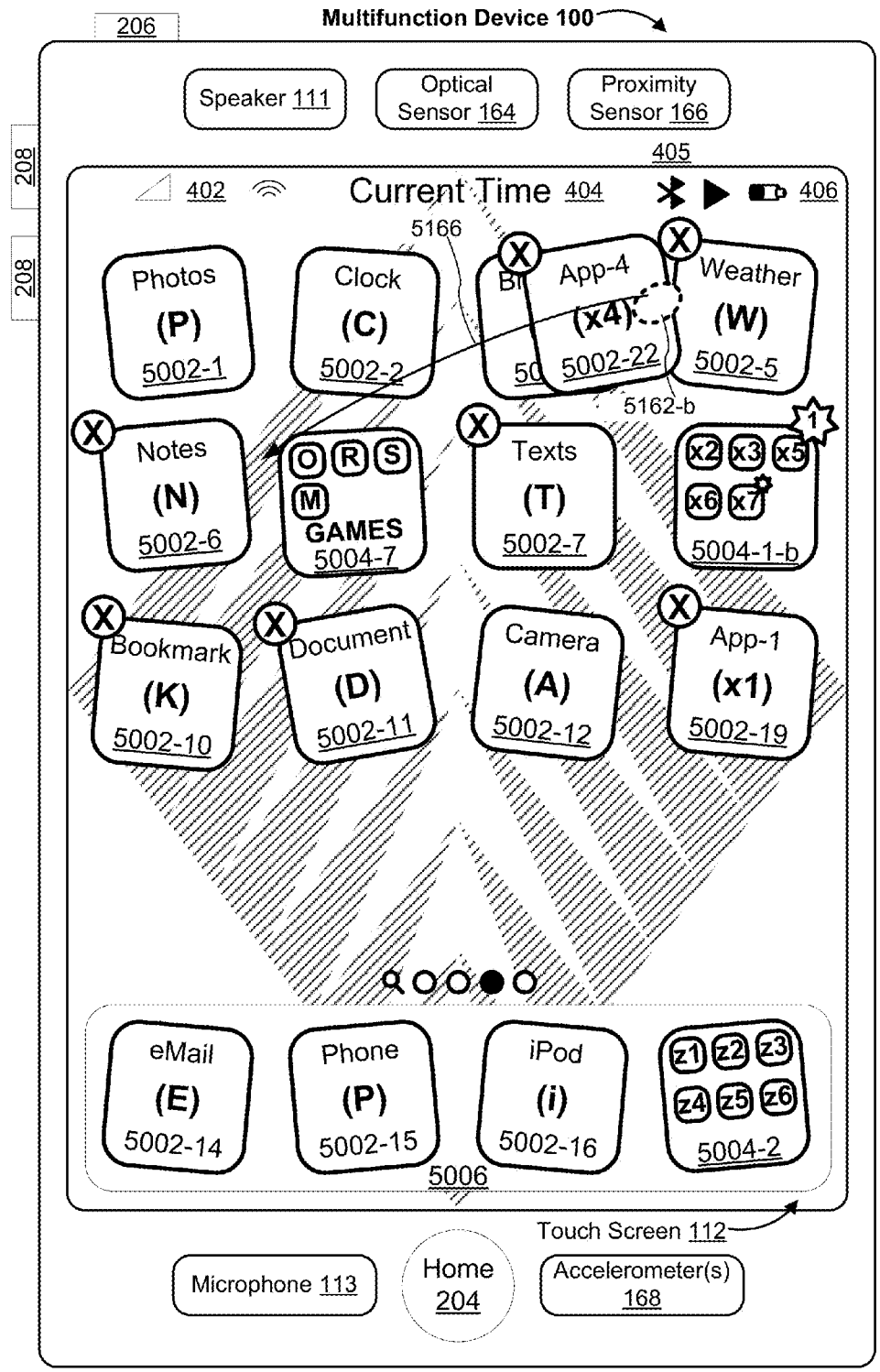
Figure 5AAA

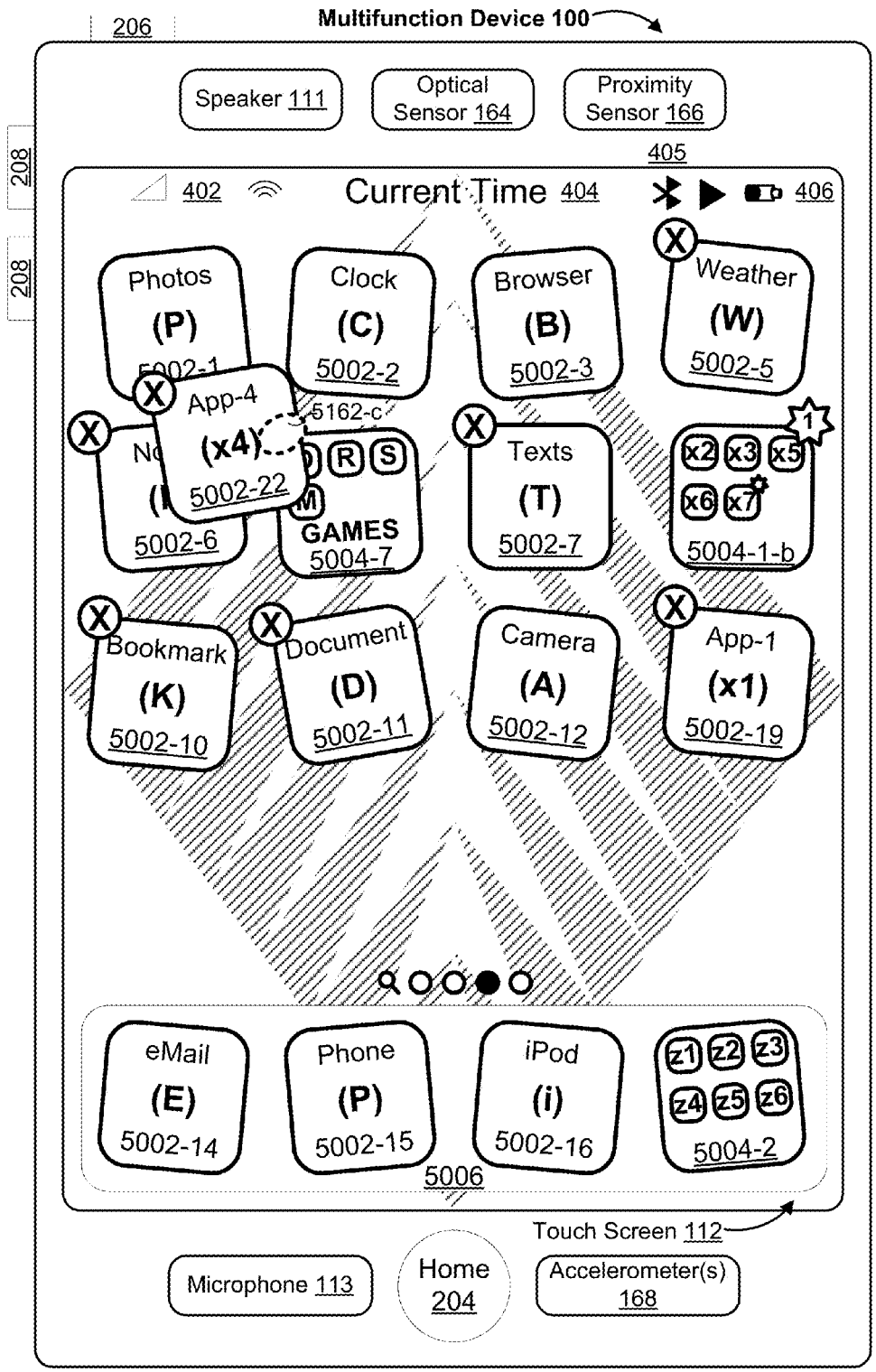
Figure 5BBB

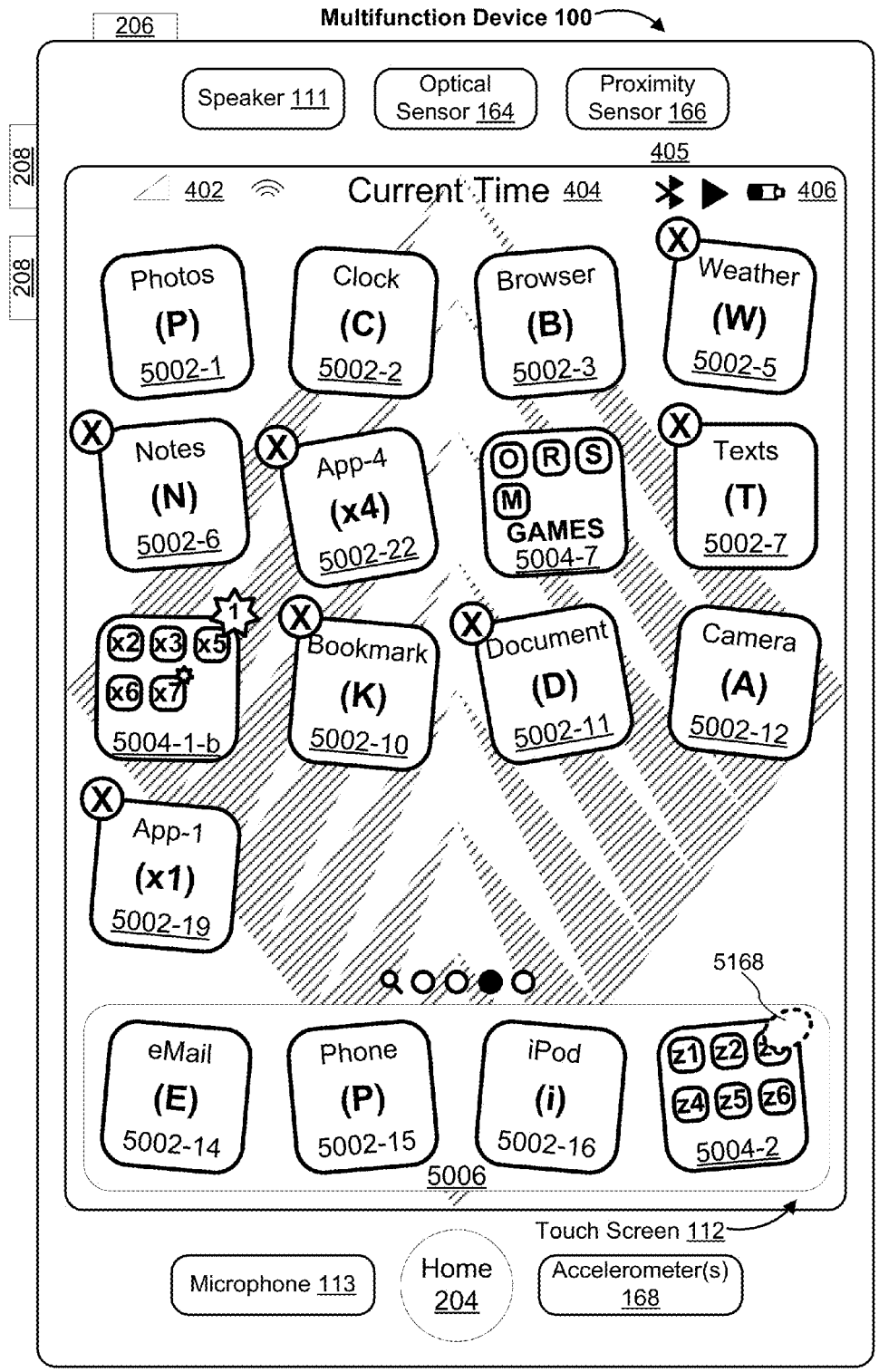
Figure 5CCC

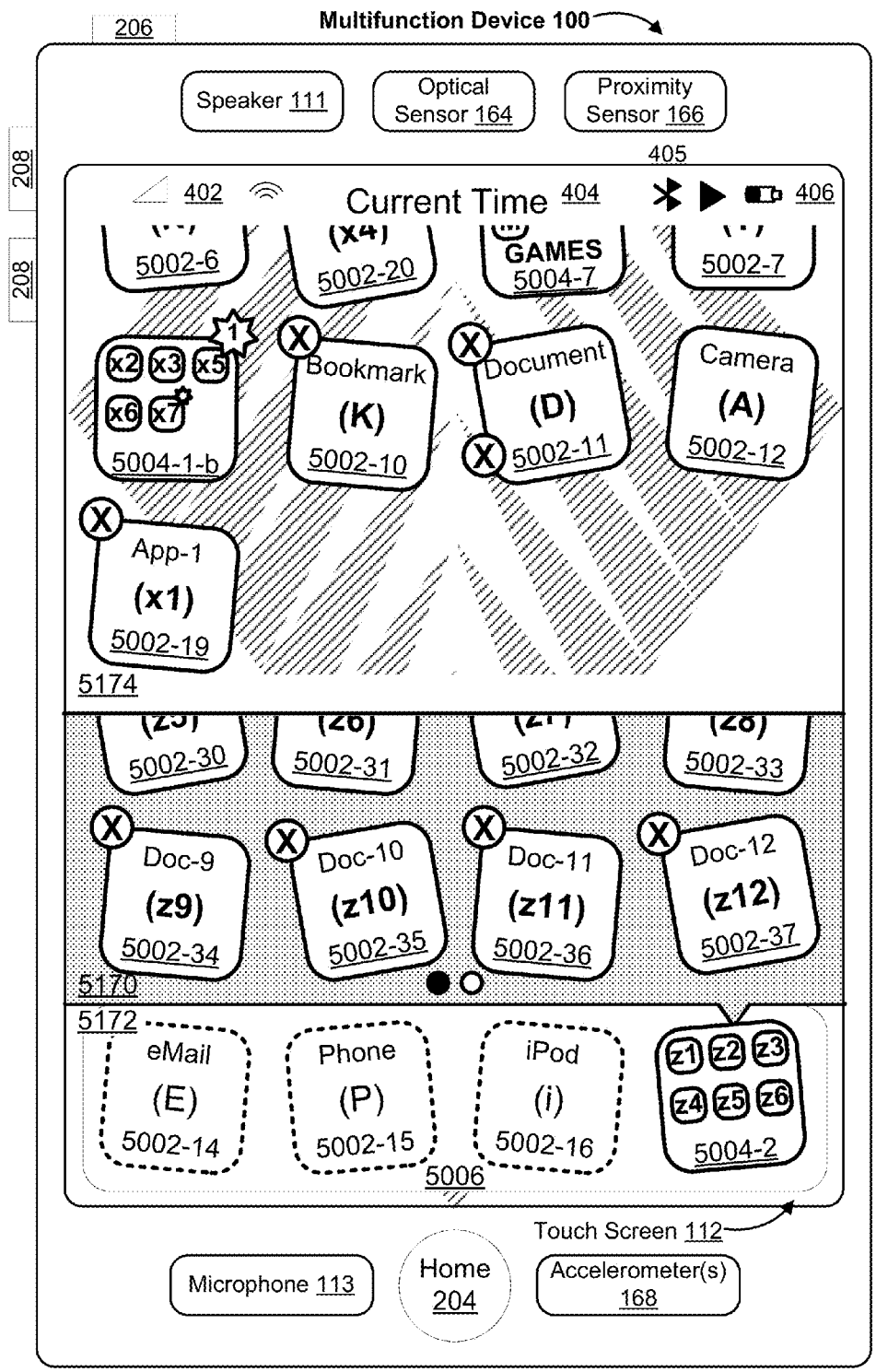
Figure 5DDD

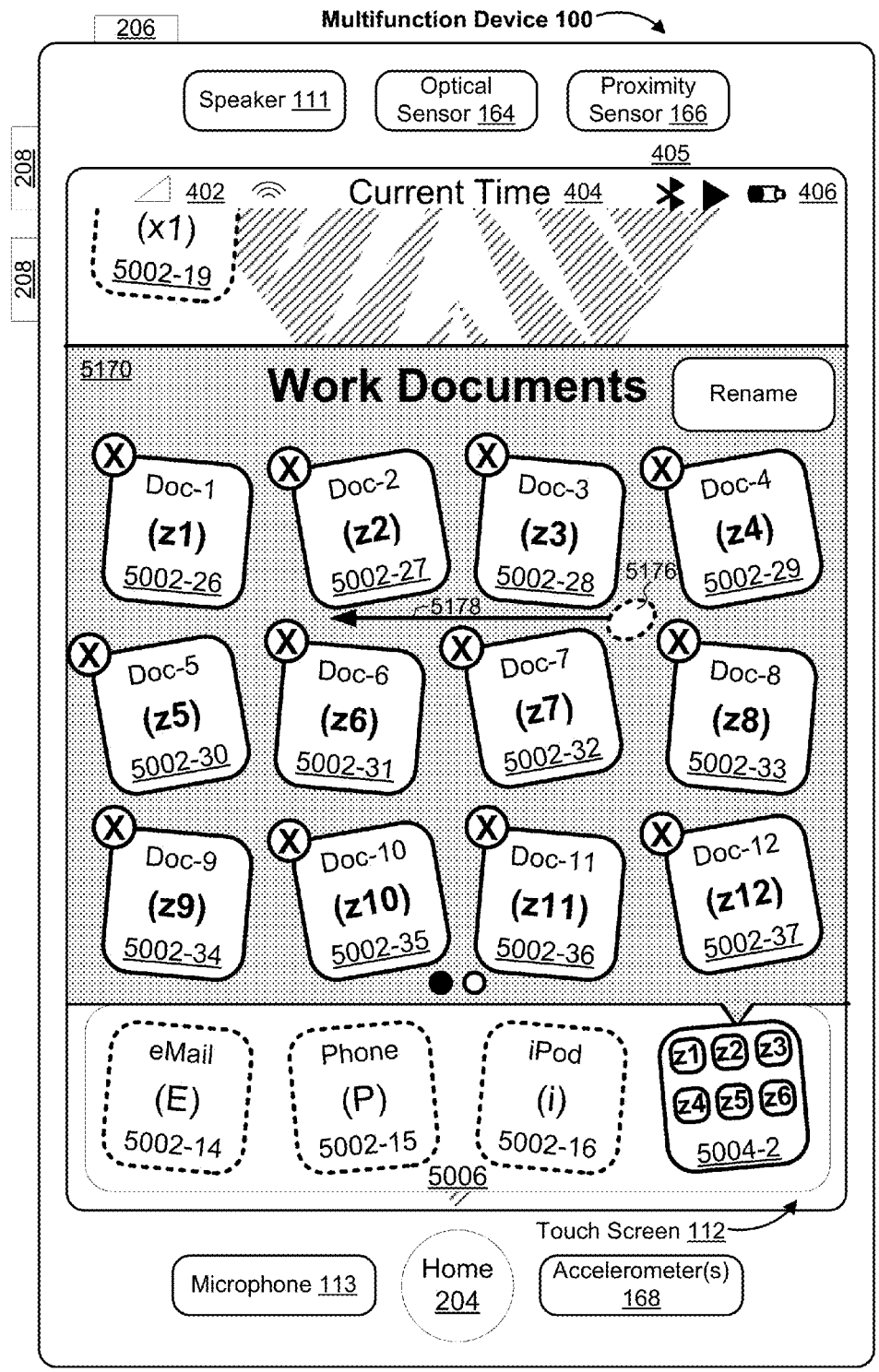
Figure 5EEE

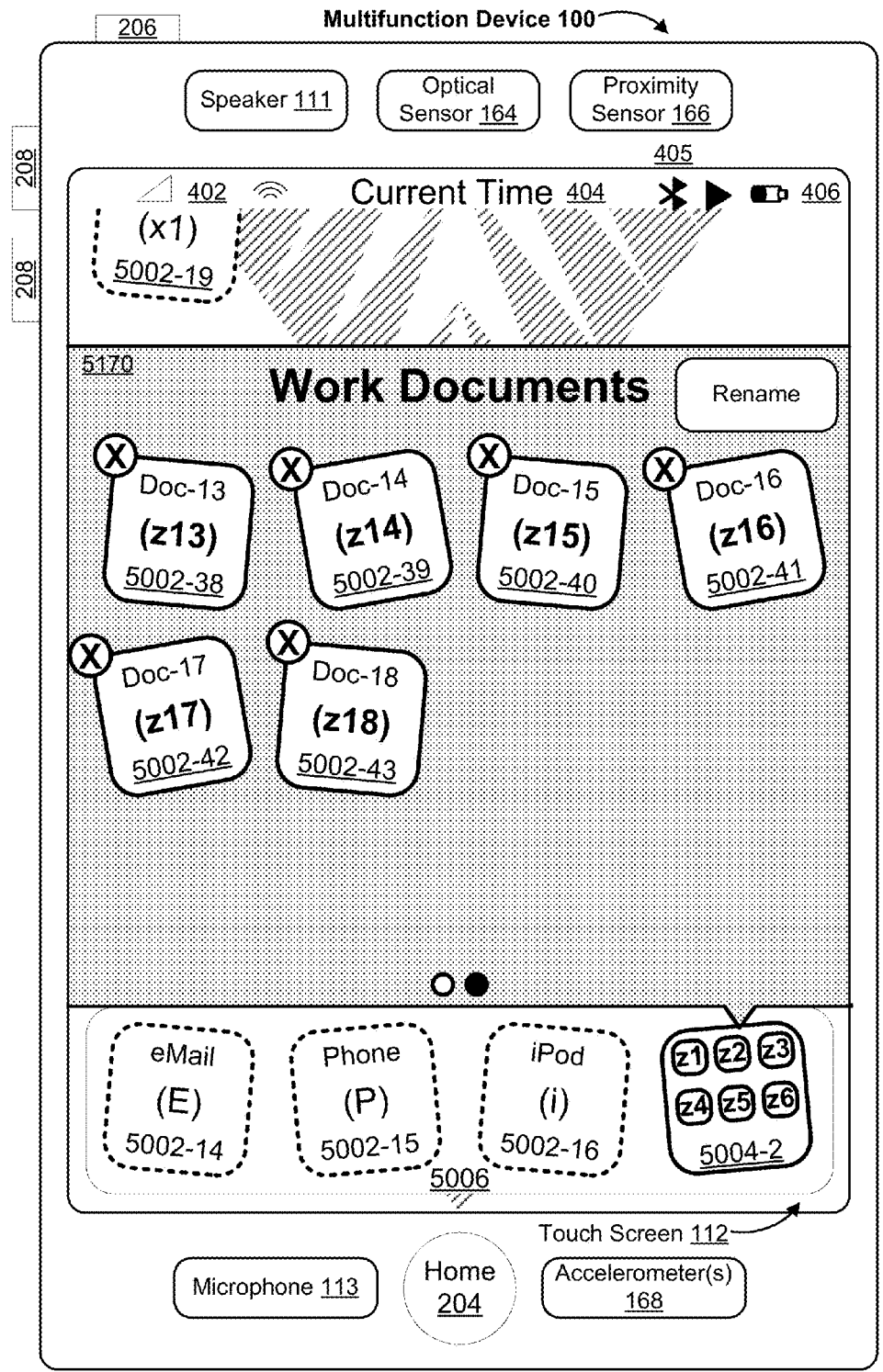
Figure 5FFF

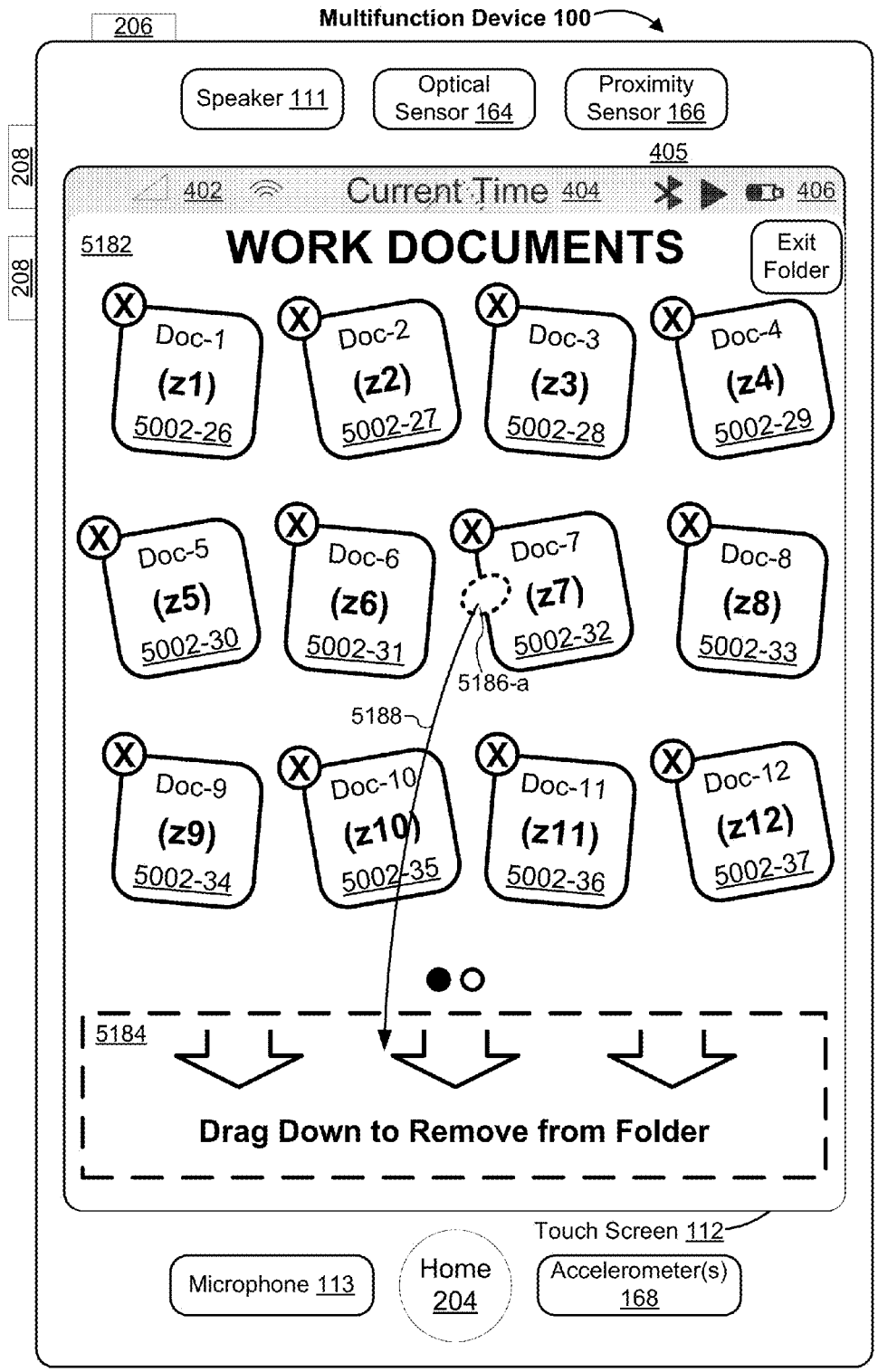
Figure 5GGG

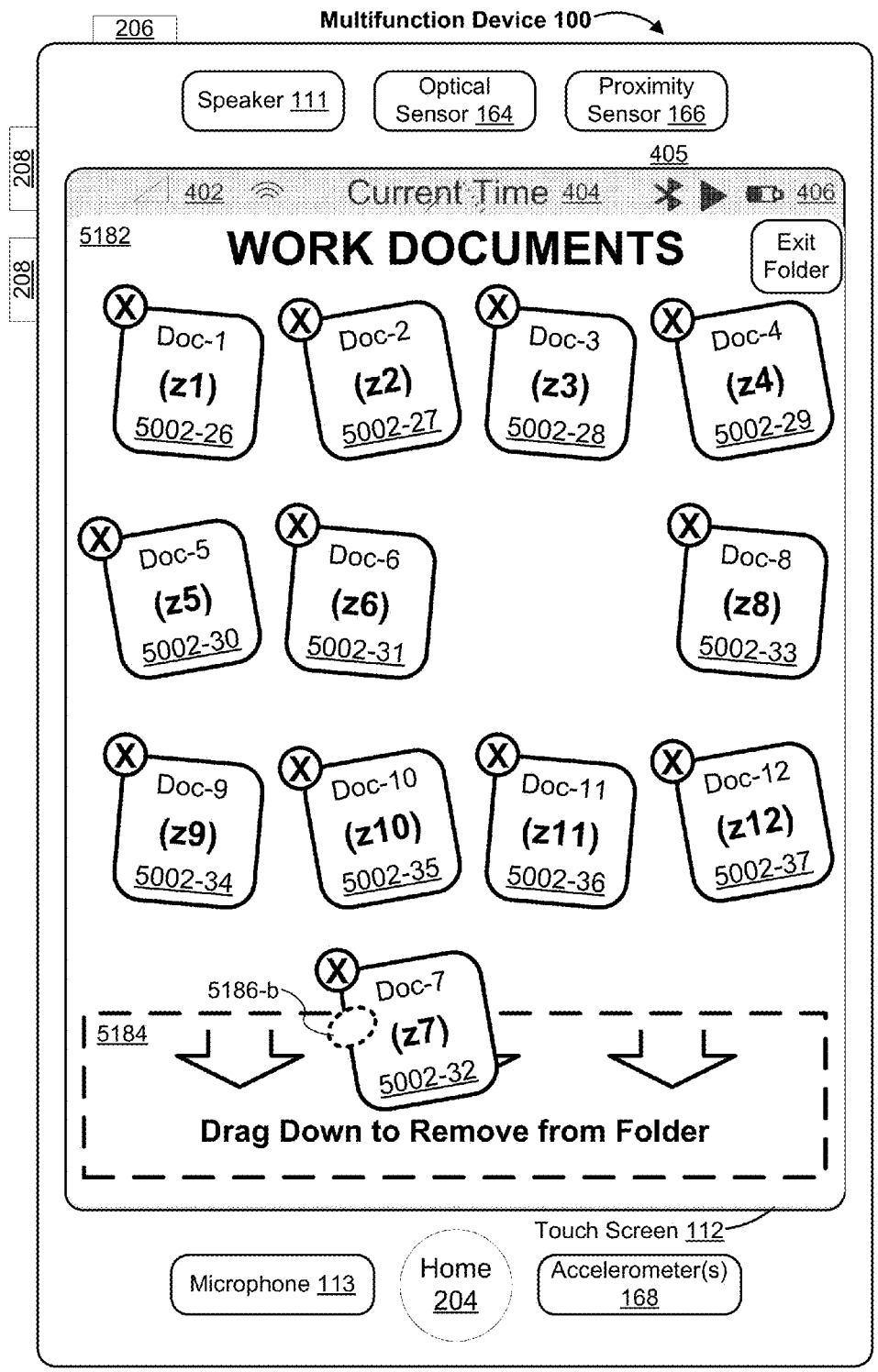
Figure 5HHH

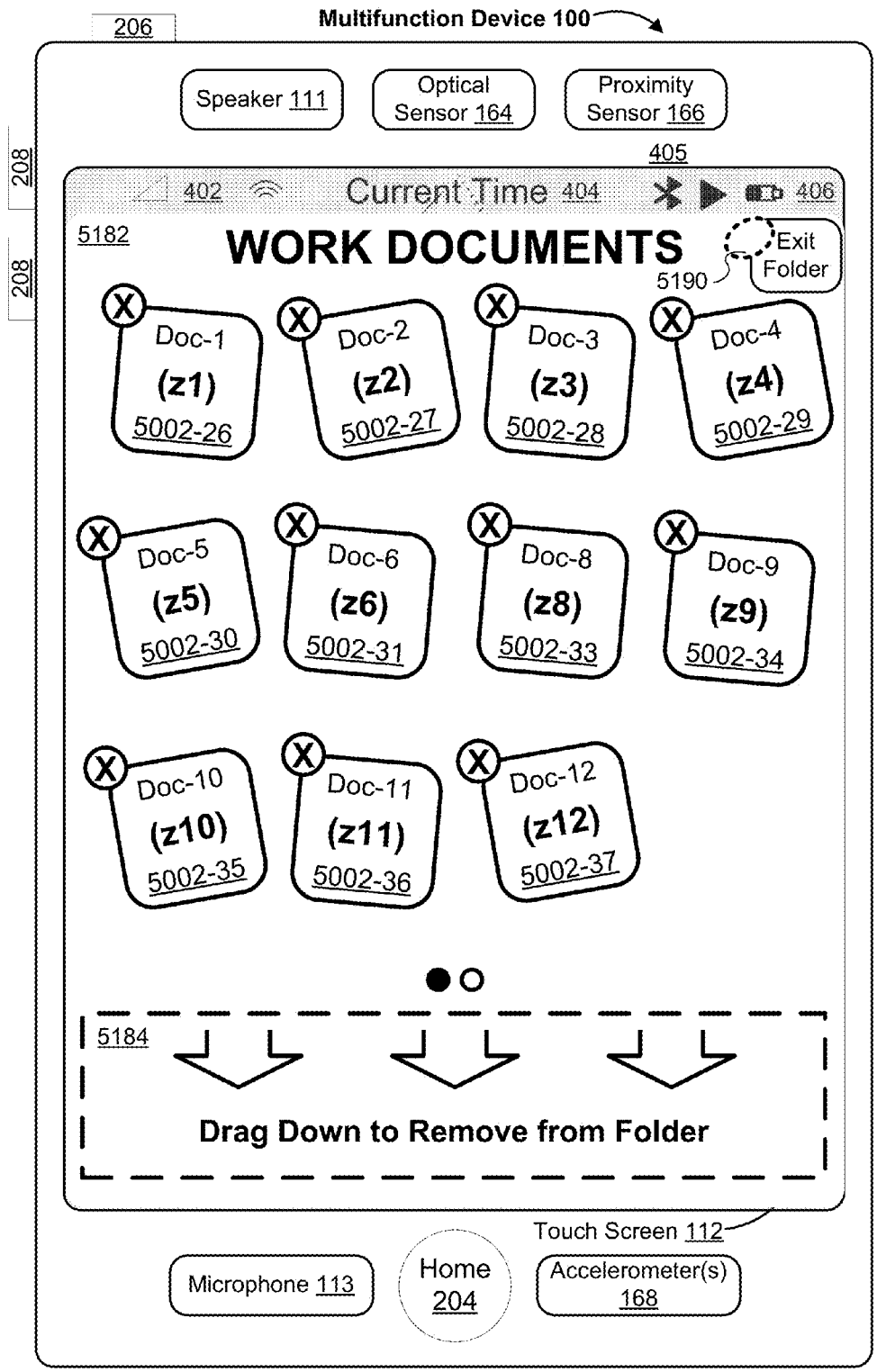
Figure 5III

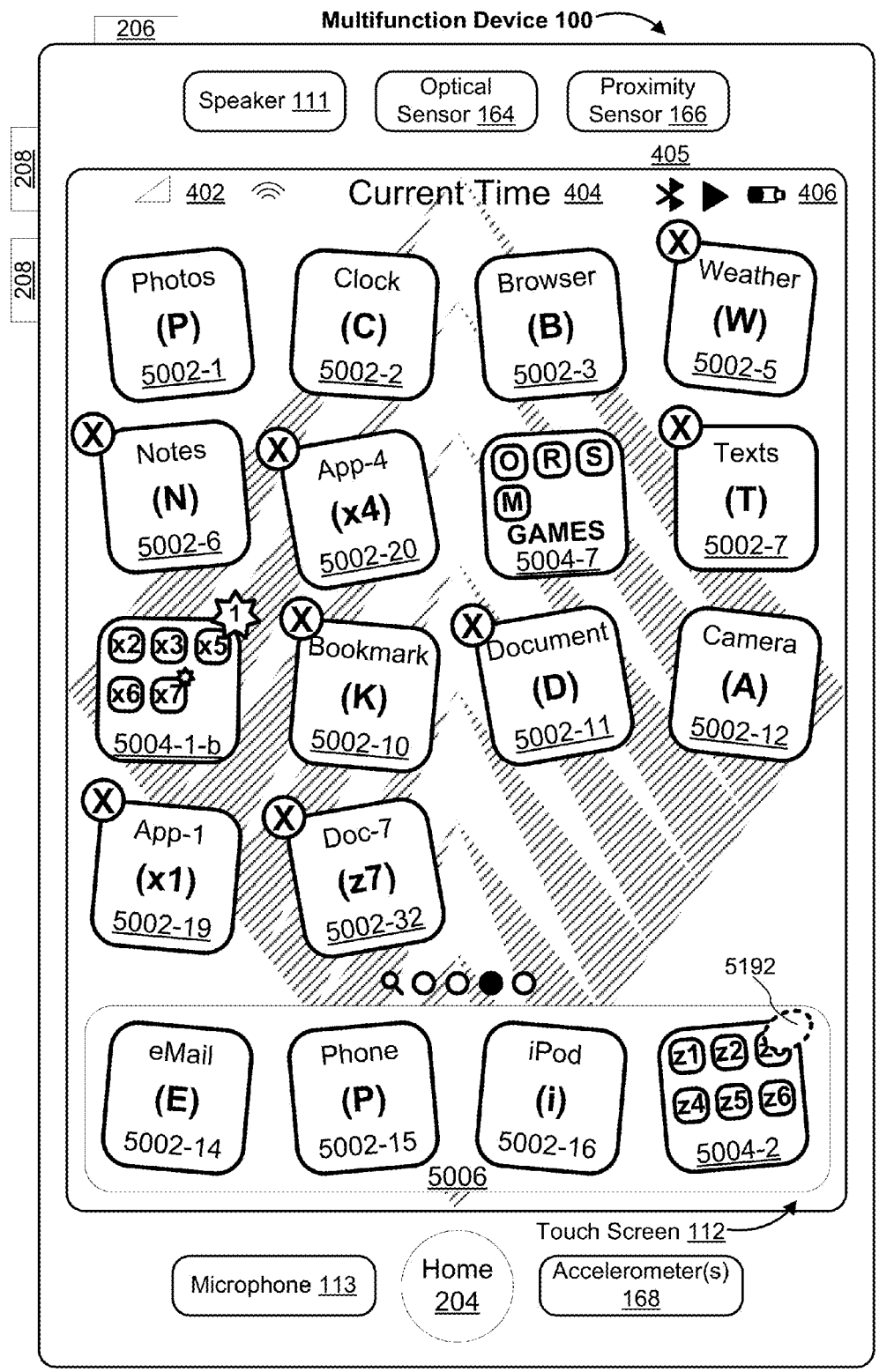
Figure 5JJJ

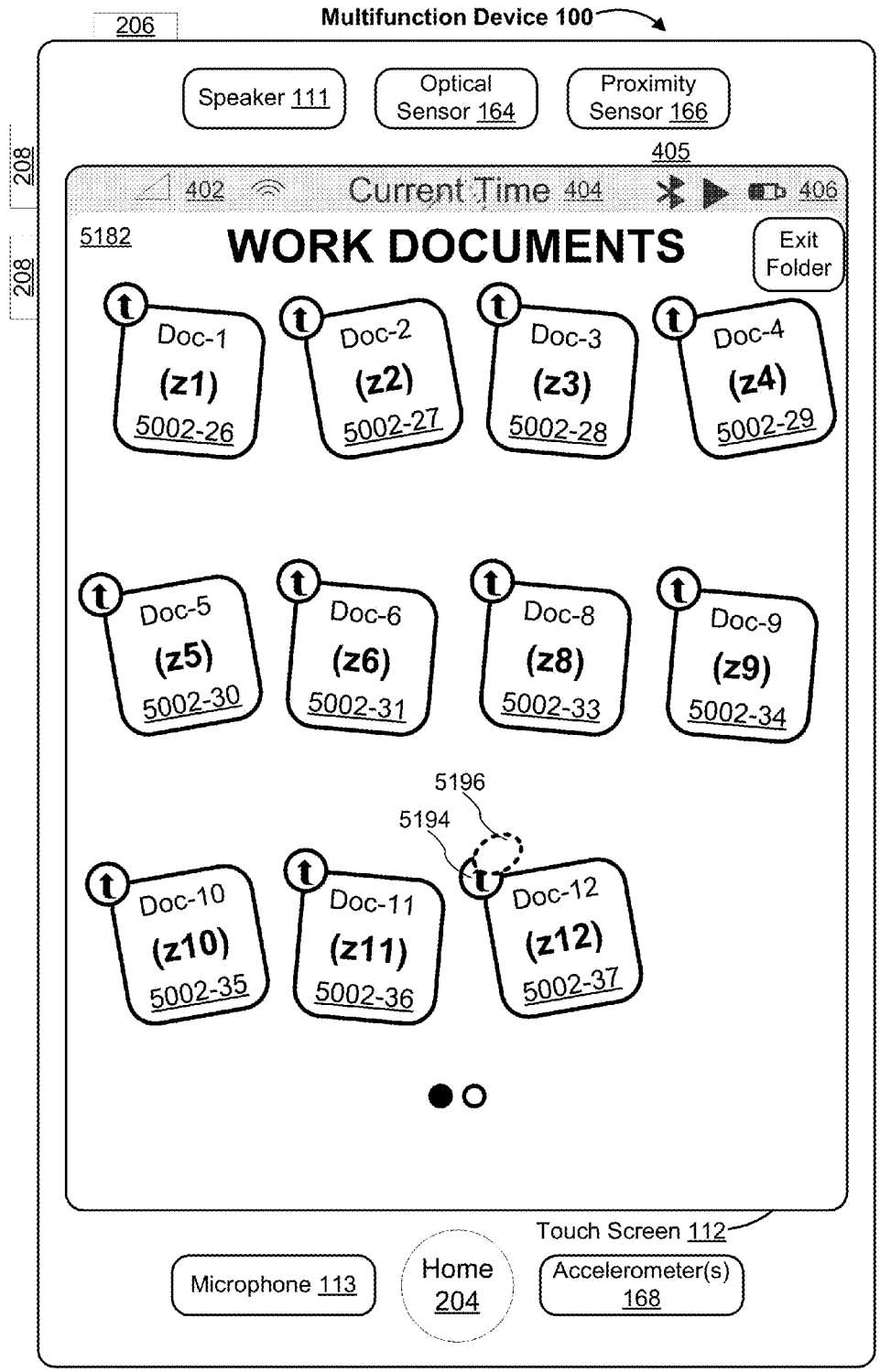
Figure 5KKK

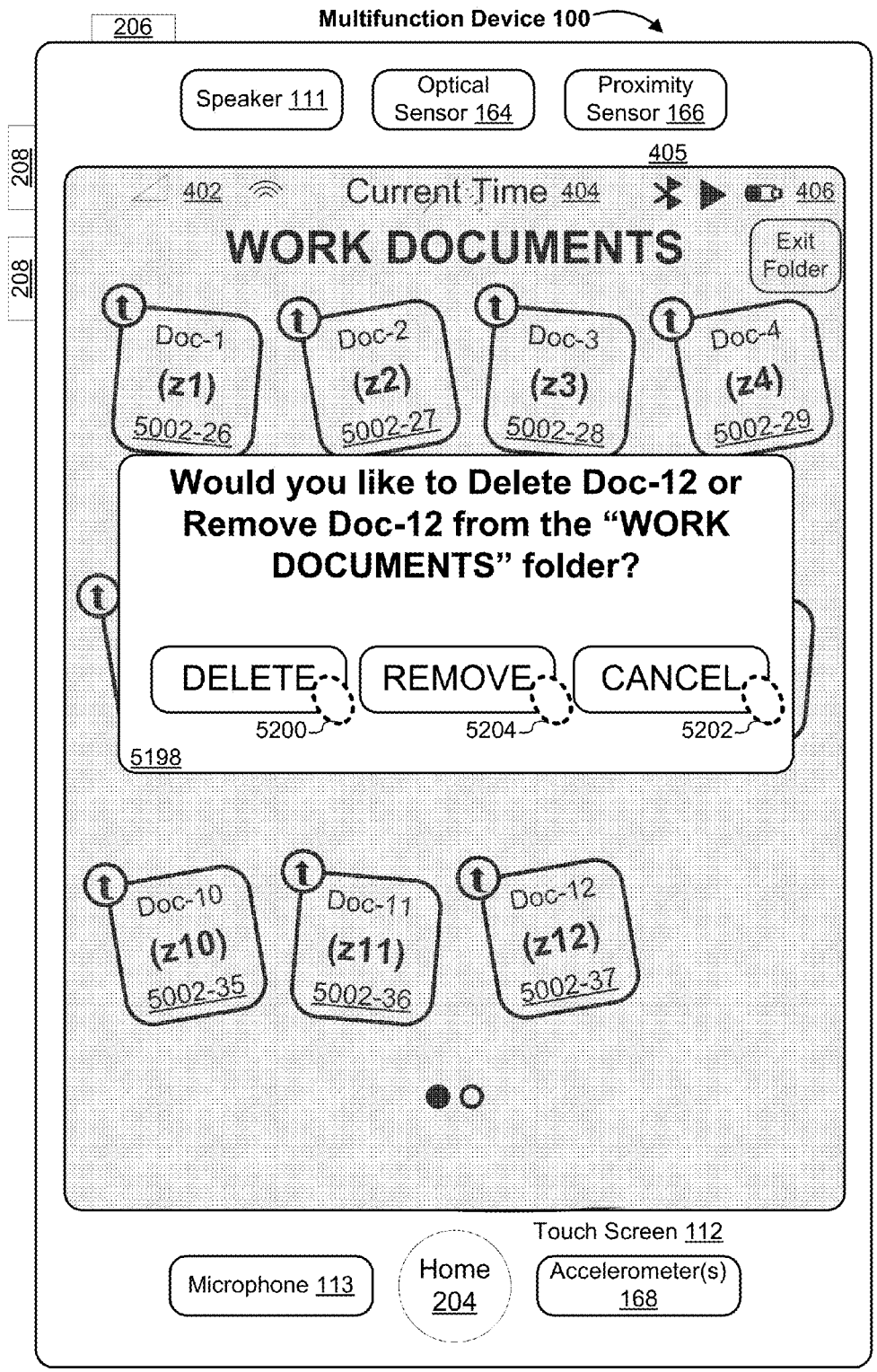
Figure 5LLL

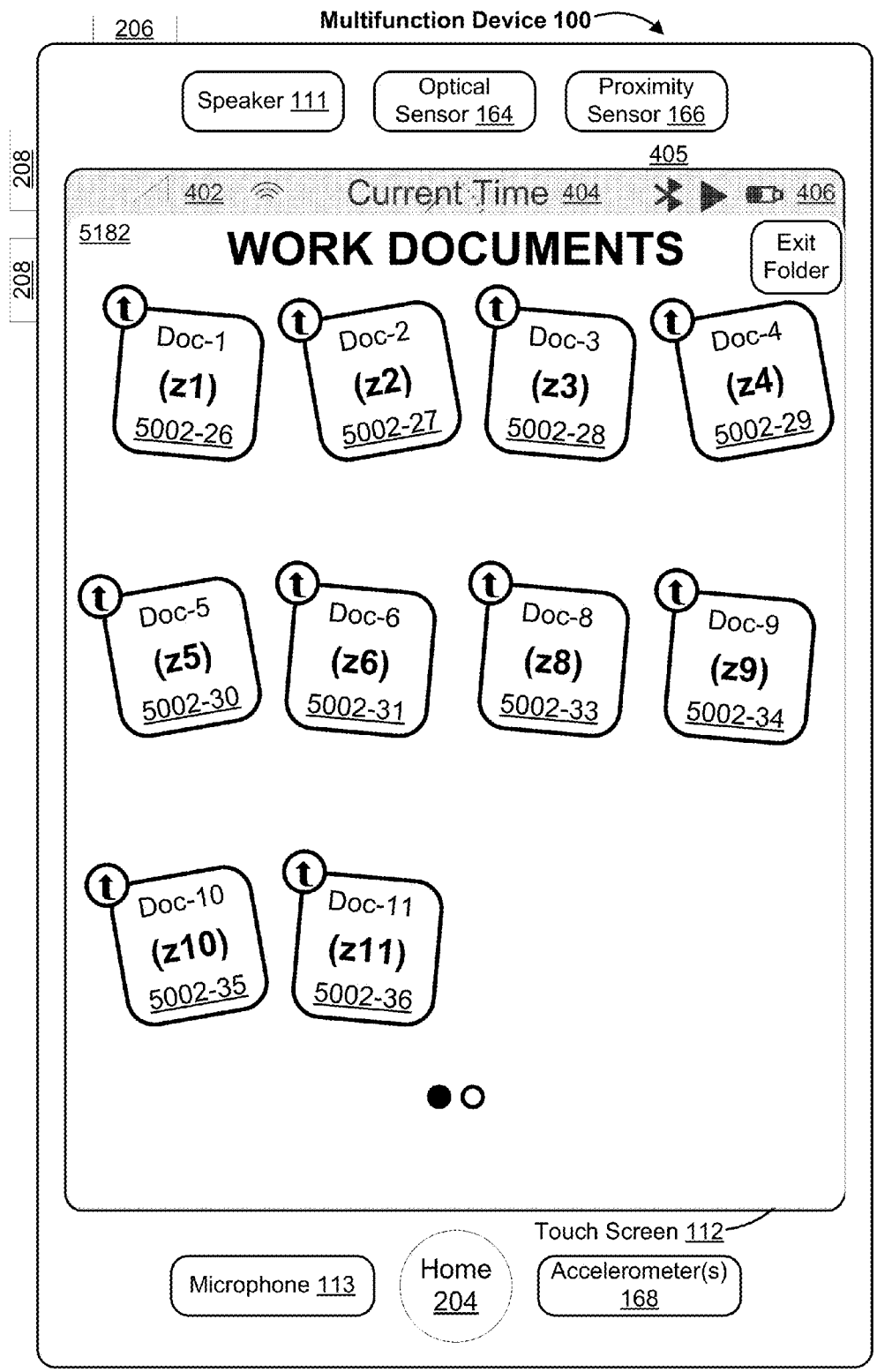
Figure 5MMM

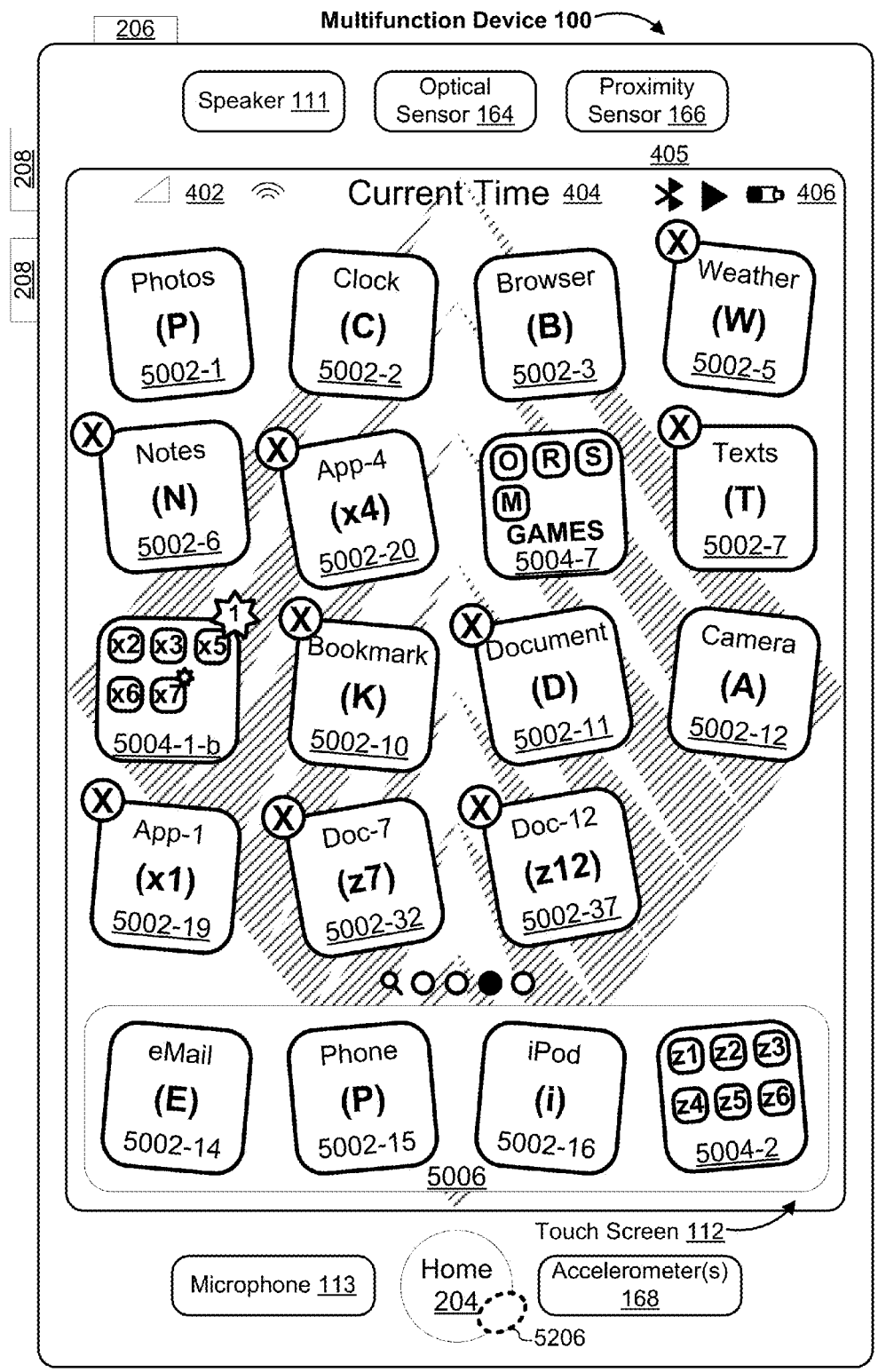
Figure 5NNN

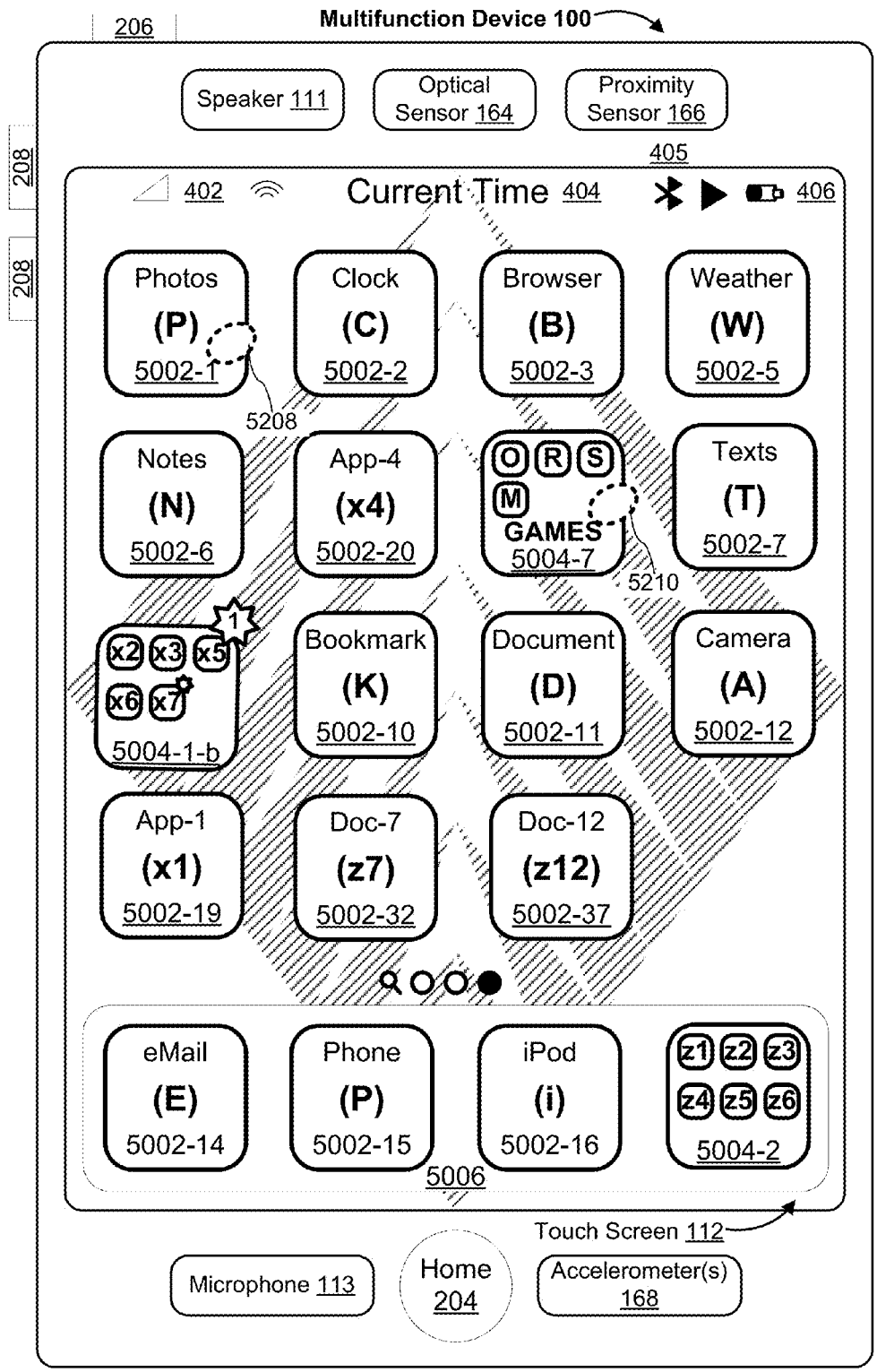
Figure 5OOO

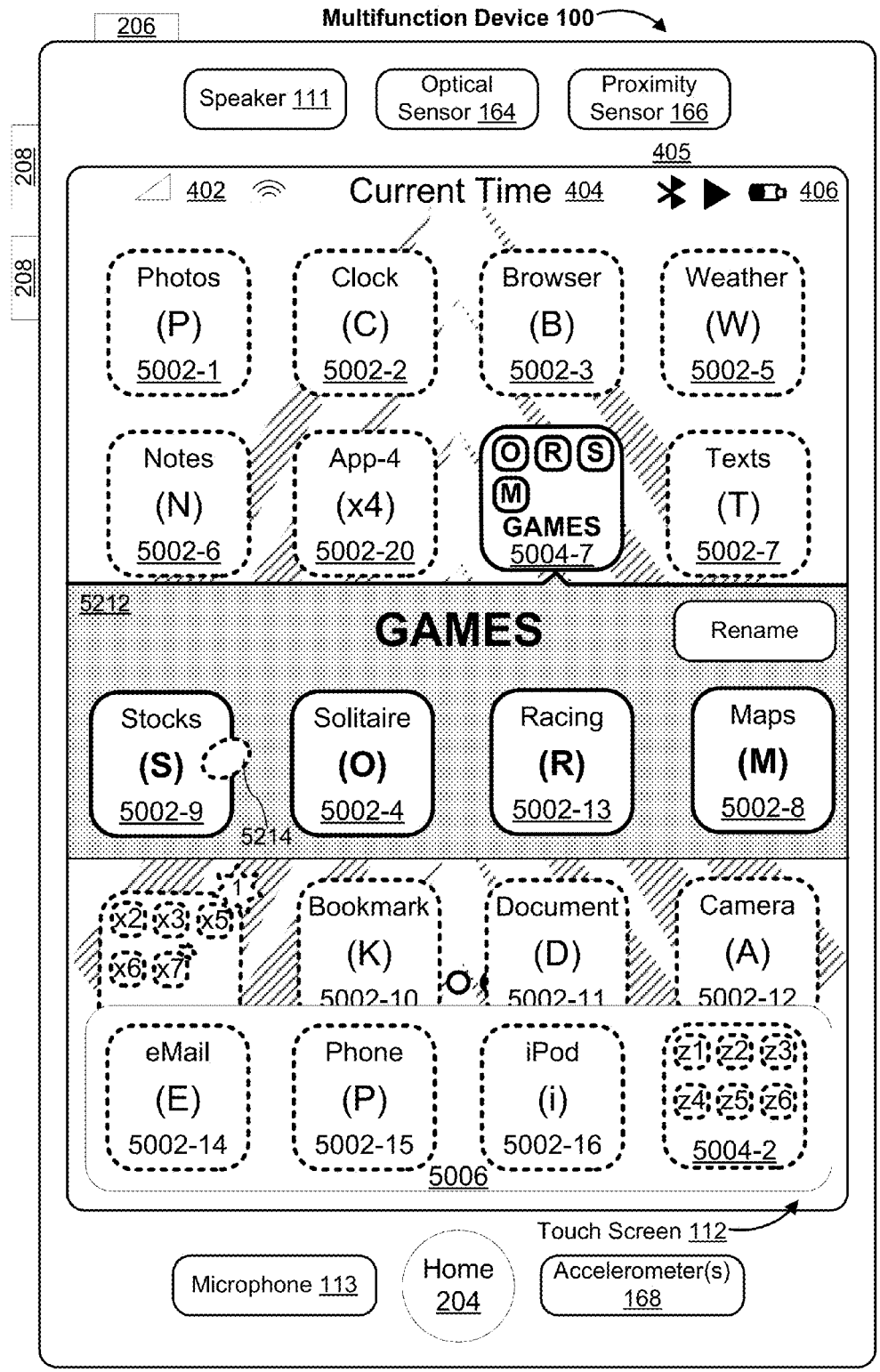
Figure 5PPP

700

702 Concurrently display one or more action icons and one or more folder icons on the display of a multifunction device. The multifunction device has a normal operation mode for activating applications and a user interface reconfiguration mode for rearranging the action icons and the folder icons on the display.

704 Detect a first input

706 The first input corresponds to a request to select the respective folder icon when the first input is a tap gesture at a location on a touch-sensitive surface that corresponds to a location of the respective folder icon on the display

708 The first input corresponds to a request to select the respective action icon when the first input is a tap gesture at a location on a touch-sensitive surface that corresponds to a location of the respective action icon on the display

710 In response to detecting the first input:

712 Is the first input a request to select a folder icon or request to select an action icon? — Action Icon → (A)

Folder Icon 714

716 Determine that the first input corresponds to a request to select a respective folder icon of the one or more folder icons

718 Displaying contents of a folder associated with the respective folder icon without regard for whether the multifunction device is in the normal operation mode or the user interface reconfiguration mode (B) (C)

1102 — Display a dynamic folder icon. The dynamic folder icon includes a visual indication of current content in a folder that is associated with the dynamic folder icon.

1104 — The dynamic folder icon indicates a number of action icons that are contained within the folder associated with the dynamic folder icon 1106 — The content has a spatial arrangement within the folder. The dynamic folder icon provides a visual indication as to the spatial arrangement of the content within the folder.

1108 — The content includes a plurality of action icons. The spatial arrangement is a predefined grid of action icons. A plurality of respective action icons each has one or more horizontally adjacent neighboring action icons 1110 — The dynamic folder icon includes reduced scale representations of at least a subset of the plurality of action icons. The reduced scale representations are arranged so that, for a plurality of the reduced scale representations, each reduced scale representation of a respective action icon is horizontally adjacent to a reduced scale representation of one of the neighboring action icons for the respective action icon 1112 — The folder includes a plurality of action icons having a first scale.

Displaying the dynamic folder icon includes displaying reduced scale representations of one or more of action icons in the plurality of action icons at a second scale within the dynamic folder icon. The second scale is smaller than the first scale

1202 Display a folder icon over a wallpaper background on the display. The folder icon corresponding to a folder that contains content. The content includes one or more selectable user interface objects.

1204 Prior to detecting the first input, displaying one or more additional selectable user interface objects. The one or more additional selectable user interface objects include:

A first set of additional selectable user interface objects that have predefined locations on the first portion of the wallpaper background.

A second set of additional selectable user interface objects that have predefined locations on the second portion of the wallpaper background.

1206 Detect a first input that corresponds to a request to display content of the folder

1208 In response to detecting the first input:

1210 Divide the wallpaper background into a first portion and a second portion

1212 The folder icon is displayed within the first portion of the wallpaper:

When the folder icon is one of a plurality of selectable user interface objects in a dock area of the display, the first portion includes a dock area of the display.

Then the folder icon is one of a plurality of selectable user interface objects outside of the dock area of the display, the second portion includes a dock area of the display.

DEVICE, METHOD, AND GRAPHICAL USER INTERFACE FOR MANAGING FOLDERS

RELATED APPLICATIONS

This application claims priority on U.S. Provisional Application Ser. No. 61/321,872, filed Apr. 7, 2010, which is incorporated herein by reference in its entirety.

This application is also related to the following: (1) U.S. application Ser. No. 12/888,362, filed Sep. 22, 2010, entitled "Device, Method, and Graphical User Interface for Managing Folders," (2) U.S. application Ser. No. 12/888,366, filed Sep. 22, 2010, entitled "Device, Method, and Graphical User Interface for Managing Folders," (3) U.S. application Ser. No. 12/888,373, filed Sep. 22, 2010, entitled "Device, Method, and Graphical User Interface for Managing Folders," (4) U.S. application Ser. No. 12/888,375, filed Sep. 22, 2010, entitled "Device, Method, and Graphical User Interface for Managing Folders," (5) U.S. application Ser. No. 12/888,376, filed Sep. 22, 2010, entitled "Device, Method, and Graphical User Interface for Managing Folders," (6) U.S. application Ser. No. 12/888,377, filed Sep. 22, 2010, entitled "Device, Method, and Graphical User Interface for Managing Folders," which are incorporated herein by reference in their entirety.

TECHNICAL FIELD

The disclosed embodiments relate generally to electronic devices with touch-sensitive surfaces, including but not limited to electronic devices with touch-sensitive surfaces for managing folders.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manage folders by manipulating selectable user interface objects on a display.

Exemplary manipulations include creating a folder, displaying a folder view associated with a folder, adding selectable user interface objects (e.g., application icons, document icons, folder icons, etc.) to a folder, removing selectable user interface objects from a folder, repositioning selectable user interface objects within a folder view of a folder, repositioning a folder icon within an arrangement of selectable user interface objects and deleting a folder. Exemplary selectable user interface objects include icons representing applications, digital images, video, text, icons, and other documents, as well as applications icons that are associated with computing applications (e.g., mobile device applications and/or personal computer applications, etc.).

But existing methods for performing these manipulations are cumbersome and inefficient. For example, using a sequence of inputs to create, modify and/or delete folders and content within folders is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for managing folders. Such methods and interfaces may complement or replace conventional methods for managing folders. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a multifunction device includes a display, one or more processors, memory, and one or more programs. The one or more programs are stored in the memory and configured to be executed by the one or more processors. The one or more programs include instructions for: displaying a plurality of selectable user interface objects on the display; detecting a first input; and in response to detecting the first input, moving a first object in the plurality of selectable user interface objects across the display to a location on the display that is proximate to a second object in the plurality of selectable user interface objects. The one or more programs further include instructions for detecting that the first input meets predefined folder-creation criteria while the first object is proximate to the second object; and, in response to detecting that the first input meets the predefined folder-creation criteria while the first object is proximate to the second object, creating a folder that contains the first object and the second object.

In accordance with some embodiments, a method is performed at a multifunction device with a display. The method includes: displaying a plurality of selectable user interface objects on the display; detecting a first input; and in response to detecting the first input, moving a first object in the plurality of selectable user interface objects across the display to a location on the display that is proximate to a second object in the plurality of selectable user interface objects. The method further includes detecting that the first input meets predefined folder-creation criteria while the first object is proximate to the second object; and, in response to detecting that the first input meets the predefined folder-creation criteria while the first object is proximate to the second object, creating a folder that contains the first object and the second object.

In accordance with some embodiments, a graphical user interface on a multifunction device with a display, a memory, and one or more processors to execute one or more programs stored in the memory includes a plurality of selectable user interface objects. A first input is detected, and in response to detecting the first input, a first object in the plurality of selectable user interface objects is moved across the display to a location on the display that is proximate to a second object in the plurality of selectable user interface objects. It is detected that the first input meets predefined folder-creation criteria while the first object is proximate to the second object; and, in response to detecting that the first input meets the predefined folder-creation criteria while the first object is proximate to the second object, a folder is created that contains the first object and the second object.

In accordance with some embodiments, a computer readable storage medium has stored therein instructions which when executed by a multifunction device with a display, cause the device to: display a plurality of selectable user interface objects on the display; detect a first input; and in response to detecting the first input, move a first object in the plurality of selectable user interface objects across the display to a location on the display that is proximate to a second object in the plurality of selectable user interface objects. The instructions further cause the device to detect that the first input meets predefined folder-creation criteria while the first object is proximate to the second object; and, in response to detecting that the first input meets the predefined folder-creation criteria while the first object is proximate to the second object, create a folder that contains the first object and the second object.

In accordance with some embodiments, a multifunction device includes: a display; means for displaying a plurality of selectable user interface objects on the display; means for detecting a first input; and means, responsive to detecting the first input, for moving a first object in the plurality of selectable user interface objects across the display to a location on the display that is proximate to a second object in the plurality of selectable user interface objects. The device further includes means for detecting that the first input meets predefined folder-creation criteria while the first object is proximate to the second object; and, means, responsive to detecting that the first input meets the predefined folder-creation criteria while the first object is proximate to the second object, for creating a folder that contains the first object and the second object.

In accordance with some embodiments, an information processing apparatus for use in a multifunction device with a display includes: means for detecting a first input; and means, responsive to detecting the first input, for moving a first object in the plurality of selectable user interface objects across the display to a location on the display that is proximate to a second object in the plurality of selectable user interface objects. The information processing apparatus further includes means for detecting that the first input meets predefined folder-creation criteria while the first object is proximate to the second object; and, means, responsive to detecting that the first input meets the predefined folder-creation criteria while the first object is proximate to the second object, for creating a folder that contains the first object and the second object.

In accordance with some embodiments, a multifunction device includes a display, one or more processors, memory, and one or more programs. The one or more programs are stored in the memory and configured to be executed by the one or more processors. The one or more programs include instructions for: concurrently displaying one or more action icons and one or more folder icons on the display. The multifunction device has a normal operation mode for activating applications and a user interface reconfiguration mode for rearranging the action icons and the folder icons on the display. The one or more programs further include instructions for detecting a first input; and in response to detecting the first input: when the first input corresponds to a request to select a respective folder icon of the one or more folder icons, displaying contents of a folder associated with the respective folder icon without regard for whether the multifunction device is in the normal operation mode or the user interface reconfiguration mode; and when the first input corresponds to a request to select a respective action icon of the one or more action icons: when the multifunction device is in the normal operation mode, activating an application associated with the respective action icon; and, when the multifunction device is in the user interface reconfiguration mode, continuing to display the respective action icon without activating the application associated with the respective action icon.

In accordance with some embodiments, a method is performed at a multifunction device with a display. The method includes: concurrently displaying one or more action icons and one or more folder icons on the display. The multifunction device has a normal operation mode for activating applications and a user interface reconfiguration mode for rearranging the action icons and the folder icons on the display. The method further includes detecting a first input; and in response to detecting the first input: when the first input corresponds to a request to select a respective folder icon of the one or more folder icons, displaying contents of a folder associated with the respective folder icon without regard for whether the multifunction device is in the normal operation mode or the user interface reconfiguration mode; and when the first input corresponds to a request to select a respective action icon of the one or more action icons: when the multifunction device is in the normal operation mode, activating an application associated with the respective action icon; and, when the multifunction device is in the user interface reconfiguration mode, continuing to display the respective action icon without activating the application associated with the respective action icon.

In accordance with some embodiments, a graphical user interface on a multifunction device with a display, a memory, and one or more processors to execute one or more programs stored in the memory includes one or more action icons and one or more folder icons. The one or more action icons and one or more folder icons are concurrently displayed on the display. The multifunction device has a normal operation mode for activating applications and a user interface reconfiguration mode for rearranging the action icons and the folder icons on the display. A first input is detected; and in response to detecting the first input: when the first input corresponds to a request to select a respective folder icon of the one or more folder icons, contents of a folder associated with the respective folder icon are displayed without regard for whether the multifunction device is in the normal operation mode or the user interface reconfiguration mode; and when the first input corresponds to a request to select a respective action icon of the one or more action icons: when the multifunction device is in the normal operation mode, an application associated with the respective action icon is activated; and, when the multifunction device is in the user interface reconfiguration mode, the respective action icon continues to be displayed without activating the application associated with the respective action icon.

In accordance with some embodiments, a computer readable storage medium has stored therein instructions which when executed by a multifunction device with a display, cause the device to: concurrently display one or more action icons and one or more folder icons on the display. The multifunction device has a normal operation mode for activating applications and a user interface reconfiguration mode for rearranging the action icons and the folder icons on the display. The instructions further cause the device to detect a first input; and in response to detecting the first input: when the first input corresponds to a request to select a respective folder icon of the one or more folder icons, display contents of a folder associated with the respective folder icon without regard for whether the multifunction device is in the normal operation mode or the user interface reconfiguration mode; and when the first input corresponds to a request to select a respective action icon of the one or more action icons: when the multifunction device is in the normal operation mode, activate an application associated with the respective action icon; and, when the multifunction device is in the user interface reconfiguration mode, continue to display the respective action icon without activating the application associated with the respective action icon.

In accordance with some embodiments, a multifunction device includes: a display; means for concurrently displaying one or more action icons and one or more folder icons on the display. The multifunction device has a normal operation mode for activating applications and a user interface reconfiguration mode for rearranging the action icons and the folder icons on the display. The device further includes means for detecting a first input; and means, responsive to detecting the first input, for: when the first input corresponds to a request to select a respective folder icon of the one or more folder icons, displaying contents of a folder associated with the respective folder icon without regard for whether the multifunction device is in the normal operation mode or the user interface reconfiguration mode; and when the first input corresponds to a request to select a respective action icon of the one or more action icons: when the multifunction device is in the normal operation mode, activating an application associated with the respective action icon; and, when the multifunction device is in the user interface reconfiguration mode, continuing to display the respective action icon without activating the application associated with the respective action icon.

In accordance with some embodiments, an information processing apparatus for use in a multifunction device with a display includes: means for concurrently displaying one or more action icons and one or more folder icons on the display. The multifunction device has a normal operation mode for activating applications and a user interface reconfiguration mode for rearranging the action icons and the folder icons on the display. The information processing apparatus further includes means for detecting a first input; and means, responsive to detecting the first input, for: when the first input corresponds to a request to select a respective folder icon of the one or more folder icons, displaying contents of a folder associated with the respective folder icon without regard for whether the multifunction device is in the normal operation mode or the user interface reconfiguration mode; and when the first input corresponds to a request to select a respective action icon of the one or more action icons: when the multifunction device is in the normal operation mode, activating an application associated with the respective action icon; and, when the multifunction device is in the user interface reconfiguration mode, continuing to display the respective action icon without activating the application associated with the respective action icon.

In accordance with some embodiments, a multifunction device includes a display, one or more processors, memory, and one or more programs. The one or more programs are stored in the memory and configured to be executed by the one or more processors. The one or more programs include instructions for: receiving an input that corresponds to a request to create a folder that contains a first item and a second item; and in response to receiving the input: creating the folder that contains the first item and the second item; determining a first plurality of descriptors that are associated with the first item; and determining a second plurality of descriptors that are associated with the second item. The one or more programs further include instructions for, when the first plurality of descriptors and the second plurality of descriptors share at least a first common descriptor: automatically generating a folder name for the folder based on the first common descriptor; and displaying an icon for the folder with the automatically generated folder name on the display.

In accordance with some embodiments, a method is performed at a multifunction device with a display. The method includes: receiving an input that corresponds to a request to create a folder that contains a first item and a second item; and in response to receiving the input: creating the folder that contains the first item and the second item; determining a first plurality of descriptors that are associated with the first item; and determining a second plurality of descriptors that are associated with the second item. The method further includes, when the first plurality of descriptors and the second plurality of descriptors share at least a first common descriptor: automatically generating a folder name for the folder based on the first common descriptor; and displaying an icon for the folder with the automatically generated folder name on the display.

In accordance with some embodiments, a graphical user interface on a multifunction device with a display, a memory, and one or more processors to execute one or more programs stored in the memory includes a first item and a second item. An input that corresponds to a request to create a folder that contains the first item and the second item is received; and in response to receiving the input: the folder that contains the first item and the second item is created; a first plurality of descriptors that are associated with the first item are determined; and a second plurality of descriptors that are associated with the second item are determined. When the first plurality of descriptors and the second plurality of descriptors share at least a first common descriptor: a folder name for the folder is automatically generated based on the first common descriptor; and an icon for the folder is displayed with the automatically generated folder name on the display.

In accordance with some embodiments, a computer readable storage medium has stored therein instructions which when executed by a multifunction device with a display, cause the device to: receive an input that corresponds to a request to create a folder that contains a first item and a second item; and in response to receiving the input: create the folder that contains the first item and the second item; determine a first plurality of descriptors that are associated with the first item; and determine a second plurality of descriptors that are associated with the second item. The instructions further cause the device to, when the first plurality of descriptors and the second plurality of descriptors share at least a first common descriptor: automatically generate a folder name for the folder based on the first common descriptor; and display an icon for the folder with the automatically generated folder name on the display.

In accordance with some embodiments, a multifunction device includes: a display; means for receiving an input that corresponds to a request to create a folder that contains a first item and a second item; and means, responsive to receiving the input, for: creating the folder that contains the first item and the second item; determining a first plurality of descriptors that are associated with the first item; and determining a second plurality of descriptors that are associated with the second item. The device further includes means for, when the first plurality of descriptors and the second plurality of descriptors share at least a first common descriptor: automatically generating a folder name for the folder based on the first common descriptor; and displaying an icon for the folder with the automatically generated folder name on the display.

In accordance with some embodiments, an information processing apparatus for use in a multifunction device with a display includes: means for receiving an input that corresponds to a request to create a folder that contains a first item and a second item; and means, responsive to receiving the input, for: creating the folder that contains the first item and the second item; determining a first plurality of descriptors that are associated with the first item; and determining a second plurality of descriptors that are associated with the second item. The information processing apparatus further includes means for, when the first plurality of descriptors and the second plurality of descriptors share at least a first common descriptor: automatically generating a folder name for the folder based on the first common descriptor; and displaying an icon for the folder with the automatically generated folder name on the display.

In accordance with some embodiments, a multifunction device includes a display, one or more processors, memory, and one or more programs. The one or more programs are stored in the memory and configured to be executed by the one or more processors. The one or more programs include instructions for: displaying a plurality of icons on the display. A first icon in the plurality of icons is displayed at a first location on the display. A second icon in the plurality of icons, distinct from the first icon, has an activation region with a default size. The one or more programs further include instructions for detecting an input that corresponds to a request to move the first icon; changing a size of the activation region for the second icon from the default size based on a distance from the first location to a location of the second icon; and in response to detecting the input, moving the first icon across the display away from the first location. The one or more programs also includes instructions for detecting that the input meets predefined trigger criteria; and, in response to detecting that the input meets predefined trigger criteria: when the first icon is at least partly within the activation region of the second icon, performing a first operation that is associated with the second icon; and when the first icon is outside of the activation region of the second icon, performing a second operation that is distinct from the first operation.

In accordance with some embodiments, a method is performed at a multifunction device with a display. The method includes: displaying a plurality of icons on the display. A first icon in the plurality of icons is displayed at a first location on the display. A second icon in the plurality of icons, distinct from the first icon, has an activation region with a default size. The method further includes detecting an input that corresponds to a request to move the first icon; changing a size of the activation region for the second icon from the default size based on a distance from the first location to a location of the second icon; and in response to detecting the input, moving the first icon across the display away from the first location. The method also includes detecting that the input meets predefined trigger criteria; and, in response to detecting that the input meets predefined trigger criteria: when the first icon is at least partly within the activation region of the second icon, performing a first operation that is associated with the second icon; and when the first icon is outside of the activation region of the second icon, performing a second operation that is distinct from the first operation.

In accordance with some embodiments, a graphical user interface on a multifunction device with a display, a memory, and one or more processors to execute one or more programs stored in the memory includes a plurality of icons displayed on the display. A first icon in the plurality of icons is displayed at a first location on the display. A second icon in the plurality of icons, distinct from the first icon, has an activation region with a default size. An input that corresponds to a request to move the first icon is detected. A size of the activation region is changed for the second icon from the default size based on a distance from the first location to a location of the second icon. In response to detecting the input, the first icon is moved across the display away from the first location. It is detected that the input meets predefined trigger criteria; and, in response to detecting that the input meets predefined trigger criteria: when the first icon is at least partly within the activation region of the second icon, a first operation that is associated with the second icon is performed; and when the first icon is outside of the activation region of the second icon, a second operation that is distinct from the first operation is performed.

In accordance with some embodiments, a computer readable storage medium has stored therein instructions which when executed by a multifunction device with a display, cause the device to: display a plurality of icons on the display. A first icon in the plurality of icons is displayed at a first location on the display. A second icon in the plurality of icons, distinct from the first icon, has an activation region with a default size. The instructions further cause the device to detect an input that corresponds to a request to move the first icon; change a size of the activation region for the second icon from the default size based on a distance from the first location to a location of the second icon; and in response to detecting the input, move the first icon across the display away from the first location. The instructions also cause the device to detect that the input meets predefined trigger criteria; and, in response to detecting that the input meets predefined trigger criteria: when the first icon is at least partly within the activation region of the second icon, perform a first operation that is associated with the second icon; and when the first icon is outside of the activation region of the second icon, perform a second operation that is distinct from the first operation.

In accordance with some embodiments, a multifunction device includes: a display; means for displaying a plurality of icons on the display. A first icon in the plurality of icons is displayed at a first location on the display. A second icon in the plurality of icons, distinct from the first icon, has an activation region with a default size. The device further includes means for detecting an input that corresponds to a request to move the first icon; means for changing a size of the activation region for the second icon from the default size based on a distance from the first location to a location of the second icon; and means, responsive to detecting the input, for moving the first icon across the display away from the first location. The device also includes means for detecting that the input meets predefined trigger criteria; and, means, responsive to detecting that the input meets predefined trigger criteria, for: when the first icon is at least partly within the activation region of the second icon, performing a first operation that is associated with the second icon; and when the first icon is outside of the activation region of the second icon, performing a second operation that is distinct from the first operation.

In accordance with some embodiments, an information processing apparatus for use in a multifunction device with a display includes: means for displaying a plurality of icons on the display. A first icon in the plurality of icons is displayed at a first location on the display. A second icon in the plurality of icons, distinct from the first icon, has an activation region with a default size. The information processing apparatus further includes means for detecting an input that corresponds to a request to move the first icon; means for changing a size of the activation region for the second icon from the default size based on a distance from the first location to a location of the second icon; and means, responsive to detecting the input, for moving the first icon across the display away from the first location. The information processing apparatus also includes means for detecting that the input meets predefined trigger criteria; and, means, responsive to detecting that the input meets predefined trigger criteria, for: when the first icon is at least partly within the activation region of the second icon, performing a first operation that is associated with the second icon; and when the first icon is outside of the activation region of the second icon, performing a second operation that is distinct from the first operation.

In accordance with some embodiments, a multifunction device includes a display, one or more processors, memory, and one or more programs. The one or more programs are stored in the memory and configured to be executed by the one or more processors. The one or more programs include instructions for: displaying a plurality of icons on the display in a first arrangement; detecting an input that corresponds to a request to move a first icon in the plurality of icons from a first position on the display to a second position on the display; and in response to detecting the input: moving the first icon from the first position to the second position; and maintaining positions of each respective icon in the plurality of icons other than the first icon until automatic reconfiguration criteria have been met. The device further includes instructions for, when the automatic reconfiguration criteria have been met, moving one or more of the icons in the plurality of icons other than the first icon to form a second arrangement that is distinct from the first arrangement.

In accordance with some embodiments, a method is performed at a multifunction device with a display. The method includes: displaying a plurality of icons on the display in a first arrangement; detecting an input that corresponds to a request to move a first icon in the plurality of icons from a first position on the display to a second position on the display; and in response to detecting the input: moving the first icon from the first position to the second position; and maintaining positions of each respective icon in the plurality of icons other than the first icon until automatic reconfiguration criteria have been met. The method further includes when the automatic reconfiguration criteria have been met, moving one or more of the icons in the plurality of icons other than the first icon to form a second arrangement that is distinct from the first arrangement.

In accordance with some embodiments, a graphical user interface on a multifunction device with a display, a memory, and one or more processors to execute one or more programs stored in the memory includes a plurality of icons on the display in a first arrangement. An input that corresponds to a request to move a first icon in the plurality of icons from a first position on the display to a second position on the display is detected; and in response to detecting the input: the first icon is moved from the first position to the second position; and positions of each respective icon in the plurality of icons other than the first icon are maintained until automatic reconfiguration criteria have been met. When the automatic reconfiguration criteria have been met, one or more of the icons in the plurality of icons other than the first icon are moved to form a second arrangement that is distinct from the first arrangement.

In accordance with some embodiments, a computer readable storage medium has stored therein instructions which when executed by a multifunction device with a display, cause the device to: display a plurality of icons on the display in a first arrangement; detect an input that corresponds to a request to move a first icon in the plurality of icons from a first position on the display to a second position on the display; and in response to detecting the input: move the first icon from the first position to the second position; and maintain positions of each respective icon in the plurality of icons other than the first icon until automatic reconfiguration criteria have been met. The instructions further cause the device to when the automatic reconfiguration criteria have been met, move one or more of the icons in the plurality of icons other than the first icon to form a second arrangement that is distinct from the first arrangement.

In accordance with some embodiments, a multifunction device includes: a display; means for displaying a plurality of icons on the display in a first arrangement; means for detecting an input that corresponds to a request to move a first icon in the plurality of icons from a first position on the display to a second position on the display; and means, responsive to detecting the input, for: moving the first icon from the first position to the second position; and maintaining positions of each respective icon in the plurality of icons other than the first icon until automatic reconfiguration criteria have been met. The device further includes means for, when the automatic reconfiguration criteria have been met, moving one or more of the icons in the plurality of icons other than the first icon to form a second arrangement that is distinct from the first arrangement.

In accordance with some embodiments, an information processing apparatus for use in a multifunction device with a display includes: means for displaying a plurality of icons on the display in a first arrangement; means for detecting an input that corresponds to a request to move a first icon in the plurality of icons from a first position on the display to a second position on the display; and means, responsive to detecting the input, for: moving the first icon from the first position to the second position; and maintaining positions of each respective icon in the plurality of icons other than the first icon until automatic reconfiguration criteria have been met. The information processing apparatus further includes means for, when the automatic reconfiguration criteria have been met, moving one or more of the icons in the plurality of icons other than the first icon to form a second arrangement that is distinct from the first arrangement.

In accordance with some embodiments, a multifunction device includes a display, one or more processors, memory, and one or more programs. The one or more programs are stored in the memory and configured to be executed by the one or more processors. The one or more programs include instructions for: displaying a dynamic folder icon. The dynamic folder icon includes a visual indication of current content in a folder that is associated with the dynamic folder icon. The device further includes instructions for detecting an input that corresponds to a request to modify content in the folder; and in response to detecting the input: modifying the content in the folder; and updating the dynamic folder icon to include a visual indication of a spatial arrangement of the modified content within the folder.

In accordance with some embodiments, a method is performed at a multifunction device with a display. The method includes: displaying a dynamic folder icon. The dynamic folder icon includes a visual indication of current content in a folder that is associated with the dynamic folder icon. The method further includes detecting an input that corresponds to a request to modify content in the folder; and in response to detecting the input: modifying the content in the folder; and updating the dynamic folder icon to include a visual indication of a spatial arrangement of the modified content within the folder.

In accordance with some embodiments, a graphical user interface on a multifunction device with a display, a memory, and one or more processors to execute one or more programs stored in the memory includes a dynamic folder icon. The dynamic folder icon includes a visual indication of current content in a folder that is associated with the dynamic folder icon. An input that corresponds to a request to modify content in the folder is detected; and in response to detecting the input: the content in the folder is modified; and the dynamic folder icon is updated to include a visual indication of a spatial arrangement of the modified content within the folder.

In accordance with some embodiments, a computer readable storage medium has stored therein instructions which when executed by a multifunction device with a display, cause the device to: display a dynamic folder icon. The dynamic folder icon includes a visual indication of current content in a folder that is associated with the dynamic folder icon. The instructions further cause the device to detect an input that corresponds to a request to modify content in the folder; and in response to detecting the input: modify the content in the folder; and update the dynamic folder icon to include a visual indication of a spatial arrangement of the modified content within the folder.

In accordance with some embodiments, a multifunction device includes: a display; means for displaying a dynamic folder icon. The dynamic folder icon includes a visual indication of current content in a folder that is associated with the dynamic folder icon. The device further includes means for detecting an input that corresponds to a request to modify content in the folder; means, responsive to detecting the input, for: modifying the content in the folder; and updating the dynamic folder icon to include a visual indication of a spatial arrangement of the modified content within the folder.

In accordance with some embodiments, an information processing apparatus for use in a multifunction device with a display includes: means for displaying a dynamic folder icon. The dynamic folder icon includes a visual indication of current content in a folder that is associated with the dynamic folder icon. The information processing apparatus further includes means for detecting an input that corresponds to a request to modify content in the folder; means, responsive to detecting the input, for: modifying the content in the folder; and updating the dynamic folder icon to include a visual indication of a spatial arrangement of the modified content within the folder.

In accordance with some embodiments, a multifunction device includes a display, one or more processors, memory, and one or more programs. The one or more programs are stored in the memory and configured to be executed by the one or more processors. The one or more programs include instructions for: displaying a folder icon over a wallpaper background on the display, the folder icon corresponding to a folder that contains content, the content including one or more selectable user interface objects. The one or more programs further include instructions for detecting a first input that corresponds to a request to display content of the folder; and in response to detecting the first input: dividing the wallpaper background into a first portion and a second portion; moving the second portion away from the first portion; and displaying content of the folder in an area between the first portion and the second portion.

In accordance with some embodiments, a method is performed at a multifunction device with a display. The method includes: displaying a folder icon over a wallpaper background on the display, the folder icon corresponding to a folder that contains content, the content including one or more selectable user interface objects. The method further includes detecting a first input that corresponds to a request to display content of the folder; and in response to detecting the first input: dividing the wallpaper background into a first portion and a second portion; moving the second portion away from the first portion; and displaying content of the folder in an area between the first portion and the second portion.

In accordance with some embodiments, a graphical user interface on a multifunction device with a display, a memory, and one or more processors to execute one or more programs stored in the memory includes a folder icon displayed over a wallpaper background on the display, the folder icon corresponding to a folder that contains content, the content including one or more selectable user interface objects. A first input that corresponds to a request to display content of the folder is detected; and in response to detecting the first input: the wallpaper background is divided into a first portion and a second portion; the second portion is moved away from the first portion; and content of the folder is displayed in an area between the first portion and the second portion.

In accordance with some embodiments, a computer readable storage medium has stored therein instructions which when executed by a multifunction device with a display, cause the device to: display a folder icon over a wallpaper background on the display, the folder icon corresponding to a folder that contains content, the content including one or more selectable user interface objects. The instructions further cause the device to detect a first input that corresponds to a request to display content of the folder; and in response to detecting the first input: divide the wallpaper background into a first portion and a second portion; move the second portion away from the first portion; and display content of the folder in an area between the first portion and the second portion.

In accordance with some embodiments, a multifunction device includes: a display; means for displaying a folder icon over a wallpaper background on the display, the folder icon corresponding to a folder that contains content, the content including one or more selectable user interface objects. The device further includes means for detecting a first input that corresponds to a request to display content of the folder; and means, responsive to detecting the first input for: dividing the wallpaper background into a first portion and a second portion; moving the second portion away from the first portion; and displaying content of the folder in an area between the first portion and the second portion.

In accordance with some embodiments, an information processing apparatus for use in a multifunction device with a display includes: means for displaying a folder icon over a wallpaper background on the display, the folder icon corresponding to a folder that contains content, the content including one or more selectable user interface objects. The information processing apparatus further includes means for detecting a first input that corresponds to a request to display content of the folder; and means, responsive to detecting the first input for: dividing the wallpaper background into a first portion and a second portion; moving the second portion away from the first portion; and displaying content of the folder in an area between the first portion and the second portion.

Thus, multifunction devices with displays are provided with faster, more efficient methods and interfaces for managing folders, thereby increasing the effectiveness, efficiency, and user satisfaction with such devices. Such methods and interfaces may complement or replace conventional methods for managing folders.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7C are flow diagrams illustrating a method of managing folder icons and action icons in accordance with some embodiments.

FIGS. 11A-11C are flow diagrams illustrating a method of updating a dynamic folder icon to provide a visual indication as to the contents of a folder associated with the dynamic folder icon in accordance with some embodiments.

FIGS. 12A-12E are flow diagrams illustrating a method of providing contextual information in conjunction with displaying content of a folder in accordance with some embodiments.

DESCRIPTION OF EMBODIMENTS

Figure 1A:
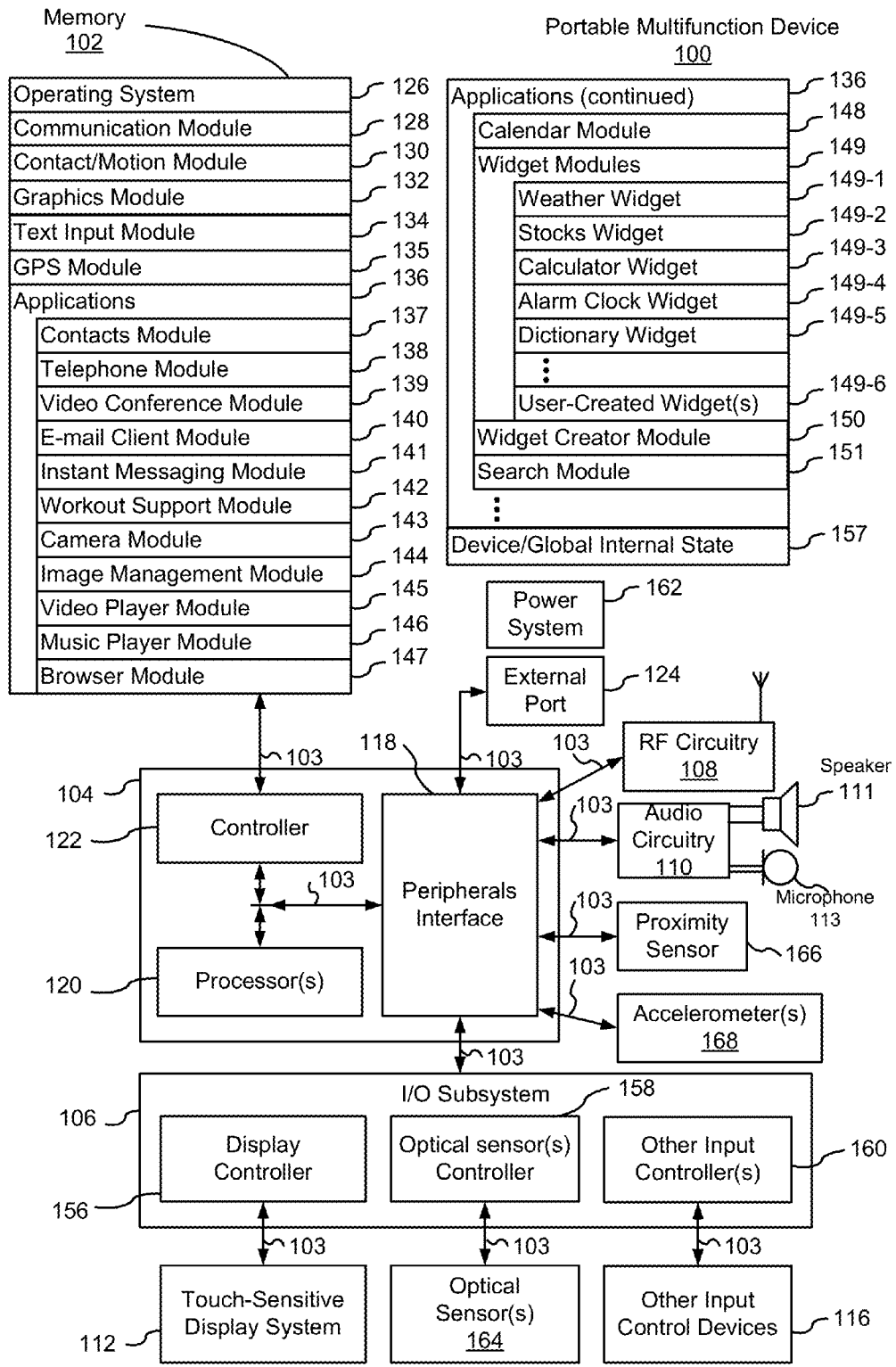
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
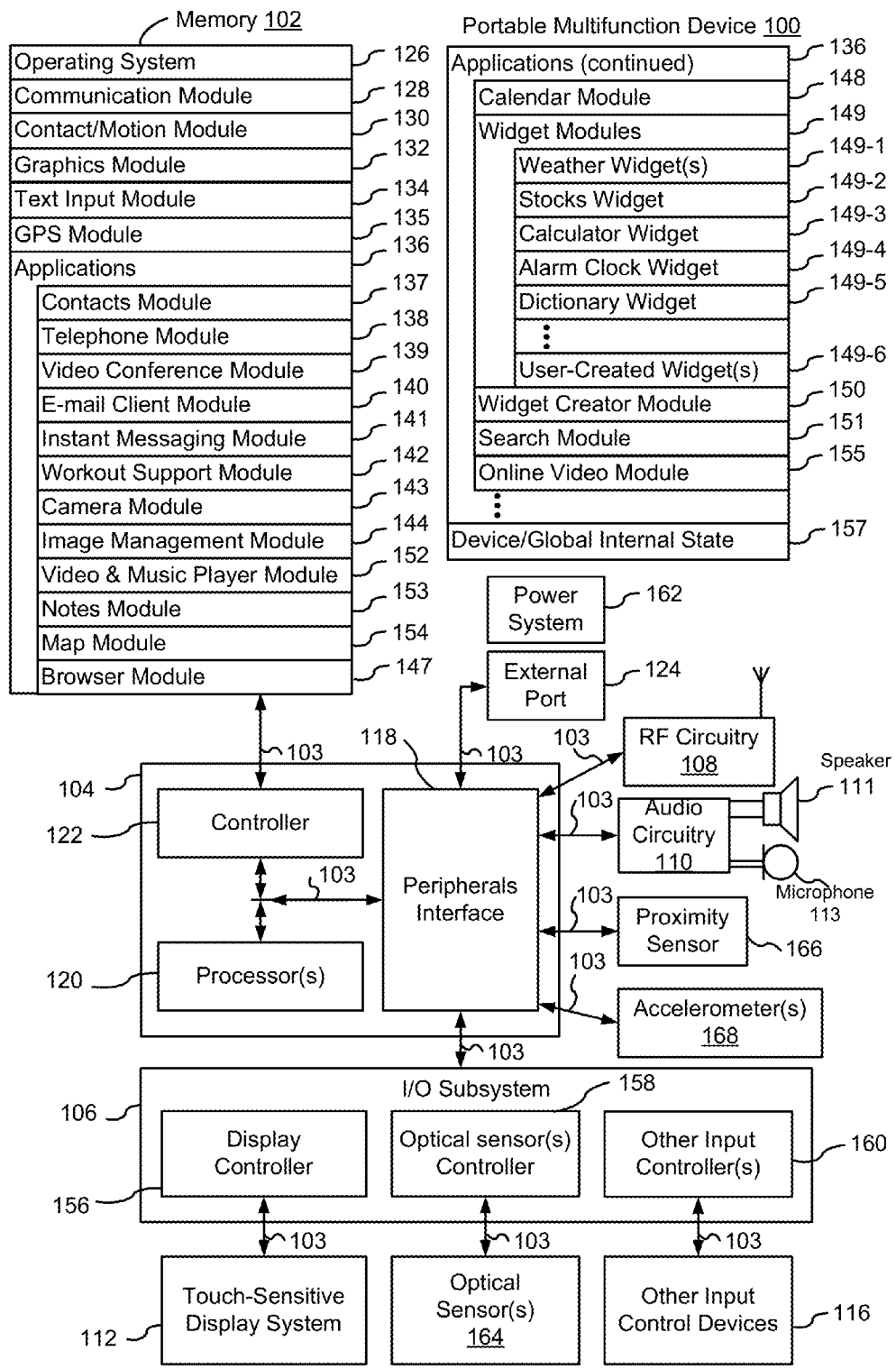

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323, 846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903, 964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
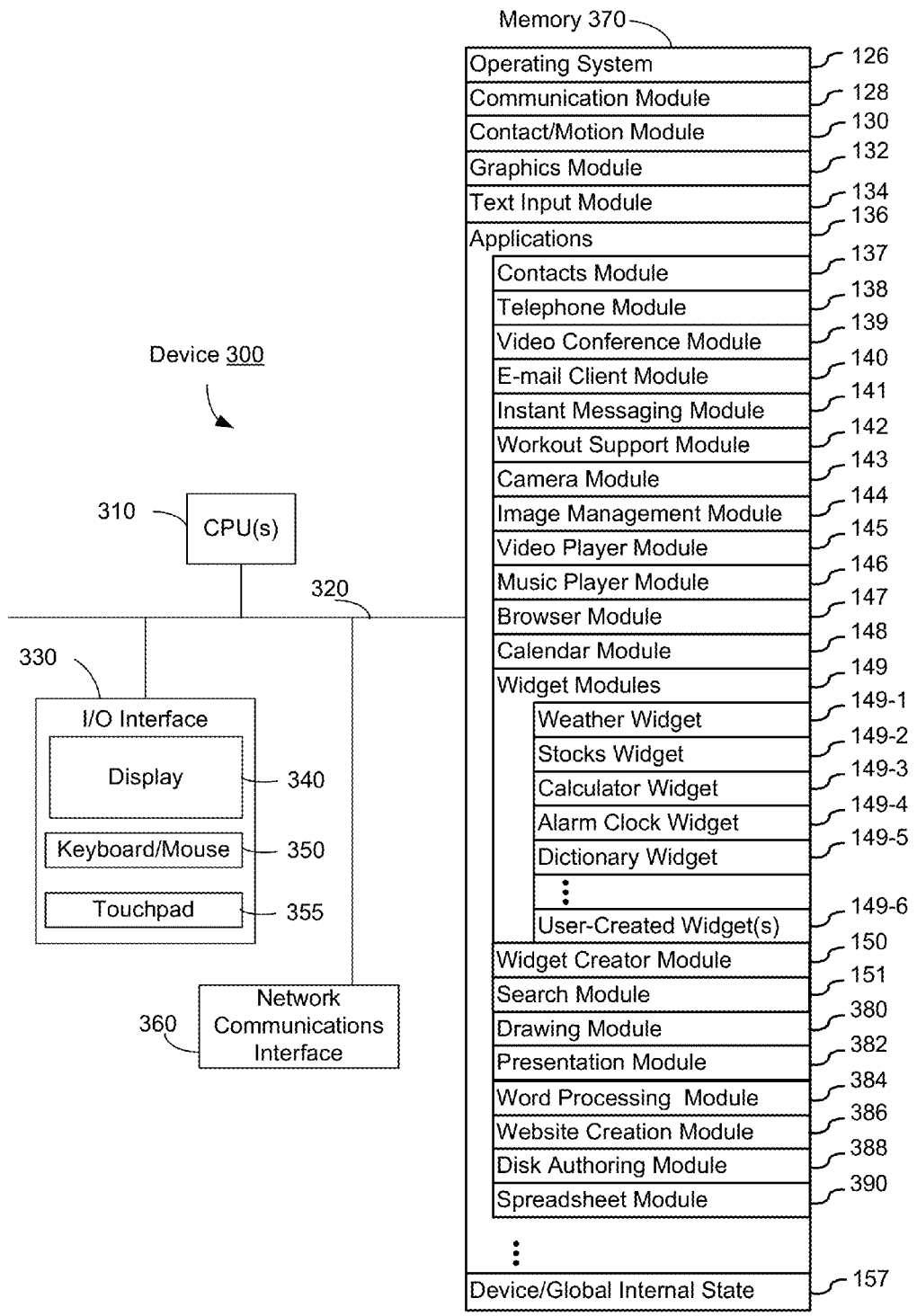
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein).

These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
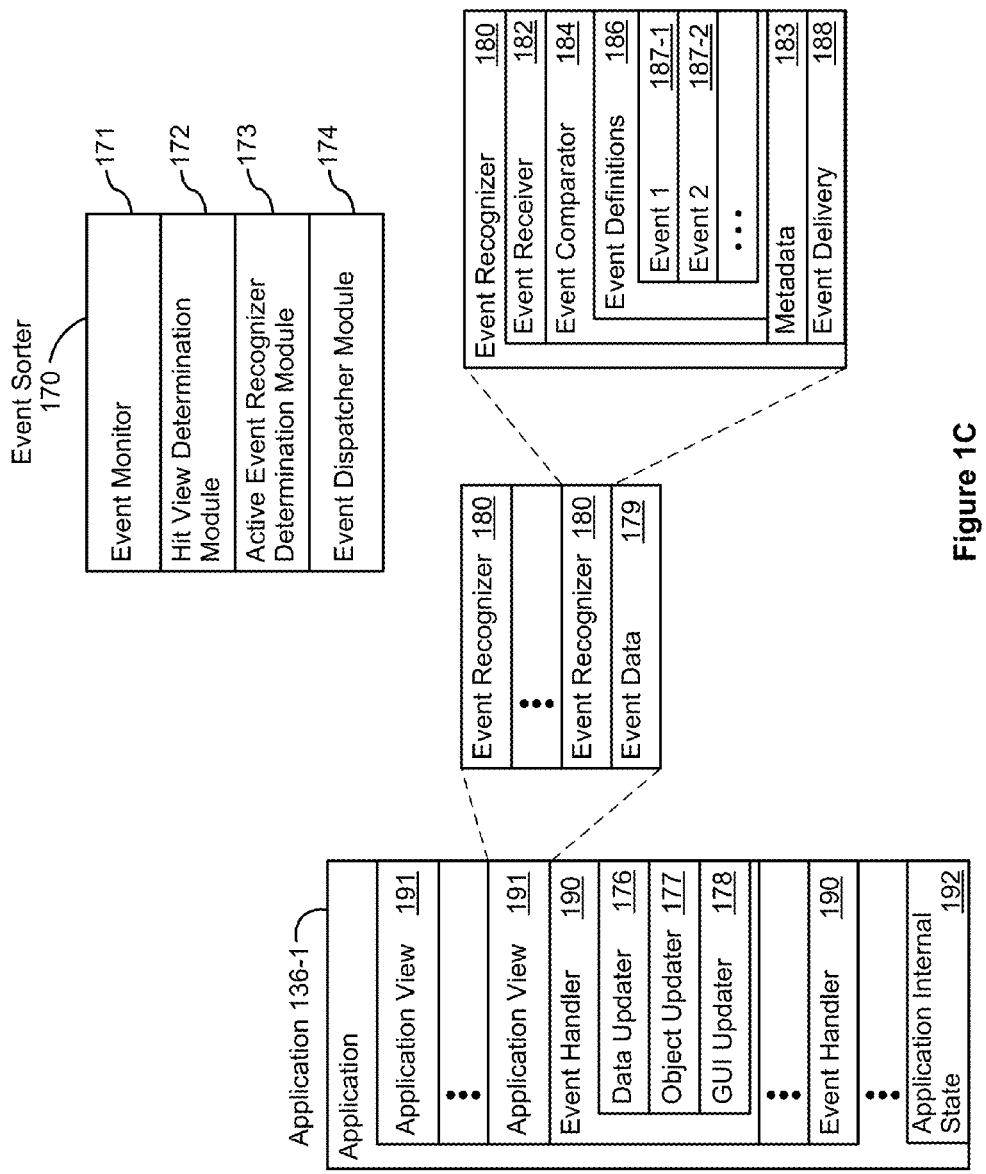
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
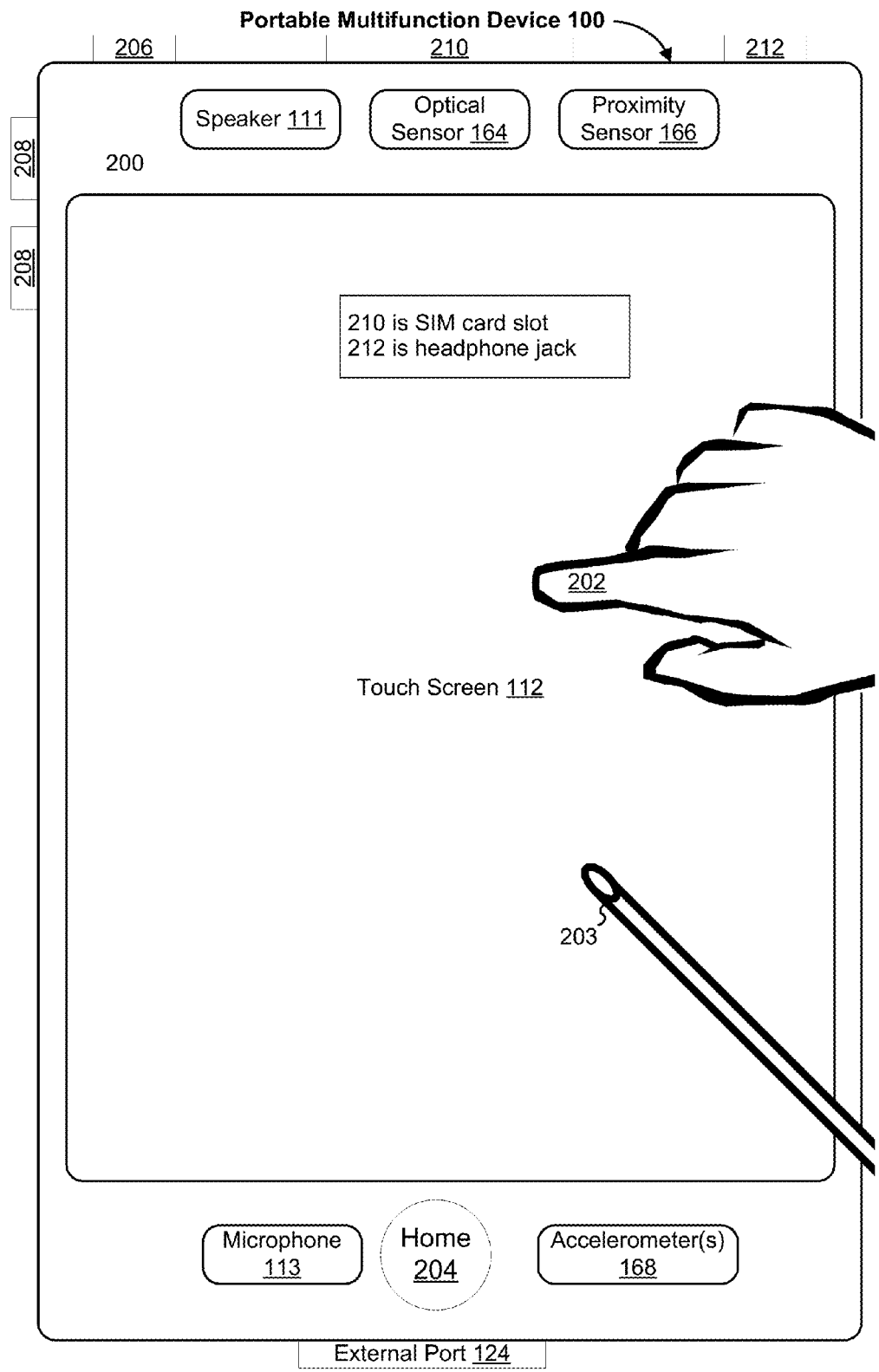
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
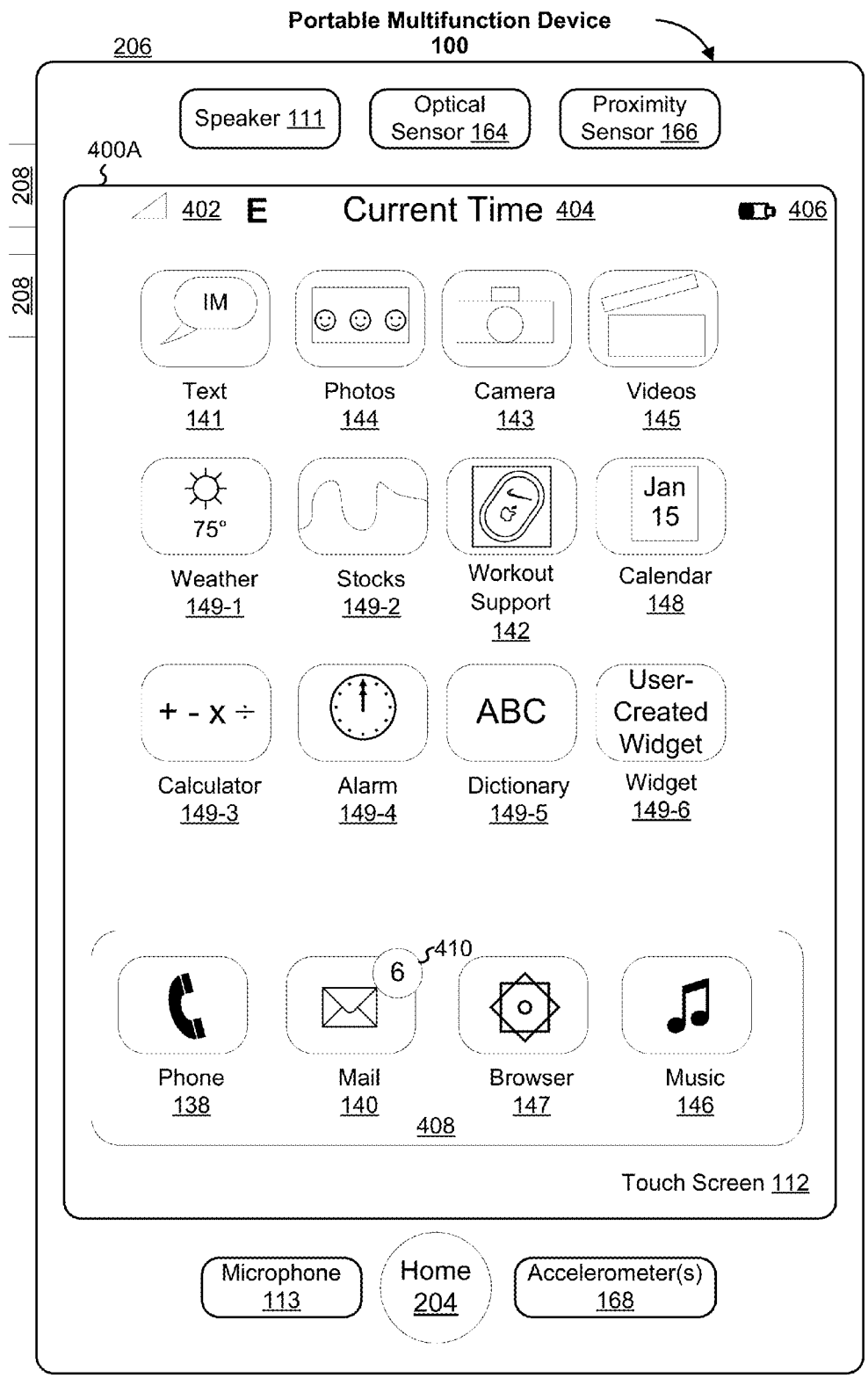
FIGS. 4A and 4B illustrate exemplary user interfaces for a menu of applications on a portable multifunction device in accordance with some embodiments.
Figure 4B:
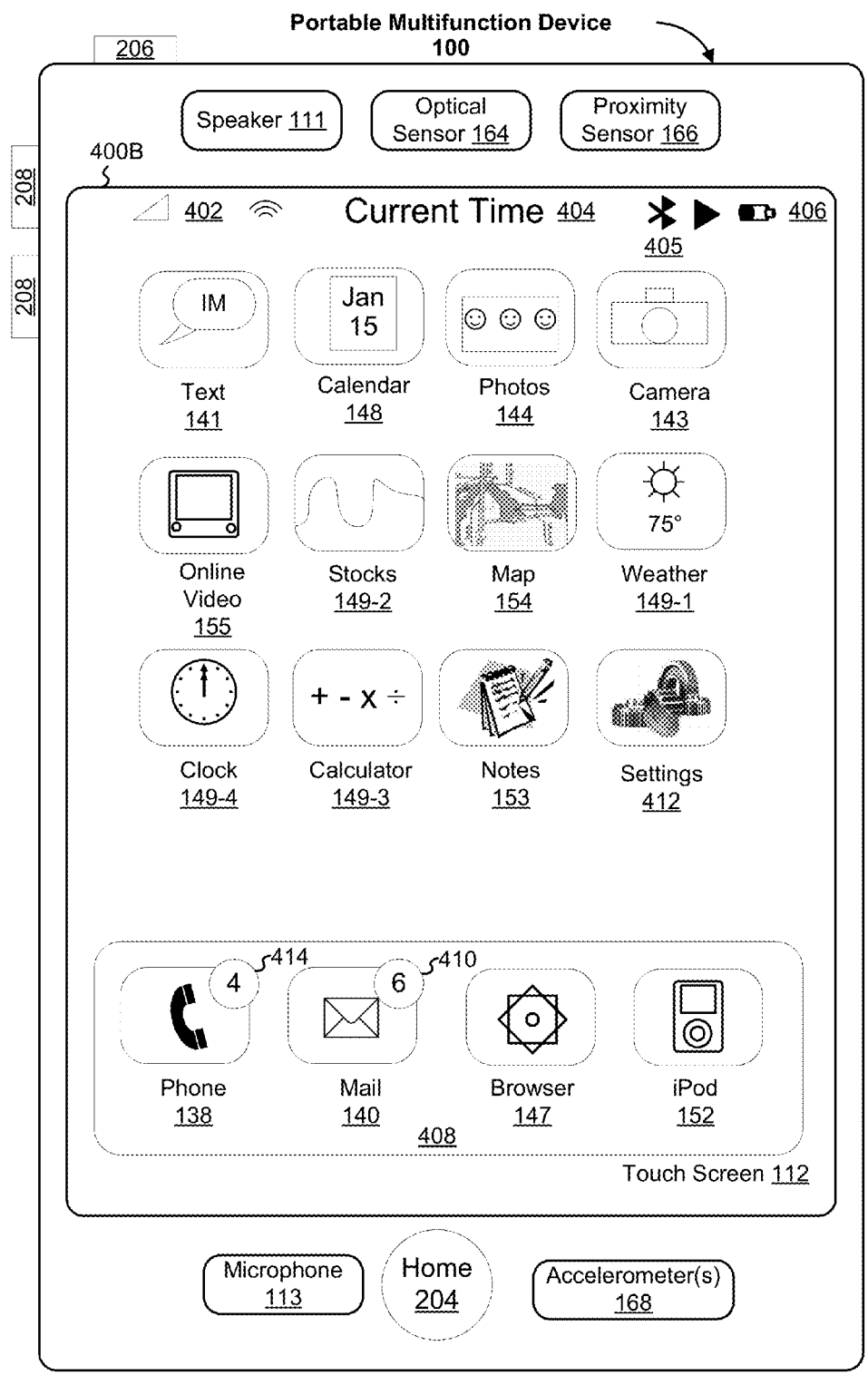

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:

IM 141;
Image management 144;
Camera 143;
Video player 145;
Weather 149-1;
Stocks 149-2;
Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for device 100 and its various applications 136, as described further below;

Video and music player module 152, also referred to as iPod (trademark of Apple Inc.) module 152; and Online video module 155, also referred to as YouTube (trademark of Google Inc.) module 155.

Figure 4C:
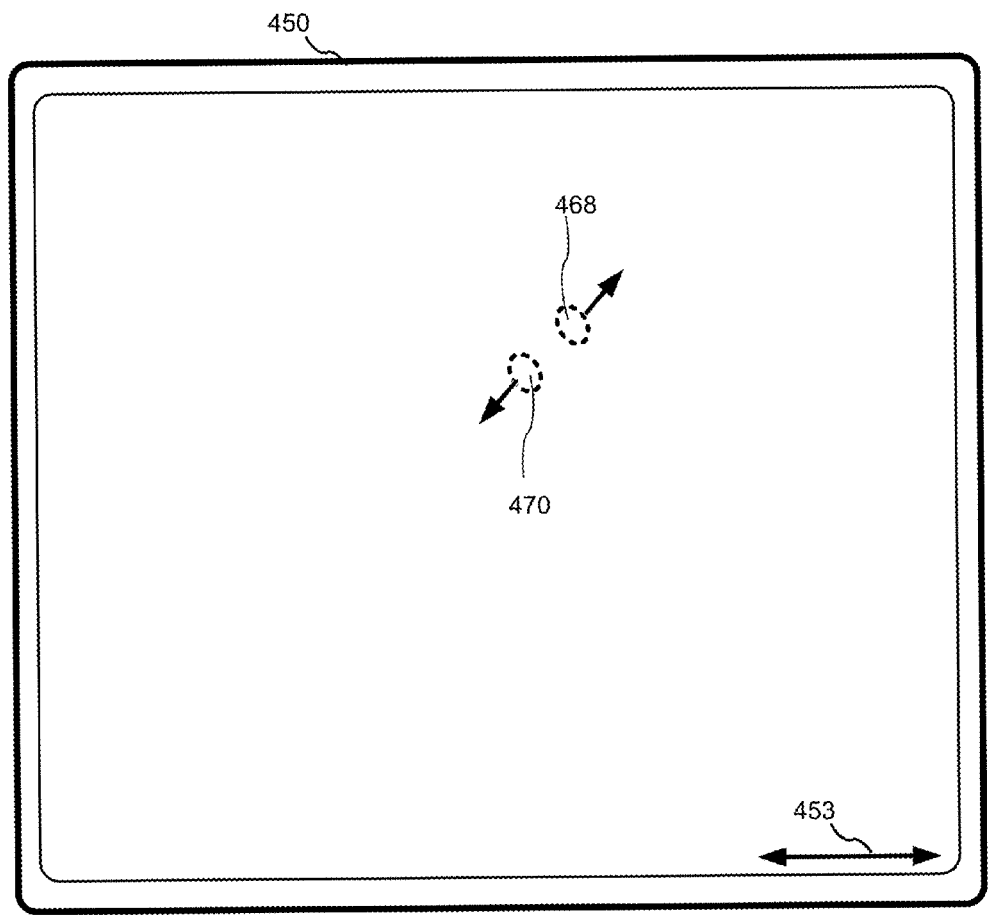
FIG. 4C illustrates an exemplary user interface for a multifunction device with a touch-sensitive surface that is separate from the display in accordance with some embodiments.
Figure 4C:
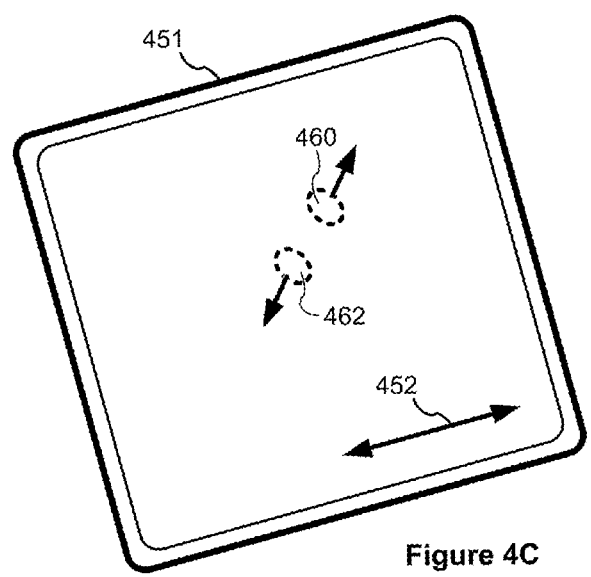

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

Figure 5A:
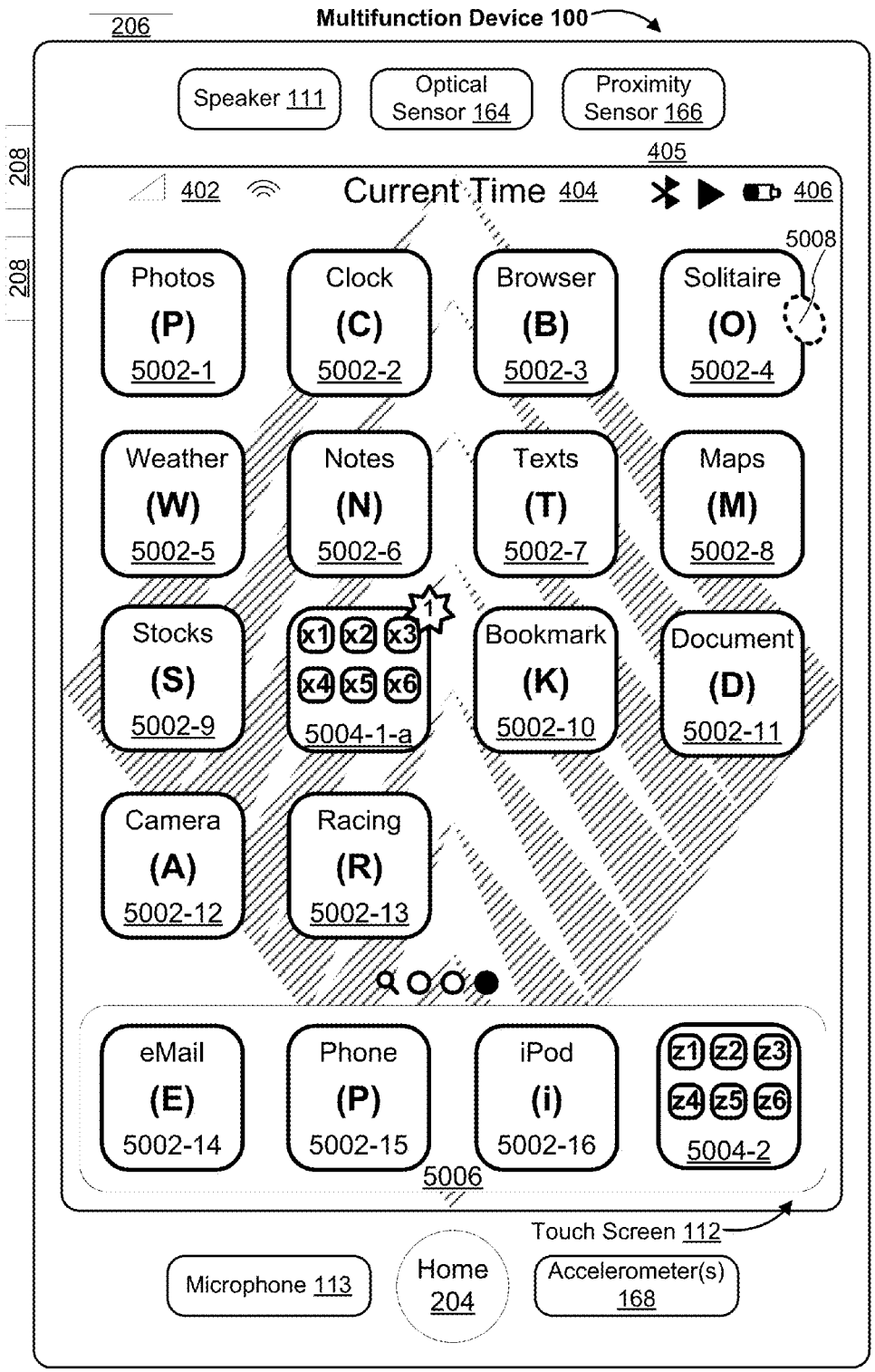
FIGS. 5A-5PPP illustrate exemplary user interfaces for managing folders in accordance with some embodiments.
Figure 5B:
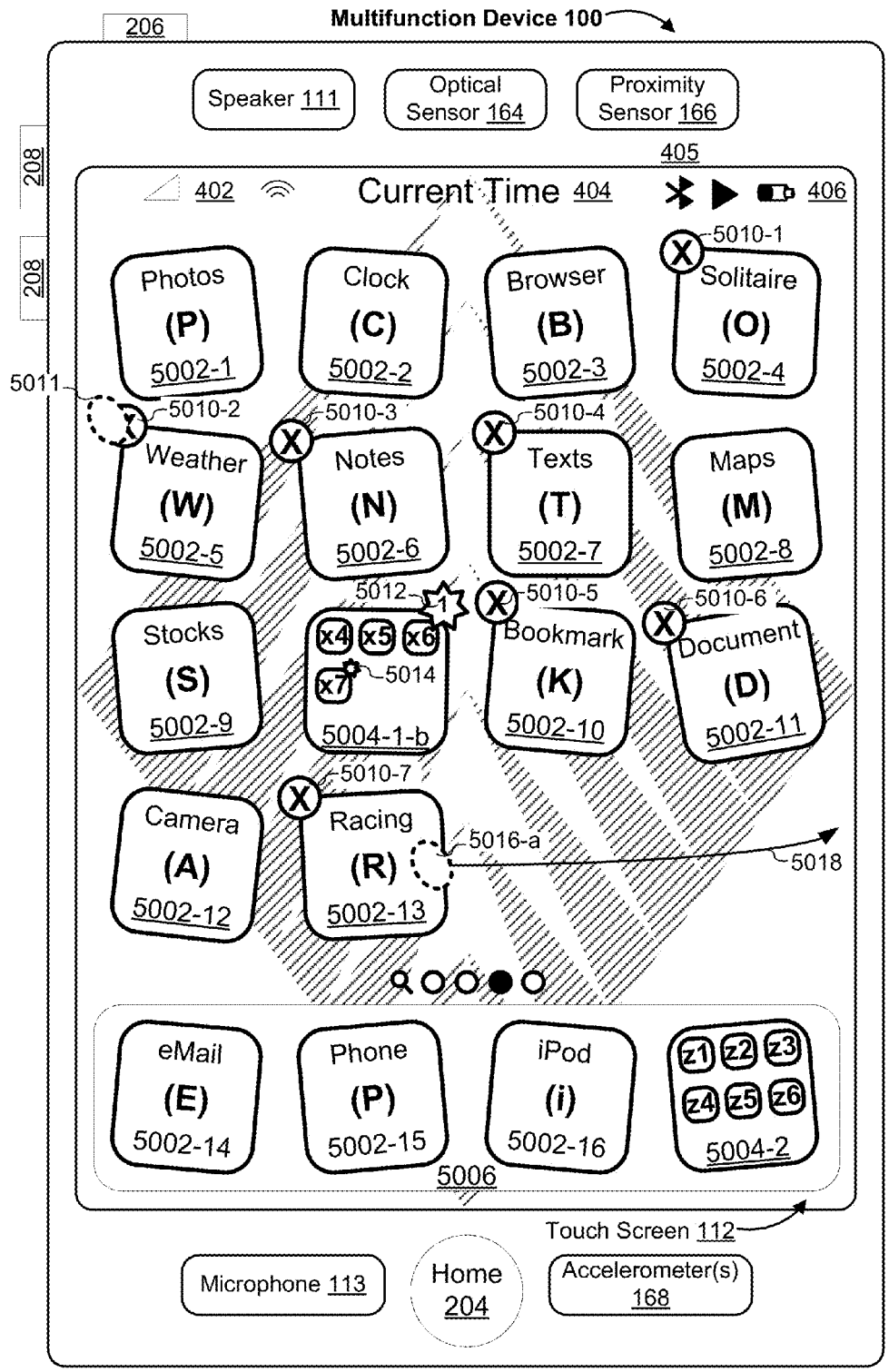
Figure 5C:
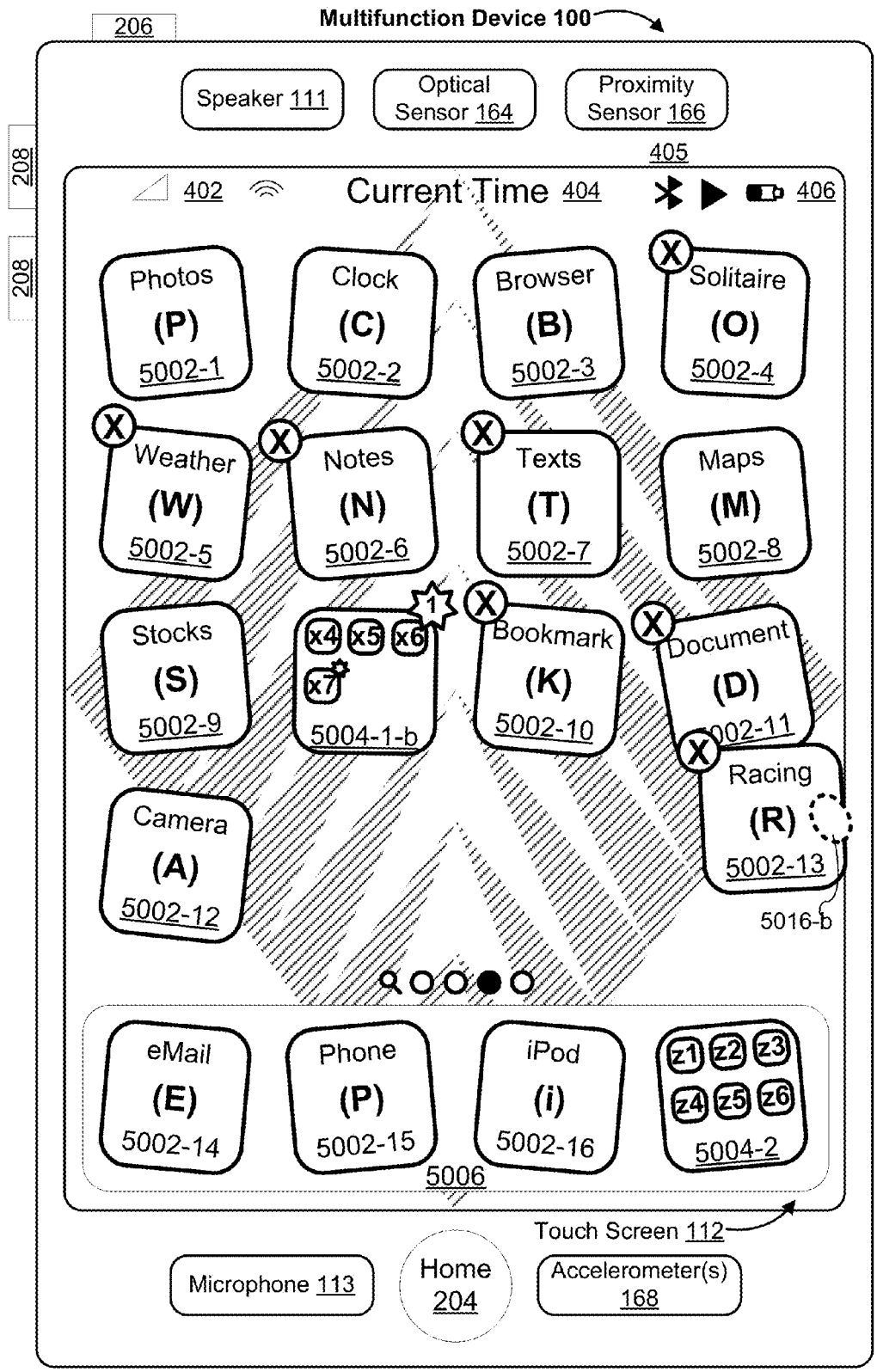
Figure 5D:
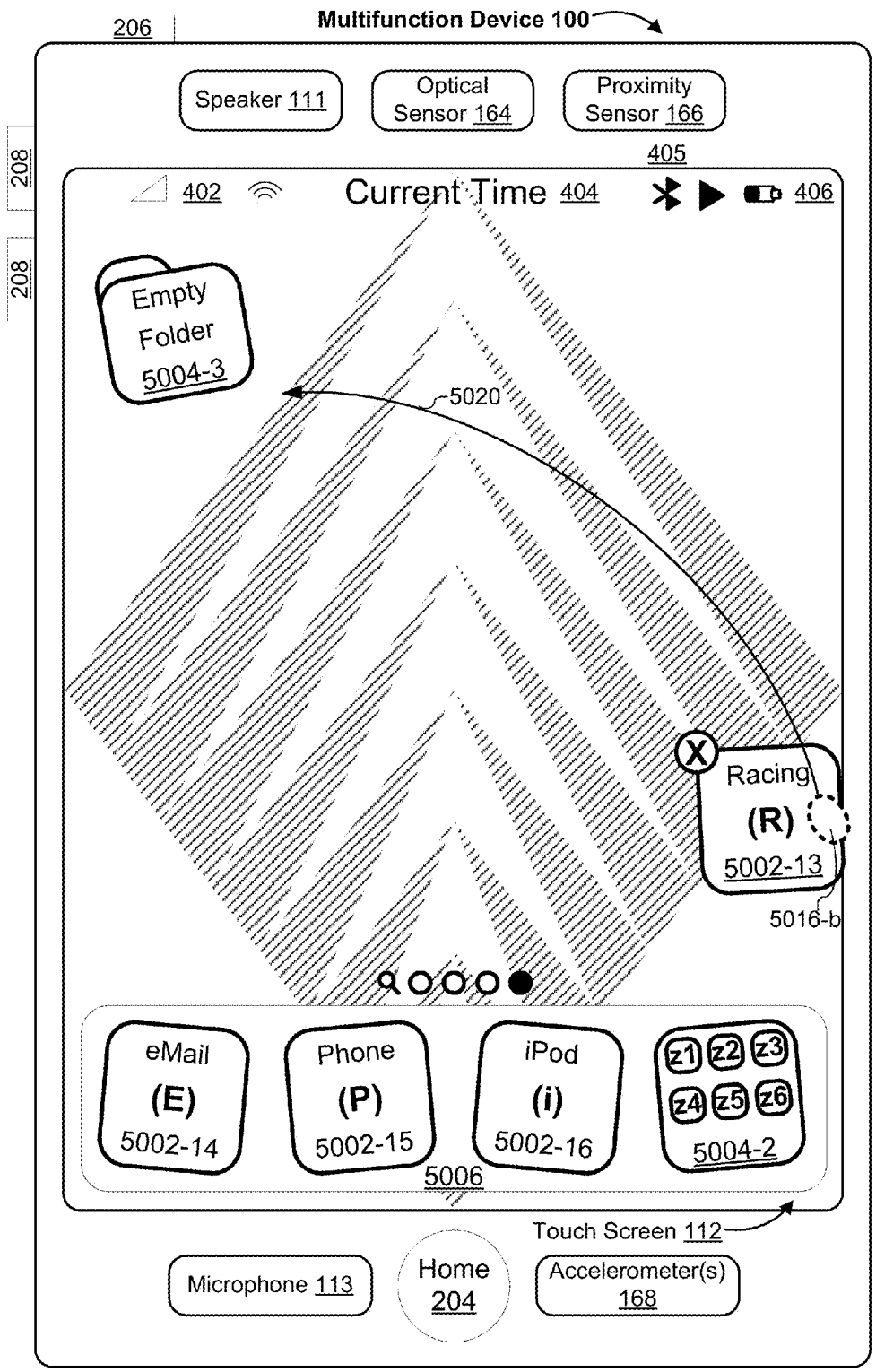
Figure 5E:
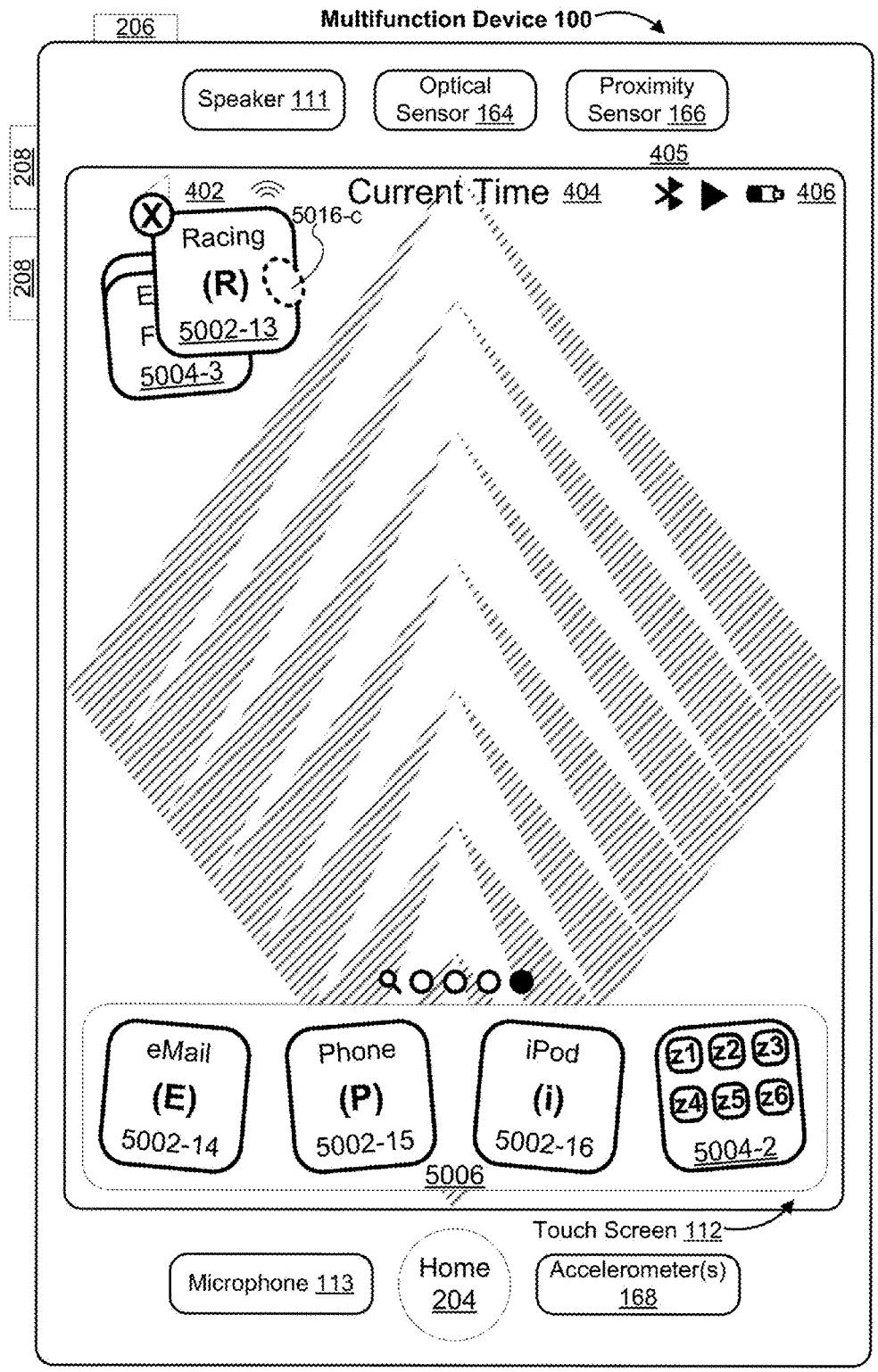
Figure 5F:
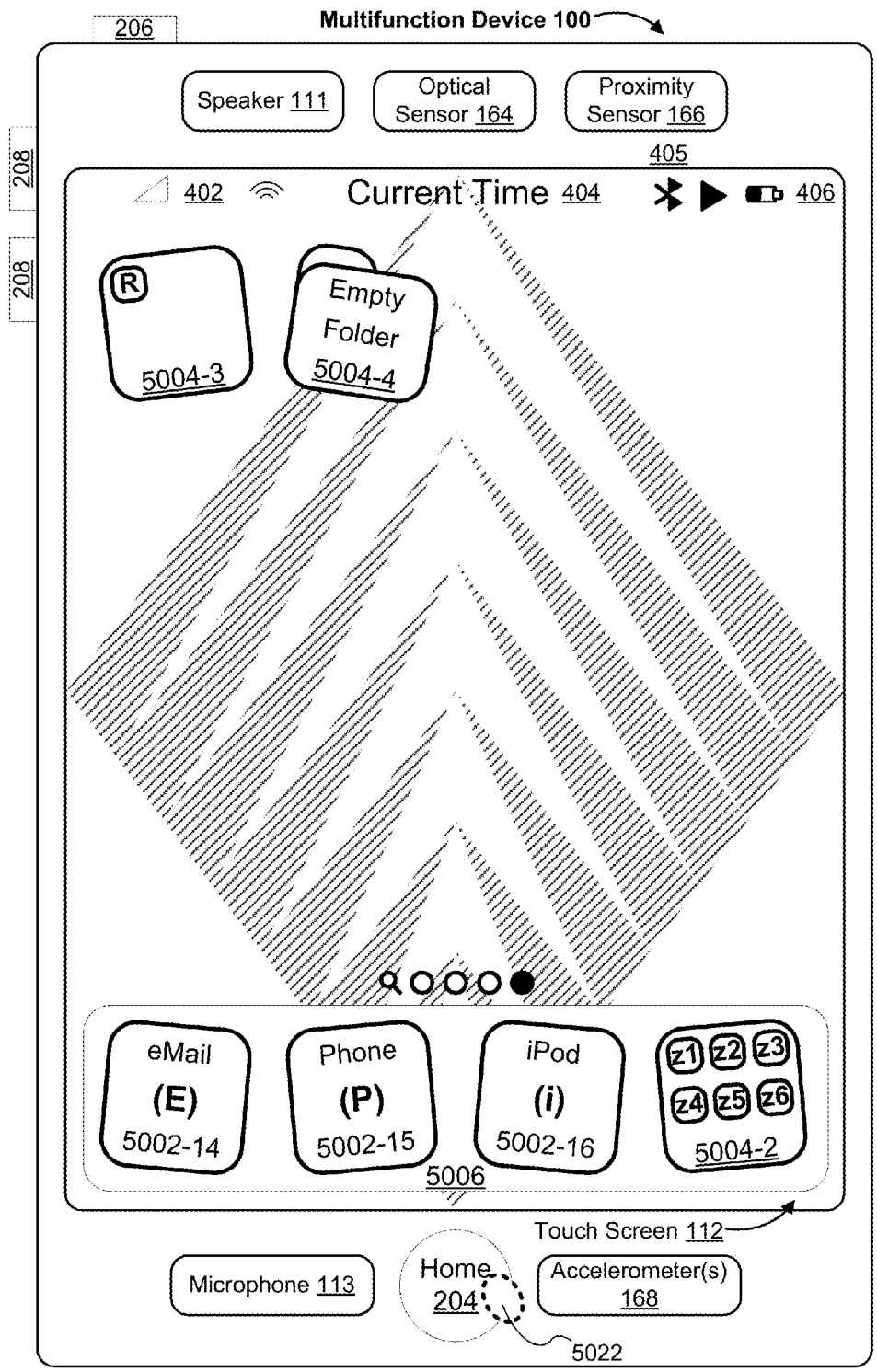
Figure 5G:
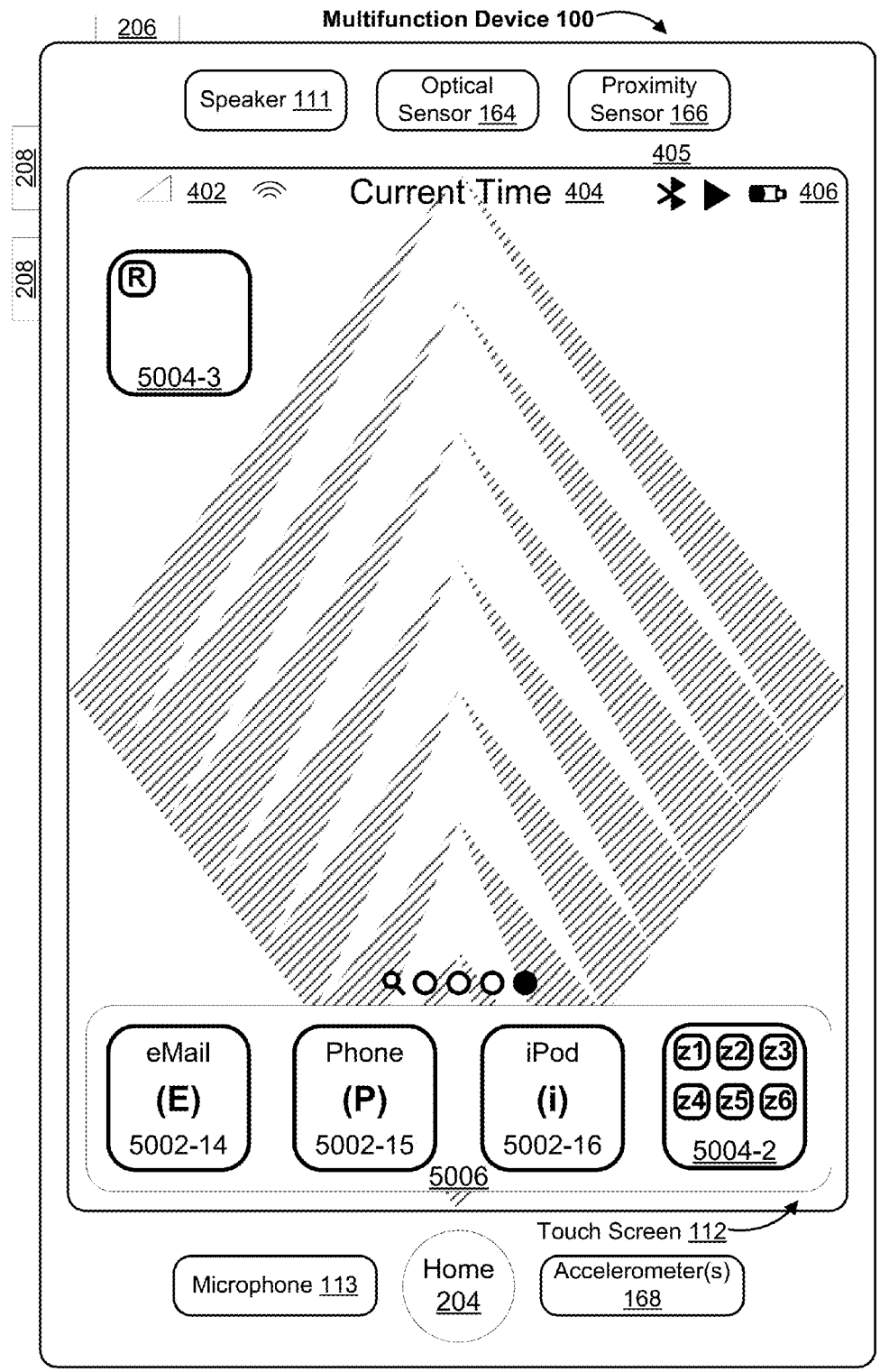
Figure 5H:
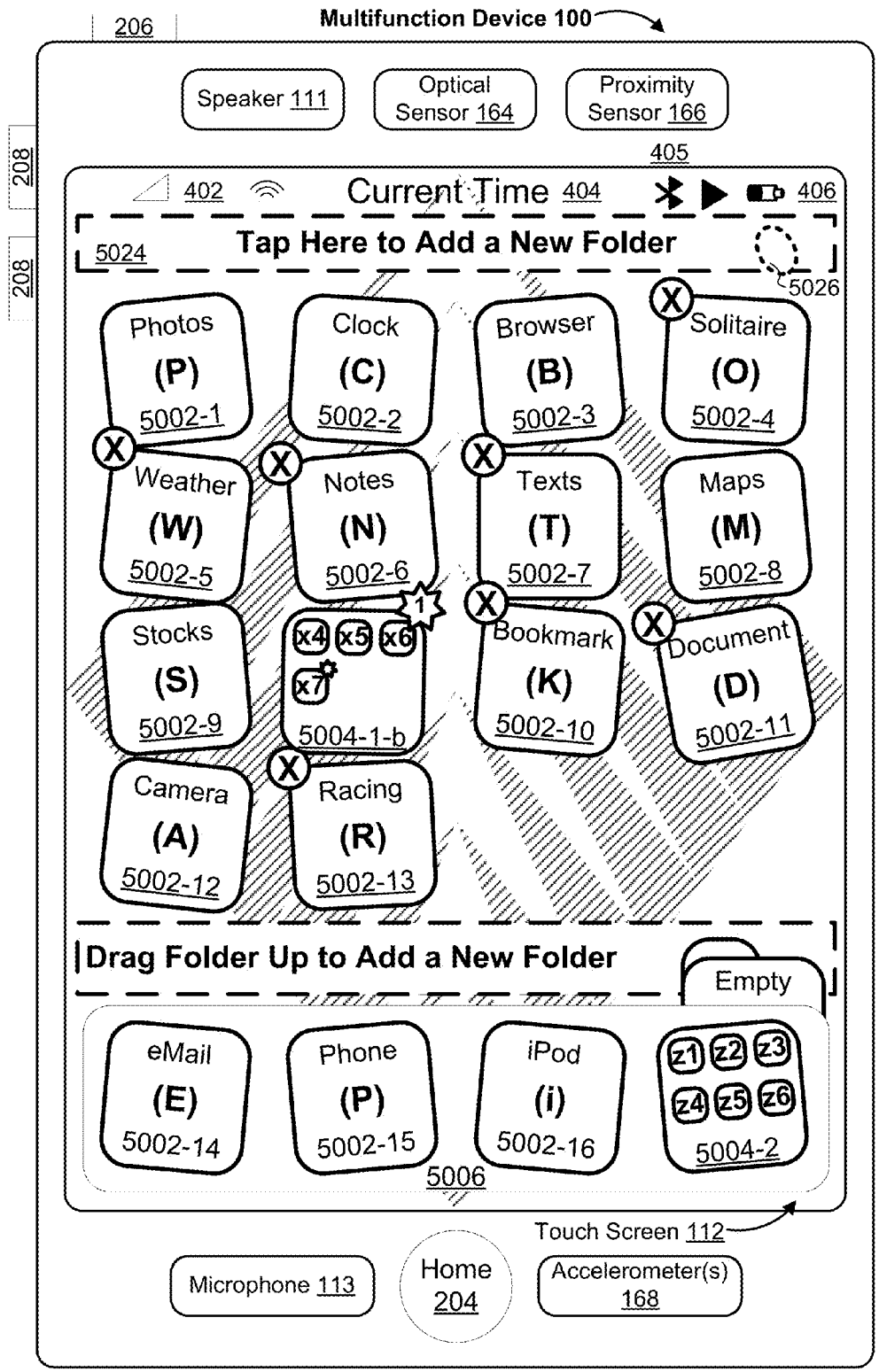
Figure 5I:
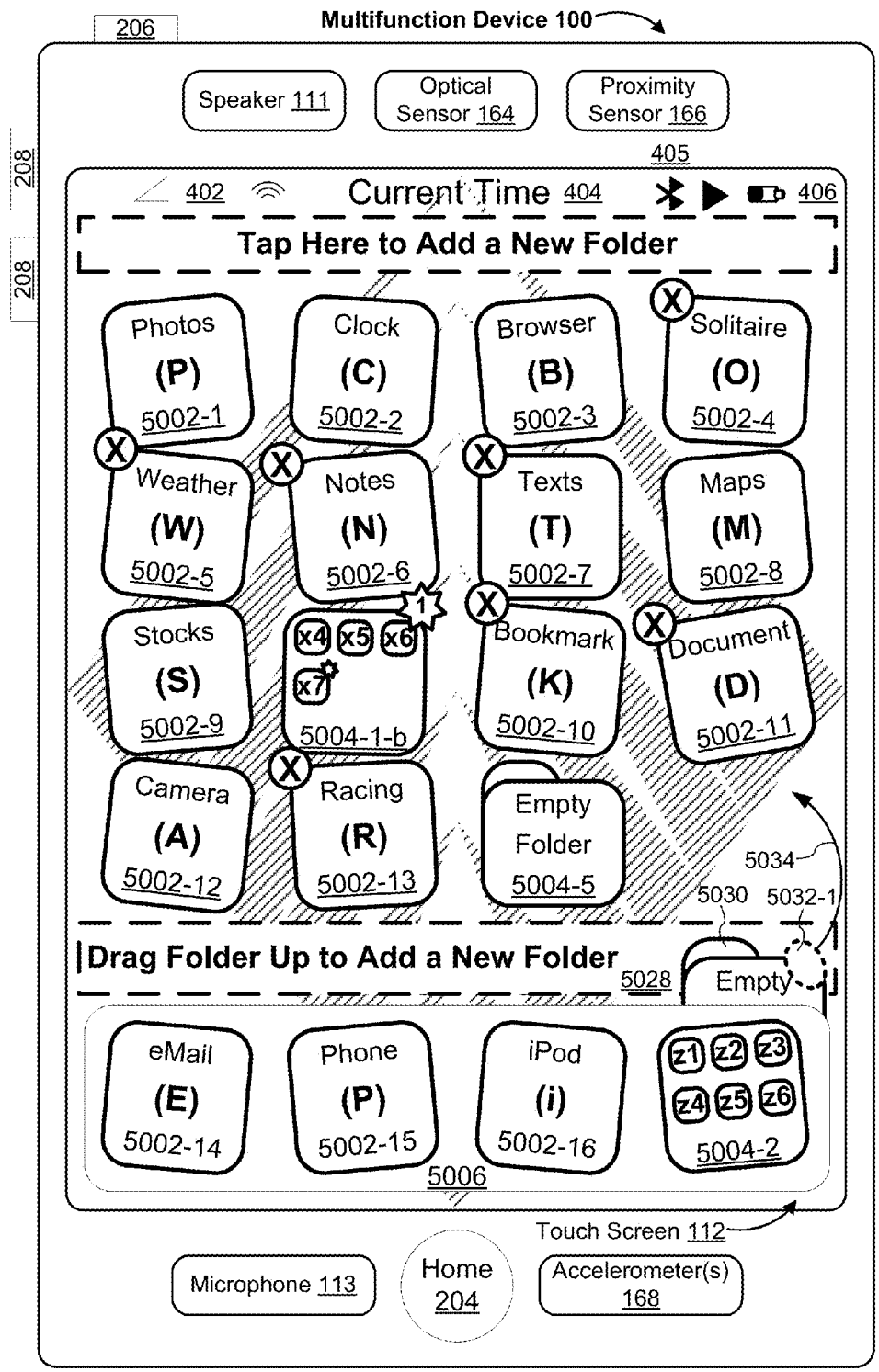
Figure 5J:
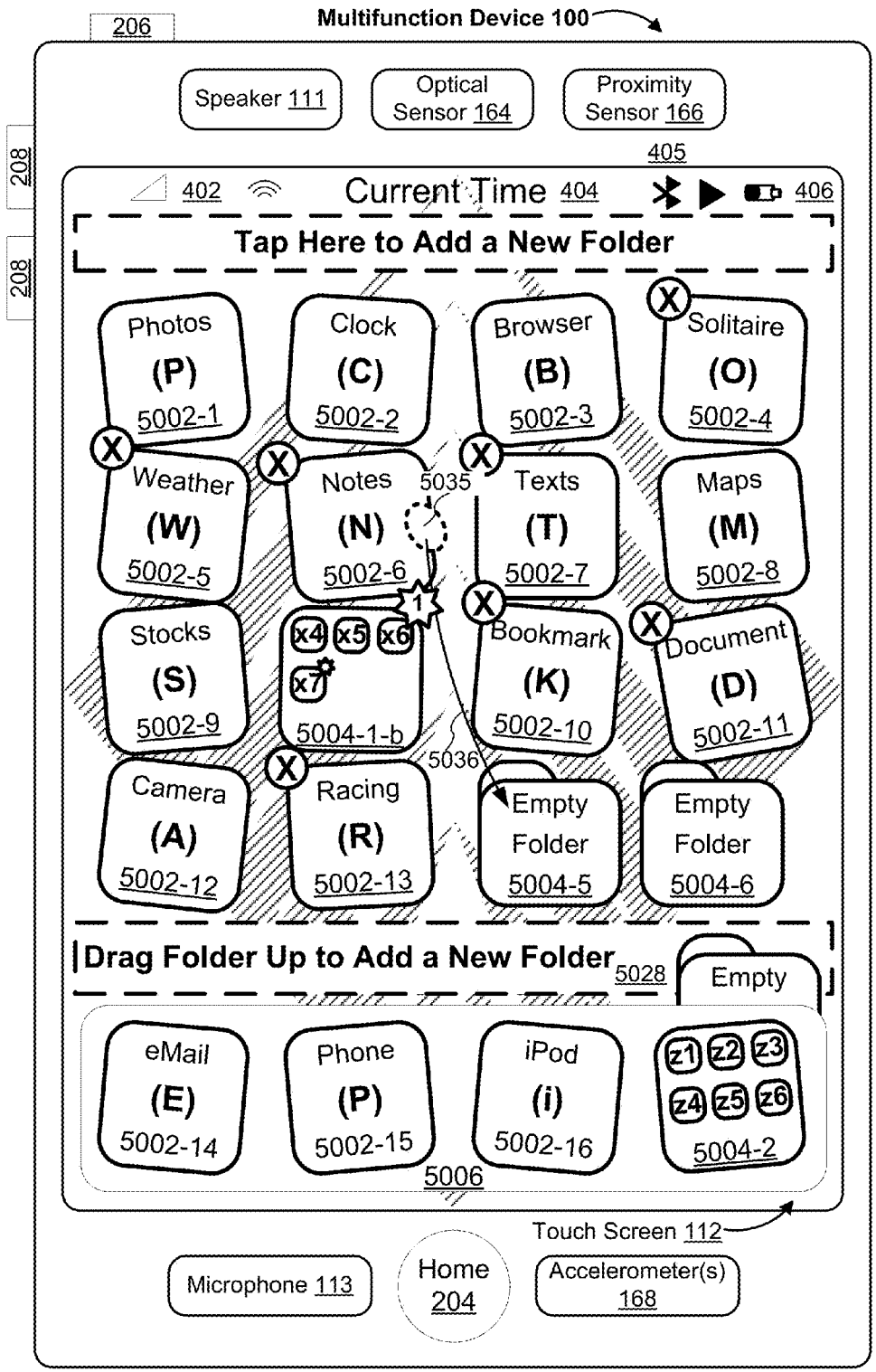
Figure 5K:
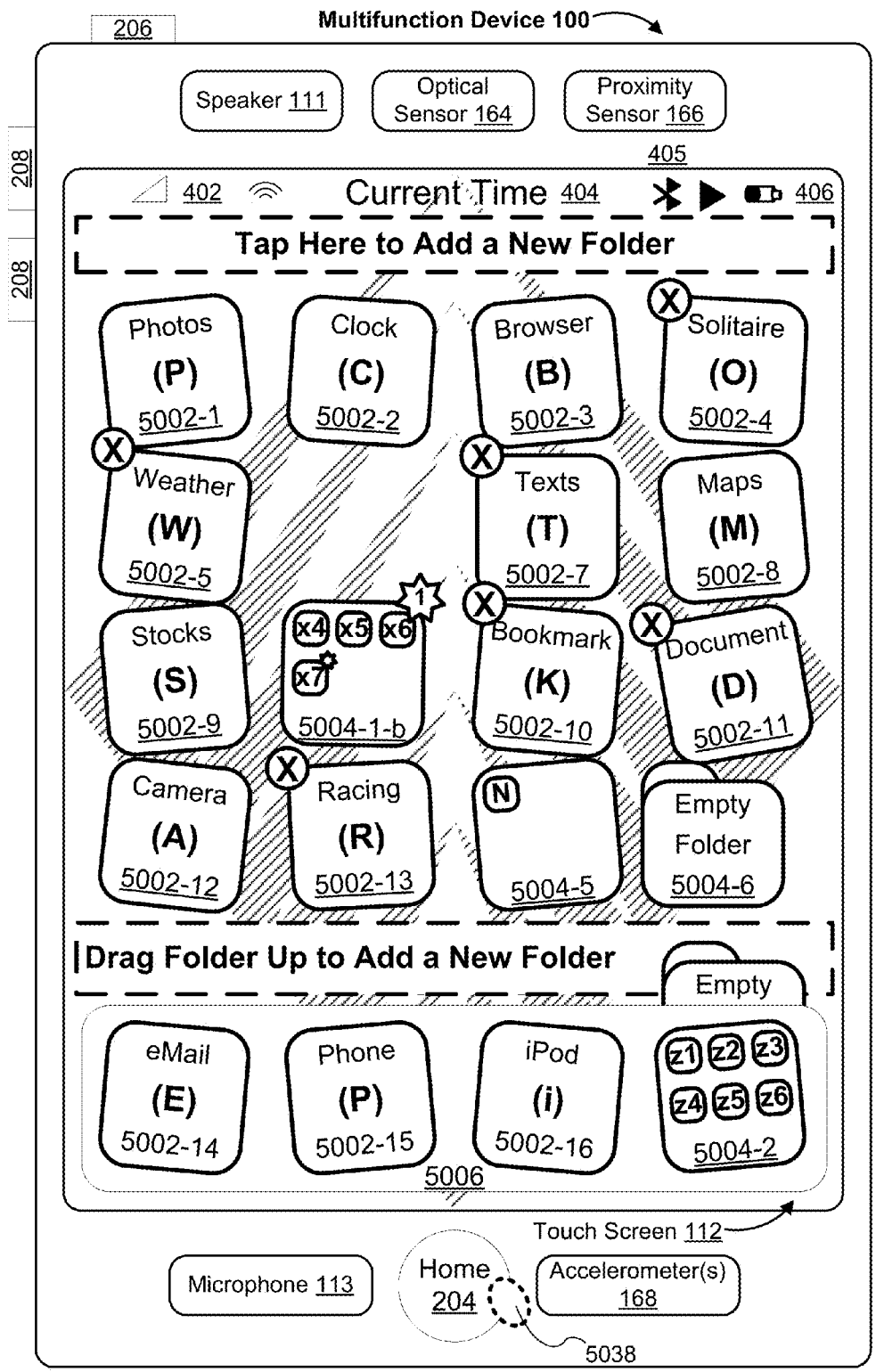
Figure 5L:
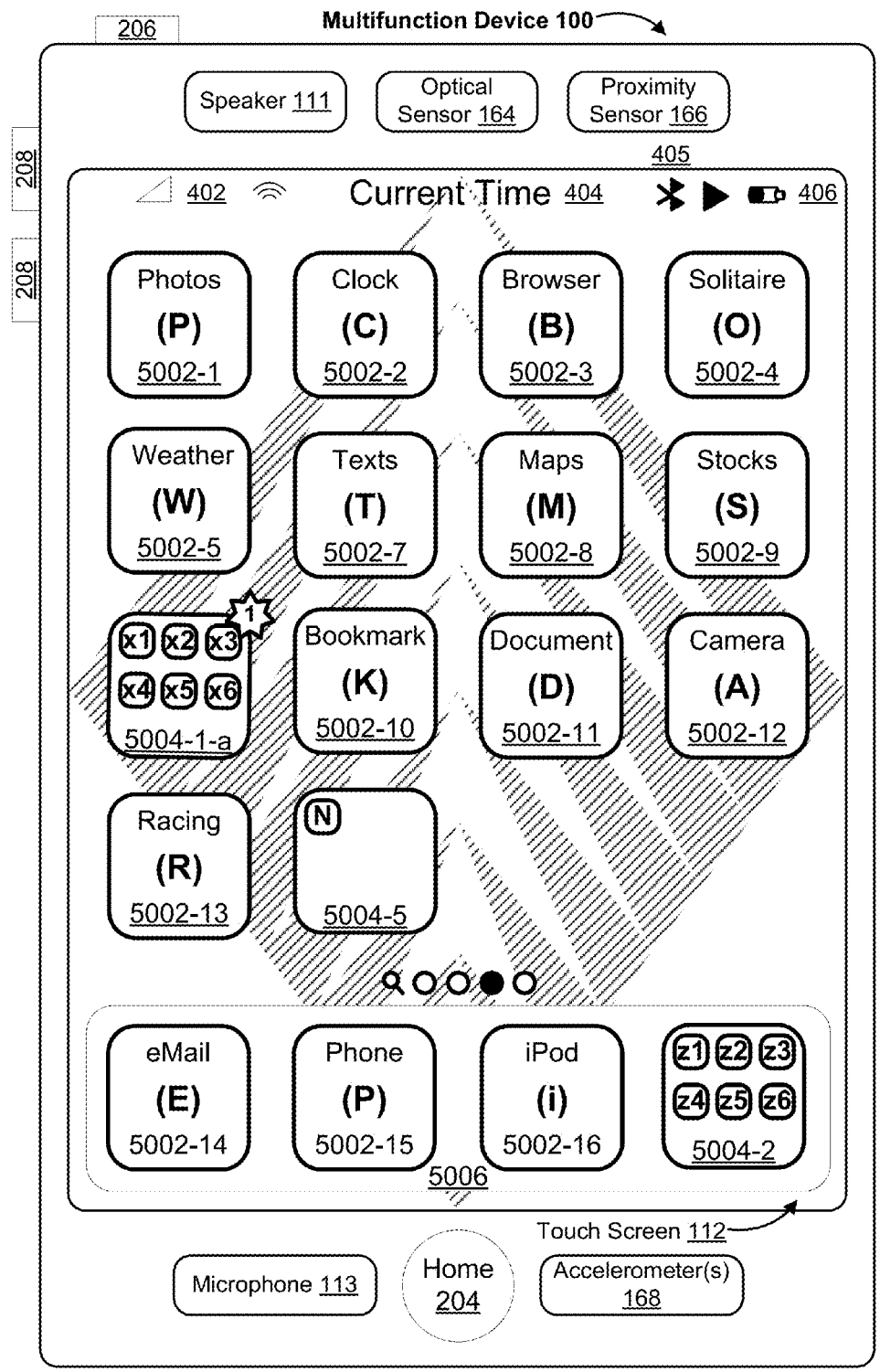
Figure 5M:
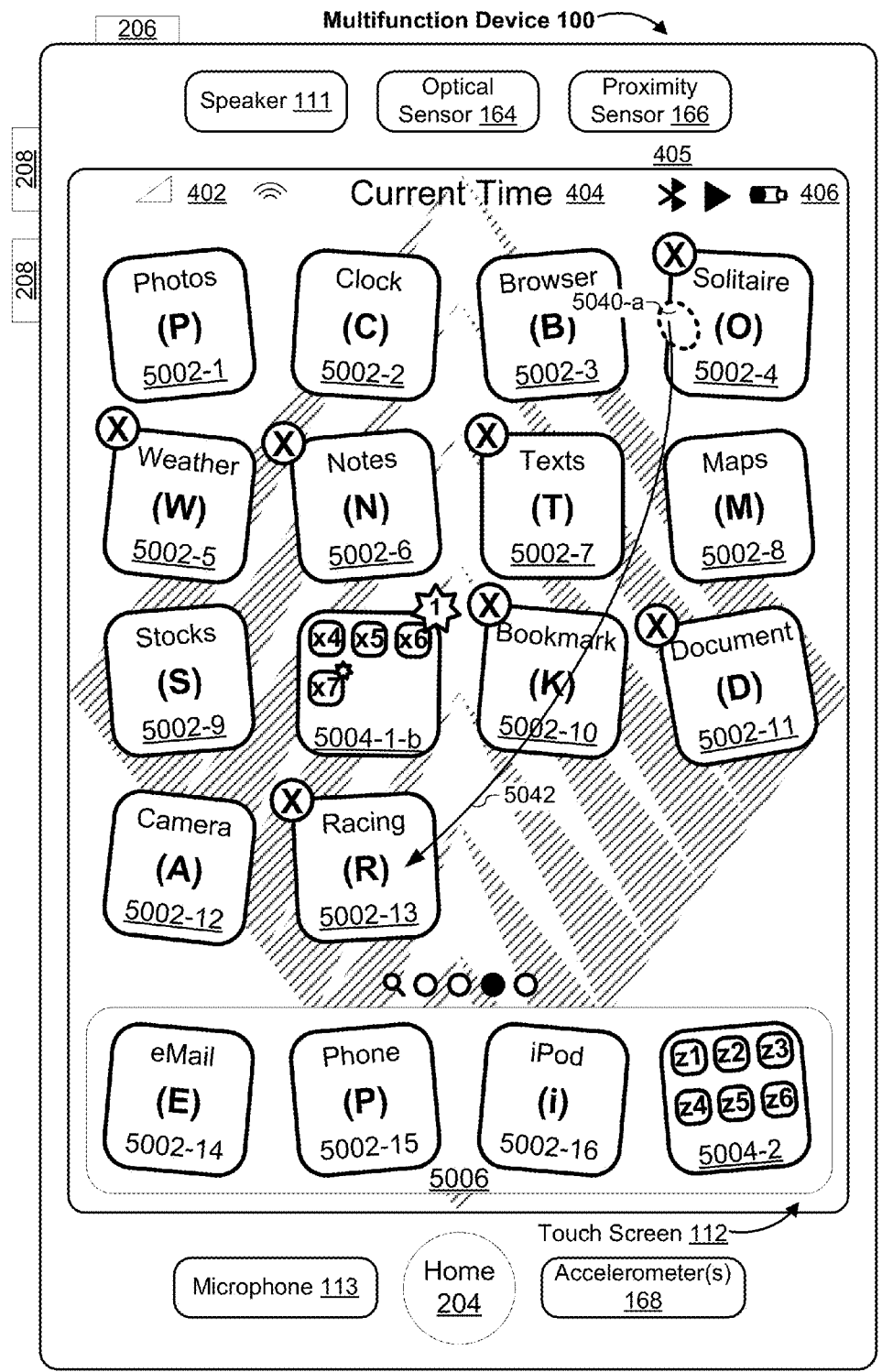
Figure 5N:
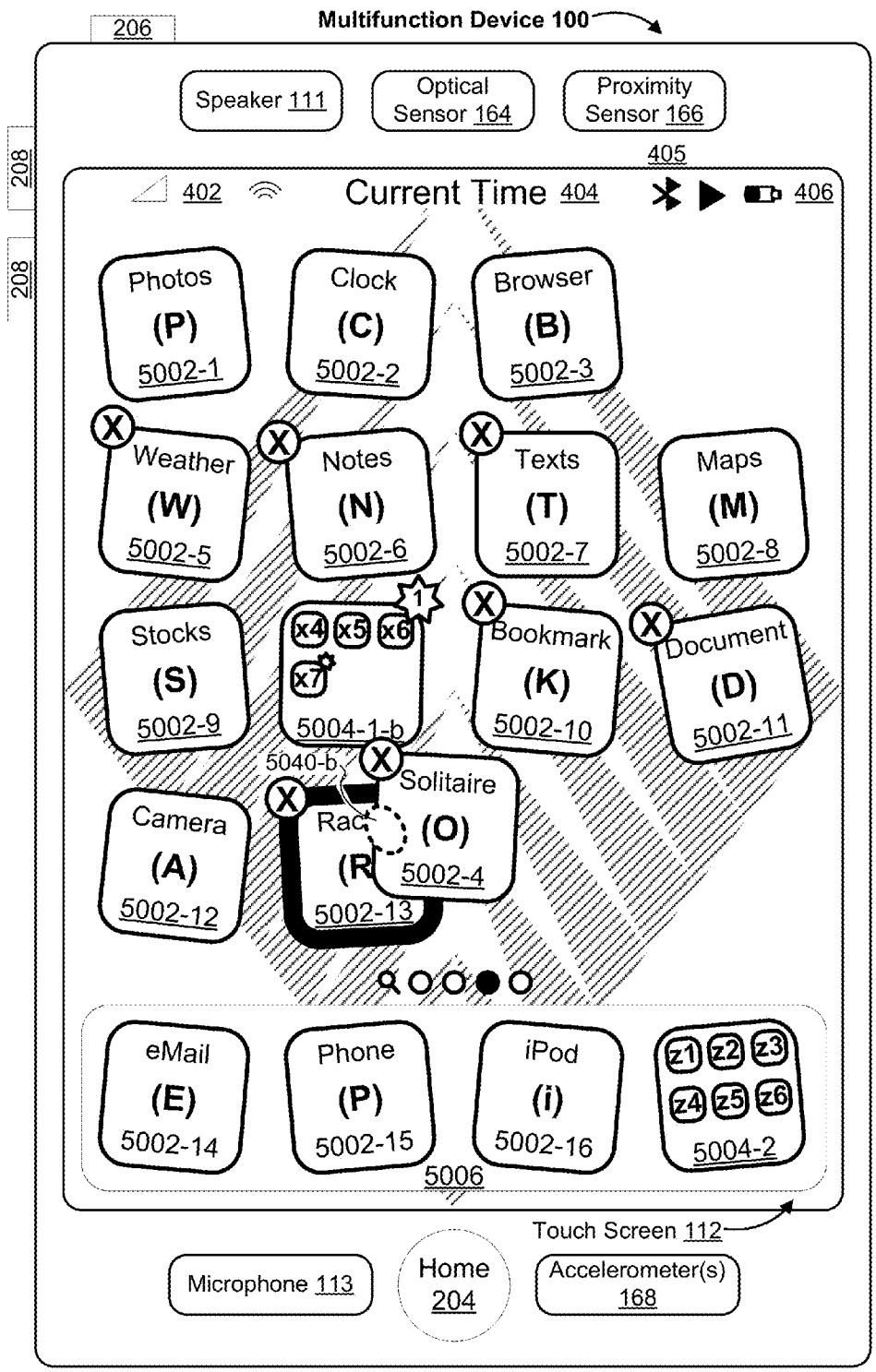
Figure 5O:
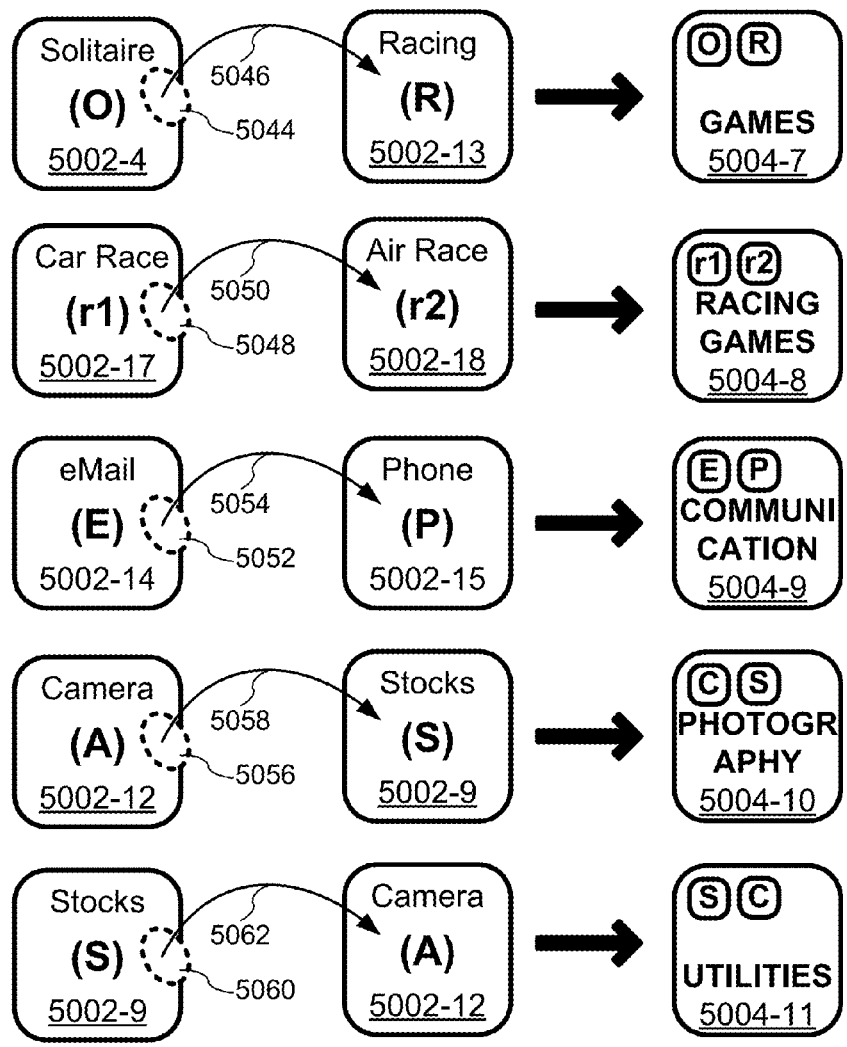
Figure 5P:
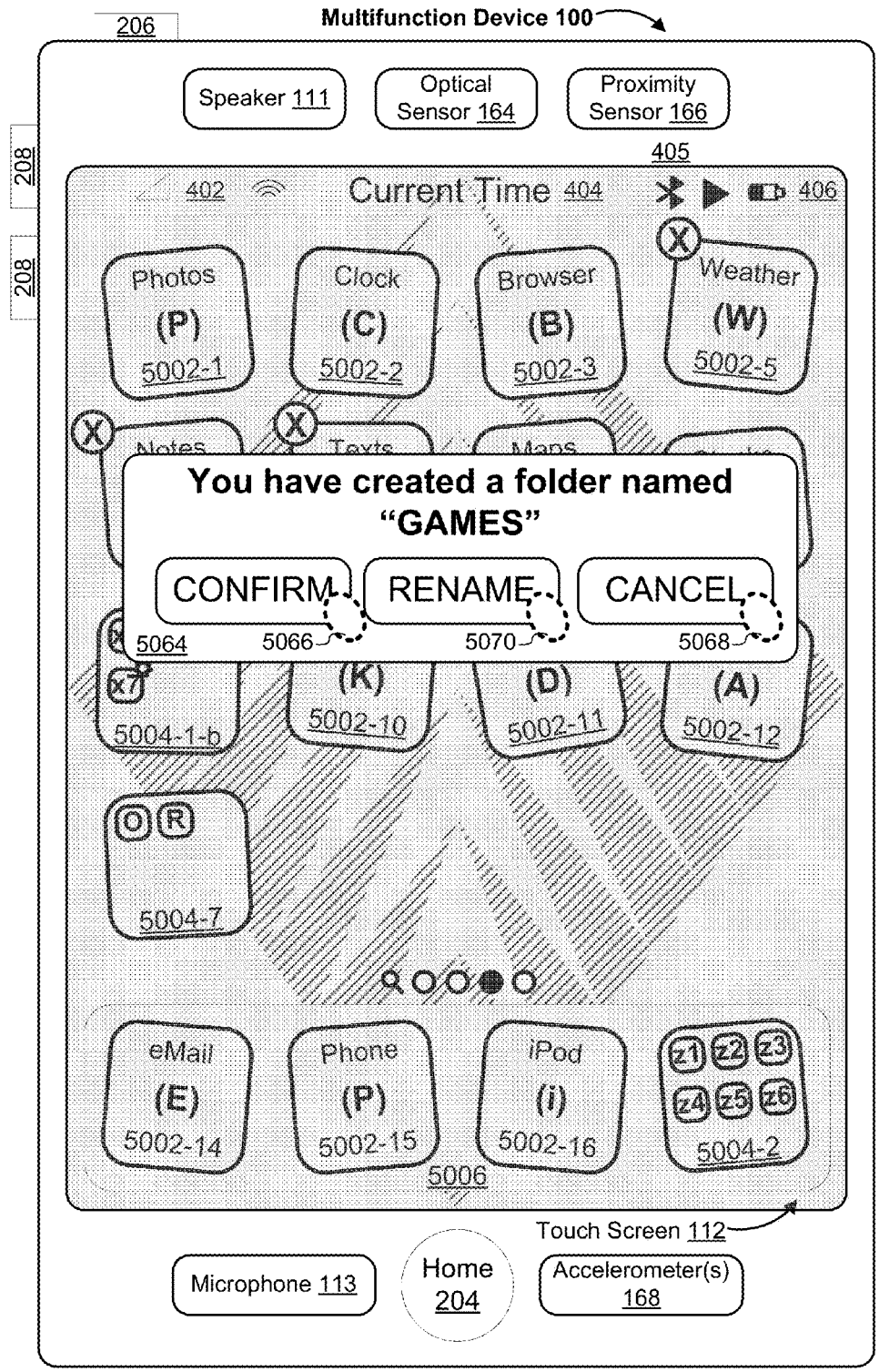

FIGS. 5A-5PPP illustrate exemplary user interfaces for creating and managing folders that contain one or more of the selectable user interface objects in accordance with some embodiments. The user interfaces in these figures are used to illustrate the processes described below, including the processes in FIGS. 6A-6E, 7A-7C, 8A-8C, 9A-9B, 10A-10B, 11A-11C, and 12A-12E.

Attention is now directed towards FIG. 5A, which illustrates a multifunction device (e.g., 100 in FIGS. 5A-5N, 5P-5PPP) with a touch screen (e.g., 112 in FIGS. 5A-5N, 5P-5PPP) display (e.g., touch screen 112). In some embodiments the multifunction device 100 also includes a speaker (e.g., 111 in FIGS. 5A-5N, 5P-5PPP), a microphone (e.g., 113 in FIGS. 5A-5N, 5P-5PPP), one or more optical sensors (e.g., 164 in FIGS. 5A-5N, 5P-5PPP), a proximity sensor (e.g., 166 in FIGS. 5A-5N, 5P-5PPP), one or more accelerometers (e.g., 168 in FIGS. 5A-5N, 5P-5PPP), as described in greater detail above.

In some embodiments, the multifunction device 100 displays a plurality of notification icons such as signal strength indicator(s) (e.g., 402 in FIGS. 5A-5N, 5P-5PPP) for wireless communication(s), such as cellular and Wi-Fi signals; time indicator (e.g., 404 in FIGS. 5A-5N, 5P-5PPP); Bluetooth indicator (e.g., 405 in FIGS. 5A-5N, 5P-5PPP); battery status indicator (e.g., 406 in FIGS. 5A-5N, 5P-5PPP). In accordance with some embodiments, the multifunction device also displays a plurality of selectable user interface objects (e.g., application icons 5002 and folder icons 5004 in FIGS. 5A-5PPP). In some embodiments one or more of the selectable user interface objects are displayed in a tray (e.g., 5006 in FIGS. 5A-5N, 5P-5PPP), which is also sometimes referred to as a dock. In some embodiments, the selectable user interface objects (e.g., application icons and/or folder icons) outside of the tray are part of a plurality of sets/pages of selectable user interface objects, where each set/page of selectable user interface objects includes a different plurality of selectable user interface objects. However, in some embodiments, when the multifunction devices switches from a first set/page of selectable user interface objects to a second set/page of selectable user interface objects, the tray 5006 does not change.

Attention is now directed towards FIG. 5A, which includes a plurality of selectable user interface objects, including a plurality of action icons 5002 and a plurality of folder icons 5004. For example, in FIG. 5A the action icons 5002 include a plurality of application icons (e.g., photos application icon 5002-1, clock application icon 5002-2, browser application icon 5002-3, solitaire application icon 5002-4, weather application icon 5002-5, notes application icon 5002-6, texts application icon 5002-7, maps application icon 5002-8, stocks application icon 5002-9, camera application icon 5002-12, racing application icon 5002-13, email application icon 5002-14, phone application icon 5002-15, and iPod application icon 5002-16) for activating respective applications, a bookmark icon 5002-10 for launching a web browser and displaying a bookmarked webpage and a document icon 5002-11 for activating a document viewing/editing application so as to displaying the document associated with the document icon 5002-11.

The folder icons (e.g., 5004-1-a and 5004-2 in FIG. 5A) in FIG. 5A are icons that can be activated to display a folder view. In some embodiments, the folder icons 5004 each include a plurality of reduced scale representations of selectable object indicators that are associated with the folder (e.g., reduced scale representations "x1," "x2," "x3," "x4," "x5," and "x6" for folder icon 5004-1, and reduced scale representations "z1," "z2," "z3," "z4," "z5," and "z6" for folder icon 5004-2). It should be understood that, in accordance with some embodiments, displaying the folder view includes displaying a region that includes a plurality of selectable user interface icons (e.g., action icons 5002). In FIG. 5A, the device is in normal operation mode. In other words, selecting one of the action icons will activate an application (e.g., launch an application that is not currently running on the device or display a view of an application that is currently running on the device). In some embodiments, the device detects a request to enter user interface reconfiguration mode. For example, in FIG. 5A, the device detects a contact 5008 with the solitaire application icon 5002-4 for more than a predetermined period of time (e.g., 2 seconds) and, in response, the device enters a user interface reconfiguration mode, as illustrated in FIG. 5B.

In FIG. 5B, the device has entered a user interface reconfiguration mode. In some embodiments, the selectable user interface objects (e.g., 5002 and 5004) display a visual indication that the device is in the user interface reconfiguration mode. For example, as illustrated in FIG. 5B, the selectable user interface objects jiggle as though they are floating on water (e.g., each respective selectable user interface object oscillates about a respective average position of the selectable user interface object on the display). Additionally in some embodiments, while in the user interface reconfiguration mode, at least some of the selectable user interface objects are associated with an object removal badge (e.g., 5010 in FIG. 5B), and when the device detects activation of the object removal badge (e.g., tap gesture 5011 in FIG. 5B), the selectable user interface object (e.g., weather application icon 5002-5 in FIG. 5B) associated with the object removal badge is removed from the user interface (e.g., deleted).

Additionally, in some embodiments, the one or more of the folder icons change appearance when the device enters user interface reconfiguration mode. For example, in FIG. 5A, when the device is in normal operation mode, a folder icon 5004-1-*a* is displayed with a first plurality of reduced size representations of selectable user interface objects (e.g. "x1," "x2," "x3," "x4," "x5," "x6" in folder icon 5004-1-*a* in FIG. 5A), while in FIG. 5B, after the device enters the user interface reconfiguration mode, a second plurality of reduced size representations of selectable user interface objects (e.g., "x4," "x5," "x6," and "x7") are displayed within the folder icon (e.g., folder icon 5004-1-*b* in FIG. 5B). Additionally, in some embodiments, one or more of the folder icons (e.g., 5004-1-*b* in FIG. 5B) includes a notification badge 5012 that indicates that an application associated with one of the selectable user interface objects in the folder has a notification. In some embodiments one of the reduced scale representations (e.g., "x7" in folder icon 5004-1-*b*) has its own notification badge 5014 that indicates that an application associated with the reduced scale representation has a notification. Typically, a notification is an indication that the application requires the attention of a user of the device (e.g., because a new message has arrived, or a new event has occurred, updates are available, etc.).

Attention is now directed towards FIGS. 5B-5F, which illustrate exemplary user interfaces for creating a new folder in accordance with some embodiments. In FIG. 5B, the device detects a request to move a respective selectable user interface object to an edge of the screen. In this example, the request includes a contact 5016-*a* on the touch-sensitive surface (e.g., touch screen 112) at a location that corresponds to a "racing" action icon 5002-13, and subsequent movement 5018 of the contact to the edge of the touch-sensitive surface (e.g., to contact position 5016-*b* on the touch screen 112, as illustrated in FIG. 5C). In FIG. 5C, the action icon 5002-13 is moved to the edge of the display (e.g., touch screen 112) and is maintained at the edge of the display for more than a predetermined time threshold (e.g., 1 second). In response to detecting the action icon 5002-13 at the edge of the display (e.g., touch screen 112) for more than the predetermined time threshold, the device navigates to a next set/page of selectable user interface objects (e.g., as illustrated in FIG. 5D).

In some embodiments, the device maintains a plurality of pages of selectable user interface objects while the device is in a normal operation mode. In some of these embodiments, when the device enters a user interface reconfiguration mode, the device creates an additional page that contains a new empty folder. For example, there are no action icons 5002 and no filled folders on the page displayed in FIG. 5D, thus the device displays a folder icon 5004-3 for an empty folder (e.g., a folder that contains no selectable user interface objects). In some embodiments the folder icon (e.g., 5004-3) for an empty folder has a different appearance from a folder icon for a filled folder (e.g., a folder that contains one or more selectable user interface objects).

In FIG. 5D, the device detects a request to move the selectable user interface object 5002-13 to the folder icon for the empty folder 5004-3. In the example illustrated in FIG. 5D, the request includes movement 5020 of the contact 5016 from the contact location 5016-*b* near the edge of the display (e.g., touch screen 112) to a contact location (e.g., 5016-*c* in FIG. 5E) that is proximate to the folder icon 5004-3 for the new empty folder. In response to the request to move the selectable user interface object, the device moves the selectable user interface object from the location (e.g., 5002-13 in FIG. 5D) near the edge of the display (e.g., touch screen 112) to a location that is proximate to or overlapping with the folder icon 5004-3 for the new empty folder or an activation region for the folder icon 5004-3.

In some embodiments, while the selectable user interface object 5002-13 is proximate to or overlapping with the folder icon 5004-3 for the empty folder, the device detects a termination of the input (e.g., a liftoff of contact 5016-*c* from the touch screen 112) that was used to request movement of the selectable user interface object 5002-13. In response to detecting termination of the input the liftoff of contact from the touch-sensitive surface (e.g., touch screen 112), the device adds the selectable user interface object 5002-13 to the folder associated with the folder icon 5004-3, as illustrated in FIG. 5F. In some embodiments, when the device adds the selectable user interface object to the folder associated with the folder icon 5004-3, the device changes the appearance of the folder icon. For example, in FIG. 5F, the folder icon 5004-3 displays a reduced scale representation of the selectable user interface object 5002-13 that was added to the folder associated with the folder icon 5004-3.

In some embodiments, the device always displays an empty folder while in user interface reconfiguration mode. For example, in FIG. 5F, once the previously empty folder (e.g., the folder associated with folder icon 5004-3) is filled (e.g., after selectable user interface object 5002-13 has been added to the folder, as illustrated in FIGS. 5C-5E), the device creates a subsequent new empty folder and displays a folder icon (e.g., 5004-4 in FIG. 5F) on the display (e.g., touch screen 112) that is associated with the subsequent new empty folder. Thus, a new empty folder can be created by a user simply by filling a previously empty folder. In some embodiments, any folder icons that are associated with empty folders (e.g., folder icon 5004-4) cease to be displayed by the device when the device returns to normal operation mode. For example, in FIG. 5F the device detects a request to return to normal operation mode (e.g., a press input 5022 on home button 204 in FIG. 5F). In response to the request to return to the normal operation mode, the device returns to normal operation mode and ceases to display the empty folder (e.g., 5004-4 in FIG. 5F), on the display (e.g., touch screen 112) as illustrated in FIG. 5G.

Attention is now directed towards FIGS. 5H-5L which illustrate exemplary user interfaces for the creation of a new folder in accordance with some embodiments. In some embodiments, the device enters a user interface reconfiguration mode (e.g., as described in greater detail above with reference to FIG. 5A). In some embodiments, when the device enters a user interface reconfiguration mode, a new folder creation element (e.g., new folder creation region 5024 in FIG. 5H) is displayed on a display (e.g., touch screen 112). In some embodiments, when the device enters a user interface reconfiguration mode, the selectable user interface icons on the display (e.g., touch screen 112) are moved towards each other (e.g., the amount of empty space between selectable user interface objects is decreased along at least one axis such as a vertical axis) so as to make room for the new folder creation element(s). In some embodiments, the device detects a request to add a new folder (e.g., a tap gesture 5026 at a location on the touch screen 112 that corresponds to a new folder creation region 5024). In response to the request to create a new folder, the device creates a new folder and displays a folder icon (e.g., 5004-5 in FIG. 5I) on the display (e.g., touch screen 112). In some embodiments the folder icon (e.g., 5004-5 in FIG. 5I) for the new folder is displayed at the first available location on in a predefined arrangement of selectable user interface objects.

In some embodiments, the new folder creation element is a represented as region (e.g., region 5028 in FIG. 5I) that contains a folder creation icon (e.g., 5030 in FIG. 5I) that is visually similar to a new folder icon. In some embodiments, the device detects a request to create a new folder. For example, as illustrated in FIG. 5I, the device detects a contact 5032 on a touch-sensitive surface (e.g., touch screen 112) at a location that corresponds to a location of the folder creation icon 5030 on a display (e.g., touch screen 112) and subsequent movement 5034 of the contact out of the folder creation region. In some embodiments the device displays an animation of a folder moving out of the folder creation element in accordance with the movement 5034 of the contact. In other words, it appears as though a new folder icon (e.g., 5004-6 in FIG. 5J) has been dragged out of the folder creation region 5028. In response to detecting the request to create the new folder, the device creates a new folder and associates the new folder with the folder icon 5004-6 that was dragged out of the folder creation region.

In some embodiments the device receives a request to add one or more of the selectable user interface objects (e.g., action icon 5002-6) into one of the new folders. For example, in FIG. 5J, the device detects a contact 5035 with action icon 5002-6 and subsequent movement 5036 of the contact to one of the new folders 5004-5. In some embodiments, in response to the request to add a selectable user interface object to a new folder, the device adds the selectable user interface object to the folder and removes the selectable user interface object from the display. In some embodiments, after adding a selectable user interface object to a folder, the device modifies the folder icon that is associated with the folder to which the selectable user interface object was added. For example, in FIG. 5K, the device has added the action icon 5002-6 to the folder associated with folder icon 5004-5, and the folder icon 5004-5 has been updated to display a reduced scale representation (e.g., "N" in folder icon 5004-5) of the action icon 5002-6 that was added to the folder.

In some embodiments, any folder icons that are associated with empty folders (e.g., folder icon 5004-6) cease to be displayed by the device when the device returns to normal operation mode. For example, in FIG. 5K the device detects a request to return to normal operation mode (e.g., a press input 5038 on home button 204 in FIG. 5K). In response to the request to return to the normal operation mode, the device returns to normal operation mode and ceases to display the empty folder (e.g., 5004-6 in FIG. 5K) on the display (e.g., touch screen 112), as illustrated in FIG. 5L. However, it should be understood that, in accordance with some embodiments, any folder icons that represent folders to which one or more selectable user interface objects have been added continue to be displayed. For example, in FIG. 5L, after the device has returned to normal operation mode, folder 5004-5 continues to be displayed. Additionally, in some embodiments, when the device returns to normal operation mode the selectable user interface objects are rearranged so as to close any gaps in the arrangement. For example, in FIG. 5K, the selectable user interface objects are in a first arrangement with a gap where the notes application icon 5004-6 used to be located (e.g., as illustrated in FIG. 5J), while in FIG. 5L, the selectable user interface objects have been rearranged so as to close the gap.

Attention is now directed towards FIGS. 5M-5O which illustrate exemplary user interfaces for the creation of a new folder in accordance with some embodiments. In some embodiments the device receives a folder creation request while in user interface reconfiguration mode that corresponds to movement of one of the selectable user interface objects to another one of the selectable user interface objects. For example in FIG. 5M, the device detects a contact (e.g., 5040-*a*) at a location on the touch-sensitive surface (e.g., touch screen 112) that corresponds to a location of a first action icon (e.g., the solitaire application icon 5002-4) on the display (e.g., touch screen 112) and detects subsequent movement of the contact (e.g., from a first location 5040-*a* in FIG. 5M to a second location 5040-*b* in FIG. 5N on the touch screen 112) that corresponds to movement of the first action icon 5002-4 onto the second action icon 5002-13, as illustrated in FIG. 5N. In some embodiments the device displays an indication that a folder is about to be created (e.g., by highlighting the second action icon 5002-13 as illustrated in FIG. 5N). In some embodiments, the device creates a folder including the first action icon and the second action icon after detecting termination of the input (e.g., detecting a liftoff of the contact 5040-*b*). In some embodiments, the device creates a folder including the first action icon and the second action icon after detecting that the input meets predefined folder-creation criteria (e.g., a pause of the contact for more than a predetermined period of time while the first action icon 5002-4 is adjacent to or on top of the second action icon 5002-13).

In some embodiments, conjunction with creating the folder, the device displays a new folder icon that is associated with the folder. In some embodiments, the new folder icon includes reduced scale representations of the user interface objects that were added to the folder. In some embodiments, the folder is named based on descriptors of the first selectable user interface object (e.g., action icon 5002-4) and/or the second selectable user interface object (e.g., action icon 5002-13). For example, FIG. 5O illustrates the device receiving an input that includes a request create a folder including a first action icon (e.g., solitaire application icon 5002-4) and a second action icon (e.g., racing application icon 5002-13), the input includes a contact 5044 at a location on the touch-sensitive surface (e.g., touch screen 112) that corresponds to a location of the first action icon 5002-4 on the display (e.g., touch screen 112) and subsequent movement 5046 of the contact 5044 to a location that is proximate to (or on top of) the second action icon 5002-13. In response to this input, the device creates a new folder and displays a "GAMES" folder icon 5004-7 for the new folder that includes reduced scale representations of the first selectable user interface object and the second selectable user interface object (e.g., "O" and "R," respectively). As another example, FIG. 5O illustrates the device receiving an input that includes a request create a folder including a first action icon (e.g., car race application icon 5002-17) and a second action icon (e.g., air race application icon 5002-18), the input includes a contact 5048 at a location on the touch-sensitive surface (e.g., touch screen 112) that corresponds to a location of the first action icon 5002-17 on the display (e.g., touch screen 112) and subsequent movement 5050 of the contact 5048 to a location that is proximate to (or on top of) the second action icon 5002-18. In response to this input, the device creates a new folder and displays a "RACING GAMES" folder icon 5004-8 for the new folder that includes reduced scale representations of the first selectable user interface object and the second selectable user interface object (e.g., "r1" and "r2," respectively). As another example, FIG. 5O also illustrates the device receiving an input that includes a request create a folder including a first action icon (e.g., email application icon 5002-14) and a second action icon (e.g., phone application icon 5002-15), the input includes a contact 5052 at a location on the touch-sensitive surface (e.g., touch screen 112) that corresponds to a location of the first action icon 5002-14 on the display (e.g., touch screen 112) and subsequent movement 5054 of the contact 5052 to a location that is proximate to (or on top of) the second action icon 5002-15. In response to this input, the device creates a new folder and displays a "COMMUNICATION" folder icon 5004-9 for the new folder that includes reduced scale representations of the first selectable user interface object and the second selectable user interface object (e.g., "E" and "P," respectively).

As another example, FIG. 5O also illustrates the device receiving an input that includes a request create a folder including a first action icon (e.g., camera application icon 5002-12) and a second action icon (e.g., stocks application icon 5002-9), the input includes a contact 5056 at a location on the touch-sensitive surface (e.g., touch screen 112) that corresponds to a location of the first action icon 5002-12 on the display (e.g., touch screen 112) and subsequent movement 5058 of the contact 5056 to a location that is proximate to (or on top of) the second action icon 5002-9. In response to this input, the device creates a new folder and displays a "PHOTOGRAPHY" folder icon 5004-10 for the new folder that includes reduced scale representations of the first selectable user interface object and the second selectable user interface object (e.g., "C" and "S," respectively). As another example, FIG. 5O also illustrates the device receiving an input that includes a request create a folder including a first action icon (e.g., stocks application icon 5002-9) and a second action icon (e.g., camera application icon 5002-12), the input includes a contact 5060 at a location on the touch-sensitive surface (e.g., touch screen 112) that corresponds to a location of the first action icon 5002-9 on the display (e.g., touch screen 112) and subsequent movement 5062 of the contact 5060 to a location that is proximate to (or on top of) the second action icon 5002-12. In response to this input, the device creates a new folder and displays a "UTILITIES" folder icon 5004-11 for the new folder that includes reduced scale representations of the first selectable user interface object and the second selectable user interface object (e.g., "S" and "C," respectively).

Figure 5Q:
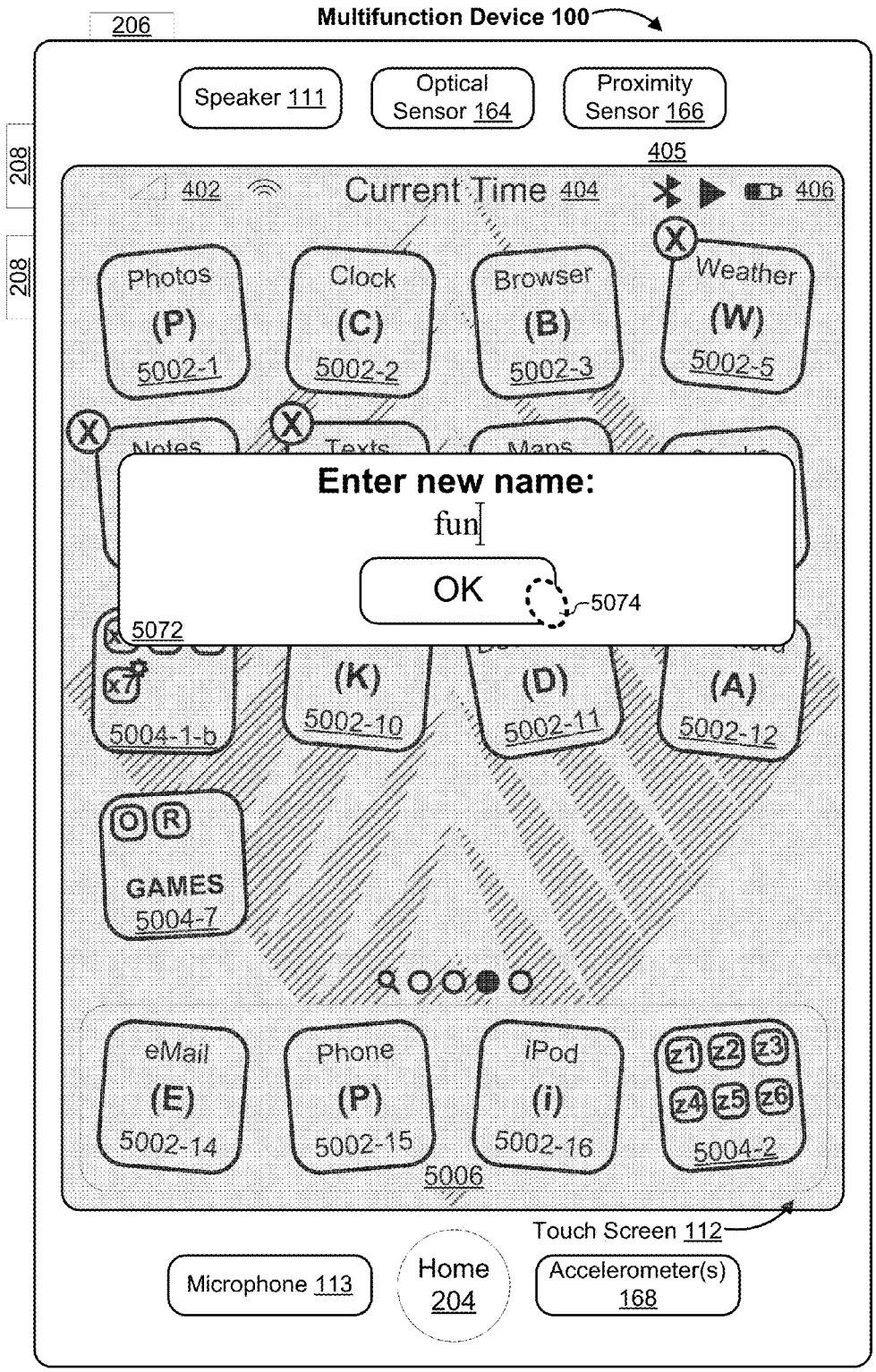
Figure 5R:
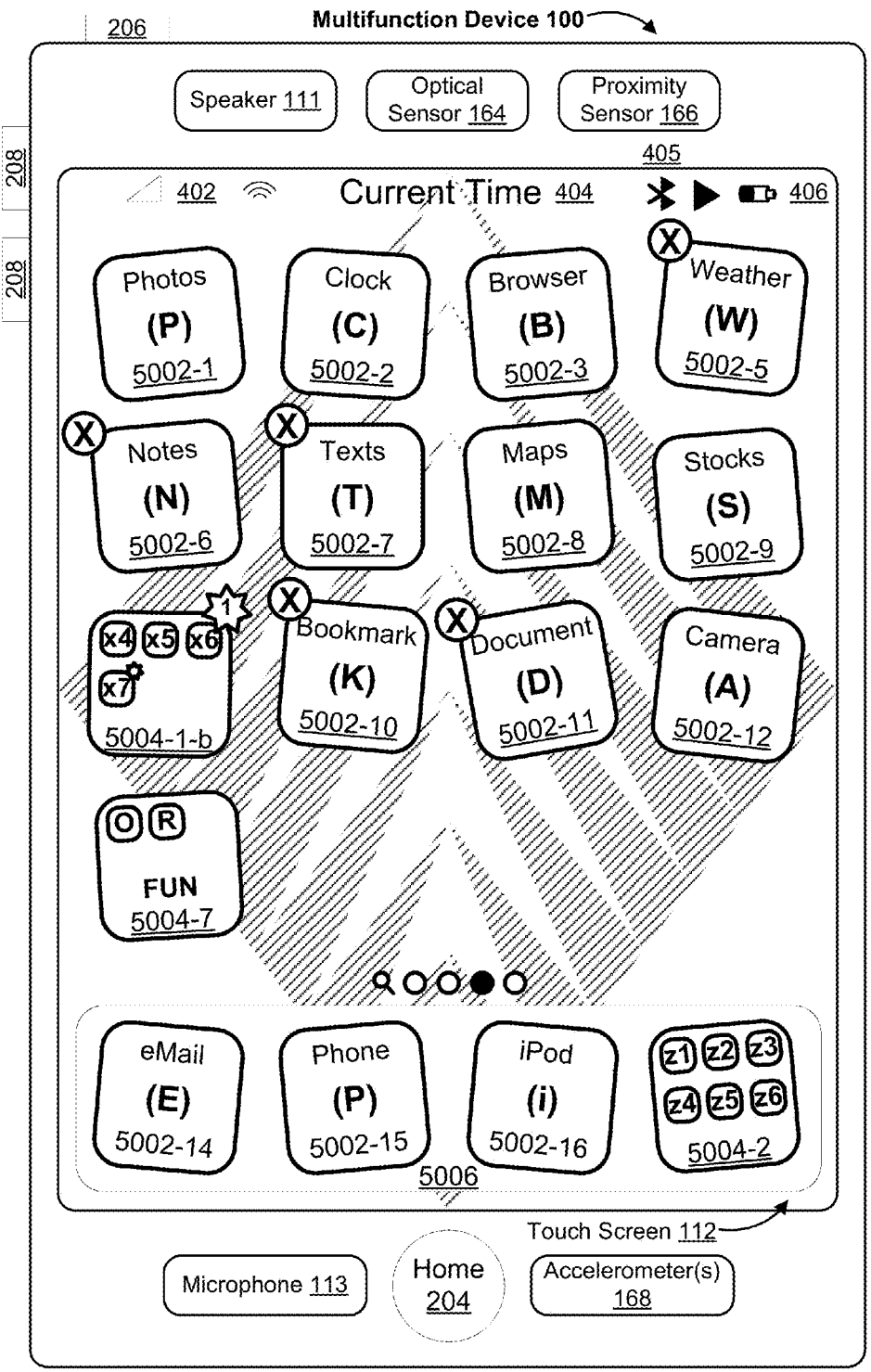
Figure 5S:
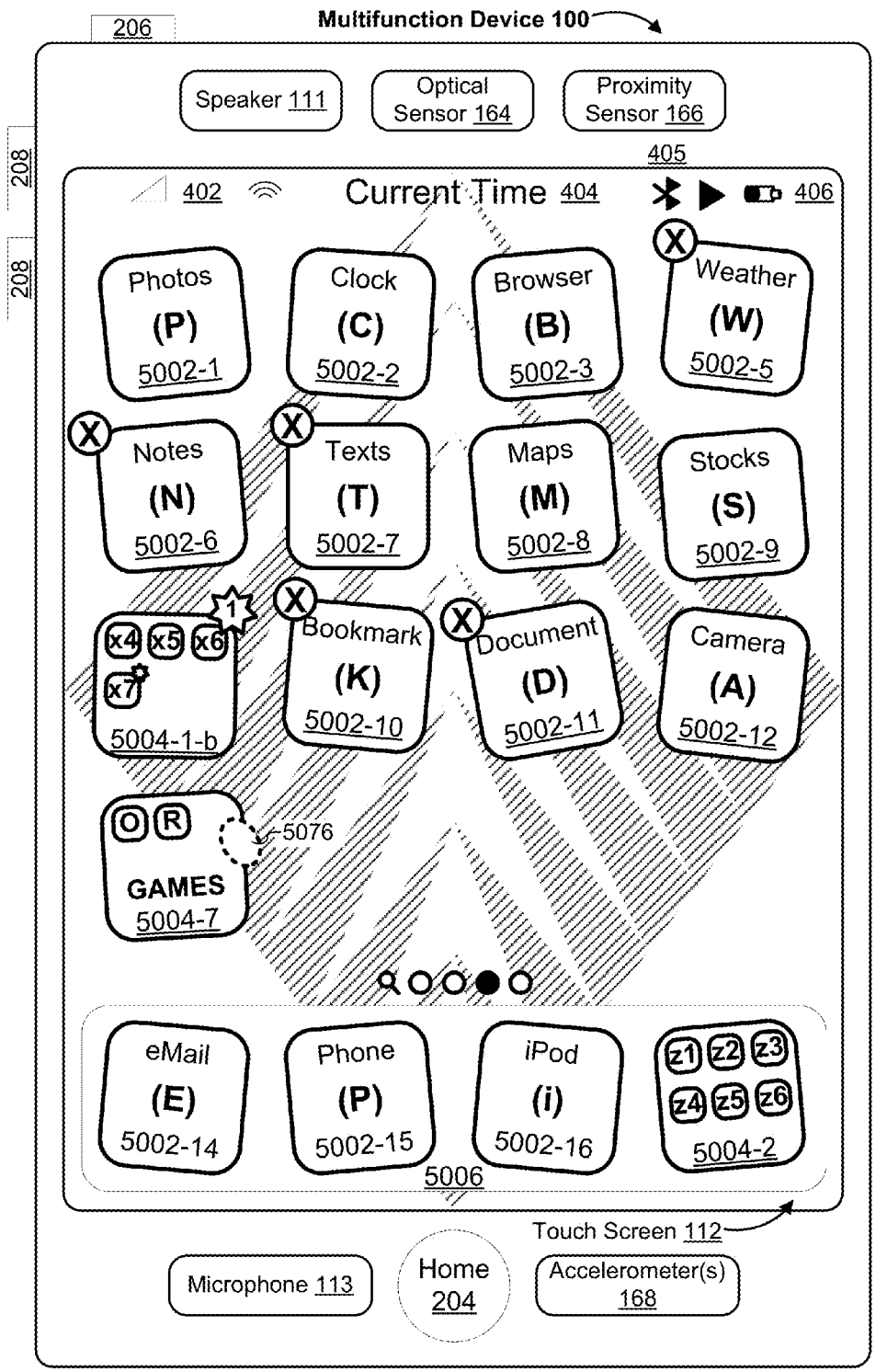

Attention is now directed towards FIGS. 5P-5R which illustrate exemplary user interfaces for renaming a folder in accordance with some embodiments. In some embodiments, a new folder is named automatically after it is created, as described above with reference to FIG. 5O. In some embodiments, immediately after the folder is created, the device displays a name confirmation dialogue (e.g., 5064 in FIG. 5P). In response to detecting a confirmation input (e.g., tap gesture 5066 at a location that corresponds to a "confirm" icon on the touch screen 112 in FIG. 5P), the device confirms the creation of the folder and the automatically generated name, as illustrated in FIG. 5S. In response to detecting a cancellation input (e.g., tap gesture 5068 at a location that corresponds to a "cancel" icon on the touch screen 112 in FIG. 5P), the device cancels the creation of the folder, as illustrated in FIG. 5M. In response to detecting a renaming input (e.g., tap gesture 5070 at a location that corresponds to a "rename" icon on the touch screen 112 in FIG. 5P), the device displays a dialogue 5072 for changing the name of the new folder (e.g., from "games" to "fun" as illustrated in FIG. 5Q), and for confirming the name change (e.g., by detecting a tap gesture 5074 at a location that corresponds to a location of an "ok" icon on the touch screen 112). The device displays a folder icon (e.g., 5004-7 in FIG. 5R) that is associated with the new name for the new folder.

Attention is now directed towards FIGS. 5S-5Q which illustrate exemplary user interfaces for displaying a folder view in accordance with some embodiments. In some embodiments, the device displays a folder view of a folder associated with a folder icon (e.g., 5004-7) in response to detecting a request to activate a folder icon (e.g., tap gesture 5076 in FIG. 5S). In response to detecting the request, the device displays a folder view (e.g., as illustrated in any of FIG. 5T, 5U, 5V-5W, or 5X-5Y) on the display (e.g., touch screen 112). In some embodiments, the device automatically displays a folder view after creating the folder (e.g., transitioning directly from FIG. 5N to any of FIG. 5T, 5U, 5V-5W, or 5X-5Y) or renaming a new folder (e.g., transitioning directly from FIG. 5Q to any of FIG. 5T, 5U, 5V-5W, or 5X-5Y).

Figure 5T:
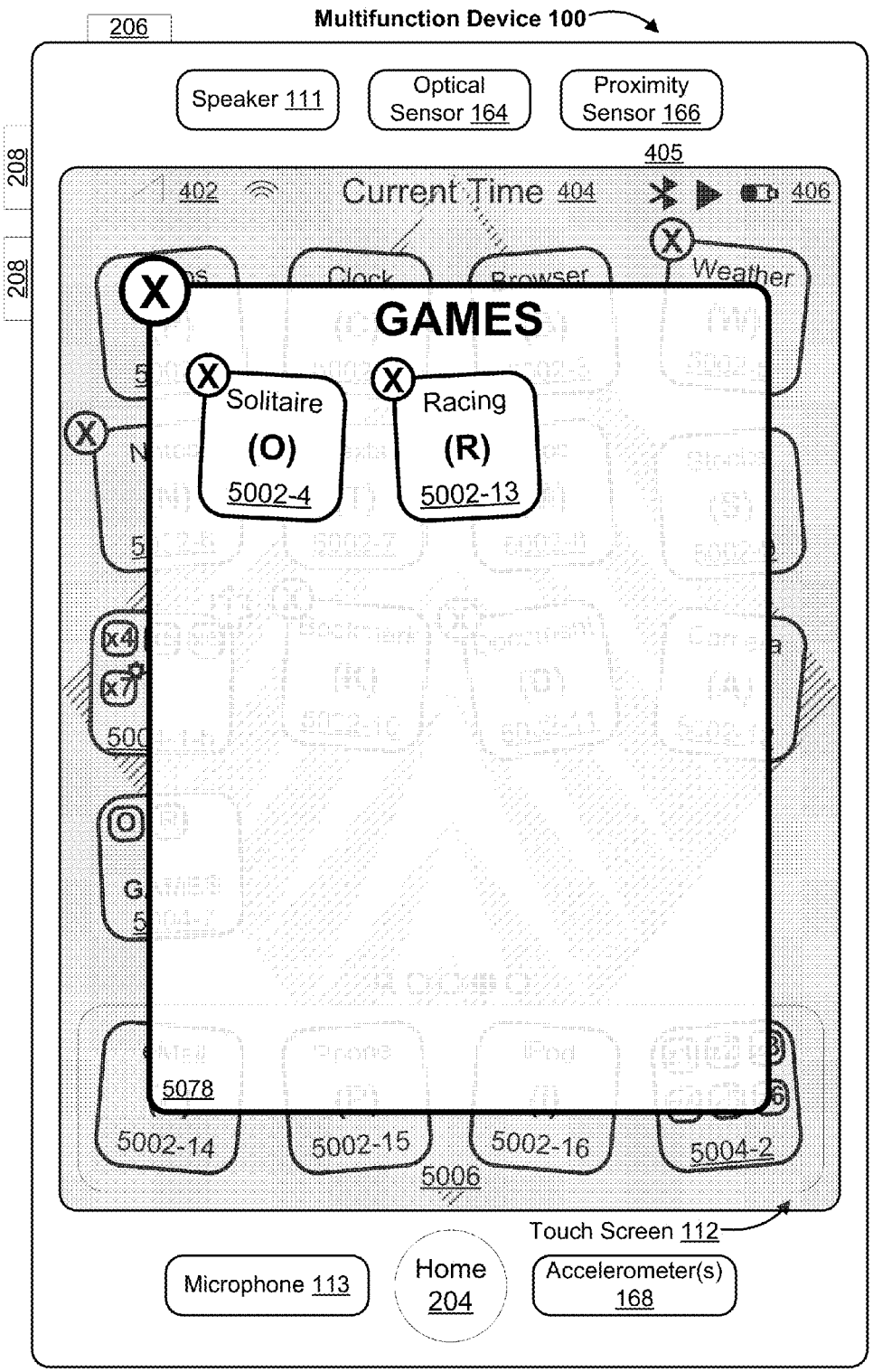

In FIG. 5T, the folder view 5078 includes an overlay that covers at least a portion of the touch screen 112, obscuring (e.g., hiding or de-emphasizing) the selectable user interface objects that are displayed on the touch screen 112. In some embodiments, the selectable user interface objects that are not in the folder are at least partially faded, so as to draw attention to the folder view (e.g., 5078 in FIG. 5T), while providing contextual feedback by indicating the arrangement of the selectable user interface objects that are outside of the folder view (e.g., 5078 in FIG. 5T). In some embodiments, the folder view (e.g., 5078 in FIG. 5T) includes the selectable user interface objects (e.g., 5002-4 and 5002-13) that were added to the folder associated with the new folder icon 5004-7.

Figure 5U:
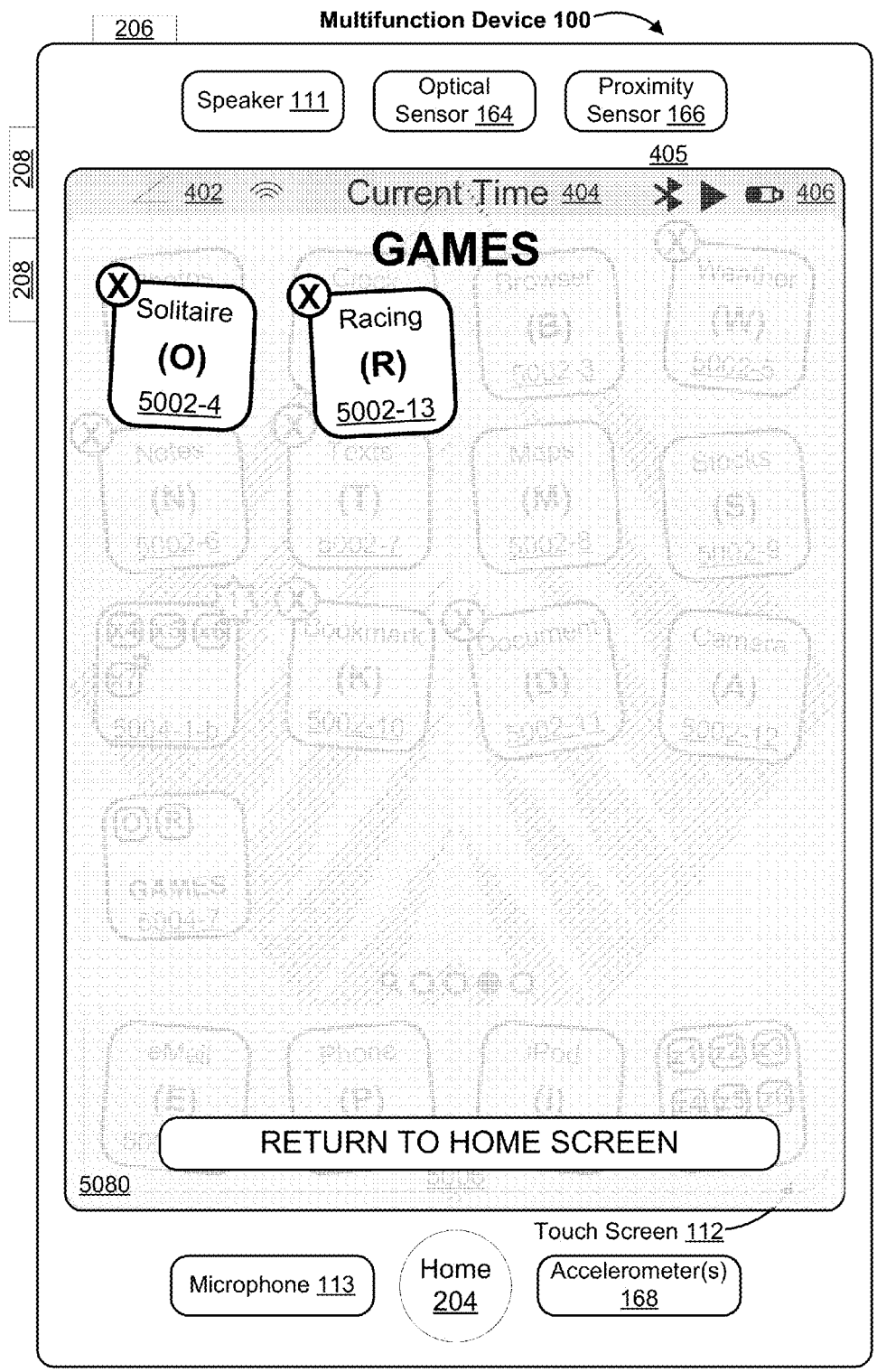

In FIG. 5U, the folder view 5080 includes a partially transparent overlay that covers all, or substantially all, of the touch screen 112, obscuring the selectable user interface objects that are displayed on the touch screen 112 and drawing attention to the folder view (e.g., 5080 in FIG. 5U), while providing contextual feedback by indicating the arrangement of the selectable user interface objects (e.g., including a location of the folder icon 5004-7 for the folder within the arrangement) that are outside of the folder. The folder view (e.g., 5080 in FIG. 5U) includes the selectable user interface objects (e.g., 5002-4 and 5002-13) that were added to the folder associated with the new folder icon 5004-7.

Figure 5V:
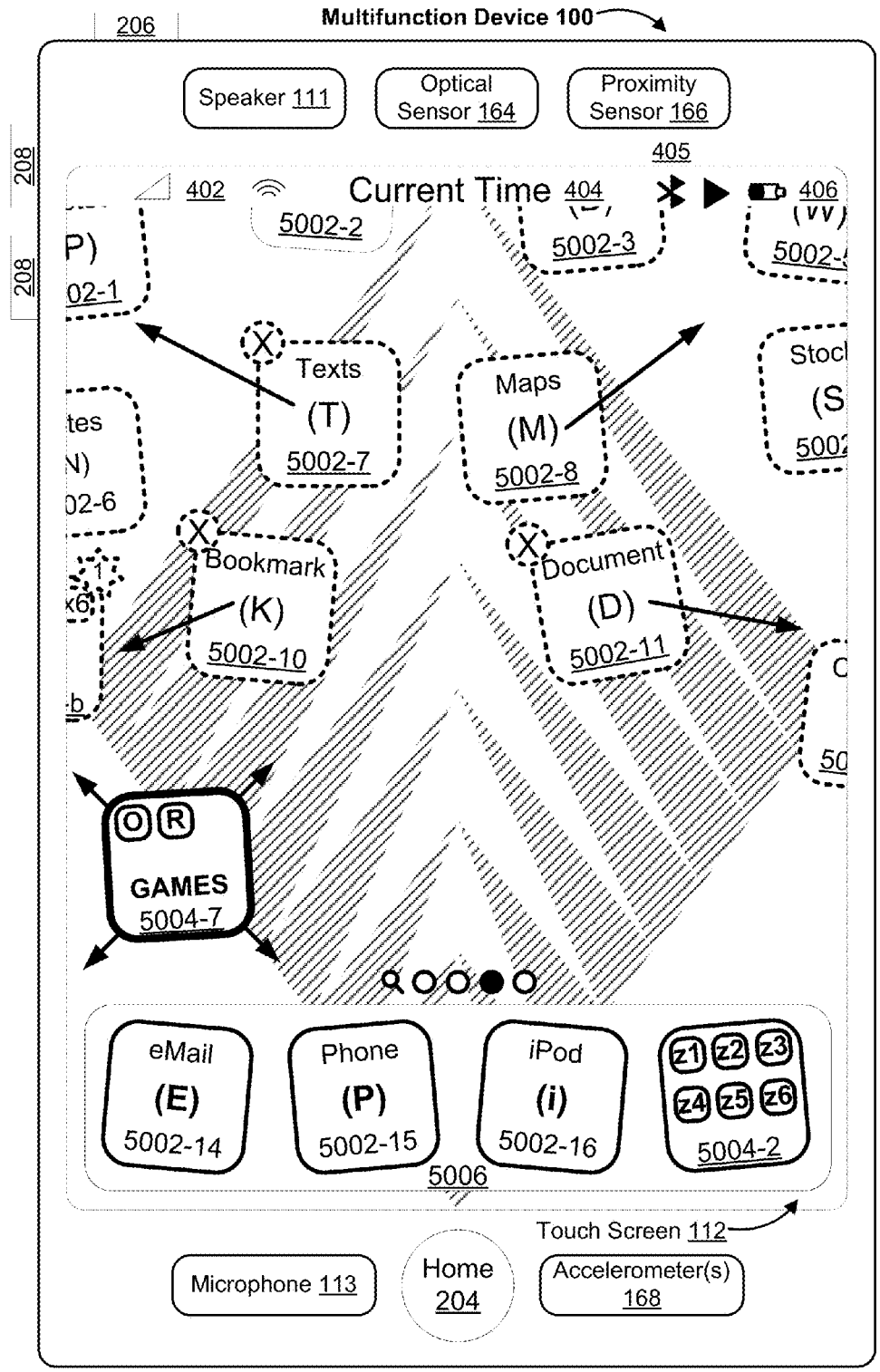
Figure 5W:
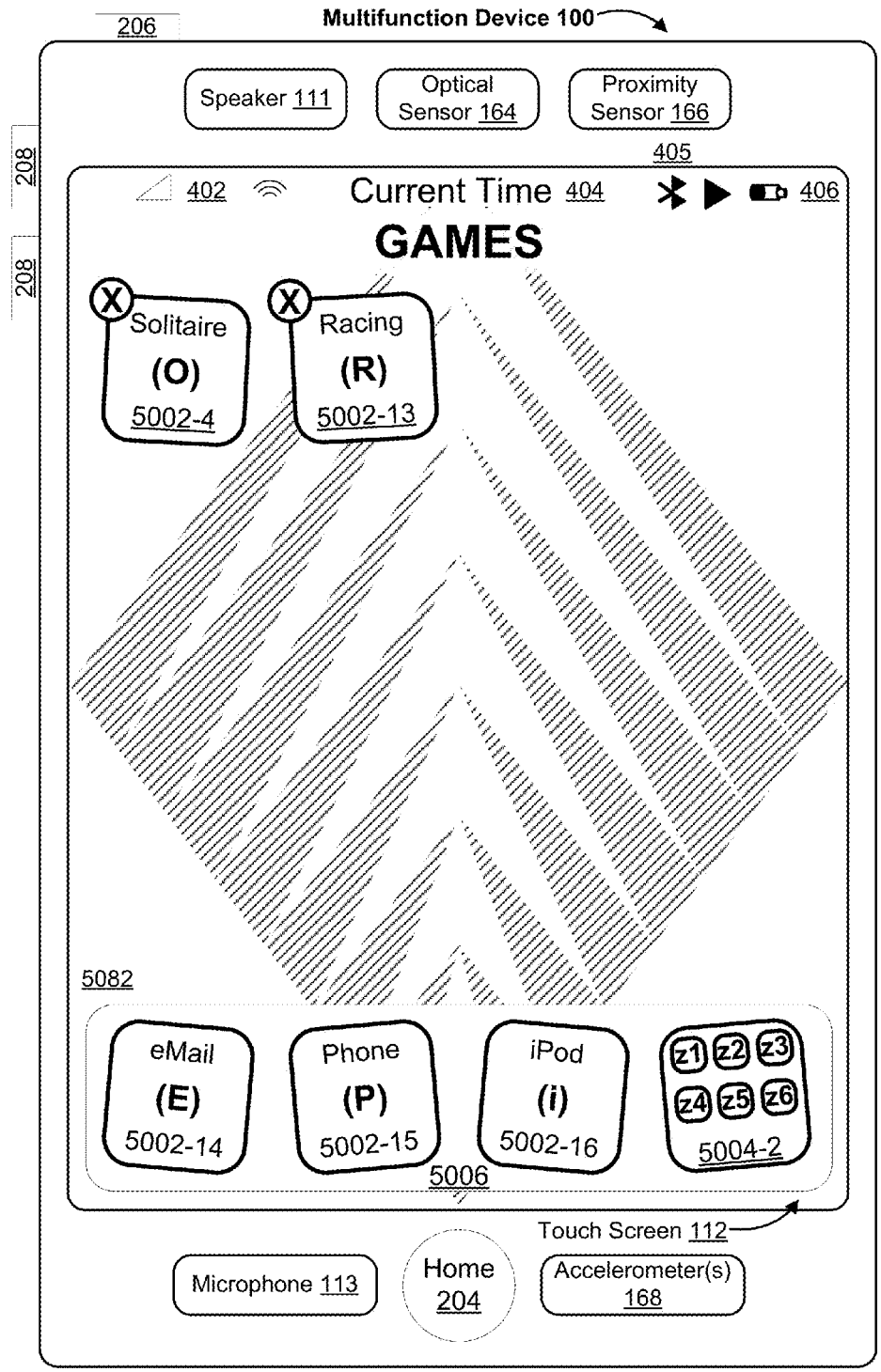

Attention is now directed towards FIGS. 5V-5Y which illustrate exemplary user interfaces for displaying an animated transition to a folder view in accordance with some embodiments. In some embodiments, the device displays a transition animation transitioning from displaying the folder icon to displaying the folder view. For example in FIG. 5V, the device displays an animation in response to receiving the request to display a folder view (e.g., detecting the tap gesture 5076 at a location on the touch screen 112 that corresponds to a location of the folder icon 5004-7 in FIG. 5S). The exemplary animation in FIG. 5V includes displaying a plurality of the selectable user interface objects (e.g., 5002-7, 5002-8, 5002-10, 5002-11, etc.) scattering off of the display (e.g., touch screen 112) by moving towards the edges of the display (e.g., touch screen 112). In conjunction with scattering a plurality of the selectable user interface objects, the device displays the selected folder icon 5004-7 expanding to fill the touch screen 112, as illustrated in FIG. 5W, so as to display a folder view 5082 that includes the selectable user interface objects (e.g., 5002-4, 5002-13 in FIG. 5W) that are associated with the folder represented by the selected folder icon (e.g., 5004-7 in FIG. 5S).

Figure 5X:
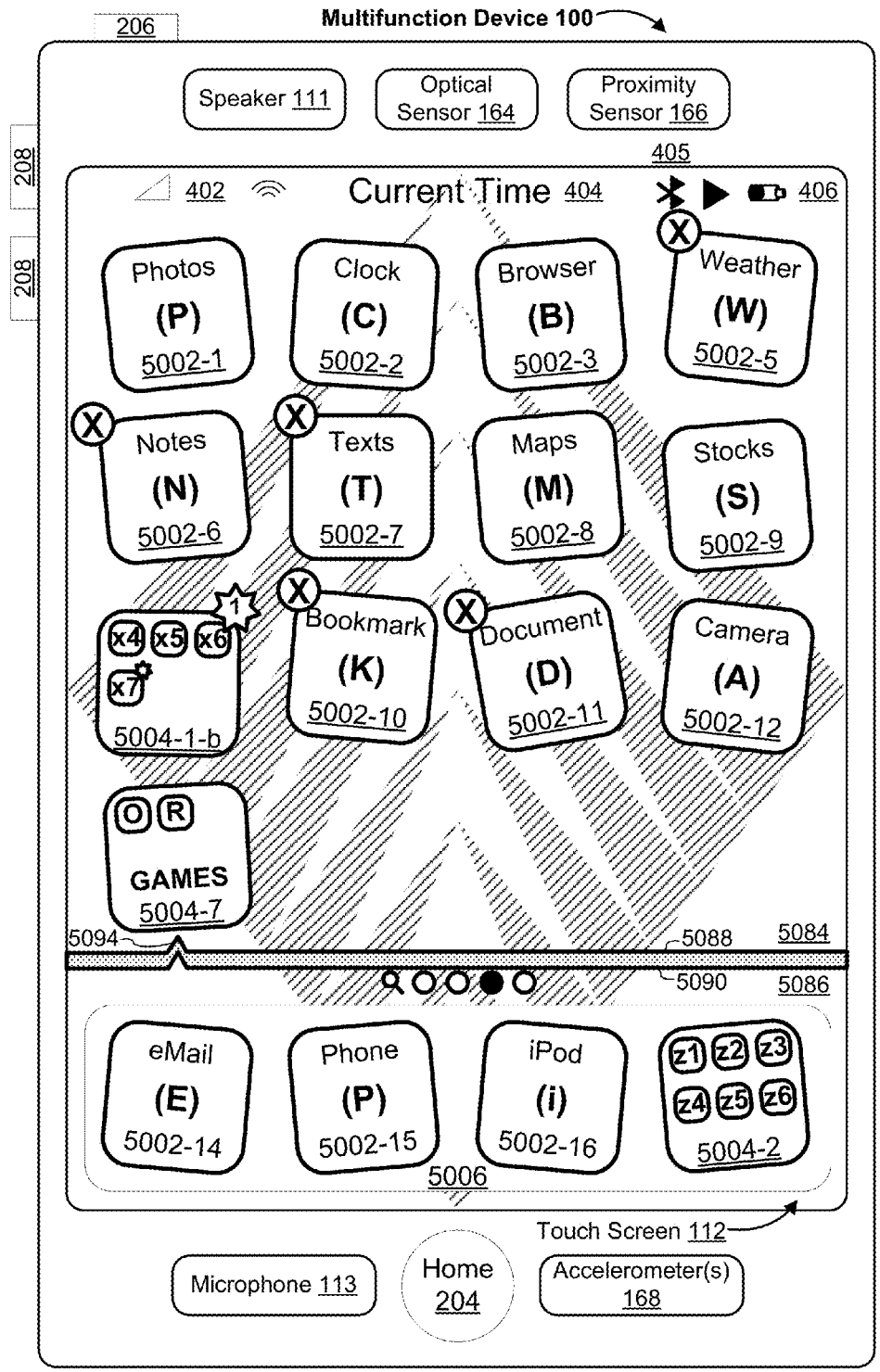
Figure 5Y:
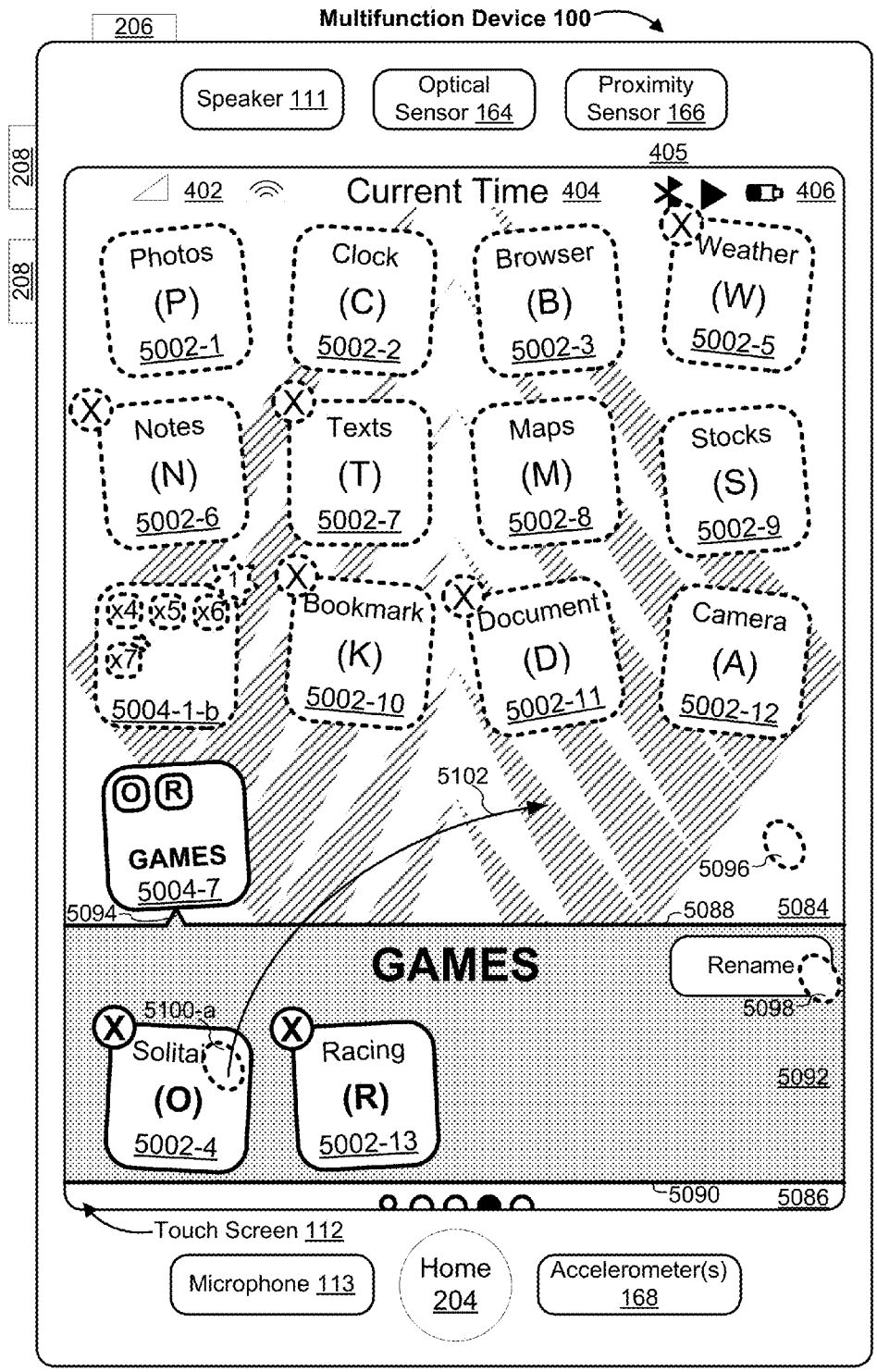

As another example of an animated transition, in FIG. 5X, the device displays an animation in response to receiving the request to display a folder view (e.g., detecting the tap gesture 5076 on the folder icon 5004-7 in FIG. 5S). The exemplary animation in FIG. 5X includes dividing a wallpaper into a first portion 5084 and a second portion 5086 and moving the second portion away from the first portion (e.g., as illustrated in FIG. 5Y. In some embodiments, the first portion has an edge 5088 with a contour that is complementary to a contour of an edge 5090 of the second portion. For example, in FIG. 5X the edge 5088 of the first portion 5084 is complementary to the edge 5090 of the second portion 5086.

It should be understood that, in some embodiments the first portion moves away from the second portion or the first portion and the second portion move away from each other. In FIG. 5Y, a folder view 5092 is displayed in an area between the first portion 5084 and the second portion 5086. In conjunction with the movement of the first portion 5084 and the second portion 5086, the device displays the selectable user interface objects (e.g., 5002-4, 5002-13 in FIG. 5Y) that are associated with the folder represented by the selected folder icon (e.g., 5004-7 in FIG. 5S) within the folder view (e.g., 5092 in FIG. 5Y) on the display (e.g., touch screen 112). In some embodiments, the animation includes displaying the wallpaper splitting to reveal the selectable user interface objects (e.g., 5002-4, 5002-13 in FIG. 5Y) in the folder as though the wallpaper were sliding door that slides away to reveal the selectable user interface objects (e.g., 5002-4, 5002-13 in FIG. 5Y) that are associated with the folder from behind the wallpaper. In some embodiments, the selected folder icon 5004-7 that is associated with the folder view 5092 continues to be displayed while the folder view 5092 is displayed, as illustrated in FIG. 5Y. In some embodiments the folder icon 5004-7 is visually distinguished from other selectable user interface objects (e.g., 5002-1, 5002-2, 5002-3, 5002-5, 5002-6, 5002-7, 5002-8, 5002-9, 5004-1-b, 5002-10, 5002-11, 5002-12 in FIG. 5Y). In some embodiments, the contour of the edge 5088 of the first portion or the contour of the edge of the second portion is adjusted so that the contours of the edges are no longer complementary. For example, in FIG. 5X the edge 5088 of the first portion 5084 and the edge 5090 of the second portion 5086 has a complementary has a cut-out notch 5094. However, continuing this example, after the portions have moved away from each other as illustrated in FIG. 5Y the edge 5088 of the first portion 5084 still has a cut-out notch 5094, while to the edge 5090 of the second portion 5086 is straight and thus the edges are no longer complementary. In some embodiments the cut-out notch 5094 provides a visual indication of a location of the selected folder icon (e.g., 5004-7 in FIGS. 5X and 5Y) within the arrangement of selectable user interface objects, as illustrated in FIG. 5Y.

In some embodiments, the device detects a folder view exit input (e.g., detecting a tap gesture 5096 at a location on the touch screen 112 that corresponds to a location outside of the folder view 5092 in FIG. 5Y) and in response to the folder exit input the device ceases to display the folder view (e.g., as illustrated in FIG. 5S). In some embodiments, the device detects a folder renaming input (e.g., detecting a tap gesture 5098 on a folder renaming region such as a button or a text entry region or the name of the folder), and in response to the folder renaming input the device provides a renaming interface (e.g., a soft keyboard sliding up from the bottom of the touch screen) that can be used to rename the folder.

Attention is now directed towards FIGS. 5Y-5CC, which illustrate exemplary user interfaces for cancelling the creation of a folder in accordance with some embodiments. In some embodiments if a cancellation input is received, the folder creation operation is cancelled. In some embodiments the cancellation input includes, immediately after creating a new folder with one or more selectable user interface objects (e.g., action icon s 5002-4 and 5002-13), removing one of the selectable user interface objects from the folder. In some embodiments the device detects an input that corresponds to a request to move one of the selectable user interface objects out of the folder. For example, in FIG. 5Y the device detects an input that includes a contact 5100 at a location on the touch-sensitive surface (e.g., touch screen 112) that corresponds to one of the selectable user interface objects 5002-4 in the folder and subsequent movement 5102 of the contact (e.g., from a first contact location 5100-a on the touch screen 112 in FIG. 5Y that is inside the folder view 5092 to a second contact location 5100-b on the touch screen 112 in FIG. 5Z that is outside of the folder view 5092). In response to detecting the input, the device moves the selectable user interface object out of the folder and deletes the folder. For example in FIG. 5Z the selectable user interface object 5002-4 is outside of the folder, and in FIG. 5AA, after detecting a termination of the contact, the selectable user interface object 5002-4 is displayed outside of the folder.

In some embodiments, the folder icon is also updated to reflect the change of contents of the folder. For example, in FIG. 5Y the folder icon 5004-7 includes reduced scale representations (e.g., "O" and "R") of both of the selectable user interface objects (e.g., 5002-4 and 5002-13) that are within the folder, while in FIG. 5AA after one of the selectable user interface objects (e.g., 5002-4) has been moved out of the folder, only the reduced scale representation (e.g., "R") of the selectable user interface object (e.g., 5004-13) that remains in the folder is displayed in the folder icon (e.g., 5004-7 in FIG. 5AA).

In some embodiments, because this is a folder creation cancellation operation, the folder icon ceases to be displayed and the remaining selectable user interface object (e.g., 5002-13) is redisplayed outside of the folder view (e.g., as illustrated in FIG. 5CC). In some embodiments an animated transition is displayed, which shows the folder icon (e.g., 5004-7) changing into the remaining selectable user interface object (e.g., the selectable user interface object 5002-13 that remains in the folder), as illustrated in FIG. 5BB, where an intermediate stage 5104 of the animation (e.g., an animation frame that is in between the folder icon and the remaining selectable user interface object 5002-13) is displayed on the touch screen 112. In some embodiments, the remaining selectable user interface object replaces the folder icon on the touch screen. For example, in FIG. 5AA the folder icon 5004-7 is displayed in the fourth row of the first column of the arrangement of selectable user interface objects, while in FIG. 5CC the remaining selectable user interface object 5002-13 is displayed on the fourth row of the first column of the arrangement of selectable user interface objects.

Attention is now directed towards FIGS. 5DD-5JJ, which illustrate exemplary user interfaces for deleting a folder in accordance with some embodiments. In some embodiments, after a new folder is created (e.g., as described in greater detail above with reference to FIGS. 5M-5O, the device automatically displays a folder view of the folder. For example, in FIG. 5DD, the device displays a folder view 5106 that includes two selectable user interface objects (e.g., 5002-4 and 5002-13). In some embodiments, when a folder view is displayed the device also displays a folder renaming region for renaming the folder. For example in FIG. 5DD, the device displays a folder view 5106 with a folder renaming region 5108, where the device has received a renaming input (e.g., text input from a physical keyboard, a keypad, a soft keyboard or other alphanumeric character entry device) to change the name of the folder from "GAMES" to "PLAY." In response to the renaming input, the device changes the name of the folder and changes the appearance of the folder icon (e.g., 5004-7) in accordance with the renaming input (e.g., changing "GAMES" in FIG. 5DD to "PLAY" in FIG. 5EE after receiving the renaming input).

In some embodiments, the folder view is displayed by dividing the wallpaper background into a first portion (e.g., 5108) and a second portion (e.g., 5110) and shifting the first portion (e.g., 5108) of the wallpaper background away from the second portion (e.g., 5110) of the wallpaper background so as to display the folder view 5106 in an area between the first portion 5108 and the second portion 5110.

In some embodiments, after the creation of the folder has been confirmed (e.g., by renaming the folder, opening and closing the folder, adding additional selectable user interface objects to the folder, etc.) the folder is not deleted when a single item is removed from the folder. Rather, in some embodiments, the folder is only deleted by the device when all of the items are removed from the folder. For example, in FIG. 5EE, the device detects a request to remove a selectable user interface object (e.g., 5002-4) from the folder view (e.g., detecting a contact 5112 and subsequent movement 5114 of the contact 5112 on the touch screen 112 to a location that is outside of the folder view 5106 into the first portion 5108 of the desktop background). In response to the request to remove the selectable user interface object e.g., 5002-4 from the folder view 5106, the device removes the selectable user interface object 5002-4 from the folder view 5106 and displays the selectable user interface object 5002-4 outside of the folder view 5106 as illustrated in FIG. 5FF. Continuing with this example, in FIG. 5FF the device detects a request to remove a last selectable user interface object (e.g., 5002-13) from the folder view that includes detecting a contact 5116 and subsequent movement 5118 of the contact (e.g., from a first contact location 5116-a on the touch screen 112 that is inside the folder view 5106 in FIG. 5FF to a second contact location 5116-b on the touch screen 112 that is outside of the folder view 5106 in FIG. 5GG). In some embodiments, in response to the request, the last selectable user interface object (e.g., 5002-13 in FIG. 5GG) is removed from the folder in response to detecting termination of the input that corresponded to the request. In some embodiments, the last selectable user interface object is displayed on the display (e.g., touch screen 112) in accordance with a location of the contact 5116-b when the device detects a termination of the input (e.g., liftoff of the contact).

In some embodiments, after the last selectable user interface object (e.g., 5002-13 in FIG. 5GG) is removed from the folder view (e.g., 5106 in FIG. 5GG), the reduced scale representation (e.g., "R") of the selectable user interface object is removed from the folder icon. For example, in FIG. 5HH the folder icon 5004-7 does not include any reduced scale representations of selectable user interface objects (e.g., because the folder associated with the folder icon does not contain any selectable user interface objects).

In some embodiments, once the last selectable user interface object (e.g., 5002-13 in FIG. 5GG) has been removed from the folder view 5106, as illustrated in FIG. 5GG, the folder is deleted and the associated folder view cease to be displayed. For example, in FIG. 5II, the device has ceased to display both the folder view (e.g., 5106 in FIG. 5GG) and the folder icon (e.g., 5004-7 in FIG. 5GG) associated with the folder. In some embodiments, the device displays an animation of the folder icon (e.g., 5004-7 disappearing. For example, in FIG. 5HH the folder displays a folder icon 5004-7 with no reduced scale representations of selectable user interface objects and starts to shrink the folder icon 5004-7, as illustrated by the arrows in FIG. 5HH. Continuing this animation, in FIG. 5II the folder icon ceases to be displayed entirely. After ceasing to display the folder icon, in some embodiments the device rearranges the selectable user interface objects so as to close the gap in predefined arrangement of the selectable user interface icons that was left by the deletion of the folder icon. For example, in FIG. 5JJ the selectable user interface object 5002-4 that is associated with a solitaire application is moved to the left to fill the gap left by the folder icon (e.g., 5004-7 in FIG. 5HH).

Attention is now directed towards FIGS. 5KK-5PP, which illustrate exemplary user interfaces for adding selectable user interface objects to a folder in accordance with some embodiments. In FIG. 5KK, the device displays a plurality of selectable user interface objects including a plurality of action icons (e.g., 5002-1, 5002-2, 5002-3, 5002-5, 5002-6, 5002-7, 5002-8, 5002-09, 5002-10, 5002-11, 5002-12, 5002-14, 5002-15, and 5002-16) and a plurality of folder icons (e.g., 5004-1-b, 5004-7, and 5004-2). In some embodiments, the device detects an input or the beginning of an input (e.g., contact 5120-a on the touch screen 112 in FIG. 5KK) that corresponds to a request to move a respective selectable user interface object (e.g., 5002-9) on the display (e.g., touch screen 112). In some embodiments, one or more of the other selectable user interface objects (e.g., action icons 5002 and folder icons 5004) have an default activation region (e.g., 5122-1-a, 5122-2-a, 5122-3-a, 5122-4-a, 5122-5-a, 5122-6-a, 5122-7-a, 5122-8-a, 5122-9-a, 5122-10-a, 5122-11-a, 5122-12-a, 5122-13-a, 5122-14-a, 5122-15-a, 5122-16-a, 5122-17-a), where each activation region for a respective selectable user interface object is for performing an action associated with the respective selectable user interface object. In some embodiments, a respective activation region for a respective action icon is associated with an action of creating a folder that includes the respective action icon. In some embodiments, a respective activation region for a respective folder icon is associated with an action of adding the selectable user interface object to a folder associated with the respective folder icon. In some embodiments, one or more of the a respective activation regions changes from the default size to an adjusted size (e.g., 5122-1-*b*, 5122-2-*b*, 5122-3-*b*, 5122-4-*b*, 5122-5-*b*, 5122-6-*b*, 5122-7-*b*, 5122-8-*b*, 5122-9-*b*, 5122-10-*b*, 5122-11-*b*, 5122-12-*b*, 5122-13-*b*, 5122-14-*b*, 5122-15-*b*, 5122-16-*b*, 5122-17-*b* in FIG. 5LL) in response to detecting an input on the touch-sensitive surface that corresponds to movement of a first selectable user interface object (e.g., 5002-9 in FIG. 5KK). In some embodiments the adjusted size of a respective activation region (e.g., 5122-13-*b* in FIG. 5LL) is determined based on a distance from the respective activation region (e.g., 5122-13-*a* in FIG. 5KK) to the first respective selectable user interface object (e.g., 5002-9 in FIG. 5KK) on the display (e.g., touch screen 112).

As one example of adding a selectable user interface object to a folder, the device detects an input that corresponds to a request to move a selectable user interface object to an activation region that is associated with a folder icon. For example the device detects a contact 5120 at a location on the touch-sensitive surface (e.g., touch screen 112) that corresponds to a respective selectable user interface object 5002-9, and detects subsequent movement 5121 of the contact across the touch-sensitive surface (e.g., from a first contact location 5120-*a* in FIG. 5KK to a second contact location 5120-*b* in FIG. 5LL to a third contact location 5120-*c* in FIG. 5MM on touch screen 112). In response to detecting the input, the device moves the respective selectable user interface object 5002-9 across the display (e.g., touch screen 112), in accordance with the movement of the contact 5120 as illustrated in FIGS. 5KK-5MM. In some embodiments, the device automatically rearranges the selectable user interface objects as the respective selectable user interface object 5002-9 is moved across the display (e.g., touch screen 112). In some embodiments, the device does not rearrange the selectable user interface objects until a predetermined condition has been met (e.g., the contact 5120 ceases to be detected on the touch screen 112). For example, in FIGS. 5LL-5MM, even though the respective selectable user interface object 5002-9 has been moved across the display (e.g., touch screen 112), the other selectable user interface objects are not immediately rearranged.

In some embodiments, the device detects a termination of the input (e.g., a liftoff of contact 5120-*c* in FIG. 5MM) while the respective selectable user interface object 5002-9 is at least partly within an activation region (e.g., 5122-13-*b*) for one of the other selectable user interface objects (e.g., folder icon 5004-7). In some embodiments, in response to detecting the termination of the input, the device adds the respective selectable user interface object 5002-9 to a folder associated with the selectable user interface object (e.g., folder icon 5004-7). In some embodiments, after the respective selectable user interface object (e.g., 5002-9) has been added to the folder associated with the selectable user interface object (e.g., folder icon 5004-7), the device modifies the folder icon (e.g., 5004-7 in FIG. 5NN) to include a reduced scale representation (e.g., "S" in folder icon 5004-7 in FIG. 5NN) of the action icon, as illustrated in FIG. 5NN. In some embodiments, after the action icon 5002-9 has been added to the folder associated with the folder icon 5004-7, the device rearranges the selectable user interface objects on the display (e.g., touch screen 112) so as to fill any gaps in the arrangement, as illustrated in FIG. 5OO, where the gap left by the movement of action icon 5002-9 into a folder is filled.

In FIG. 5OO, the device detects another input including a contact 5124 on the touch-sensitive surface (e.g., touch screen 112) at a location that corresponds to a location of an action icon 5002-8 on the display (e.g., touch screen 112) and subsequent movement 5126 of the contact (e.g., from a first contact location 5124-*a* in FIG. 5OO to a second contact location 5124-*b* in FIG. 5PP on the touch screen 112). In some embodiments, one or more of the other selectable user interface objects (e.g., action icons 5002 and folder icons 5004) have an activation region (e.g., 5128-1, 5128-2, 5128-3, 5128-4, 5128-5, 5128-6, 5128-7, 5128-8, 5128-9, 5128-10, 5128-11, 5128-12, 5128-13, 5128-14, 5128-15), where each activation region for a respective selectable user interface object is for performing an action associated with the respective selectable user interface object. In some embodiments, a respective activation region (e.g., 5128-1, 5128-2, 5128-3, 5128-4, 5128-5, 5128-6, 5128-8, 5128-9, 5128-10, 5128-11, 5128-12, or 5128-13) for a respective action icon is associated with an action of creating a folder that includes the respective action icon. In some embodiments, a respective activation region (e.g., 5128-7, 5128-11, or 5128-15) for a respective folder icon is associated with an action of adding the respective selectable user interface object (e.g., 5002-8) to a folder associated with the respective folder icon. In some embodiments the size of the activation regions is determined based on a distance of the activation region from the respective selectable user interface object (e.g., 5002-8). In some embodiments the activation regions are not displayed on the display (e.g., touch screen 112).

In response to detecting the input (e.g., movement 5126 of the contact 5124 on the touch screen 112 in FIGS. 5OO-5PP), the device moves the respective selectable user interface object 5002-8 across the display (e.g., touch screen 112), in accordance with the movement of the contact 5124 as illustrated in FIGS. 5OO-5PP. In some embodiments, the device does not rearrange the selectable user interface objects until a predetermined condition has been met, as described in greater detail above with reference to FIGS. 5LL-5MM. In some embodiments, the device automatically rearranges the selectable user interface objects as the respective selectable user interface object 5002-8 is moved across the display (e.g., touch screen 112), as illustrated in FIG. 5PP. For example, in FIGS. 5OO-5PP, even though the respective selectable user interface object 5002-8 is still being moved across the display (e.g., touch screen 112), the other selectable user interface objects have been rearranged to fill in the gap that would have been left by the respective selectable user interface object 5002-8 moving across the display (e.g., touch screen 112).

In some embodiments the device detects additional movement 5130 of the contact (e.g., from the second contact location 5124-*b* in FIG. 5PP to a contact location that is within the activation region 5128-11 for a respective folder icon 5004-7). In some embodiments, the device detects a termination of the input (e.g., a liftoff of contact 5124 from the touch screen 112) while the respective selectable user interface object 5002-8 is at least partly within an activation region (e.g., 5128-11) for one of the other selectable user interface objects (e.g., folder icon 5004-7). In some embodiments, in response to detecting the termination of the input, the device adds the respective selectable user interface object 5002-8 to a folder associated with the selectable user interface object (e.g., folder icon 5004-7). In some embodiments, after the respective selectable user interface object (e.g., 5002-8) has been added to the folder associated with the selectable user interface object (e.g., folder icon 5004-7), the device modifies the folder icon (e.g., 5004-7 in FIG. 5QQ) to include a reduced scale representation (e.g., "M" in folder icon 5004-7 in FIG. 5QQ) of the action icon, as illustrated in FIG. 5QQ.

Attention is now directed towards FIGS. 5QQ-5SS, which illustrate exemplary user interfaces for moving folder icons in accordance with some embodiments. In some embodiments, while the device is in the user interface reconfiguration mode, folder icons can be moved around the display (e.g., touch screen 112) in response to folder repositioning inputs on the touch-sensitive surface (e.g., touch screen 112). For example, in FIG. 5QQ, the device detects an input including contact 5132 at a location that corresponds to a location of a respective folder icon 5004-7 on the touch-sensitive surface (e.g., touch screen 112), and detects subsequent movement 5134 of the contact 5132 across the touch-sensitive surface (e.g., movement across the touch screen 112 from a first contact location 5132-a in FIG. 5QQ to a second contact location 5132-b in FIG. 5RR). In response to detecting the input, the device moves the respective folder icon 5004-7 to a new location on the display (e.g., touch screen 112) in accordance with the input, as illustrated in FIG. 5RR. In some embodiments, after detecting a predetermined condition (e.g., termination of the input, or a pause in the movement for more than a predetermined period of time), the device rearranges the selectable user interface objects so as to make space for the respective folder icon (e.g., 5004-7) that was moved in response to detecting the input, as illustrated in FIG. 5SS.

Attention is now directed towards FIGS. 5SS-5VV, which illustrate exemplary user interfaces for rearranging selectable user interface objects within folders in accordance with some embodiments. In FIG. 5SS the device detects a folder view display input (e.g., tap gesture 5136 at a location that corresponds to a location of a folder icon 5004-7 on the touch screen 112). In response to the folder view display input, the device displays a folder view (e.g., 5138 in FIGS. 5TT-5UU) that includes selectable user interface objects (e.g., action icons 5002-4, 5002-13, 5002-9, 5002-8) that are associated with the folder represented by the folder icon 5004-7. In some embodiments, the selectable user interface objects within the folder view (e.g., 5138) have a predetermined spatial arrangement, and can be rearranged based on detected rearrangement inputs. For example, in FIG. 5TT the device detects a rearrangement input (e.g., contact 5140 and subsequent movement 5142 of the contact 5140 across the touch screen 112). In response to detecting the rearrangement input, the device moves one or more respective selectable user interface objects within the folder view from a first location within the spatial arrangement of the folder view to a second location within the spatial arrangement of the folder view in accordance with the rearrangement input. For example, in FIG. 5TT the device detects a contact 5140 at a location on the touch-sensitive surface (e.g., touch screen 112) that corresponds to a location of the stocks application icon 5002-9 on the display (e.g., touch screen 112), and detects subsequent movement 5142 of the contact 5140 to a location on the touch-sensitive surface (e.g., touch screen 112) that corresponds the far left of the spatial arrangement on the display (e.g., touch screen 112). In response to the movement, the device moves the stocks application icon 5002-9 to a left most position within the spatial arrangement of the folder view 5138, as illustrated in FIG. 5UU.

Additionally, in some embodiments, the folder icon (e.g., 5004-7) associated with the folder view (e.g., 5138) is updated to reflect the changes to the spatial arrangement of the icons within the folder view (e.g., 5138). For example, in FIG. 5TT (e.g., before the spatial arrangement of the selectable user interface objects within the folder view has been changed) the device displays reduced scale representations (e.g., "O," "R," "S," "M" in order from left to right, top to bottom) of the selectable user interface objects in the folder view 5138 in a first order that corresponds to the spatial arrangement of the selectable user interface objects (e.g., solitaire application icon 5002-4, racing application icon 5002-13, stocks application icon 5002-9, maps application icon 5002-8 in order from left to right, top to bottom). In contrast, in FIG. 5UU (e.g., after the spatial arrangement has been changed) the device displays reduced scale representations (e.g., "S," "O," "R," "M" in order from left to right, top to bottom) of the selectable user interface objects in the folder view 5138 in a second order that corresponds to the new spatial arrangement of the selectable user interface objects (e.g., stocks application icon 5002-9, solitaire application icon 5002-4, racing application icon 5002-13, maps application icon 5002-8 in order from left to right, top to bottom).

In some embodiments, in response to a folder view exit input the device ceases to display the folder view. For example, in FIG. 5UU the device detects tap gesture 5144 at a location on the touch-sensitive surface (e.g., touch screen 112) that corresponds to a location on the display (e.g., touch screen 112) that is outside of the folder view. In response to detecting the tap gesture 5144 the device ceases to display the folder view, as illustrated in FIG. 5VV. In some embodiments, the device displays an animation of the folder view closing (e.g., the background wallpaper closing over the selectable user interface objects that are within folder view 5138) on the display (e.g., touch screen 112).

Attention is now directed towards FIGS. 5VV-5BBB, which illustrate exemplary user interfaces for removing selectable user interface objects from a folder in accordance with some embodiments. In some embodiments, the device detects a folder view display input (e.g., tap gesture 5146 at a location that corresponds to a folder icon 5004-1-b on touch screen 112 in FIG. 5VV). In response to detecting the folder view display input the device displays a folder view 5148 that includes content of the folder (e.g., action icons 5002-19, 5002-20, 5002-21, 5002-22, 5002-23, 5002-24, and 5002-25 on touch screen 112), as illustrated in FIG. 5WW.

In some embodiments one or more of the selectable user interface objects includes a notification badge (e.g., 5150 in FIG. 5WW) that indicates that an application (e.g., app-7) associated with the selectable user interface object (e.g., action icon 5002-25) requires attention of a user of the device. In some embodiments one or more additional notification badges (e.g., 5012 and/or 5014) are also displayed on the folder icon (e.g., 5004-1-b) that is associated with the folder containing the selectable user interface object (e.g., action icon 5002-25). In some embodiments the additional notification badges are updated as the notification badges on the selectable user interface object are updated (e.g., when the notification badge 5150 appears, disappears or changes so as to indicate that the number of notifications has changed).

In some embodiments the device detects a selectable user interface object removal input and in response to detecting the selectable user interface object removal input the device removes a selectable user interface object from the folder view. For example, in FIG. 5WW, the device detects contact 5152 at a location on the touch-sensitive surface (e.g., touch screen 112) that corresponds to a location of an application icon 5002-19 on the display (e.g., touch screen 112) and subsequent movement 5154 of the contact 5152 across the touch-sensitive surface (e.g., touch screen 112) towards a location that corresponds to a portion of the display (e.g., touch screen 112) that is outside of the folder view 5148. In some embodiments, the input is a quick gesture that does not specify a particular location outside of the folder view (e.g., the gesture is a flick gesture or a quick tap and drag gesture that does not include a pause outside of the folder view), and the device moves the selectable user interface object to an automatically determined location on the display (e.g., touch screen 112) that is outside of the folder view. Continuing the example above, in response to detecting the contact 5152 and subsequent movement 5154 of the contact, the device removes the action icon 5002-19 from the folder view 5148, closes the folder view, and displays the action icon 5002-19 at the first open location in the arrangement of selectable user interface objects on the display (e.g., touch screen 112). In this example, the action icon 5002-19 is displayed at the bottom right hand corner of the three-by-four array of selectable user interface objects on the display (e.g., touch screen 112 in FIG. 5XX).

In some embodiments, when a selectable user interface object has been removed from the folder associated with a folder icon, the device updates the folder icon associated with the folder. For example, in FIG. 5WW the folder icon 5004-1-*b* associated with the displayed folder view 5148 includes four reduced scale representations (e.g., "x4," "x5," "x6," and "x7") of the selectable user interface objects that are contained within the folder associated with the folder icon 5004-1-*b*. In some embodiments, empty spaces in the folder icon indicate that the folder view includes space to add more selectable user interface objects, as illustrated in folder icon 5004-1-*b* in FIG. 5WW. However, after the selectable user interface object (e.g., action icon 5002-19) is removed from the folder associated with the folder icon (e.g., 5004-1-*b*), the device changes the appearance of the folder icon (e.g., 5004-1-b in FIG. 5XX), so as to indicate that the selectable user interface object (e.g., 5002-19) has been removed from the folder. For example, in FIG. 5XX, the folder icon 5004-1-*b* shows the reduced scale representations in the folder (e.g., "x2," "x3," "x4," "x5," "x6," and "x7" are displayed) rearranged so as to indicate that there is one less selectable user interface object in the folder associated with the folder icon 5004-1-*b*.

In some embodiments, the device detects an action icon selection input (e.g., tap gesture 5155 at a location that corresponds to an action icon 5002-12 on the touch screen 112 in FIG. 5XX) while the device is in user interface reconfiguration mode, and in response to the action icon selection input while the device is in user interface reconfiguration mode, the device does not activate an application (e.g., a camera application) that is associated with the action icon (e.g., camera application icon 5002-12). In some embodiments, the device detects a folder view display input (e.g., tap gesture 5156 at a location that corresponds to a folder icon 5004-1-*b* in FIG. 5XX). In response to detecting the folder view display input the device displays a folder view 5158 that includes content of the folder (e.g., action icons 5002-20, 5002-21, 5002-22, 5002-23, 5002-24, and 5002-25) on the display (e.g., touch screen 112), as illustrate in FIG. 5YY.

In some embodiments, while the device is in a user interface reconfiguration mode, the device detects an input that corresponds to a request to activate an application associated with one of the action icons (e.g., tap gesture 5156, which corresponds to a request to activate an app-7 application that corresponds to the app-7 application icon 5002-25). However, in accordance with some embodiments, in response to detecting the input the device does not activate the application icon while the device is in user interface reconfiguration mode.

In some embodiments the device detects a selectable user interface object removal input and in response to detecting the selectable user interface object removal input the device removes a selectable user interface object from the folder view. In some embodiments, when the selectable object removal input meets predefined conditions, the selectable user interface object is positioned within an arrangement of selectable user interface objects in accordance with the selectable object removal input. For example, in FIG. 5YY, the device detects contact 5162 at a location on the touch-sensitive surface (e.g., touch screen 112) that corresponds to a location of an application icon 5002-22 on the display (e.g., touch screen 112) and subsequent movement 5164 of the contact 5152 across touch-sensitive surface (e.g., movement across touch screen 112 from contact location 5162-*a* within the folder view 5158 in FIG. 5YY to a contact location in FIG. 5ZZ that corresponds to a portion of the touch screen 112 that is outside of the folder view 5158). In some embodiments, the device detects the contact at a location (e.g., contact location 5162-*b*) on the touch-sensitive surface (e.g., touch screen 112) that corresponds to a location on the display (e.g., touch screen 112) that is outside of the folder view 5158 for more than a threshold time period, and in response, the device ceases to display the folder view, as illustrated in FIG. 5AAA.

In some embodiments, after the folder view ceases to be displayed the device continues to detect movement 5166 of the contact 5162 (e.g., movement from the second contact location 5162-*b* on touch screen 112 in FIG. 5AAA to a third contact location 5162-*c* on touch screen 112 in FIG. 5BBB that corresponds to a location within an arrangement of selectable user interface objects on the touch screen 112). In response to the continued movement 5166, the device moves the selectable user interface object (e.g., action icon 5002-22) on the display (e.g., touch screen 112) in accordance with the movement of the contact. In some embodiments, the selectable user interface object (e.g., action icon 5002) that was removed from the folder in this way is placed in accordance with the selectable user interface object input. Continuing the example from above, the device detects a termination of the input (e.g., a liftoff of the contact 5162 from the touch screen 112 at contact location 5162-*c* in FIG. 5BBB) that is associated with a location on the display (e.g., touch screen 112) that is within the arrangement of selectable user interface objects. As illustrated in FIG. 5BBB, the contact 5162-*c* and the action icon 5002-22 are located in between two of the other selectable user interface objects (e.g., 5002-6 and 5004-7) and upon detecting a termination of the input (e.g., liftoff of contact 5162-*c* in FIG. 5BBB) the selectable user interface object is displayed at the location within the arrangement of selectable user interface objects that was indicated by the input (e.g., the App-4 action icon 5002-22 is displayed in between the notes action icon 5002-6 and the games folder icon 5004-7 on the touch screen 112 in FIG. 5CCC).

In some embodiments, when a selectable user interface object has been removed from the folder associated with a folder icon, the device updates the folder icon associated with the folder. For example, in FIG. 5YY the folder icon 5004-1-*b* associated with the displayed folder view 5158 displays six reduced scale representations (e.g., "x2," "x3," "x4," "x5," "x6," and "x7") of the selectable user interface objects that are contained within the folder associated with the folder icon 5004-1-*b*. However, after the selectable user interface object (e.g., action icon 5002-22) is removed from the folder associated with the folder icon (e.g., 5004-1-*b*), the device changes the appearance of the folder icon (e.g., from 5004-1-*b* in FIGS. 5XX-5ZZ to 5004-1-*b* in FIG. 5AAA), so as to indicate that the selectable user interface object (e.g., 5002-22) has been removed from the folder. For example, in FIG. 5AAA, the folder icon 5004-1-*b* shows all of the reduced scale representations in the folder rearranged (e.g., only "x2," "x3," "x5," "x6," and "x7" are displayed), so as to indicate that there is one less selectable user interface object in the folder associated with the folder icon 5004-1-*b*. Additionally, in some embodiments, the reduced scale representation of the removed selectable user interface object ceases to be displayed within the folder icon. For example, reduced scale representation "x4" is no longer displayed in the folder icon 5004-1-*b* in FIG. 5CCC because action icon 5002-22 has been removed from the folder).

Attention is now directed towards FIGS. 5CCC-5EEE, which illustrate exemplary user interfaces for navigating through pages of selectable user interface objects within a folder view in accordance with some embodiments. In some embodiments, the device detects a folder view display input (e.g., tap gesture 5168 at a location on the touch screen 112 that corresponds to a location of a folder icon 5004-2 on the touch screen 112 in FIG. 5CCC). In response to detecting the folder view display input the device displays a folder view 5170 that includes content of the folder (e.g., action icons 5002-26, 5002-27, 5002-28, 5002-29, 5002-30, 5002-31, 5002-32, 5002-33, 5002-34, 5002-35, 5002-36, and 5002-37) on the display (e.g., touch screen 112) as illustrated in FIG. 5EEE.

In some embodiments, when the folder view display input is a request to display a folder view for a folder icon (e.g., 5004-2) that is in a tray (e.g., 5006 in FIG. 5CCC) in the user interface, the device displays an animation of the folder view expanding from the dock. For example in FIG. 5CCC, the device detects tap gesture 5168 on a folder icon 5004-2 that is in the tray 5006, and in FIG. 5EEE a folder view 5170 of the folder is displayed. In some embodiments, the device displays a transition animation before displaying the folder view, as illustrated in FIG. 5DDD. For example, in response to detecting the tap gesture 5168 the device divides the wallpaper background into a first portion 5172 and a second portion 5174 and displays an animation of a wallpaper background sliding back (e.g., the second portion 5174 moving away from the first portion 5172) so as to reveal selectable user interface objects (e.g., 5002-34, 5002-35, 5002-36, 5002-37 in FIG. 5DDD) that appear to be beneath the wallpaper background. At the end of the animation the contents or a portion of the contents of the folder are displayed in the folder view 5170 on the display (e.g., touch screen 112).

In some embodiments the folder includes more selectable user interface objects than can be displayed in the folder view (e.g., 5170 in FIG. 5EEE). In some embodiments the folder has a maximum number of selectable user interface objects that can be added to the folder, where the maximum number is based on the maximum number of selectable user interface objects that can be displayed in the folder view for the folder. For example in FIG. 5EEE, only 12 selectable user interface objects could be added to the folder associated with the folder view 5170. However, in some embodiments, the folder view contains a plurality of "pages" or sets of selectable user interface objects, and the folder can hold additional selectable user interface objects that do not fit in the first set of selectable user interface objects (e.g., action icons 5002-26, 5002-27, 5002-28, 5002-29, 5002-30, 5002-31, 5002-32, 5002-33, 5002-34, 5002-35, 5002-36, and 5002-37) by displaying the additional selectable user interface objects that are part of subsequent sets of selectable user interface objects. For example, in FIG. 5EEE the device detects a next page input including contact 5176 and subsequent movement 5178 of the contact across the touch-sensitive surface (e.g., touch screen 112). In response to detecting the next page input, the device displays a second set of selectable user interface objects (e.g., action icons 5002-38, 5002-39, 5002-40, 5002-41, 5002-42, and 5002-43 in FIG. 5FFF) within the folder view 5170 for the folder. In other words the folder includes eighteen selectable user interface objects with twelve selectable user interface objects in a first page and six selectable user interface objects on a second page.

Attention is now directed towards FIGS. 5GGG-5MMM, which illustrate exemplary user interfaces for removing selectable user interface objects from a folder in accordance with some embodiments. In some embodiments, the device detects a folder view display input (e.g., tap gesture 5168 at a location that corresponds to a folder icon 5004-2 on the touch screen 112 in FIG. 5CCC). In response to detecting the folder view display input the device displays a folder view 5182 that includes content of the folder (e.g., action icons 5002-26, 5002-27, 5002-28, 5002-29, 5002-30, 5002-31, 5002-32, 5002-33, 5002-34, 5002-35, 5002-36, and 5002-37), as illustrated in FIG. 5GGG.

In some embodiments the folder view (e.g., 5182) includes all of or substantially all of the display (e.g., touch screen 112) in some of these embodiments, the device displays a selectable user interface object removal region (e.g., 5184 in FIG. 5GGG). In some embodiments, in response to detecting a removal request that corresponds to a request to move a respective selectable user interface object into the selectable user interface object removal region 5184, the device removes the respective selectable user interface object from the folder. For example, in FIG. 5GGG, the device detects a contact 5186 and movement 5188 of the contact (e.g., movement from a first contact location 5168-*a* in FIG. 5GGG that corresponds to a location of the respective selectable user interface object 5002-32 on the touch screen 112 to a second contact location 5186-*b* in FIG. 5HHH that corresponds to a location on the touch screen 112 that is proximate to or within the selectable user interface object removal region 5184). Continuing this example, the device moves the respective selectable user interface object (e.g., action icon 5002-32) into the selectable user interface object removal region 5184. In some embodiments, in response to detecting termination of the input (e.g., liftoff of contact 5186-*b* in FIG. 5HHH), the device ceases to display the respective selectable user interface object (e.g., action icon 5002-32) from the folder view 5182 and automatically rearranges the selectable user interface objects within the folder view 5182 so as to close any gaps in the arrangement of the selectable user interface objects. For example in FIG. 5III the selectable user interface objects have been rearranged so as to fill in the gap that remained in FIG. 5HHH after the respective selectable user interface object (e.g., action icon 5002-32) was removed from the folder view.

In some embodiments, the folder view ceases to be displayed automatically after a selectable user interface object (e.g., action icon 5002-32) is removed from the folder (e.g., the device automatically switches from the user interface displayed in FIG. 5III to the user interface displayed in FIG. 5JJJ. In some embodiments the device detects an exit folder view input (e.g., tap gesture 5190 on "exit folder" icon in the upper right corner of the folder view 5182 in FIG. 5III). In response to detecting the exit folder view input, the device ceases to display the folder view and redisplays the home screen, as illustrated in FIG. 5JJJ. In some embodiments the selectable user interface object (e.g., 5002-32) that was removed from the folder is displayed on the home screen, as illustrated in FIG. 5JJJ.

In some embodiments, the device detects a folder view display input (e.g., tap gesture 5192 at a location that corresponds to a folder icon 5004-2 in FIG. 5JJJ). In response to detecting the folder view display input the device redisplays the folder view 5182 that includes the modified content of the folder (e.g., action icons 5002-26, 5002-27, 5002-28, 5002-29, 5002-30, 5002-31, 5002-33, 5002-34, 5002-35, 5002-36, and 5002-37), as illustrated in FIG. 5KKK. In some embodiments, instead of, or in addition to, the selectable user interface object removal region described above, the device displays an object modification target associated with one or more of the selectable user interface objects. For example, in FIG. 5KKK each of the selectable user interface objects has an object modification target associated with it (e.g., action icon 5002-37 has a respective object modification target 5194).

In some embodiments, when the device detects a request to activate the object modification target for a respective selectable user interface object (e.g., tap gesture 5196 at a location on the touch screen 112 that corresponds to a location of an object modification region for action icon 5002-37), the device displays an object modification dialogue. For example in FIG. 5LLL the device displays a pop-up dialogue 5198 that provides the user with options for modifying the selectable user interface object (e.g., deleting action icon 5002-37, removing action icon 5002-37 from the folder, or canceling the object modification operation). In this example, in response to an input that corresponds to a request to delete the selectable user interface object (e.g., tap gesture 5200 on a delete button), the device deletes the selectable user interface object (e.g., removing the action icon 5002-37 from the folder associated with the folder view and from the device entirely, so that it is not displayed on a home screen or any other folder view, as illustrated in FIG. 5MMM). In some embodiments, when the selectable user interface is deleted an application associated with the selectable user interface object is deleted from the device. In this example, in response to an input that corresponds to a request to cancel the object modification operation (e.g., tap gesture 5202 on a cancel icon), the device ceases to display the object modification dialogue 5198 without modifying the selectable user interface object (e.g., action icon 5002-37) thereby returning to the user interface displayed in FIG. 5KKK. In this example, in response to an input that corresponds to a request to remove the selectable user interface object from the folder (e.g., tap gesture 5204 on a remove button), the device removes the selectable user interface object from the folder (e.g., as illustrated in FIG. 5MMM) without removing the selectable user interface object from the device (e.g., removing the action icon 5002-37 from the folder associated with the folder view and displaying the action icon 5002-37 on the home screen as illustrated in FIG. 5NNN).

Attention is now directed towards FIGS. 5NNN-5OOO, which illustrate exemplary user interfaces for displaying a folder view while in a normal operating mode in accordance with some embodiments. In some embodiments the device detects an input that corresponds to a request to exit the user interface reconfiguration mode and return to a normal operation mode. For example, in FIG. 5NNN the device detects a request to return to normal operation mode (e.g., a press input 5206 on home button 204 in FIG. 5NNN). In response to the request to return to the normal operation mode, the device returns to normal operation mode so that the selectable user interface objects (e.g., action icons 5002 and folder icons 5004) in FIGS. 5OOO-5PPP can no longer be rearranged (although, in some embodiments, the arrangement of selectable user interface objects can be scrolled in one or two dimensions).

In some embodiments, while the device is in a normal operation mode, selection of a respective action icon 5002 results in activating an application associated with the respective action icon. For example in FIG. 5OOO, in response to detecting selection of the photos action icon (e.g., detecting a tap gesture 5208 at a location on the touch-sensitive surface that corresponds to the photos action icon 5002-1), the device displays a photos application (e.g., launching the photos application if the photos application is not already running, or simply displaying the photos application if the photos application is already running). In contrast, in some embodiments, in response to detecting selection of a respective folder icon 5004 results in displaying a folder view for the folder. For example, in FIG. 5OOO, after detecting selection of a games folder icon (e.g., detecting a tap gesture 5210 at a location on the touch-sensitive surface that corresponds to the games folder icon 5004-7), the device displays a folder view 5212 for the games folder. In some embodiments, while the device is in a normal operation mode, selection of a respective action icon 5002 within a folder view (e.g., folder view 5212) results in activating an application associated with the respective action icon. For example, in response to detecting selection of the photos action icon (e.g., detecting a tap gesture 5214 at a location on the touch-sensitive surface (e.g., touch screen 112) that corresponds to the stocks action icon 5002-9), the device displays a photos application (e.g., launching the stocks application if the stocks application is not already running, or simply displaying the stocks application if the stocks application is already running) on the display (e.g., touch screen 112).

FIGS. 6A-6E are flow diagrams illustrating a method 600 of creating a new folder in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display (e.g., 112 in FIGS. 5A-5N, 5P-5PPP) and the touch-sensitive surface is on the display. In some embodiments, the display is separate from the touch-sensitive surface. Some operations in method 600 may be combined and/or the order of some operations may be changed.

As described below, the method 600 provides an intuitive way to create a new folder. The method reduces the cognitive burden on a user when creating new folders, thereby creating a more efficient human-machine interface. For battery-operated computing devices, enabling a user to create a new folder faster and more efficiently conserves power and increases the time between battery charges.

The device displays (602) a plurality of selectable user interface objects on the display (e.g., in FIG. 5M, the device displays a plurality of action icons 5002 and a plurality of folder icons 5004 on touch screen 112). In some embodiments, the selectable user interface objects are (604) action icons 5002. For example, action icons 5002 may include one or more activatable icons that represent a software programs (e.g., photos application icon 5002-1, clock application icon 5002-2, browser application icon 5002-3, solitaire application icon 5002-4, weather application icon 5002-5, notes application icon 5002-6, texts application icon 5002-7, maps application icon 5002-8, stock application icon 5002-9, camera application icon 5002-12, racing application icon 5002-13, email application icon 5002-14, phone application icon 5002-15, iPod application icon 5002-16), files (e.g., document action icon 5002-11), bookmarks (e.g., bookmark action icon 5002-10), etc. Similarly, a first folder icon 5004-1-b is associated with a first folder, while a second folder icon 5004-2 is associated with a second folder.

In response to detecting an input that corresponds to selection of a respective selectable user interface object, the device activates (606) an application that is associated with the respective selectable user interface object. In some embodiments, applications are only activated when the device is in a normal operation mode. For example, selecting a solitaire application icon 5002-1 in FIG. 5A (e.g., while the device is in a normal operation mode) would launch a solitaire game application. It should be understood that, when an action icon 5002 represents a file and detecting an input that corresponds to selection of the action icon displays an application that is used to view and/or edit the file. For example, if the device detected an input (e.g., a tap gesture) that corresponds to selection of a bookmark icon (e.g., 5002-10 in FIG. 5A) that is associated with a bookmarked webpage, the device would launch a web browser and navigate to the bookmarked webpage. As another example, if the device detected an input that corresponds to selection of a document icon (e.g., 5002-11 in FIG. 5A) that is associated with a spreadsheet document, the device would launch a spreadsheet editing/viewing application and display the spreadsheet document within the spreadsheet editing/viewing application. In some embodiments the action icon is an application launch icon and selecting the action icon launches the application if the application is not currently running or displays the application if the application is currently running, but is hidden from view. In other words, in response to detecting selection of an action icon, the device displays a view of an application, however, if the application is not running when the input is detected, the device must first launch the application, whereas if the application is already running when the input is detected the device can simply display a current view of the application and does not need to launch the application.

The device detects (608) a first input. For example, as illustrated in FIG. 5M, the device detects a finger contact 5040 at a location (e.g., a first location 5040-*a* in FIG. 5M) on a touch-sensitive surface that corresponds to a first object (e.g., the solitaire application icon 5002-4) and detects subsequent movement 5042 of the finger contact across the touch-sensitive surface (e.g., to a second location 5040-*b* in FIG. 5N). In some embodiments, the first input is (610) a gesture (e.g., a finger drag gesture) that is detected on a touch-sensitive surface. In some embodiments the touch-sensitive surface is distinct from the display. In some embodiments the touch-sensitive surface is combined with the display as a touch screen 112.

In response to detecting the first input, the device moves (612) a first object in the plurality of selectable user interface objects across the display (e.g., touch screen 112) to a location on the display (e.g., touch screen 112) that is proximate to a second object in the plurality of selectable user interface objects. For example, in FIG. 5N the solitaire application icon 5002-4 has been moved from a previous location to a current location (e.g., 5002-4 in FIG. 5N) that is proximate to a second object (e.g., racing application icon 5002-13 in FIG. 5N). In some embodiments, the location is over or at least partly overlapping the second object or an activation region for the second object, as illustrated in FIG. 5N, where the solitaire application icon 5002-4 partly overlaps the racing application icon 5002-13. In some embodiments, the location is over or at least partly overlapping an activation region for the second object, as described in greater detail below with reference to method 900.

The device detects (614) that the first input meets predefined folder-creation criteria while the first object is proximate to the second object. In some embodiments, detecting that the first input meets predefined folder-creation criteria includes detecting (616) termination of the first input while the first object is proximate to the second object. For example, in FIG. 5N, the device detects a liftoff of the contact 5040-*b* while the solitaire application icon 5002-4 is overlapping with the racing application icon 5002-13. As another example, in FIG. 5N, the device detects a pause of the contact 5040 while the solitaire application icon 5002-4 is overlapping with the racing application icon 5002-13 for more than a predetermined period of time (e.g., 0.5 seconds, 1 second, 1.5 seconds or any reasonable period of time). In some embodiments, the device is (618) in a user interface reconfiguration mode (i.e., not in a normal operation mode) when the first input is detected, as described in greater detail above. Additionally, it should be understood that, in some embodiments the selectable user interface objects cannot be moved (e.g., repositioned within the arrangement of selectable user interface objects) when the device is in the normal operation mode.

Operations 622-636 are performed (620) in response to detecting that the first input meets predefined folder-creation criteria while the first object is proximate to the second object. In some embodiments, in response to detecting that the first input meets predefined folder-creation criteria of the first input while the first object is proximate to the second object, ceasing (622) to display the first object and the second object (e.g., as illustrated in FIGS. 5N and 5S). For example, in FIG. 5S, after the device has detected that the first input meets predefined folder-creation criteria (e.g., by detecting termination of the input or a pause in the input for more than a predetermined period of time), the solitaire application icon 5002-4 and the racing application icon 5002-13, which were previously displayed in FIG. 5N are no longer displayed in FIG. 5S. Instead a folder icon 5004-7, which represents a folder that contains the solitaire application icon and the racing application icon is displayed. In some embodiments, ceasing to display the second object includes displaying an animation of the second object transforming into a folder icon that corresponds to the folder. For example in FIG. 5S a folder icon 5004-7 has replaced racing application icon 5002-13 from FIG. 5N. In some embodiments, a reduced scale representations of the first object and/or the second object are displayed in the folder icon, as described in greater detail below with reference to FIGS. 11A-11C. For example in FIG. 5S the folder icon includes reduced scale representations (e.g., "O" and "S") of the solitaire application icon 5002-4 and the racing application icon 5002-13, respectively.

The device creates (624) a folder that contains the first object and the second object. In some embodiments, creating the folder includes displaying (626) a folder icon that is representative of the folder (e.g., as described in greater detail below with reference to method 1100). For example, the device creates folder that includes the solitaire application icon 5002-4 and the racing application icon 5002-13, and displays folder icon 5004-7, as illustrated in FIG. 5S. In some embodiments, folders icons have different properties from other selectable objects, (e.g., action icons such as application icons, bookmark icons, document icons, etc.), as described in greater detail below with reference to method 700. In some embodiments, the folder icon is displayed (628) at a location on the display (e.g., touch screen 112) that was previously occupied by the second selectable object. For example in FIG. 5N the racing application icon 5002-13 is the last selectable user interface object in the arrangement of selectable user interface objects (e.g., from left to right, top to bottom), while in FIG. 5S, the folder icon 5004-7 that contains the racing application icon 5002-13 is displayed as the last selectable user interface object in the arrangement of selectable user interface objects. In some embodiments, displaying the folder icon includes displaying (630) an animation of the second selectable object changing (e.g., morphing) into the folder icon. In some embodiments, existing folders cannot be combined in this manner. For example, even if the device detected an input that corresponded to dragging a first folder (e.g., 5004-2 in FIG. 5N) on top of a second folder (e.g., 5004-1-*b* in FIG. 5N), the device would not add the first folder to the second folder.

In some embodiments, after creating the folder, the device automatically displays (632) a folder view that includes contents of the folder. For example, the device moves automatically from the user interface displayed in FIG. 5N to the user interface displayed in FIG. 5Y in response to detecting that the first input meets predefined folder creation criteria, the device displays a folder view (e.g., the area 5092 that contains the solitaire application icon 5002-4 and the racing application icon 5002-13, as illustrated in FIG. 5Y).

In some embodiments, after detecting the first input, the device displays the plurality of user interface objects in a first arrangement on the display. For example, in FIG. 5X, the selectable user interface object (e.g., action icons 5002 and folder icons 5004) are displayed in a two-dimensional grid arrangement, with each selectable user interface object having a respective position within the grid arrangement. In some of these embodiments, after creating the folder, the device displays (634) a folder view (e.g., 5092 in FIG. 5Y) on the display (e.g., touch screen 112). In some embodiments, displaying the folder view includes displaying the first object and the second object within the folder view. It should be understood that a respective folder view is a portion of the display (e.g., touch screen 112) that includes the contents of the folder. For example, the region 5078 in FIG. 5T, the shaded region 5092 in FIGS. 5Y-5Z, the shaded region 5106 in FIGS. 5DD-5GG, the shaded region 5138 in FIGS. 5TT-5UU, the shaded region 5148 in FIG. 5WW, the shaded region 5158 in FIGS. 5YY-5ZZ, the shaded region 5170 in FIGS. 5EEE-5FFF and the shaded region 5212 in FIG. 5PPP are all folder views that are a portion of the display (e.g., touch screen 112). In some embodiments, the folder view is substantially all of the display (e.g., touch screen 112). For example, the region 5080 in FIG. 5U and the region 5182 in FIGS. 5GGG-5III, 5KKK, 5MMM are folder views that are substantially all (or all) of the display (e.g., touch screen 112).

In some embodiments, the device displays an animated transition from the first arrangement to the folder view (e.g., as described in greater detail below with reference to method 1200). In some embodiments, displaying the folder view includes displaying (636) a folder icon (e.g., 5004-7 in FIG. 5Y) and a representation of at least a portion of the first arrangement, so as to indicate a location of the folder icon within the first arrangement. For example, in FIG. 5Y, the selectable user interface objects (e.g., 5002-1, 5002-2, 5002-3, 5002-5, 5002-6, 5002-7, 5002-8, 5002-6, 5004-1-*b* 5002-10, 5002-11, and 5002-12) that were displayed above the folder icon (e.g., in FIG. 5X) continue to be displayed above the folder icon 5004-7, while the selectable user interface objects (e.g., 5002-14, 5002-15, 5002-16, 5004-2) that were displayed below the folder icon 5004-7 are no longer displayed below the folder icon 5004-7.

In some embodiments, while the device is in a normal operation mode, the selectable user interface objects include (638) one or more action icons (e.g., 5002 in FIG. 5OOO) and one or more folder icons (e.g., 5004 in FIG. 5OOO). In some of these embodiments, the device detects (640) a second input. In some embodiments, in response to detecting the second input: when the second input corresponds to a request to select a respective action icon, the device activates (642) an application associated with the respective action icon; and when the second input corresponds to a request to select the folder icon, the device displays a folder view that includes contents of the folder associated with the folder icon. For example, in FIG. 5OOO, a tap gesture 5208 at a location on the touch-sensitive surface (e.g., touch screen display 112) that corresponds to a location of an action icon (e.g., photos application icon 5002-9) on the display (e.g., touch screen 112) activates an application (e.g., a photos application) that is associated with the action icon, while in response to detecting a tap gesture 5210 at a location on the touch-sensitive surface (e.g., touch screen 112) at a location that corresponds to location of the folder icon (e.g., folder icon 5004-7 in FIG. 5OOO) on the display (e.g., touch screen 112) the device displays a folder view 5212 that includes contents (e.g., action icons 5002-9, 5002-4, 5002-13, 5002-8) of the folder associated with the folder icon 5004-7.

In some embodiments, after creating the folder, the device displays (644) a folder view that includes contents of the folder and displays an object removal region. For example, in FIG. 5Y the object removal region is the first portion 5084 of the display (e.g., touch screen 112). As another example, in FIGS. 5GGG-5HHH the object removal region 5184 is a separately identified portion of the display (e.g., touch screen 112). As yet another example, in FIG. 5WW the portions of the display (e.g., touch screen 112) above and below the folder view 5148 are both object removal regions. In some embodiments, the folder view includes the object removal region (e.g., folder view 5182 with object removal region 5184 in FIGS. 5GGG-5HHH). In some embodiments, the object removal region is outside of the folder view (e.g., object removal region 5084 is outside of folder view 5092 in FIG. 5Y). In some embodiments, the object removal region is displayed all the time (e.g., the object removal region is a portion of the home screen that is displayed while displaying the folder view). In some embodiments, the object removal region is only displayed while in icon reconfiguration mode (e.g., in FIG. 5S no object removal region is displayed, while in FIG. 5Y an object removal region 5084 is displayed above the folder view 5092). In some embodiments, the object removal region is displayed only while in icon reconfiguration mode and currently detecting an input that corresponds to a request to move an object (e.g., in FIG. 5GGG the object removal region 5184 is only displayed when the device detects the movement of contact 5186 across the touch-sensitive surface).

Figure 5Z:
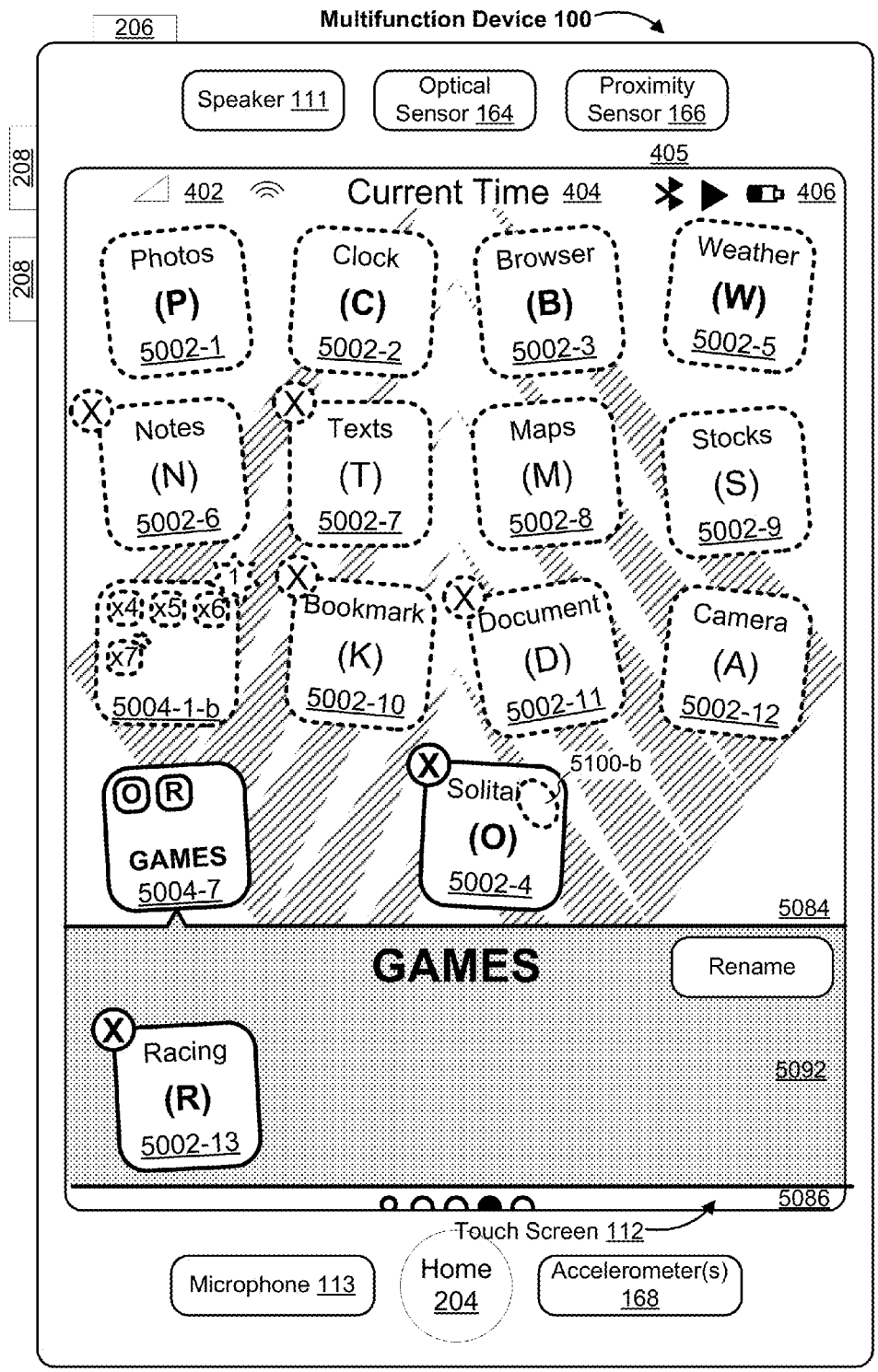
Figure 5A:
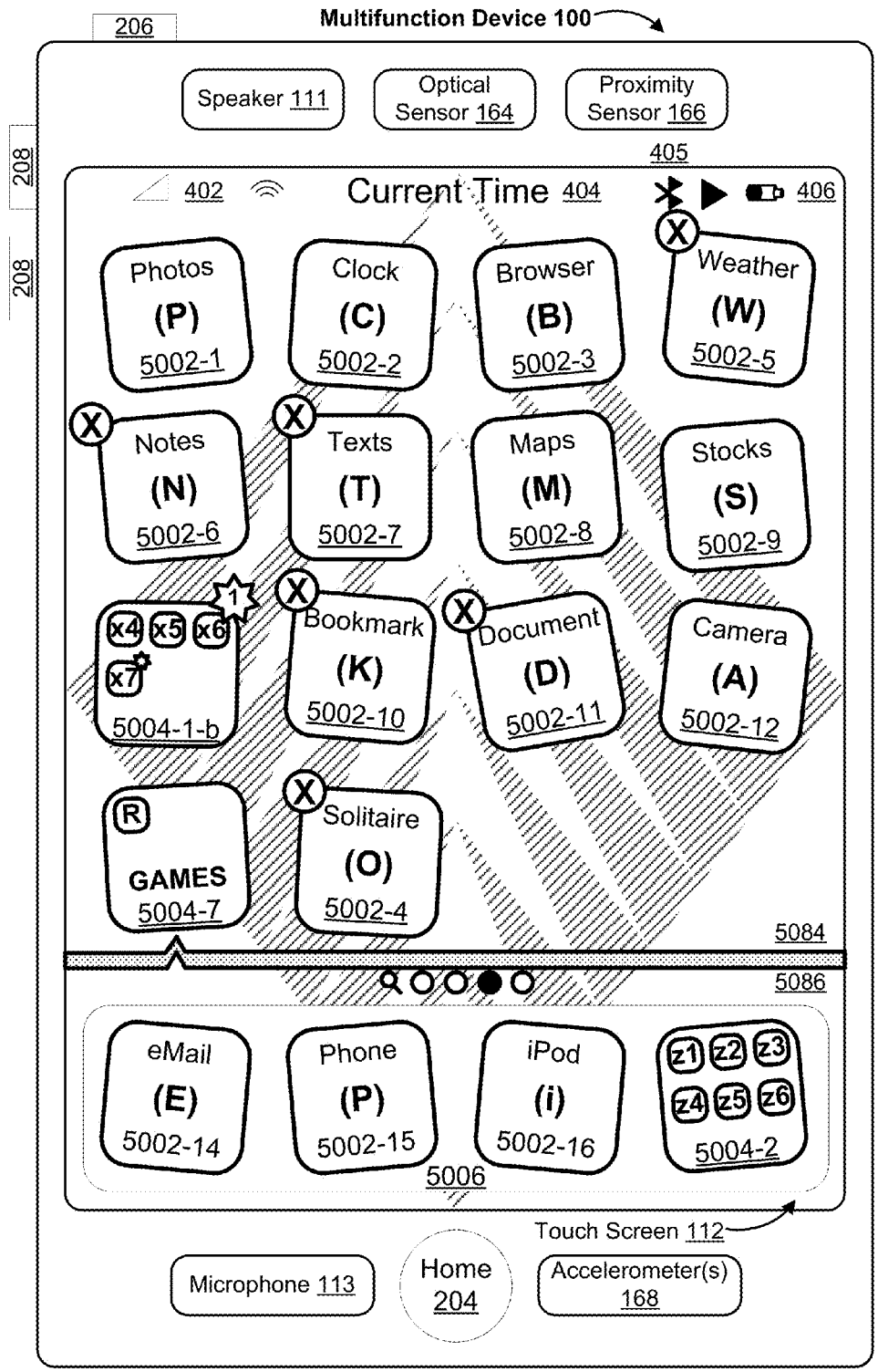
Figure 5B:
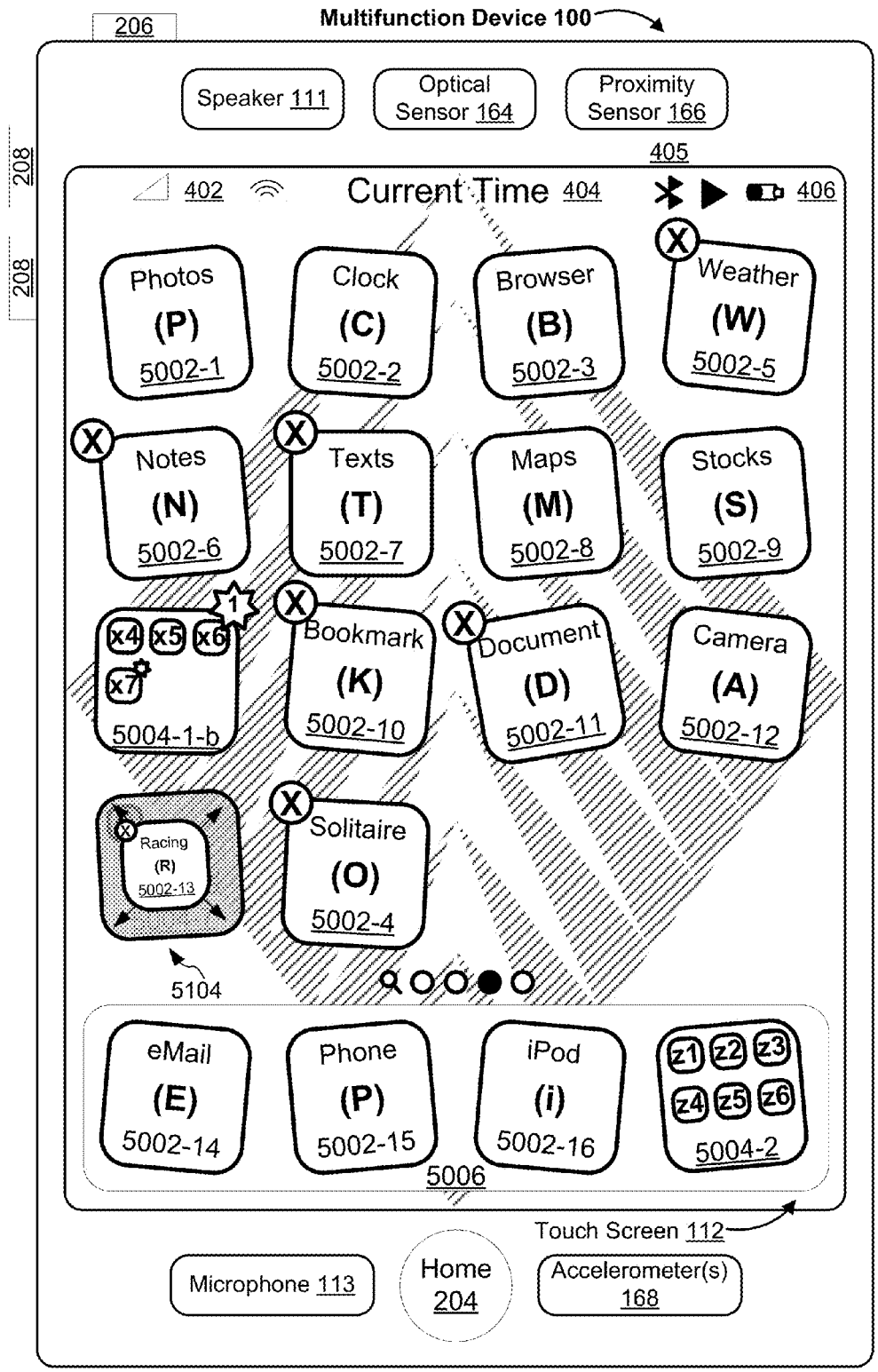
Figure 5C:
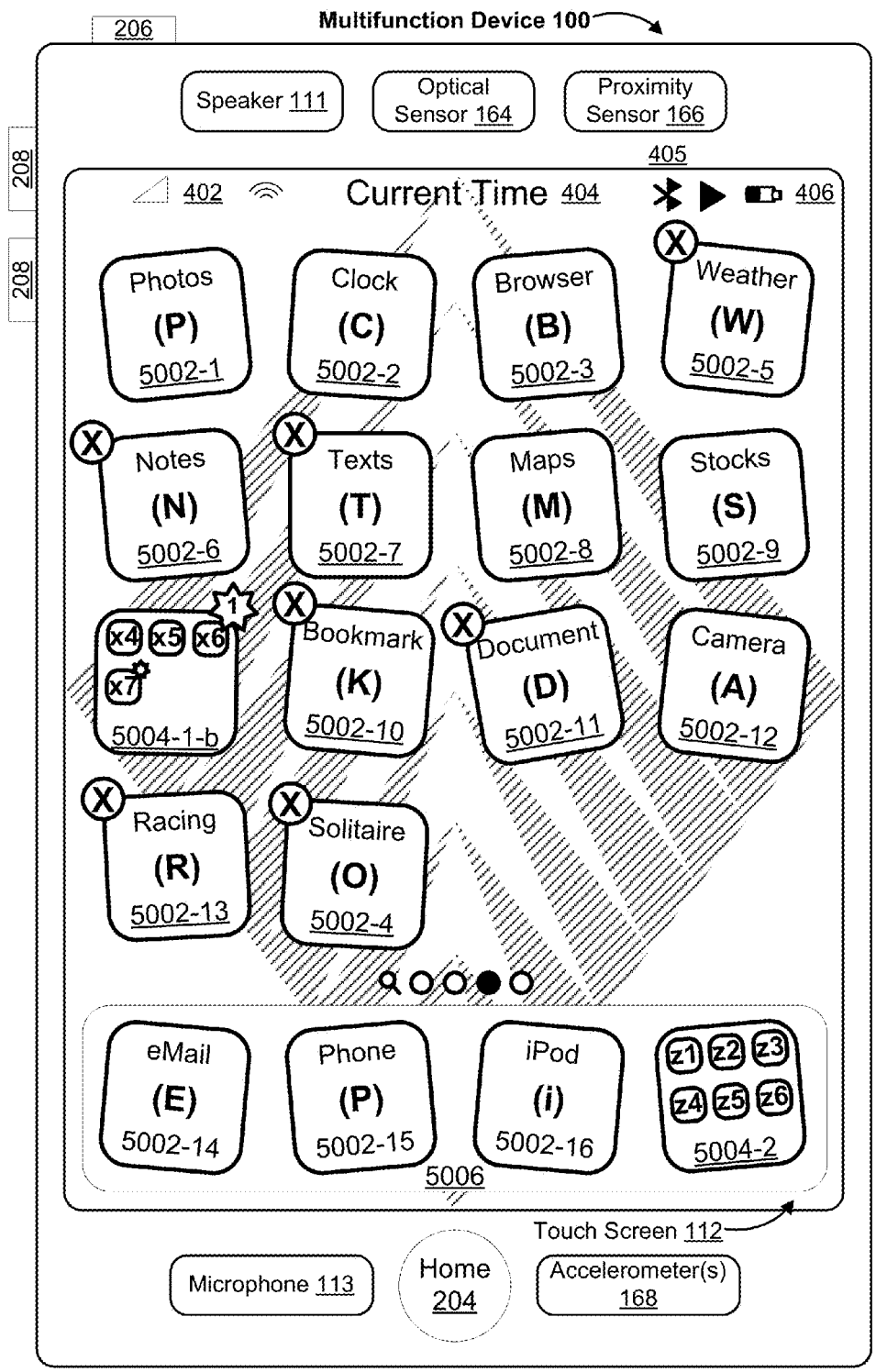
Figure 5D:
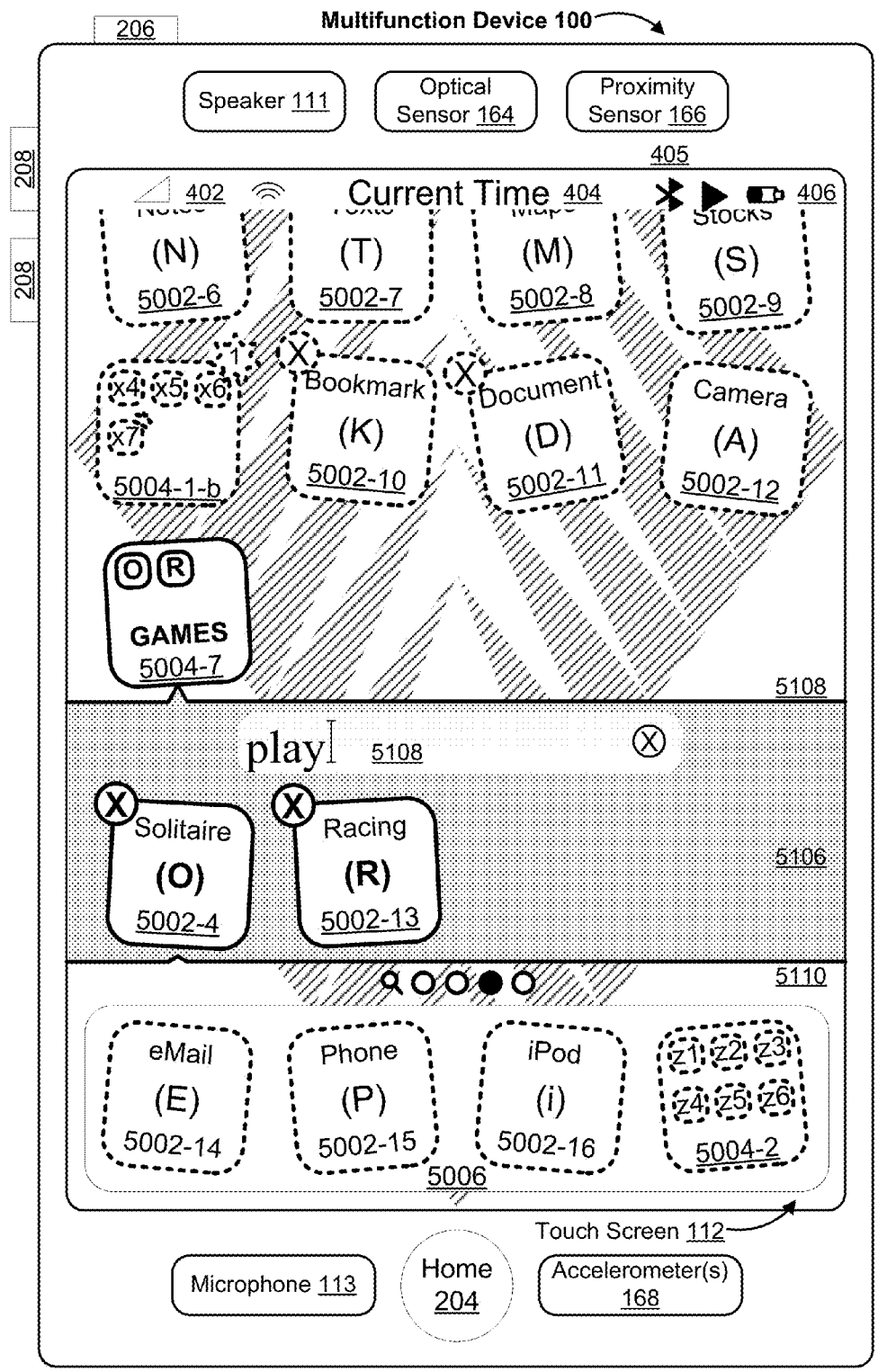
Figure 5E:
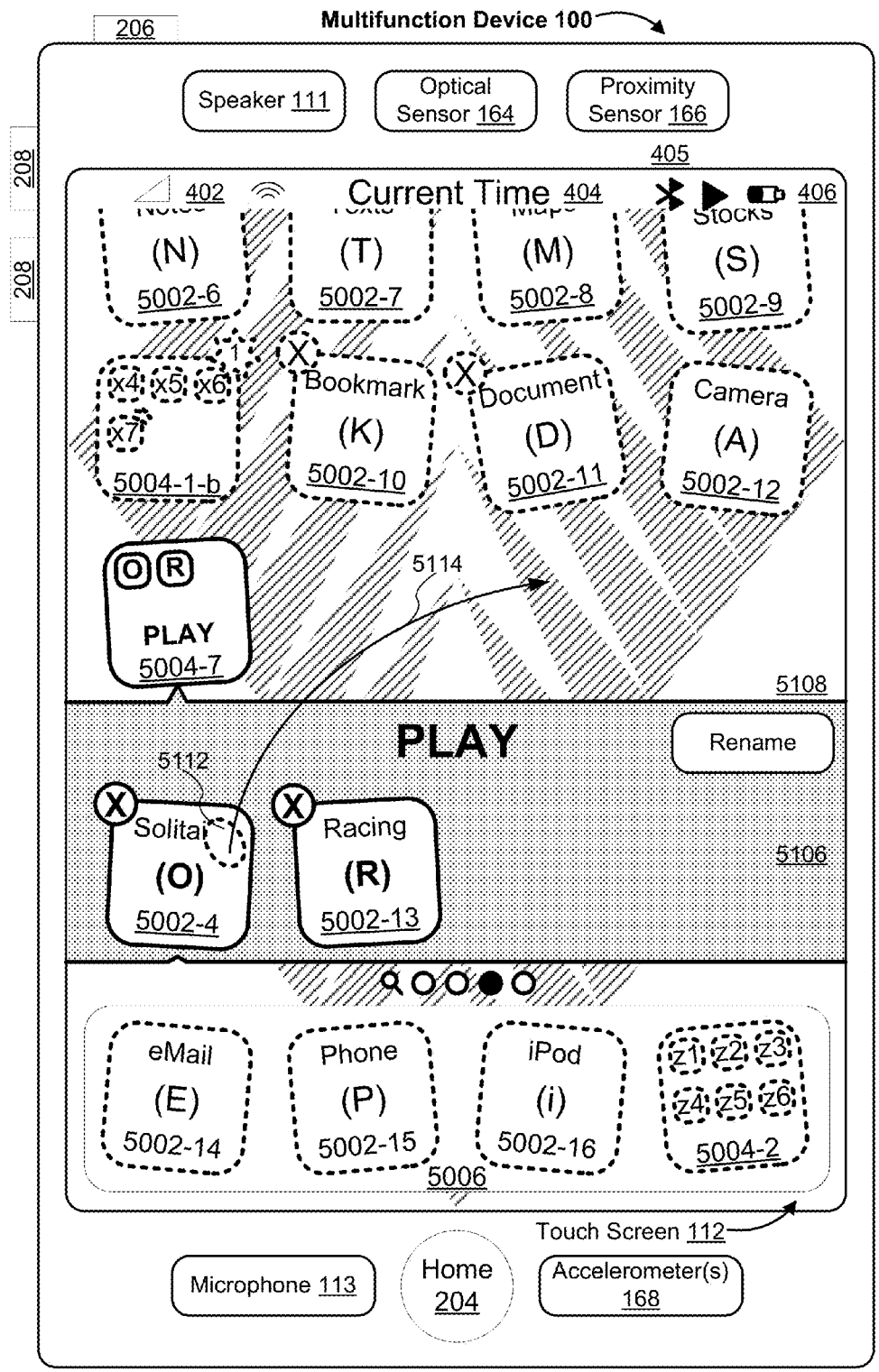
Figure 5F:
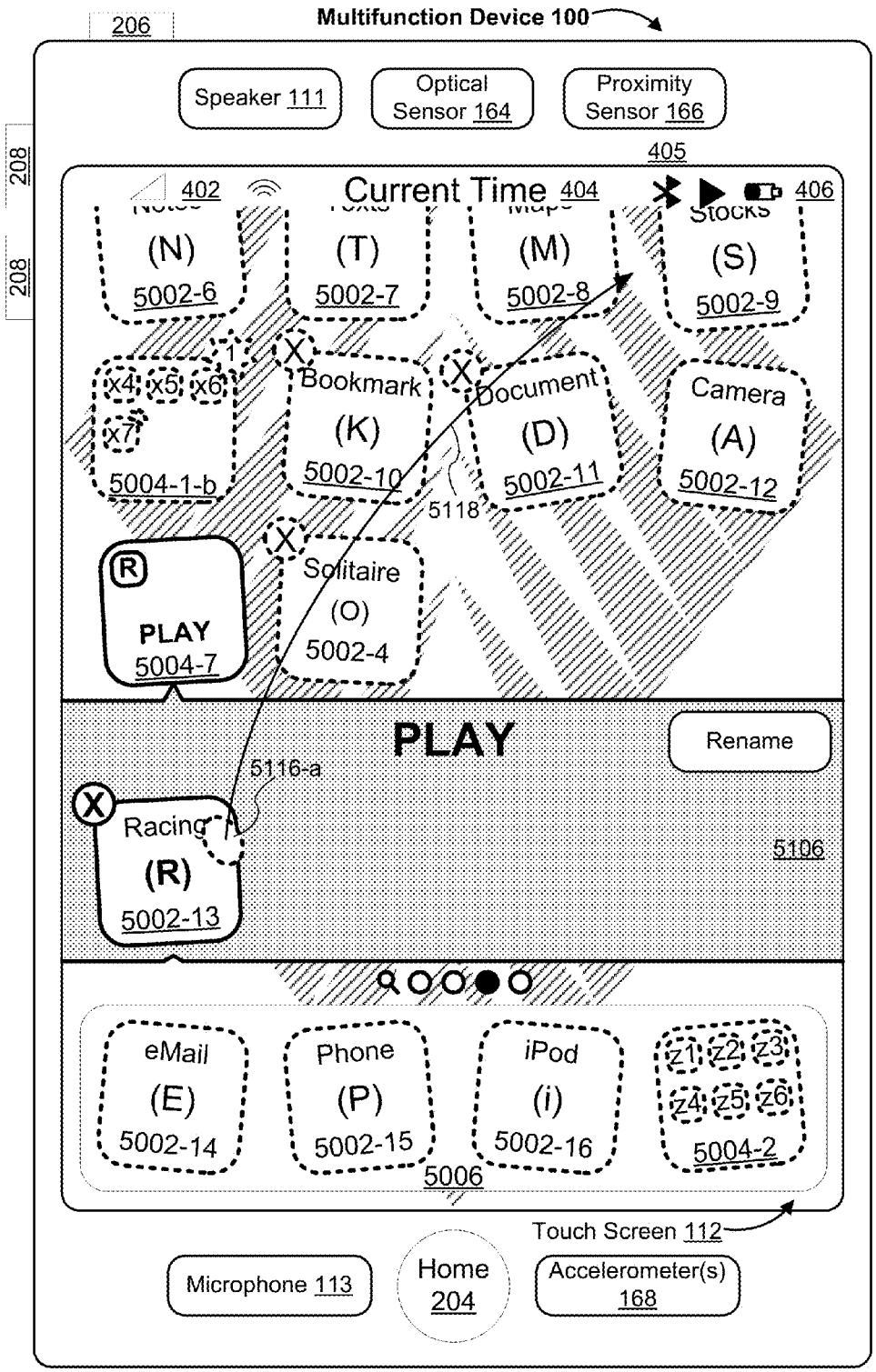
Figure 5G:
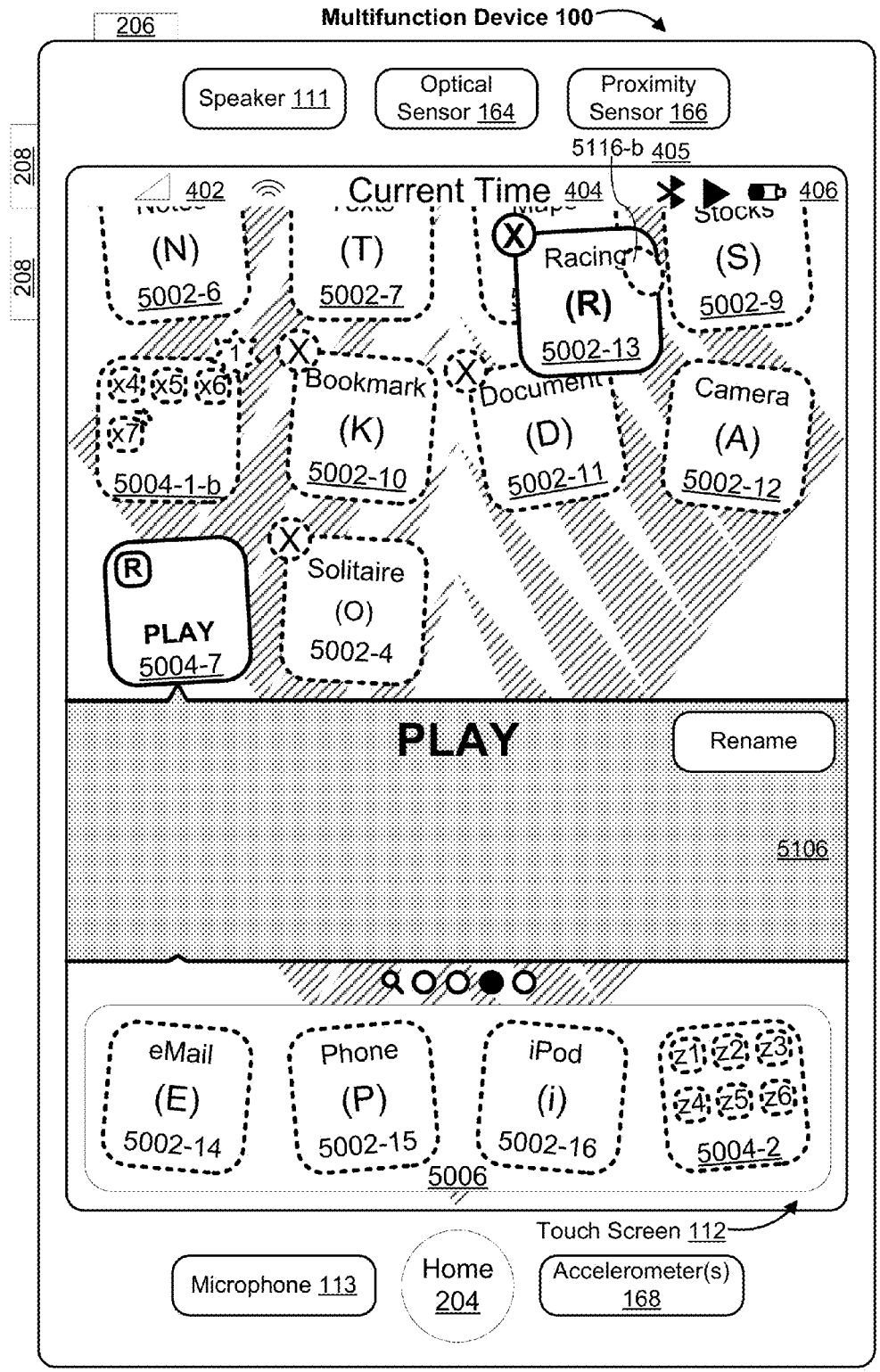
Figure 5H:
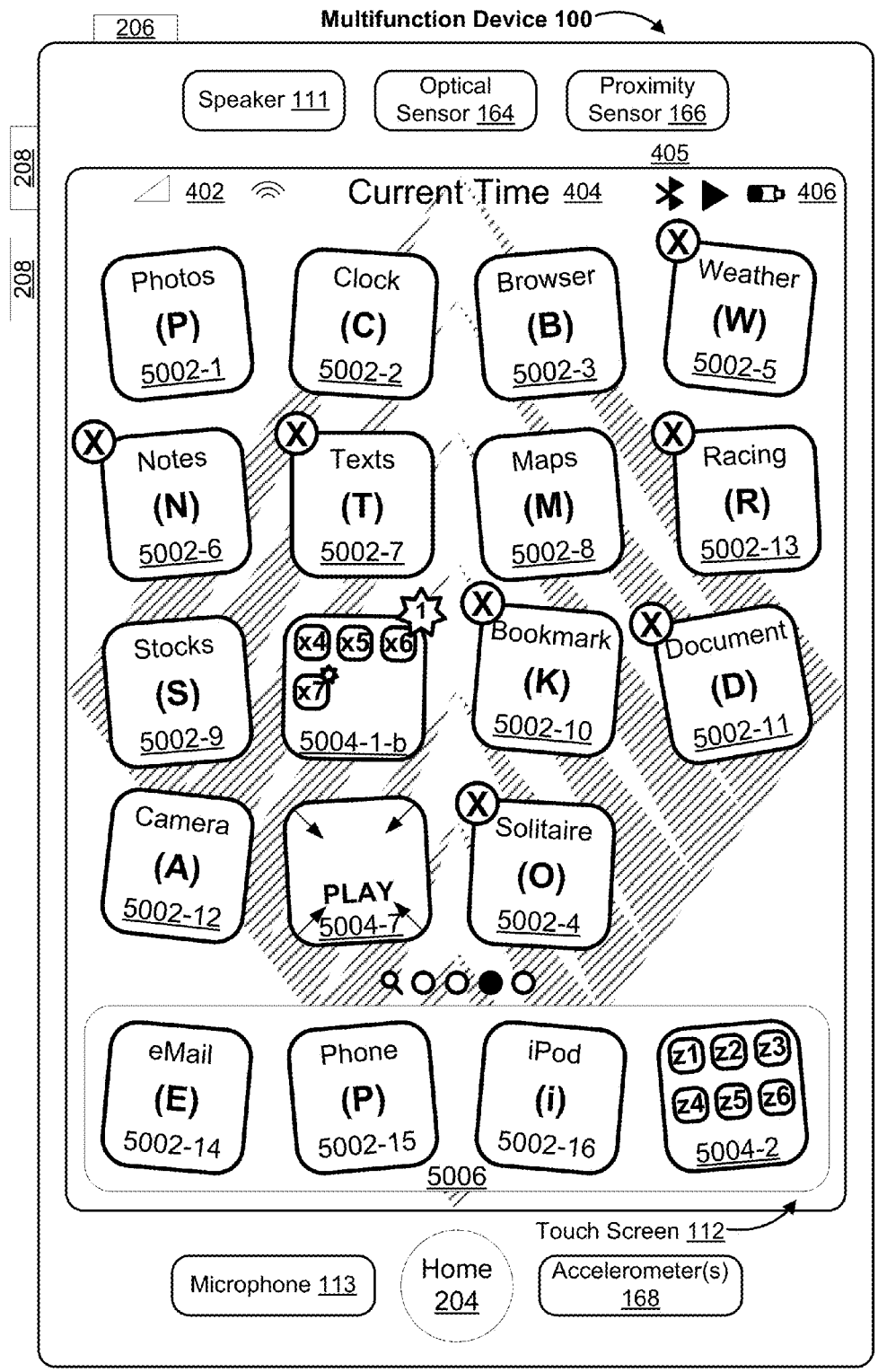
Figure 5I:
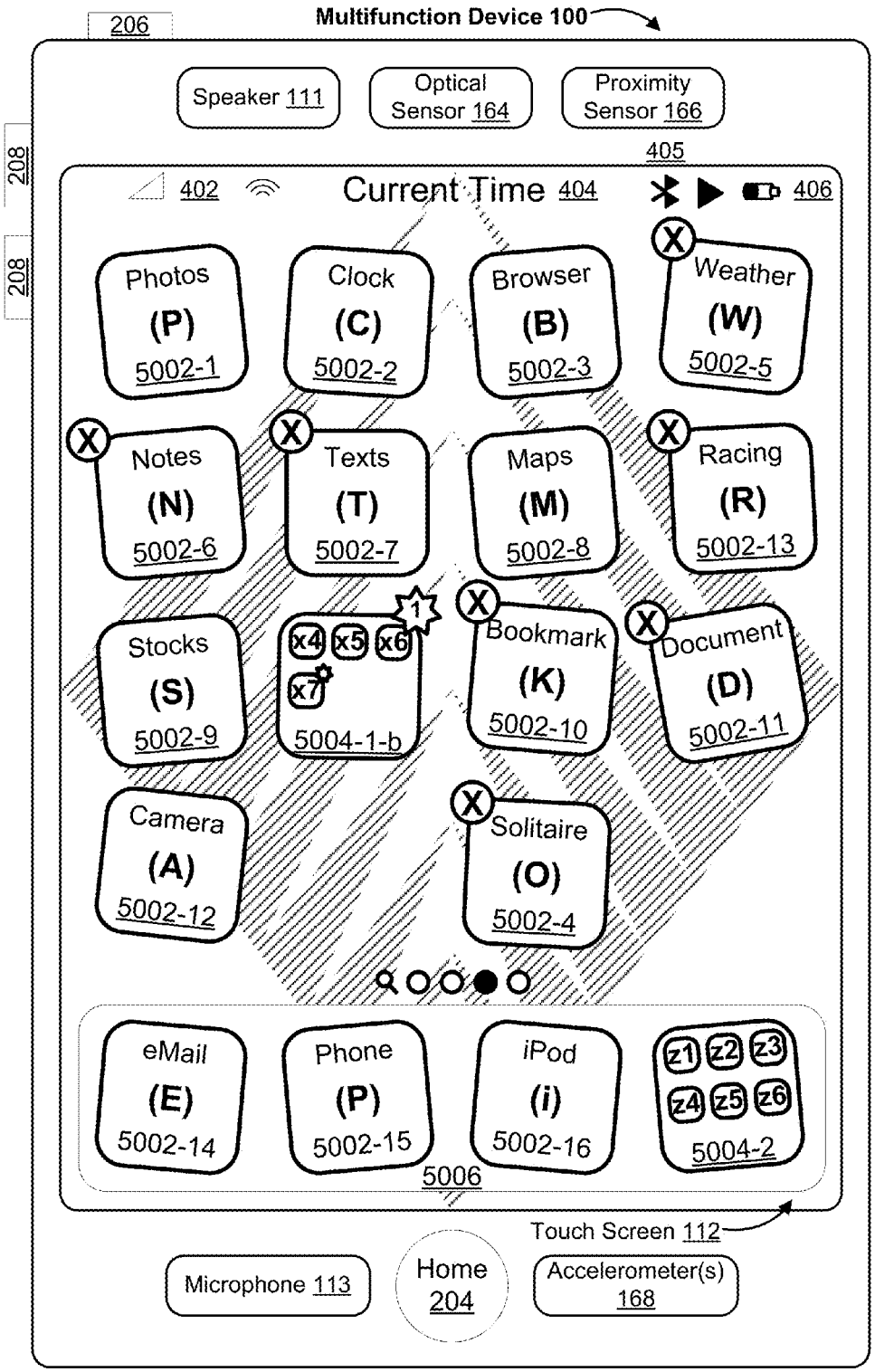
Figure 5J:
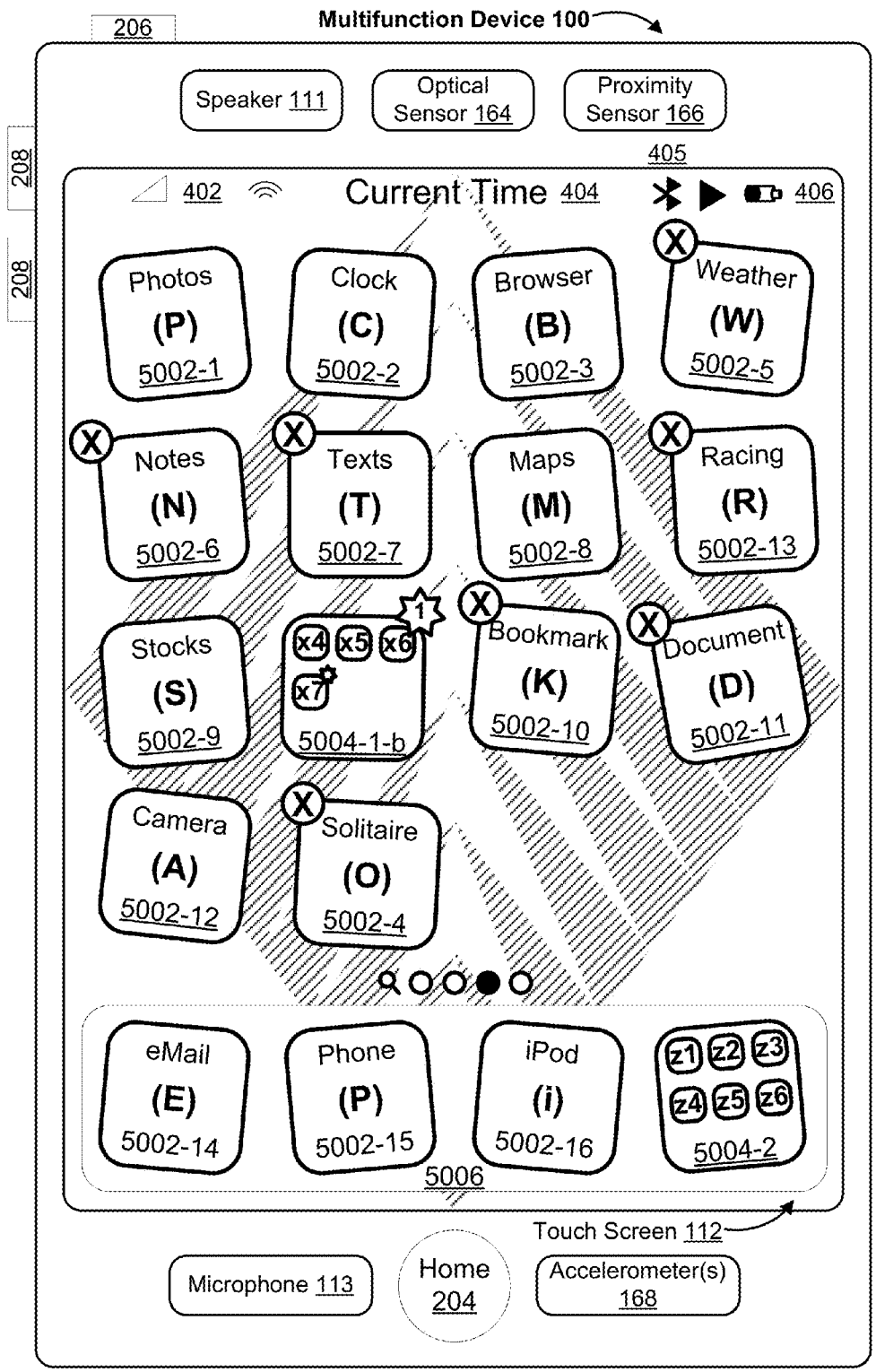
Figure 5K:
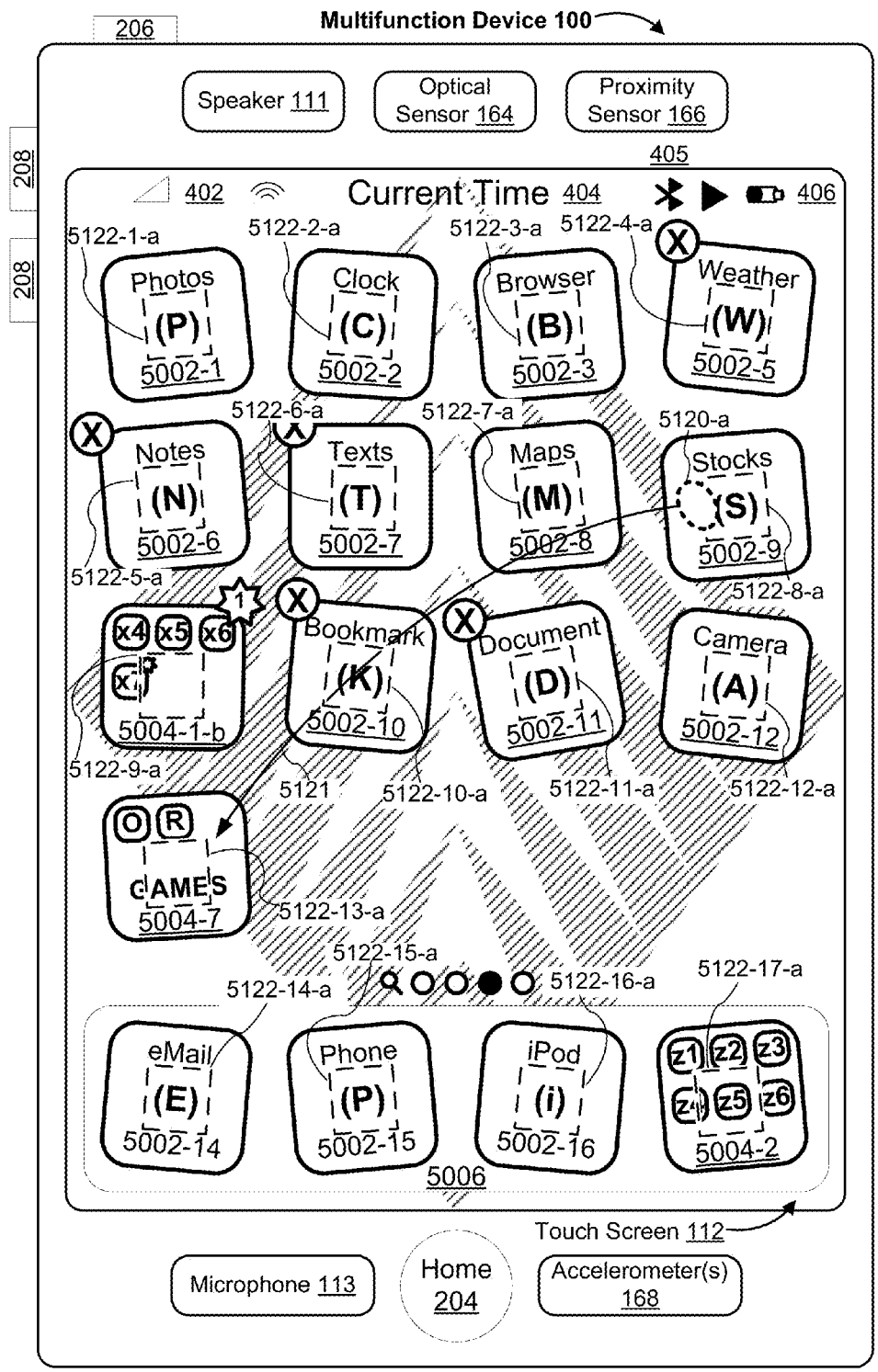
Figure 5L:
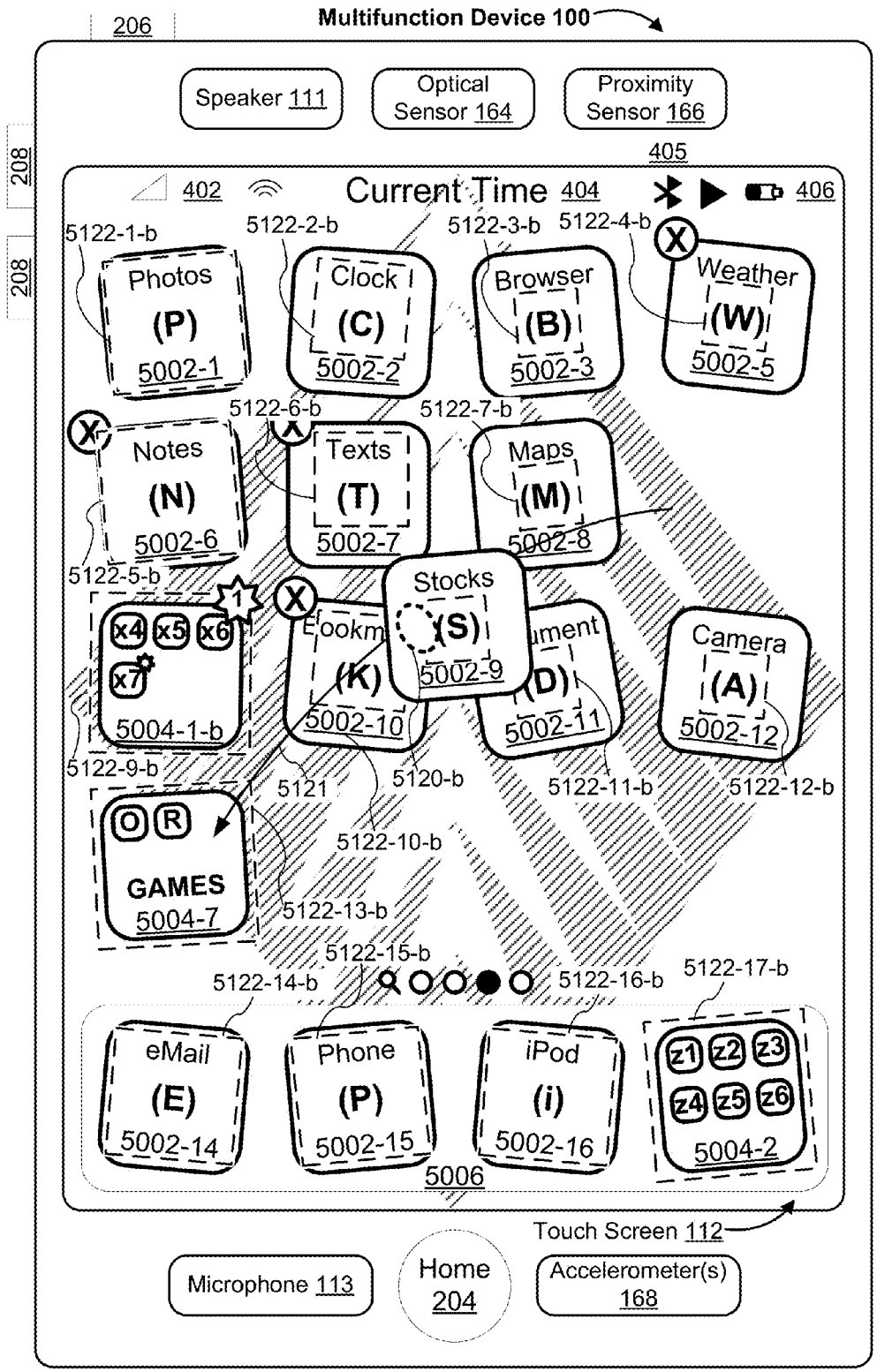
Figure 5M:
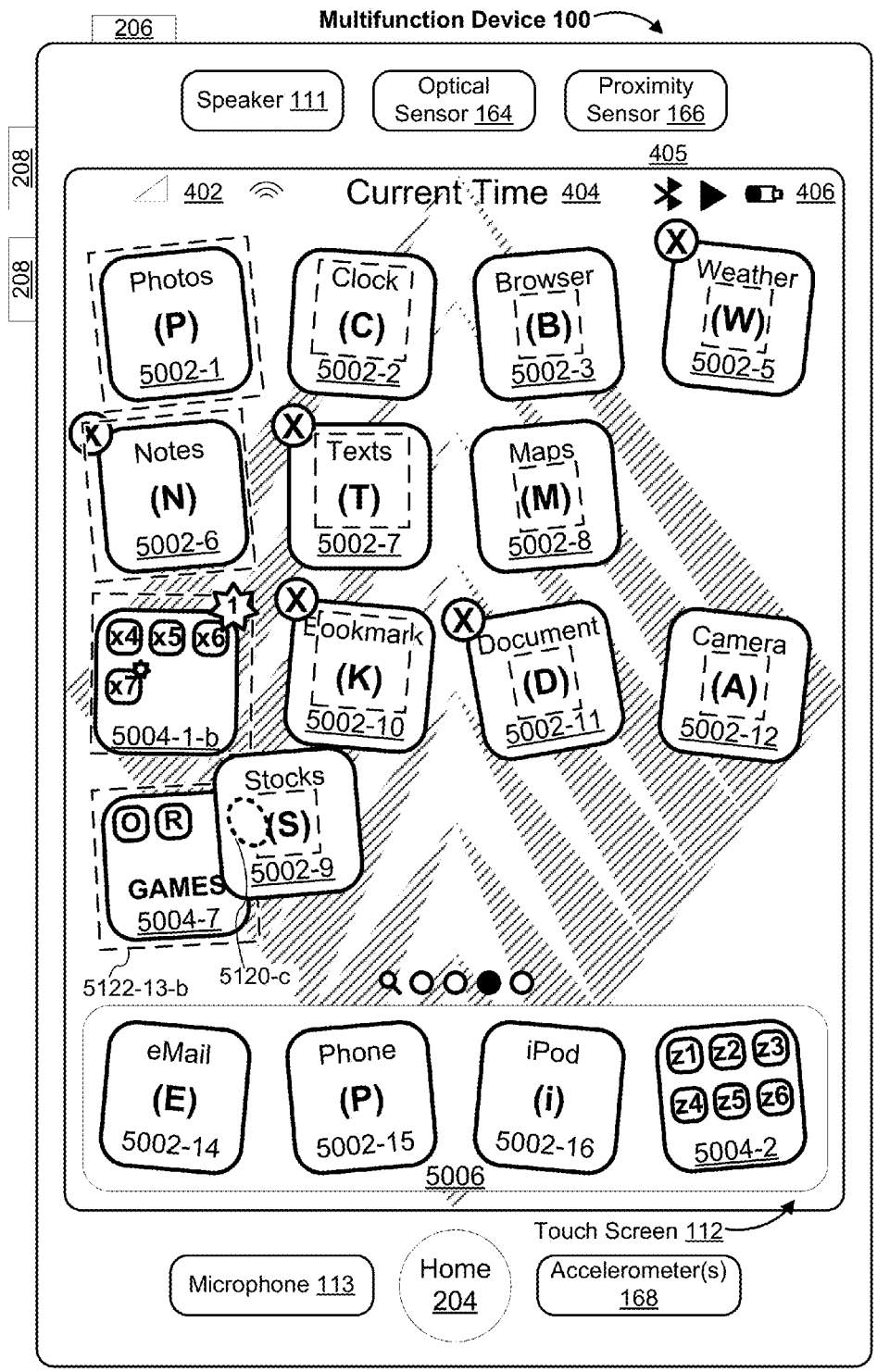
Figure 5N:
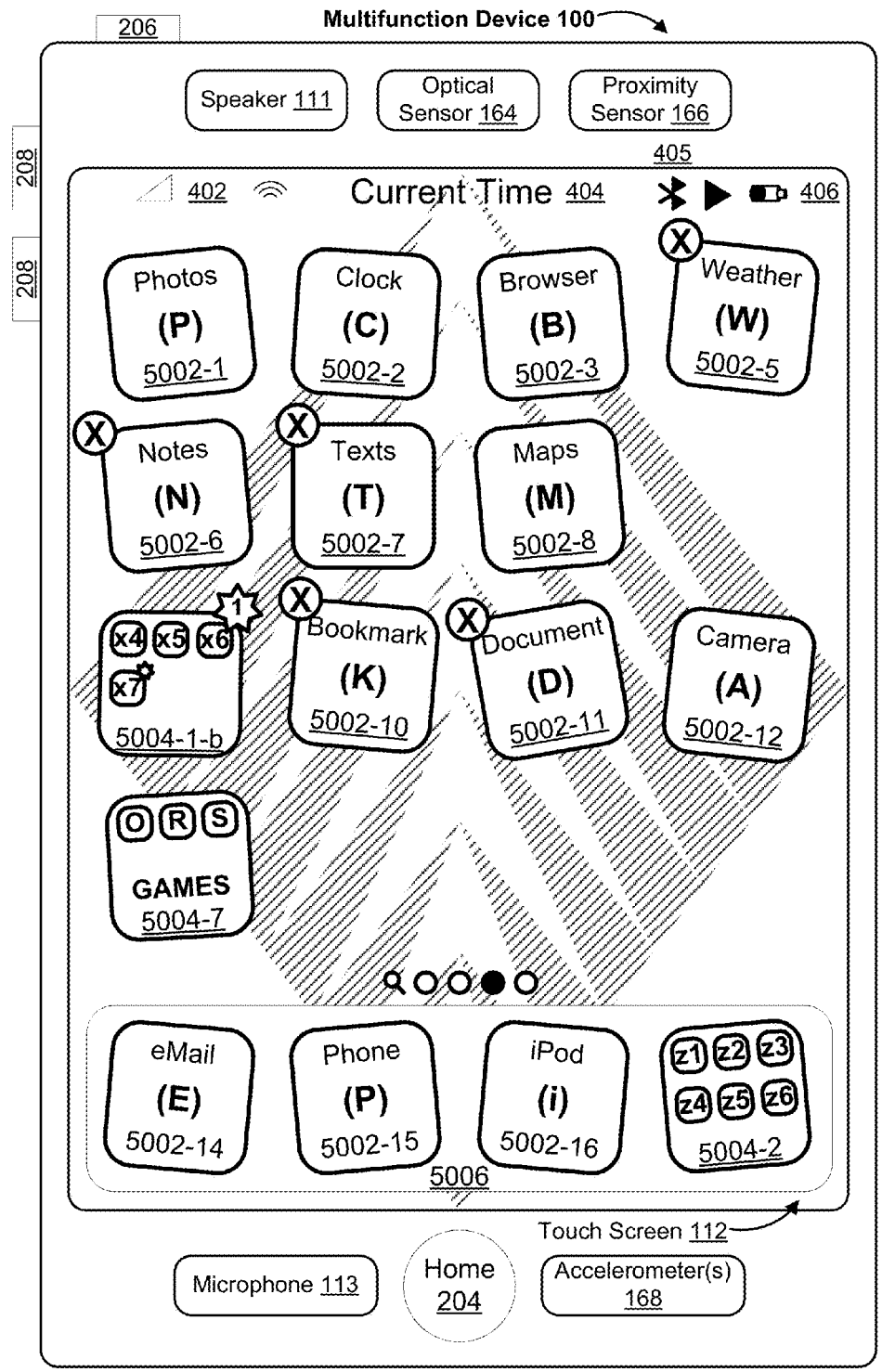
Figure 5O:
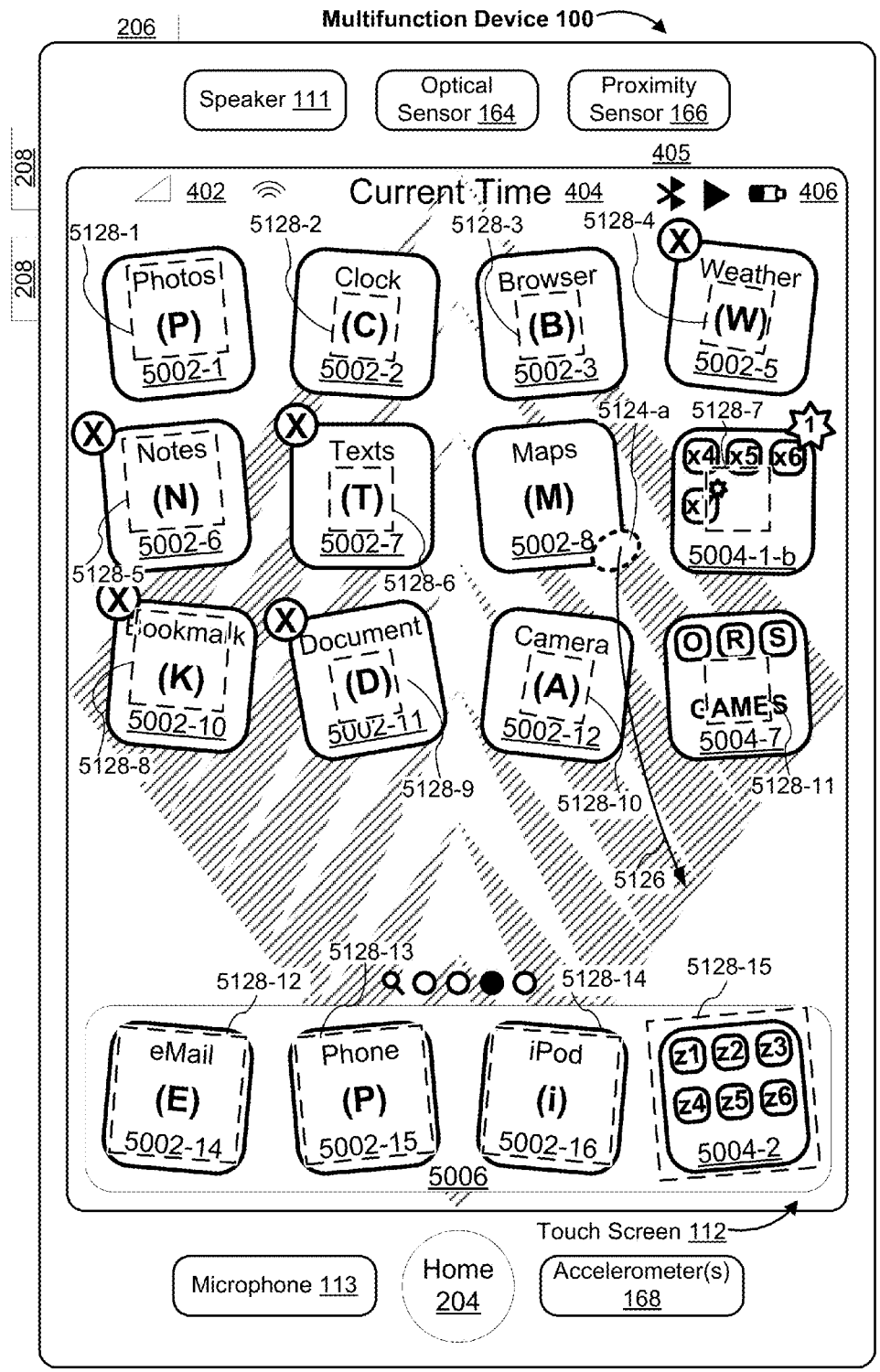
Figure 5P:
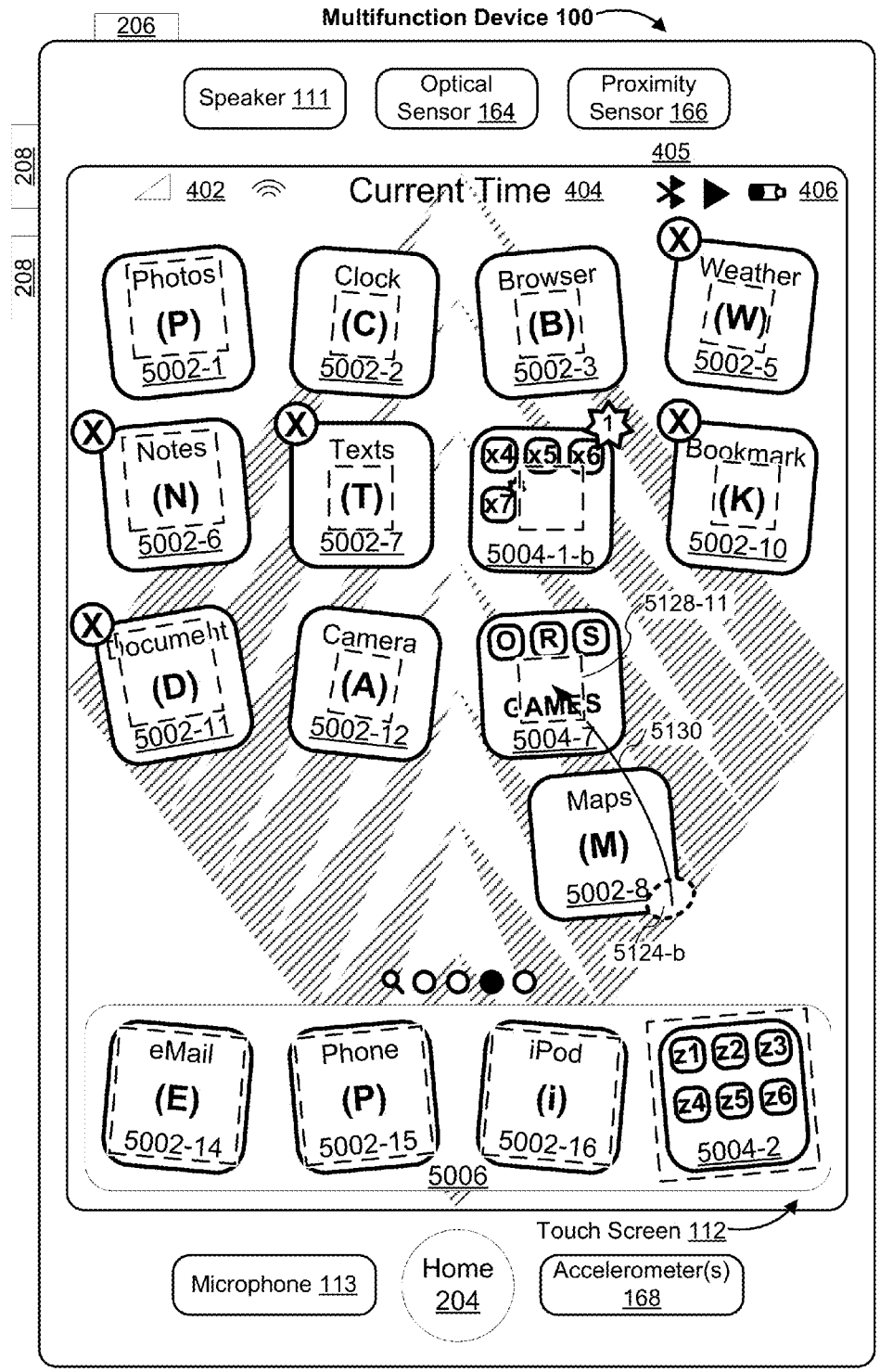
Figure 5Q:
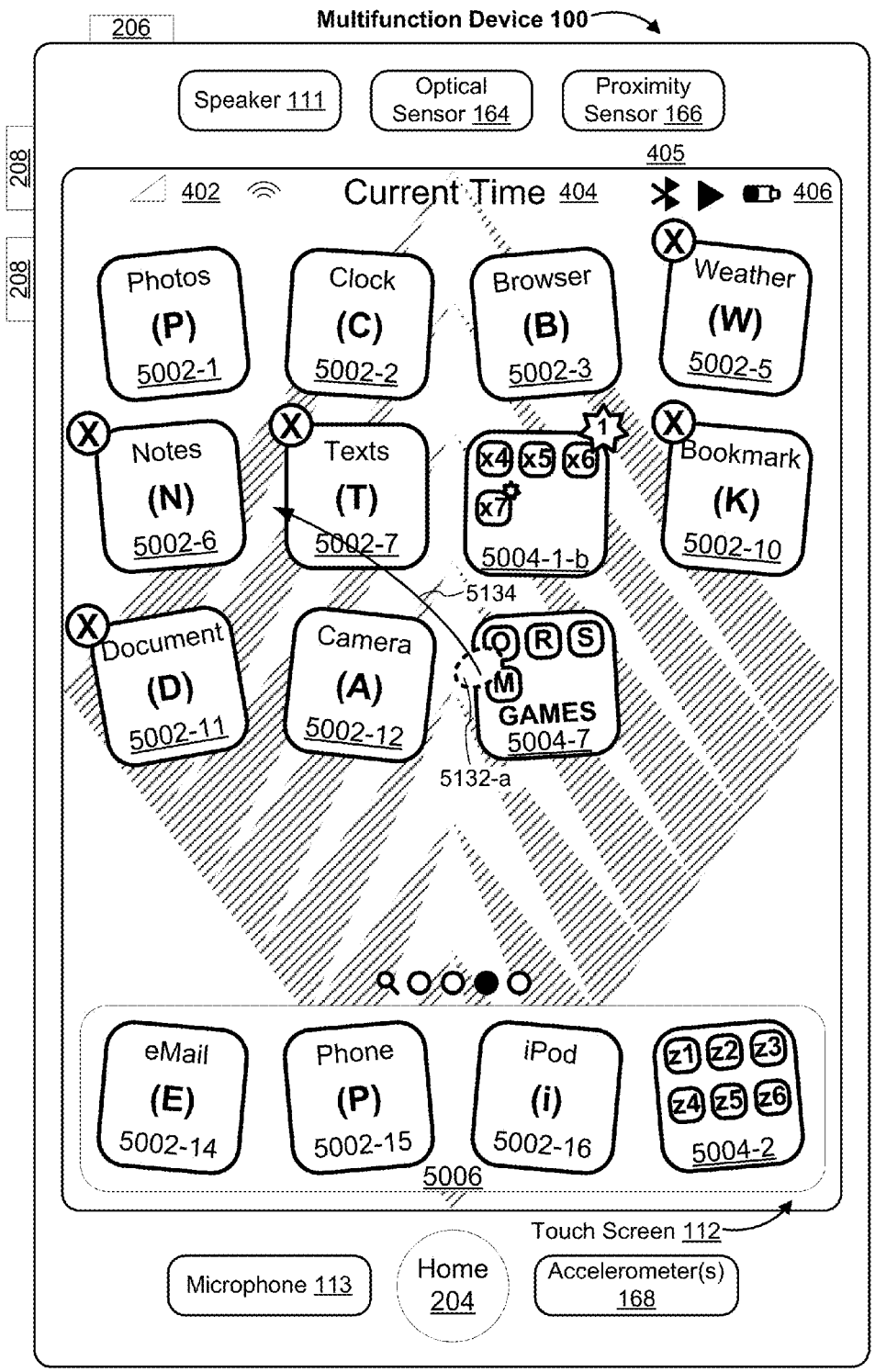
Figure 5R:
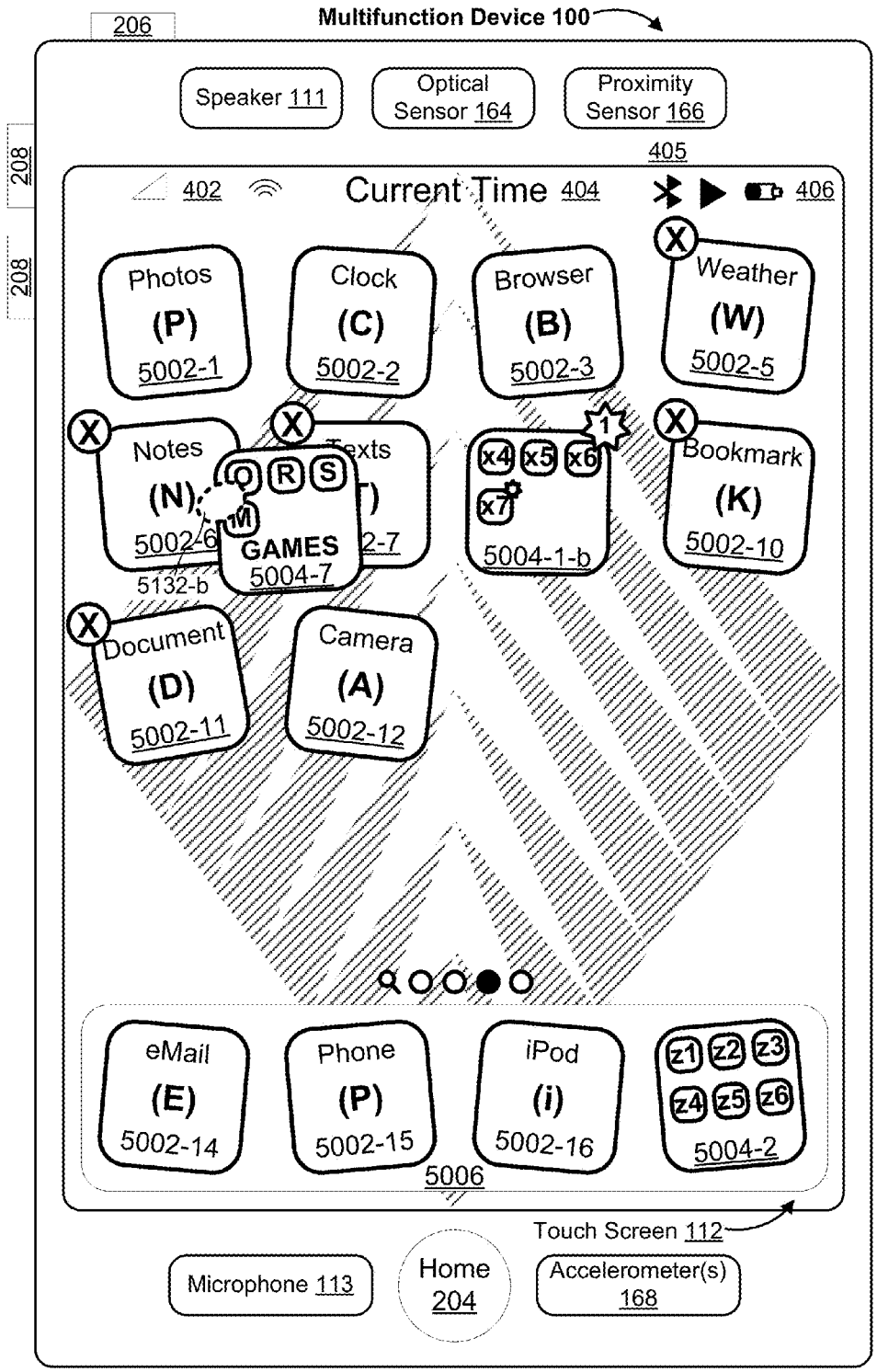
Figure 5S:
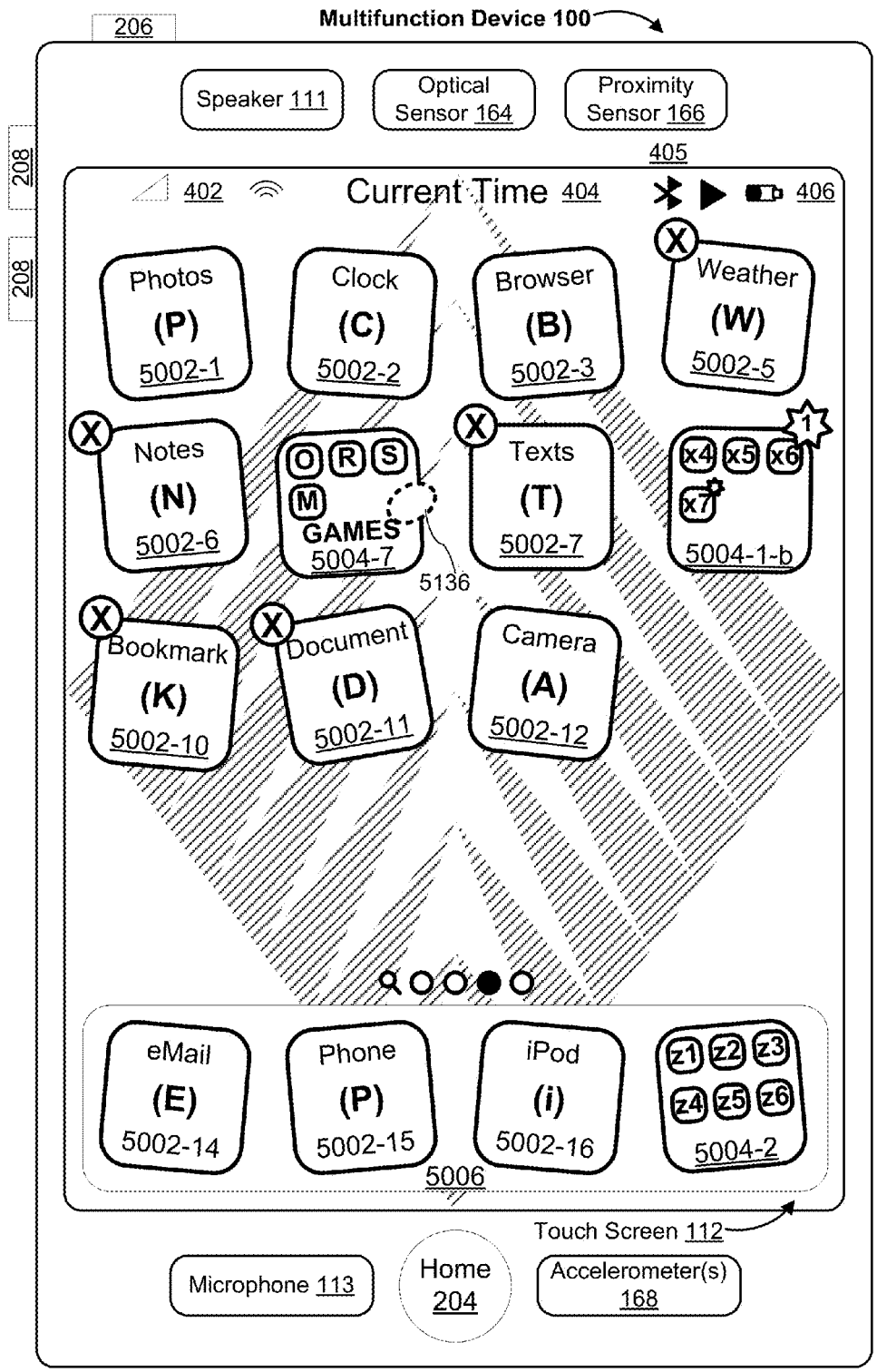
Figure 5T:
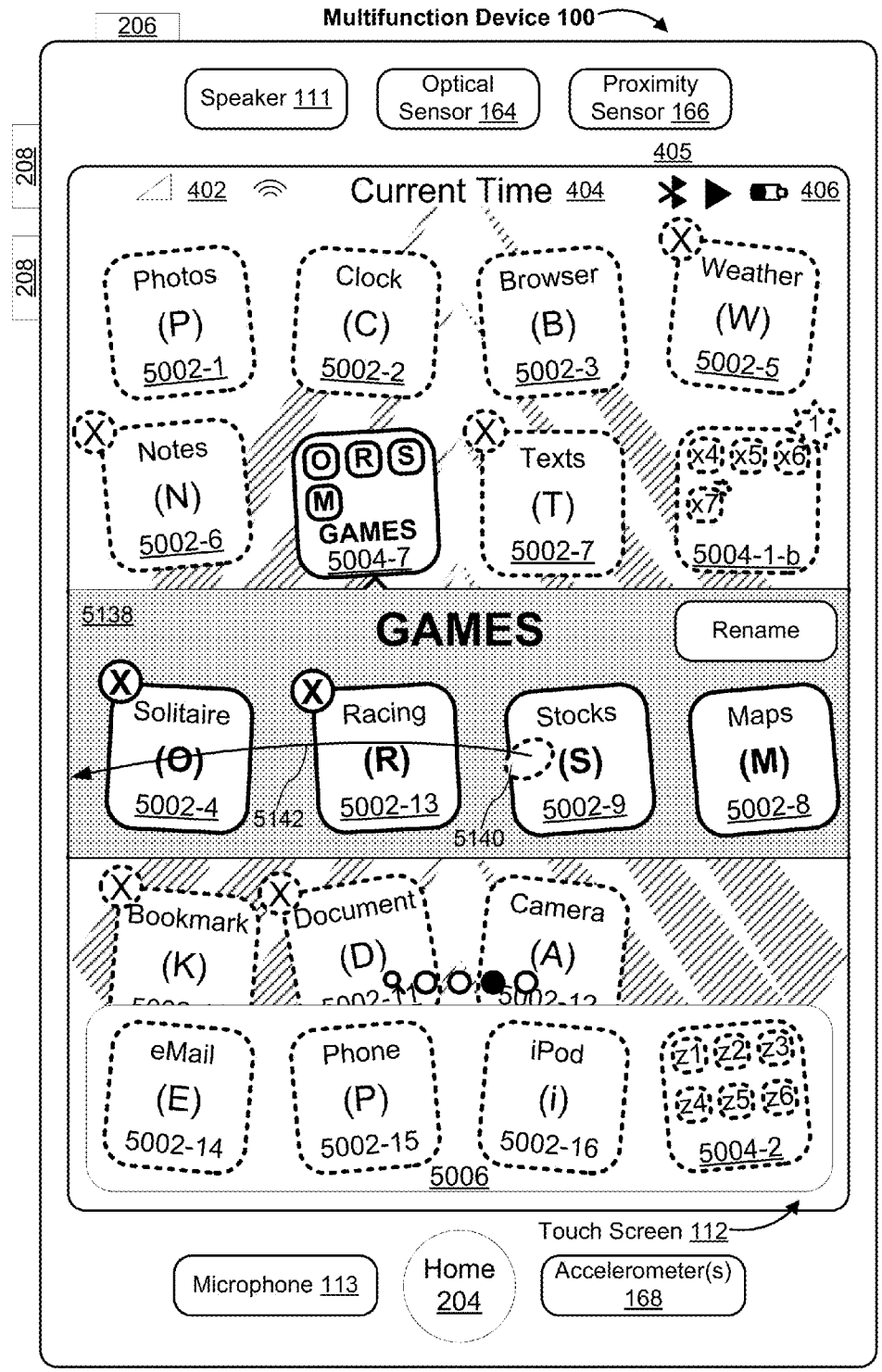
Figure 5U:
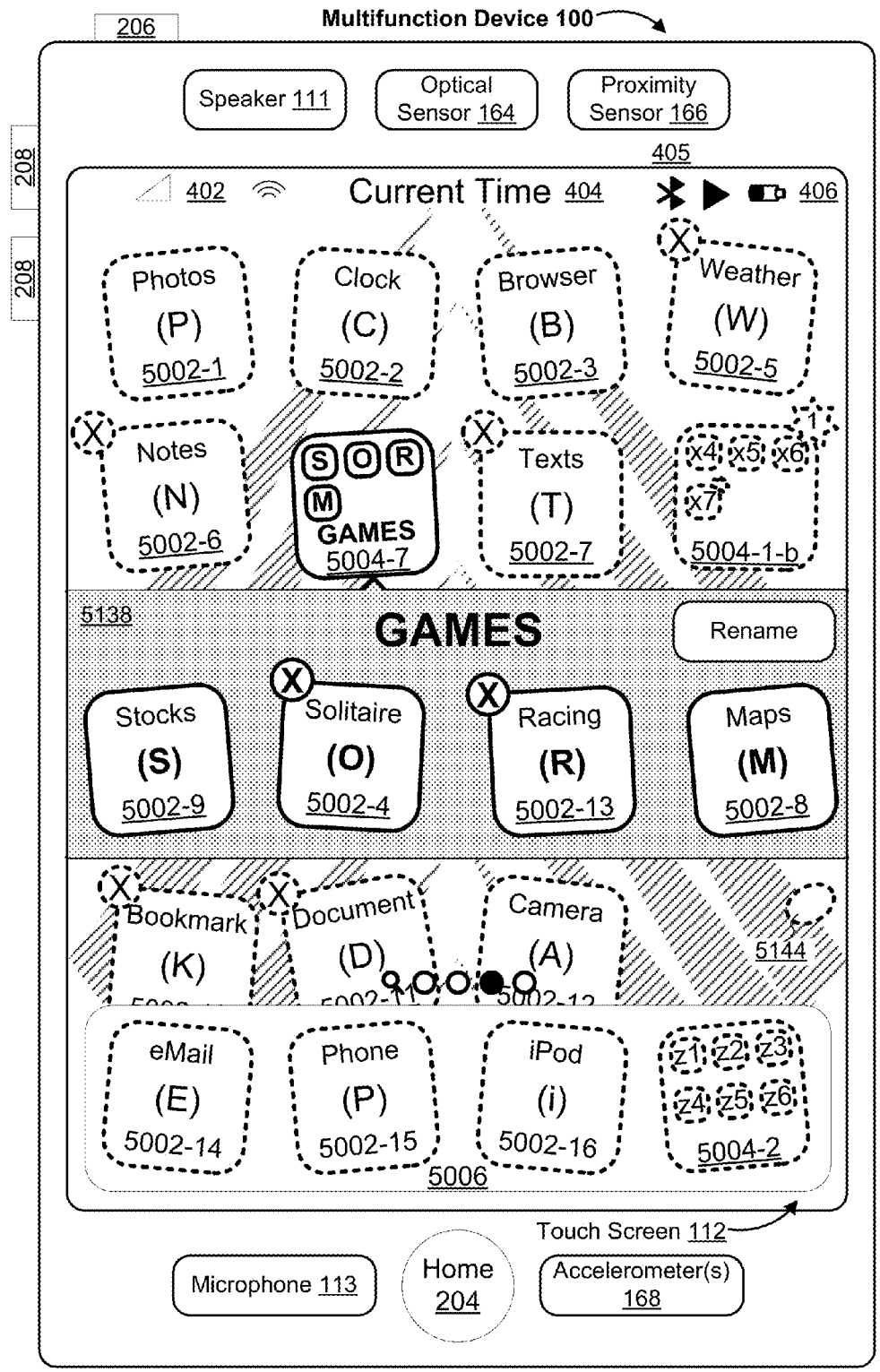
Figure 5V:
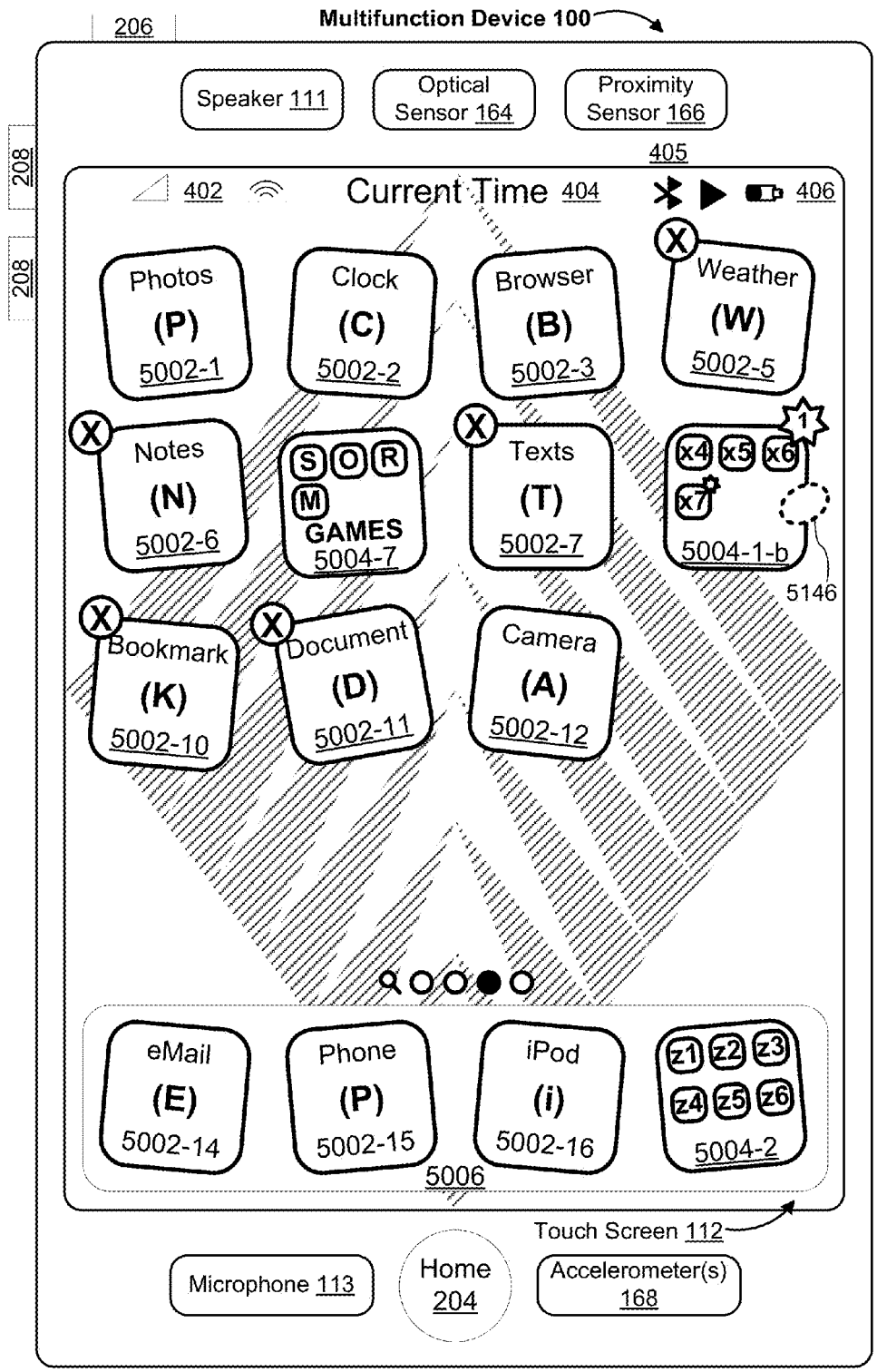
Figure 5W:
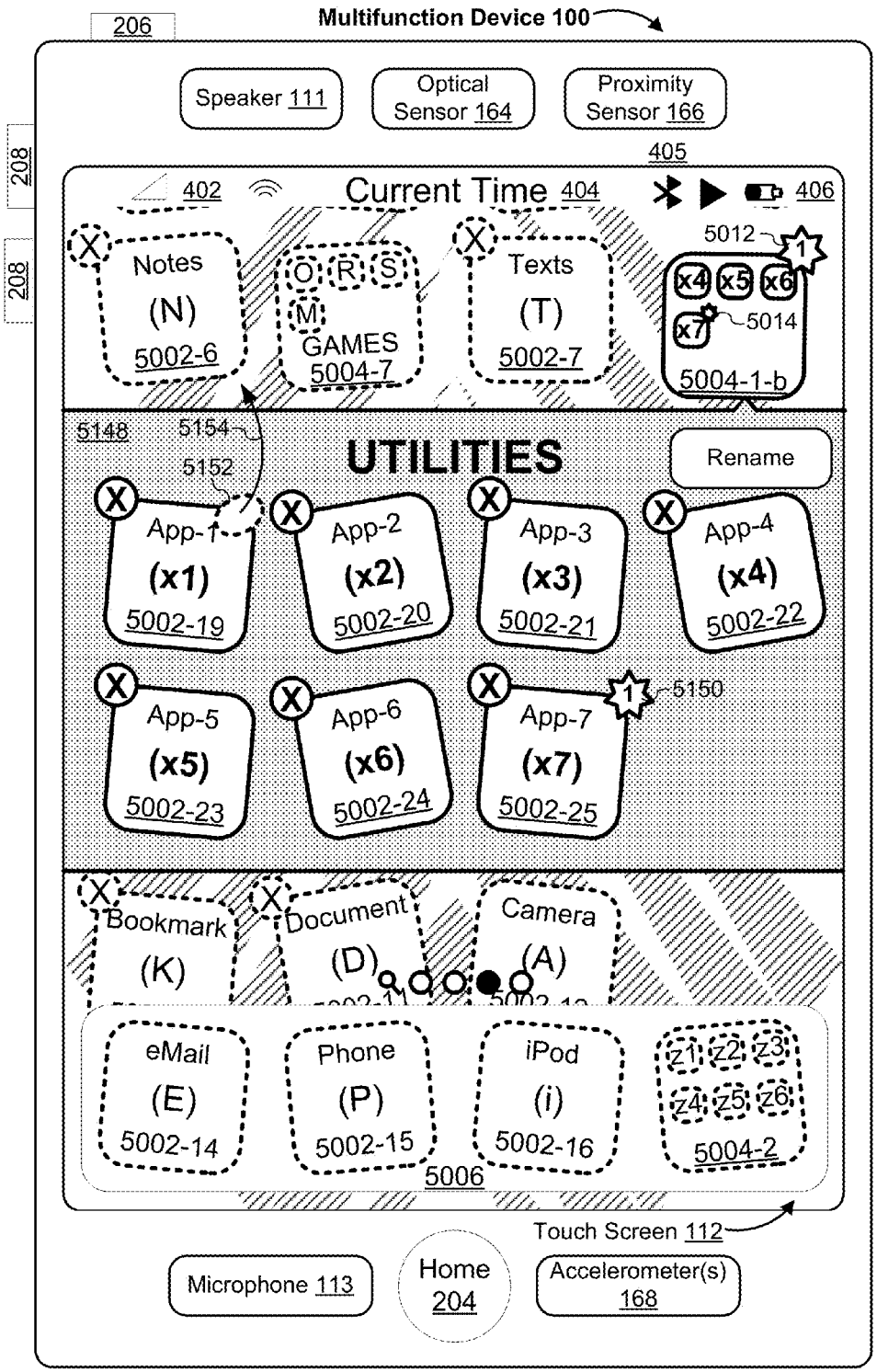
Figure 5X:
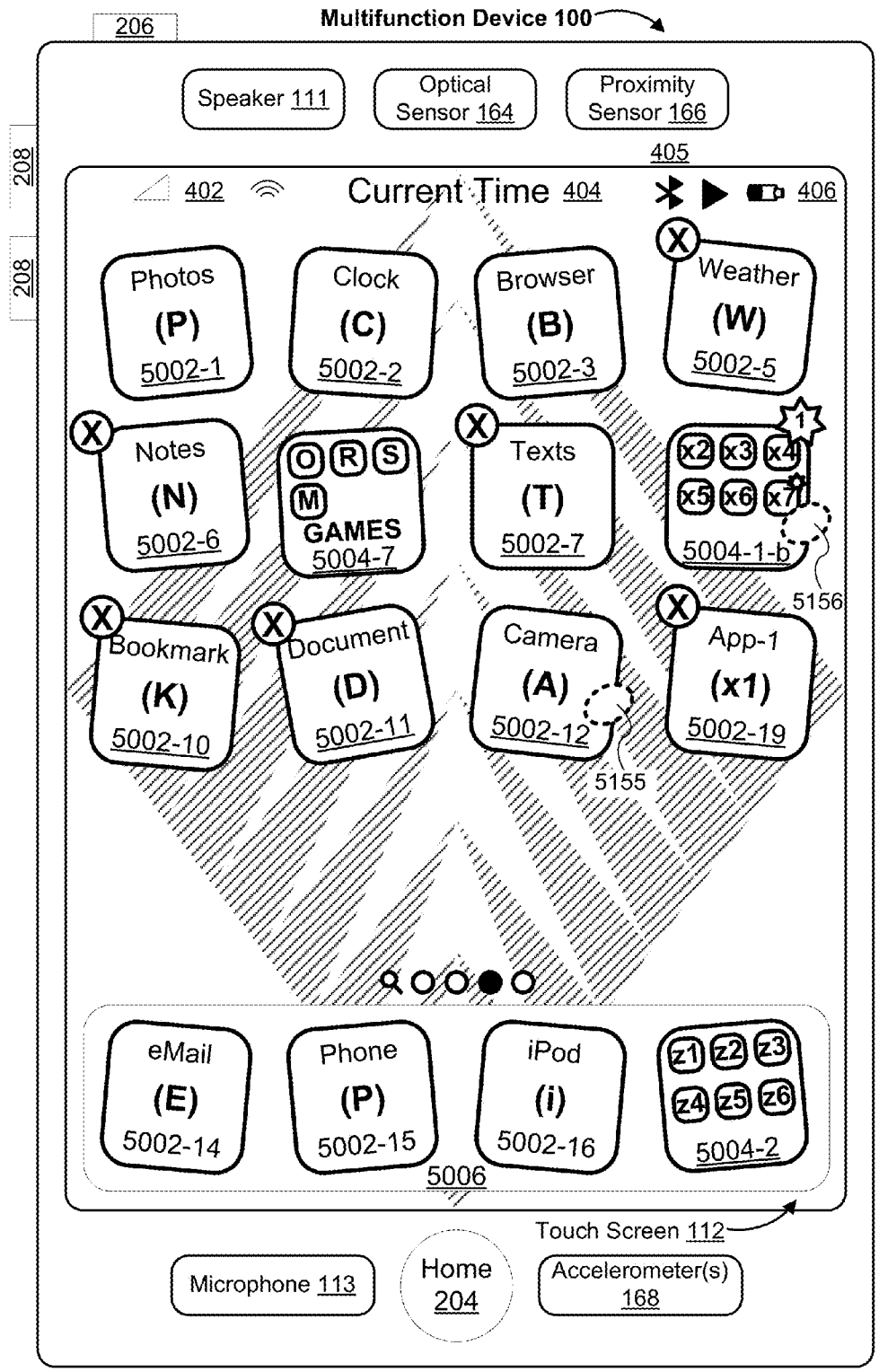
Figure 5Y:
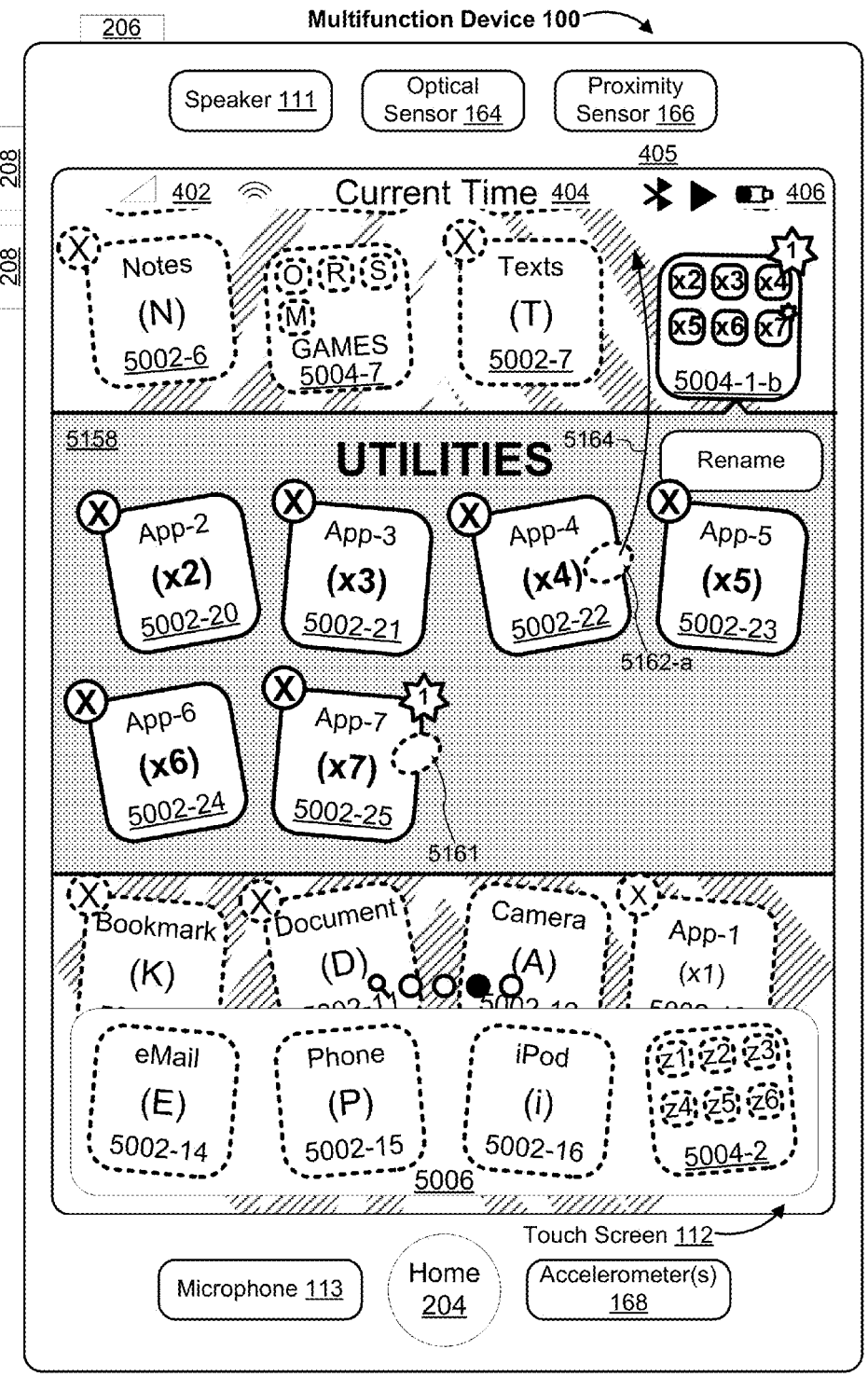
Figure 5Z:
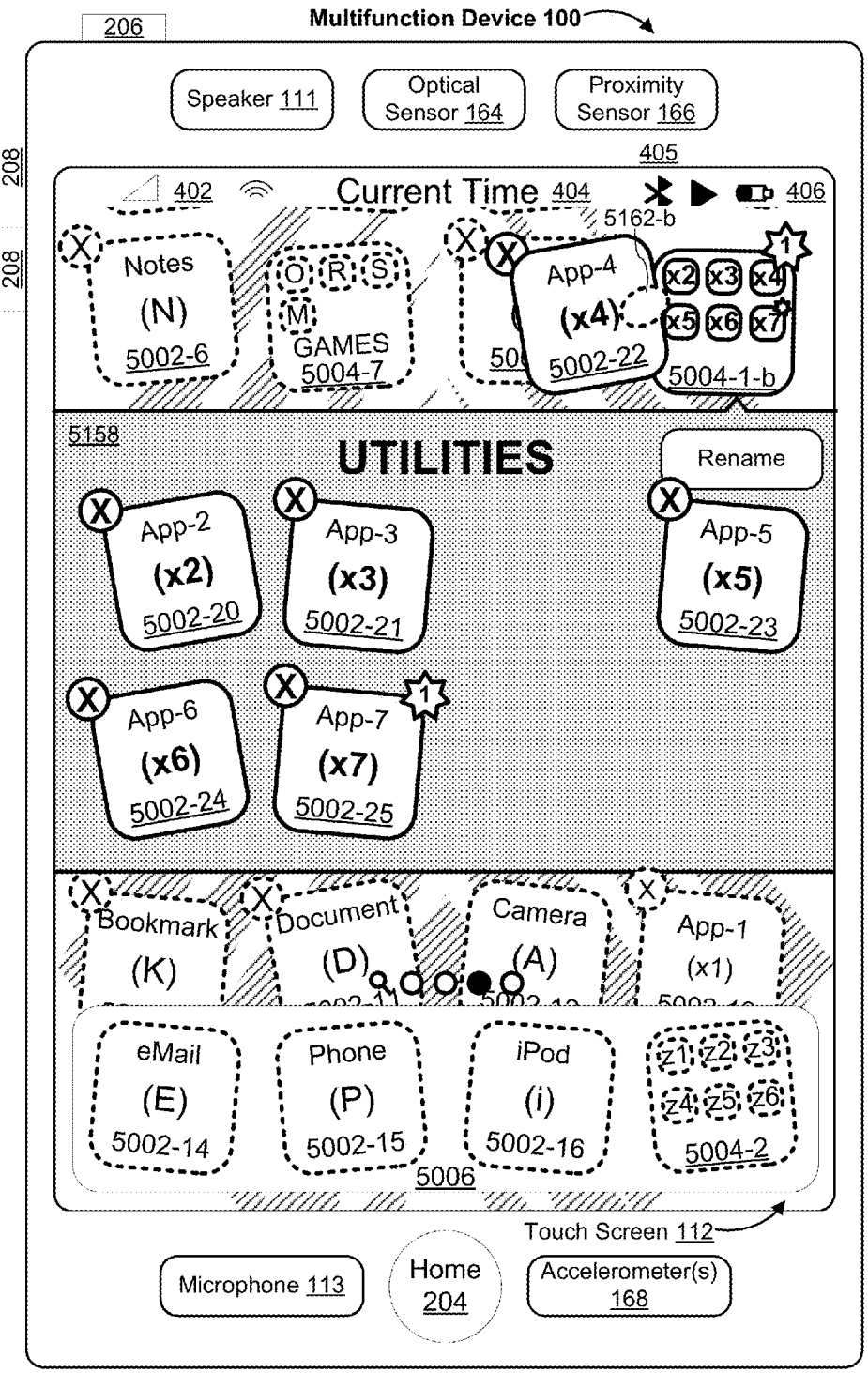
Figure 6A:
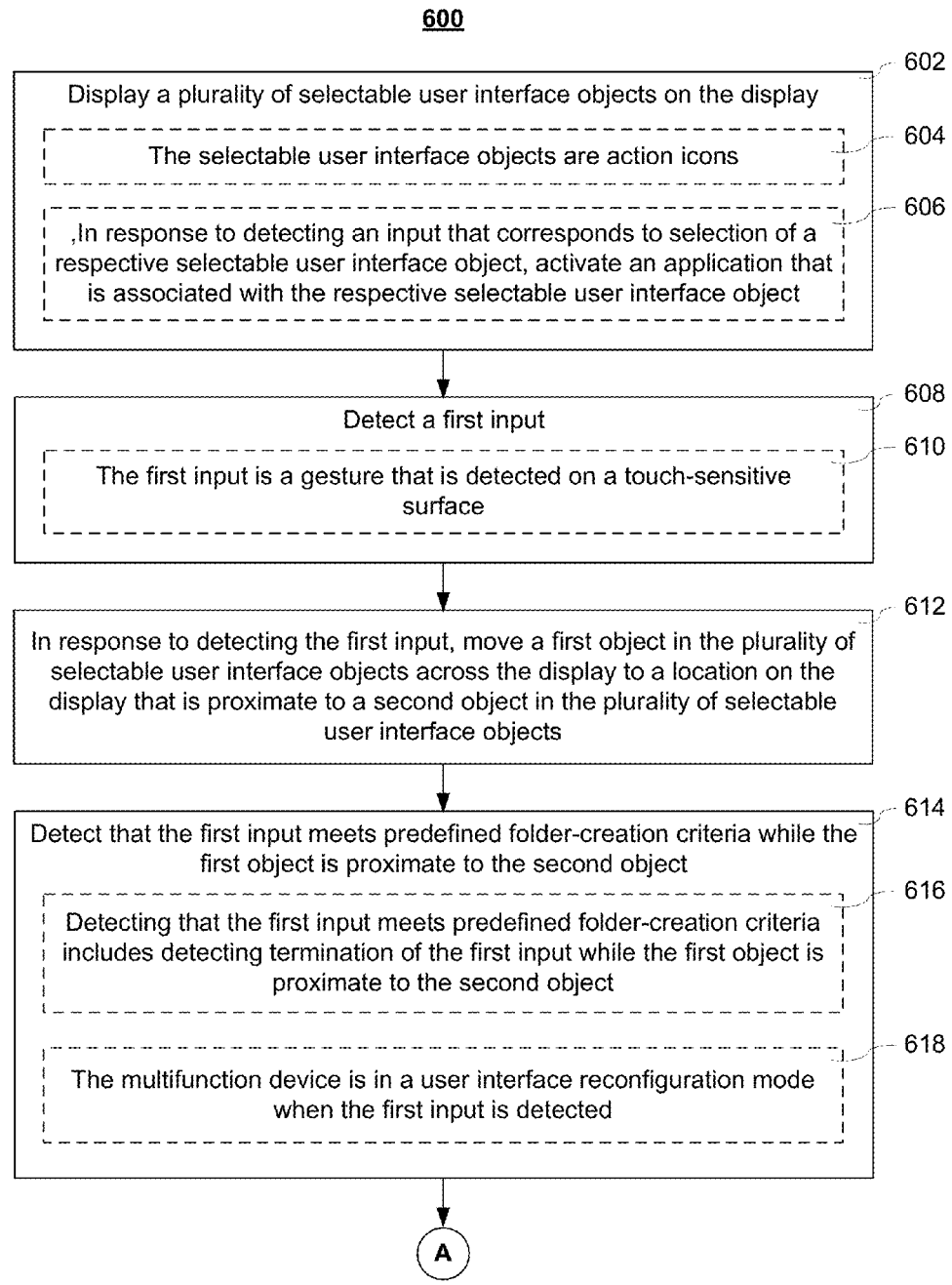
FIGS. 6A-6E are flow diagrams illustrating a method of creating a new folder in accordance with some embodiments.
Figure 6B:
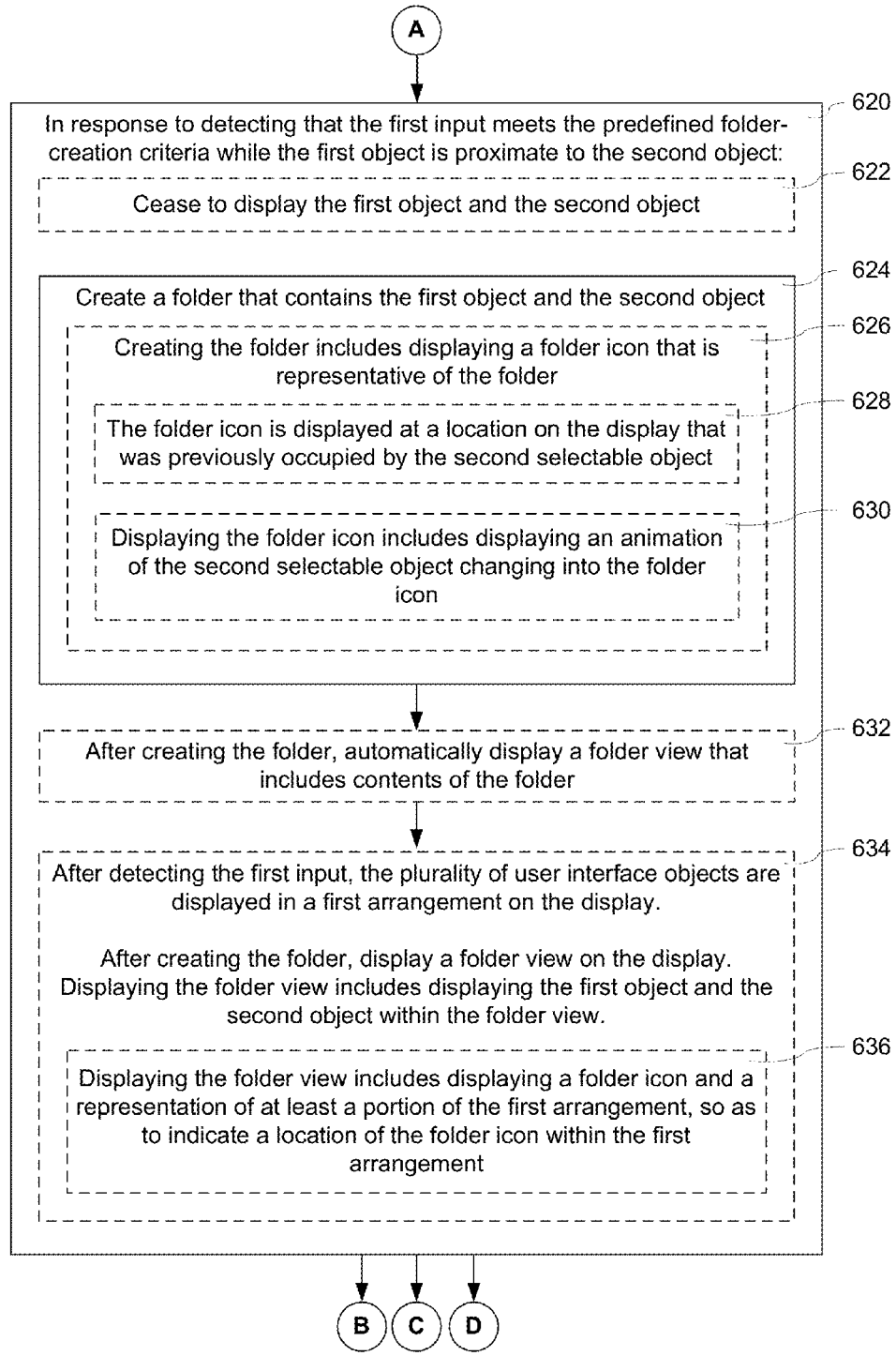
Figure 6C:
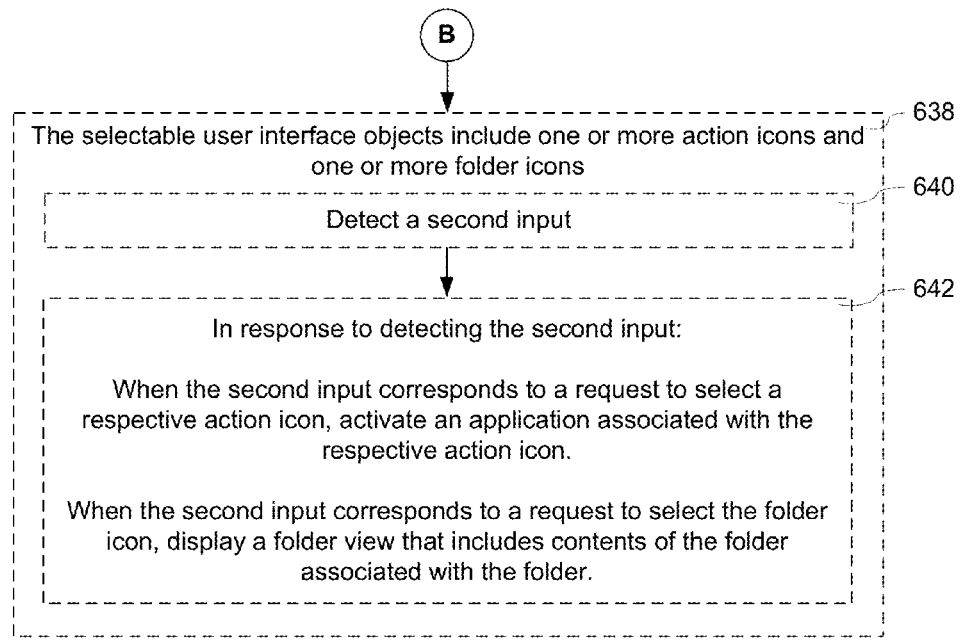
Figure 6D:
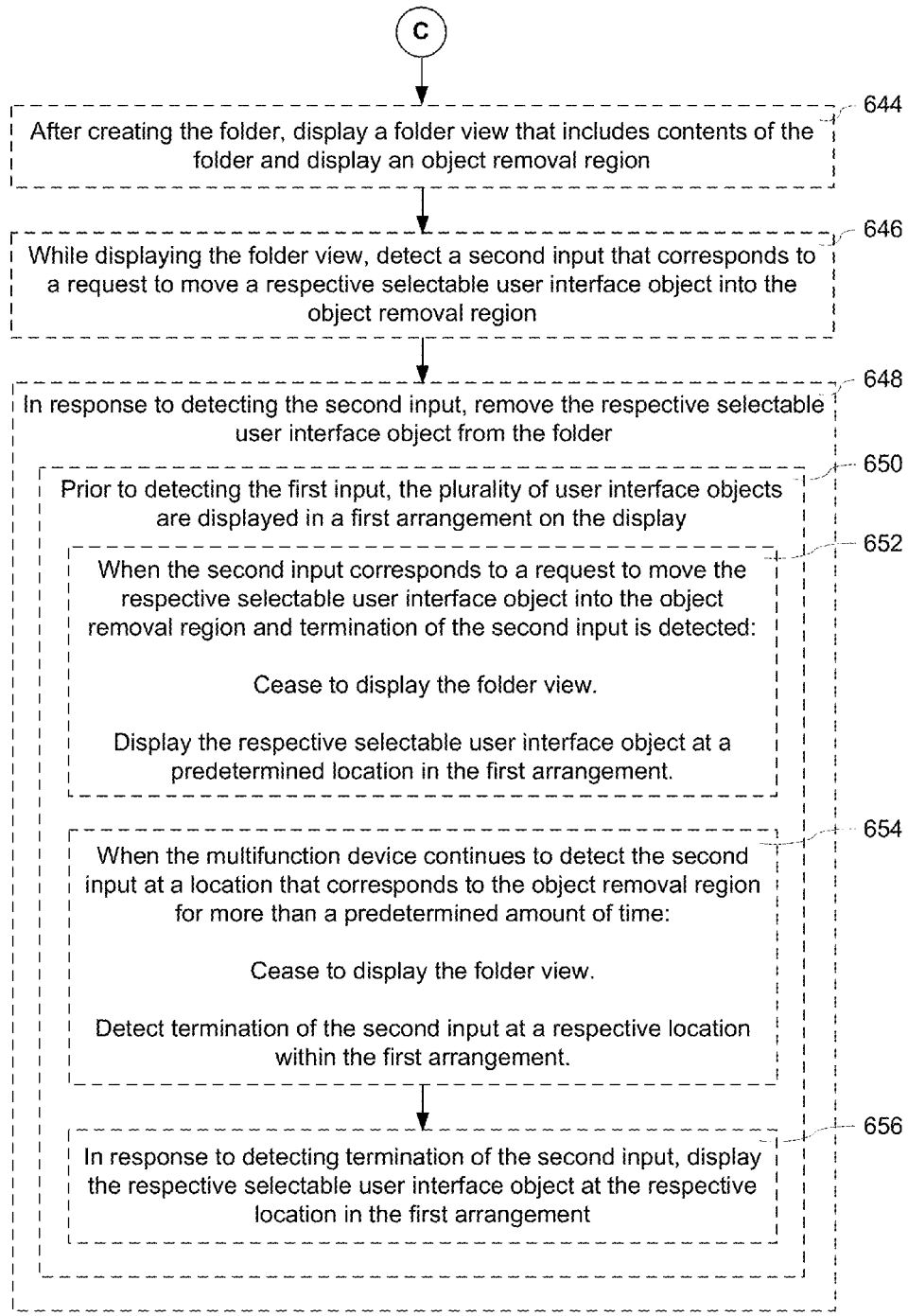
Figure 6E:
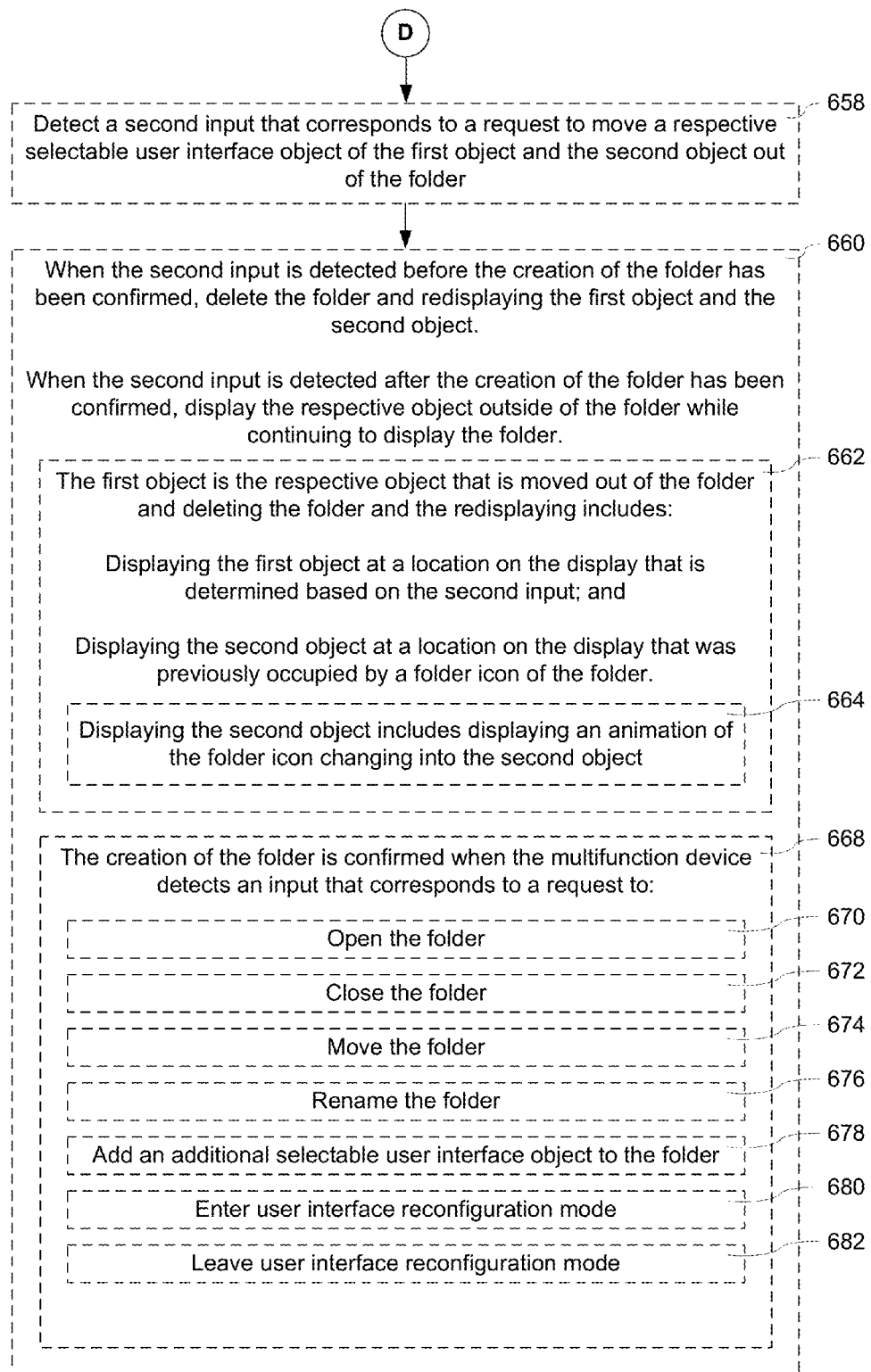

In some embodiments, while displaying the folder view, the device detects (646) a second input that corresponds to a request to move a respective selectable user interface object into the object removal region, and in response to detecting the second input, the device removes (648) the respective selectable user interface object from the folder. For example, in FIG. 5Y, the device detects a contact 5100-*a* at a location on the touch-sensitive surface (e.g., touch screen 112) that corresponds to the solitaire application icon 5002-4 and subsequent movement 5102 of the contact across the touch-sensitive surface (e.g., touch screen 112) into the object removal region 5084 that is the first portion of the display (e.g., touch screen 112). Continuing this example, in response to detecting this gesture, the device removes the solitaire application icon 5002-4 from the folder and from the folder view 5092, as illustrated in FIG. 5Z and returns the solitaire application icon 5002-4 to the first arrangement of selectable user interface objects, as illustrated in FIG. 5AA.

In some embodiment, prior to detecting the first input, the plurality of user interface objects are displayed (650) in a first arrangement on the display (e.g., touch screen 112), and when the second input corresponds to a request to move the respective selectable user interface object into the object removal region and termination of the second input is detected: the device ceases to display the folder view; and displays (652) the respective selectable user interface object at a predetermined location in the first arrangement (e.g., at an end of the first arrangement or at a first open location within the first arrangement). In other words, in some embodiments, the second input corresponds to a flick gesture that includes a contact at a location on the touch-sensitive surface that corresponds to a location of the respective selectable user interface object and includes a lateral movement on the touch-sensitive surface (e.g., touch screen 112) that corresponds to movement on the display (e.g., touch screen 112) towards a location of the touch-sensitive surface (e.g., touch screen 112) that corresponds to the object removal region on the display (e.g., touch screen 112). For example, in FIG. 5VV the device displays a first arrangement of selectable user interface objects (e.g., action icons 5002 and folder icons 5004), and in FIG. 5WW the device detects a gesture including a contact 5152 at a location on the touch-sensitive surface (e.g., touch screen 112) that corresponds to a location of the app-1 application icon 5002-19 on the display (e.g., touch screen 112) and movement 5154 of the contact to a location on the touch-sensitive surface (e.g., touch screen 112) that corresponds to a location on the display (e.g., touch screen 112) that is outside of a folder view 5148. In this example, in response to detecting the gesture, the device ceases to display the folder view and displays the app-1 application icon 5002-19 in the first arrangement, as illustrated in FIG. 5XX.

In some embodiments, prior to detecting the first input, the plurality of user interface objects are displayed (650) in a first arrangement on the display; when the device continues to detect the second input at a location on the touch-sensitive surface (e.g., touch screen 112) that corresponds to a location of the object removal region on the display (e.g., touch screen 112) for more than a predetermined amount of time: the device ceases to display the folder view; the device detects (654) termination of the second input at a respective location on the touch-sensitive surface (e.g., touch screen 112) that corresponds to a location on the display (e.g., touch screen 112) that is within the first arrangement; and in response to detecting termination of the second input, and the device displays (656) the respective selectable user interface object at the respective location in the first arrangement. In other words, in some embodiments, the second input corresponds to a tap and drag gesture that includes a contact moving into a region on the touch-sensitive surface (e.g., touch screen 112) that corresponds to the object removal region on the display (e.g., touch screen 112). For example, in FIG. 5XX the selectable user interface objects (e.g., action icons 5002 and folder icons 5004) are arranged in a first arrangement, and in FIG. 5YY the device detects a second input (e.g., the gesture including contact 5162 and movement 5164 of the contact on the touch screen 112) that corresponds to movement of the app-4 application icon 5002-22 out of the folder view 5158 into the object removal region 5084. In this example, in response to detecting a pause of the contact (e.g., 5162-b in FIG. 5ZZ) in the object removal region the device ceases to display the folder view 5158 and displays the first arrangement (e.g., as illustrated in FIG. 5AAA), and detects subsequent movement (e.g., 5166) of the contact within the first arrangement on the touch screen 112. In this example, when the device detects termination (e.g., liftoff of contact 5162-c from touch screen 112 in FIG. 5BBB), the device displays the app-4 application icon 5002-22 at a location in the first arrangement that corresponds to the location of the app-4 application icon 5002-22 when the termination of the input was detected, as illustrated in FIG. 5CCC.

In some embodiments, after creating the folder, the device detects (658) a second input that corresponds to a request to move a respective selectable user interface object of the first object and the second object out of the folder; and when the second input is detected before the creation of the folder has been confirmed, the device deletes (660) the folder and redisplays the first object and the second object. For example, in FIG. 5Y, the first input that the device detects after creating the folder is an input (e.g., contact 5100 and movement 5102 of the contact on the touch screen 112) that corresponds to a request to move the solitaire application icon 5002-4 out of the folder that was created by dragging the solitaire application icon 5002-4 on top of the racing application icon 5002-13. In this example, the input is received before creation of the folder has been confirmed, and thus, after the solitaire application icon 5002-4 has been moved out of the folder, the device deletes the folder 5004-7 in FIG. 5AA and redisplays the racing application icon 5002-13 on the display (e.g., touch screen 112), as illustrated in FIG. 5CC.

In some embodiments, the first object is the respective object that is moved out of the folder and deleting (662) the folder and the redisplaying includes: displaying the first object at a location on the display (e.g., touch screen 112) that is determined based on the second input; and displaying the second object at a location on the display (e.g., touch screen 112) that was previously occupied by a folder icon of the folder. Continuing the example described above with reference to FIGS. 5AA and 5CC, the device displays the folder icon 5004-7 in the fourth row on the left end of selectable user interface objects on the display (e.g., touch screen 112) in FIG. 5AA, and in FIG. 5CC the racing application icon 5002-13 has replaced the folder icon 5004-7 at the left end of the fourth row of selectable user interface objects. In some embodiments, displaying the second object includes displaying (664) an animation of the folder icon changing (e.g., morphing) into the second object. For example, in FIG. 5BB the device displays an animation 5104 the racing application icon 5002-13 expanding to fill the space previously occupied by the folder icon 5004-7 (e.g., as illustrated in FIG. 5AA).

In contrast, when the second input is detected after the creation of the folder has been confirmed, the device displays the respective object outside of the folder while continuing to display the folder. For example, when the creation of the folder has been confirmed, as illustrated in FIG. 5DD, removing a single application icon out from the folder (e.g., removing solitaire application icon 5002-4 in FIG. 5EE in response to detecting contact 5112 and movement 5114 of the contact), does not result in deleting the folder. Rather, in this example, the folder continues to be displayed (e.g., 5004-7 in FIG. 5FF). In other words, in some embodiments, after the folder creation is confirmed, the folder is only deleted when the last icon is removed, and when the last icon is removed, the folder collapses (e.g., rather than changing back to one of the action icons).

In some embodiments, the creation of the folder is confirmed (668) when the device detects an input that corresponds to a request to perform an action that manipulates the folder. Such actions include but are not limited to opening (670) the folder, closing (672) the folder, moving (674) the folder, renaming (676) the folder, adding (678) an additional selectable user interface object to the folder, entering (680) a user interface reconfiguration mode, leaving (682) a user interface reconfiguration mode. In some embodiments, the creation of the folder is confirmed when the device receives other predefined inputs that correspond to a request to manipulate the folder. In other words, creation of the folder is confirmed by actions that indicate that the creation of the folder was intentional and not accidental.

Note that details of other processes described herein with respect to methods 700, 800, 900, 1000, 1100, 1200 (e.g., FIGS. 7A-7C, 8A-8C, 9A-9B, 10A-10B, 11A-11C, 12A-12E and 5A-5PPP) are also applicable in an analogous manner to the method 600 described above. For example, the selectable user interface objects (e.g., action icons 5002 and folder icons 5004) described with reference to FIGS. 6A-6E may have one or more of the characteristics of the various selectable user interface objects/icons/items (e.g., action icons 5002 and folder icons 5004) described herein with reference to any of methods 700, 800, 900, 1000, 1100, or 1200. For brevity, these details are not repeated here.

Figure 7B:
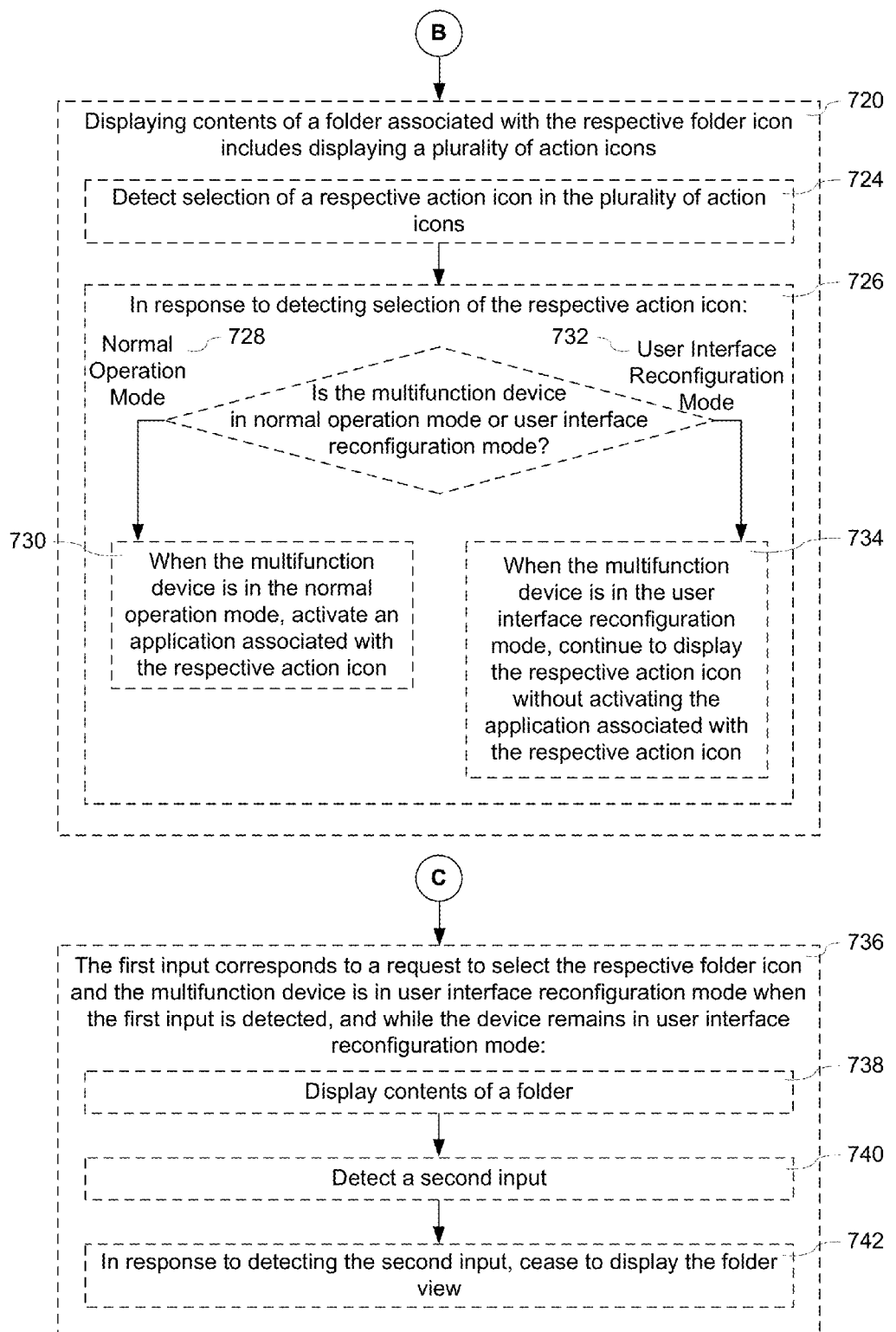
Figure 7C:
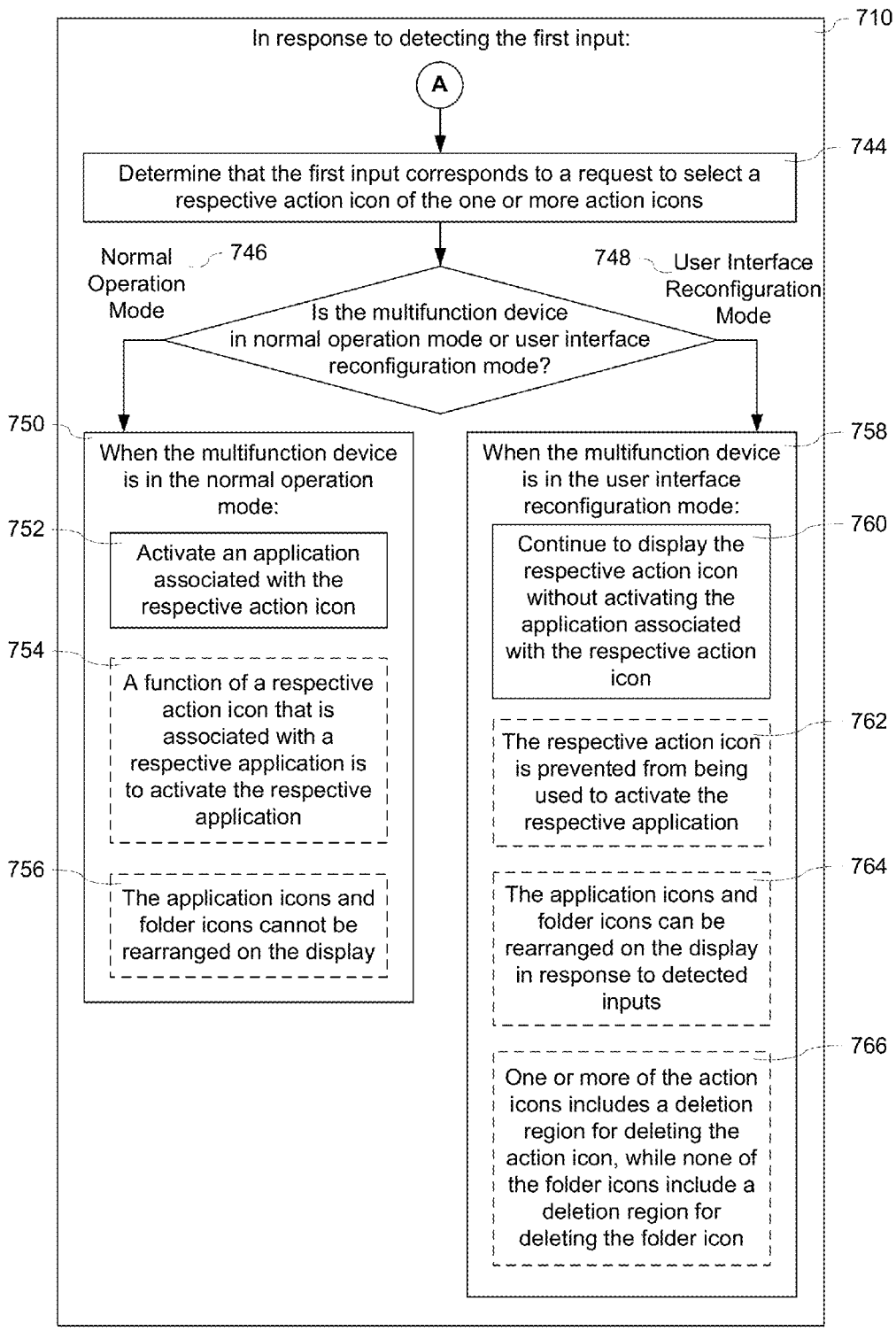

FIGS. 7A-7C are flow diagrams illustrating a method 700 of managing folder icons and action icons in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to manage folder icons and action icons. The method reduces the cognitive burden on a user when managing folder icons and action icons, thereby creating a more efficient human-machine interface. For battery-operated computing devices, enabling a user to manage folder icons and action icons faster and more efficiently conserves power and increases the time between battery charges.

The device concurrently displays (702) one or more action icons (e.g., application icons and other activatable icons besides folder icons) and one or more folder icons on the display. The device has a normal operation mode for activating applications (e.g., as illustrated in FIGS. 5A, 5L, 5OOO-5PPP) and a user interface reconfiguration mode for rearranging the action icons and the folder icons on the display (e.g., as illustrated in FIGS. 5B-5K, 5M-5N, 5P-5NNN). In some embodiments, while the device is in the user interface reconfiguration mode, the selectable user interface objects (e.g., action icons 5002 and folder icons 5004) oscillate about respective average positions so as to indicate that the device is in user interface reconfiguration mode and that the selectable user interface objects (e.g., action icons 5002 and folder icons 5004) can be moved around the display.

The device detects (704) a first input (e.g., tap gesture 5155 in FIG. 5XX, tap gesture 5156 in FIG. 5XX, tap gesture 5208 in FIG. 5OOO, or tap gesture 5210 in FIG. 5OOO). In some embodiments, the first input corresponds to a request to select the respective folder icon when the first input is (706) a tap gesture at a location on a touch-sensitive surface (e.g., touch screen 112) that corresponds to a location of the respective folder icon on the display (e.g., tap gesture 5156 in FIG. 5XX at a location that corresponds to folder icon 5004-1-b, or tap gesture 5210 in FIG. 5OOO at a location that corresponds to folder icon 5004-7 on touch screen 112). In some embodiments, the first input corresponds to a request to select the respective action icon when the first input is (708) a tap gesture at a location on a touch-sensitive surface (e.g., touch screen 112) that corresponds to a location of the respective action icon on the display (e.g., tap gesture 5155 in FIG. 5XX at a location that corresponds to camera application icon 5002-12, or tap gesture 5208 in FIG. 5OOO, at a location that corresponds to photos application icon 5002-1 on the touch screen 112).

Operations 712-718 and 744-766 are performed (710) in response to detecting the first input.

In some embodiments the device determines whether the first input is a request to select a folder to select an action icon. When the first input is a request to select (712) an action icon, the device performs operations discussed in greater detail below with reference to operations 744-766. In contrast, when the when the first input is a request to select (714) an action icon, the device performs operations discussed in greater detail below with reference to operations 716-742.

When the device determines that (716) the first input corresponds to a request to select a respective folder icon of the one or more folder icons, the device displays (718) contents of a folder associated with the respective folder icon without regard for whether the device is in the normal operation mode or the user interface reconfiguration mode. For example, in FIG. 5XX the device detects a tap gesture 5156 at a location that corresponds to folder icon 5004-1-b while the device is in user interface reconfiguration mode, and in response to detecting the tap gesture 5156, the device displays a folder view 5158 for the folder associated with the folder icon 5004-1-b, as illustrated in FIG. 5YY. Similarly, in FIG. 5OOO the device detects a tap gesture 5210 at a location that corresponds to folder icon 5004-7 while the device is in normal operation mode, and in response to detecting the tap gesture 5210, the device displays a folder view 5212 for the folder associated with the folder icon 5004-7, as illustrated in FIG. 5PPP.

In some embodiments, while the device is in user interface reconfiguration mode, the folder icon can also be moved in response to a folder repositioning input. For example, in FIG. 5QQ the device detects a contact 5132 at a location on the touch-sensitive surface (e.g., touch screen 112) that corresponds to a location of a folder icon 5004-7 on the display (e.g., touch screen 112) and subsequent movement 5134 of the contact across the touch-sensitive surface (e.g., touch screen 112). In response to detecting the input, the device moves the folder icon 5004-7 to a location within the arrangement of selectable user interface objects on the display (e.g., touch screen 112) that is determined based on the input, as illustrated in FIG. 5SS. In some embodiments, folder icons cannot be repositioned while the device is in the normal operation mode. In other words, an identical gesture performed while the device is in normal operation mode would not cause the device to reposition the folder icon within the arrangement of selectable user interface objects.

In some embodiments, displaying contents of a folder associated with the respective folder icon includes displaying (720) a plurality of action icons (e.g., in FIG. 5YY the device displays action icons 5002-20, 5002-21, 5002-21, 5002-22, 5002-23, 5002-24, and 5002-25 in folder view 5158, or in FIG. 5PPP the device displays action icons 5002-9, 5002-4, 5002-13, 5002-8 in folder view 5212). In some of these embodiments, the device detects (724) selection of a respective action icon in the plurality of action icons. In some of these embodiments, operations 728-734 are performed (726) in response to detecting selection of the respective action icon. In some embodiments the device determines whether the device is in normal operation mode or user interface reconfiguration mode. In some of these embodiments, when the device is (728) in the normal operation mode, the device activates (730) an application associated with the respective action icon (e.g., in FIG. 5PPP when the device detects a tap gesture 5214 at a location that corresponds to a stocks application icon 5002-9 and in response the device activates a stocks application associated with the stocks application icon 5002-9); and, when the device is (732) in the user interface reconfiguration mode, the device continues (734) to display the respective action icon without activating the application associated with the respective action icon. For example, in FIG. 5YY, the device detects a tap gesture 5161 at a location on the touch-sensitive surface (e.g., touch screen 112) that corresponds to a location of an app-7 application icon 5002-

25 on the display (e.g., touch screen 112), and in response the device does not activate any application associated with the app-7 application icon 5002-25.

In some embodiments, the action icon within the folder is moved in response to an action icon movement input while the device is in user interface reconfiguration mode. For example, in FIG. 5TT, while the device is in user interface reconfiguration mode, the device detects an action icon movement input including contact 5140 at a location on the touch-sensitive surface (e.g., touch screen 112) that corresponds to a location of a stocks application icon 5002-9 on the display (e.g., touch screen 112) and subsequent movement 5142 of the contact to a location on the touch-sensitive surface (e.g., touch screen 112) that corresponds to a location on the display (e.g., touch screen 112) that is within the folder view 5138, as illustrated in FIG. 5TT. In response to the action icon movement input, the device moves the stock application icon 5002-9 into a new position in the arrangement of selectable user interface objects within the folder view 5138 that is based on the movement of the input on the touch-sensitive surface (e.g., touch screen 112), as illustrated in FIG. 5UU.

In some embodiments, the first input corresponds to a request to select the respective folder icon; and the device is in user interface reconfiguration mode when the first input is detected. In some of these embodiments, while remaining (736) in user reconfiguration mode the device displays (738) contents of a folder. In some of these embodiments, after displaying contents of the folder the device detects (740) a second input; and in response to detecting the second input, the device ceases (742) to display the folder view. For example, in FIG. 5SS the device detects a first input (e.g., tap gesture 5136) at a location on the touch-sensitive surface (e.g., touch screen 112) that corresponds to a folder icon 5004-7, and in response to detecting the tap gesture, the device displays a folder view (e.g., 5138 in FIGS. 5TT-5UU) that includes contents (e.g., action icons 5002-9, 5002-4, 5002-13, and 5002-8) of the folder associated with the folder icon 5004-7 on the display (e.g., touch screen 112). While displaying the folder view 5138, the device detects a second input (e.g., tap gesture 5144) at a location on the touch-sensitive surface (e.g., touch screen 112) that is outside of the folder view 5138 (e.g., a tap gesture that is located in the region of the touch screen 112 below the folder view), and in response to detecting the second input the device ceases to display the folder view on the display (e.g., touch screen 112), as illustrated in FIG. 5VV.

The device determines (744) that first input corresponds to a request to select a respective action icon of the one or more action icons (e.g., tap gesture 5155 in FIG. 5XX at a location that corresponds to camera application icon 5002-12, or tap gesture 5208 in FIG. 5OOO, at a location that corresponds to photos application icon 5002-1). In some embodiments the device determines whether the device is in normal operation mode or user interface reconfiguration mode. When the device is (746) in normal operation mode, in response to detecting the first input the device performs operations 750-756 as discussed in greater detail below. In contrast, when the when the device is (748) in user interface reconfiguration mode, in response to detecting the first input, the device performs, operations 758-766, as discussed in greater detail below.

In some embodiments, operations 752-756 are performed when the device is (750) in the normal operation mode. The device activates (752) an application associated with the respective action icon. For example, in FIG. 5OOO the device detects a tap gesture 5208 at a location on the touch-sensitive surface (e.g., touch screen 112) that corresponds to a location of a photos application icon 5002-1 on the display (e.g., touch screen 112) and in response to detecting the tap gesture 5208 the device activates a photos application that is associated with the photos application icon 5002-1. In some embodiments, while the device is in the normal operation mode, a function of a respective action icon that is associated with a respective application is to activate (754) the respective application (e.g., the action icon is an application launch icon); and while in normal operation mode, the application icons and folder icons cannot be rearranged (756) on the display (e.g., the relative positions of selectable user interface objects within the arrangement of selectable user interface objects is fixed). It should be understood that, although the arrangement of selectable user interface objects may be scrolled, paged through, or otherwise translated across the display (e.g., touch screen 112), these operations do not entail any rearrangement of the selectable user interface objects, because the relative positions of respective selectable user interface objects to each other remains unchanged when the device performs these operations.

Operations 760-766 are performed when (758) the device is in the user interface reconfiguration mode. The device continues (760) to display the respective action icon without activating the application associated with the respective action icon. For example, in FIG. 5XX the device detects a tap gesture 5155 at a location that corresponds to a camera application icon 5002-12 and in response to detecting the tap gesture 5155 the device does not activate a camera application that is associated with the photos application icon 5002-12, and merely continues to display the arrangement of selectable user interface objects as illustrated in FIG. 5XX. In some embodiments, the action icon can also be moved by a tap and drag gesture. For example, in FIG. 5XX if the device were to detect subsequent movement of the contact 5155 across the touch-sensitive surface (e.g., touch screen 112), the device would, in response to detecting the movement, move the action icon 5002-12 across the display (e.g., touch screen 112) in accordance with the movement.

In some embodiments, while the device is in the user interface reconfiguration mode, the respective action icon is prevented (762) from being used to activate the respective application (e.g., a request to select the camera application icon 5002-12 fails to activate the application icon). In some embodiments, when the device is in the user reconfiguration mode, one or more of the action icons includes (764) a deletion region for deleting the action icon, while none of the folder icons include a deletion region for deleting the folder icon. For example, the device displays object removal badges 5010 in FIG. 5B that are associated with a plurality of the action icons (e.g., 5002-4, 5002-5, 5002-6, 5002-7, 5002-10, 5002-11, and 5002-13) but does not show object removal badges associated with any of the folder icons (e.g., 5004-1-b or 5004-2). In some embodiments, the device detects a deletion input that includes selection of a respective deletion region for a respective action icon (e.g., tap gesture 5011 in FIG. 5B); and deletes the respective action icon (e.g., weather application icon 5002-5). In some embodiments one or more of the action icons do not include deletion regions. For example in FIG. 5B a plurality of the action icons (e.g., action icons 5002-1, 5002-2, 5002-3, 5002-9, 5002-12, 5002-14, 5002-15, and 5002-16) are associated with applications (e.g., phone, email, camera, web browser) that provide access to fundamental features of the device and thus cannot be deleted by the device while in user interface reconfiguration mode. In some embodiments, while in user interface reconfiguration mode, the application icons and folder icons can be rearranged (766) on the display (e.g., touch screen 112) in response to detected inputs, as described in greater detail above.

Note that details of other processes described herein with respect to methods 600, 800, 900, 1000, 1100, 1200 (e.g., FIGS. 6A-6E, 8A-8C, 9A-9B, 10A-10B, 11A-11C, 12A-12E and 5A-5PPP) are also applicable in an analogous manner to the method 700 described above. For example, the selectable user interface objects (e.g., action icons 5002 and folder icons 5004) described with reference to FIGS. 7A-7C may have one or more of the characteristics of the various selectable user interface objects/icons/items (e.g., action icons 5002 and folder icons 5004) described herein with reference to any of methods 600, 800, 900, 1000, 1100, or 1200. For brevity, these details are not repeated here.

Figure 8A:
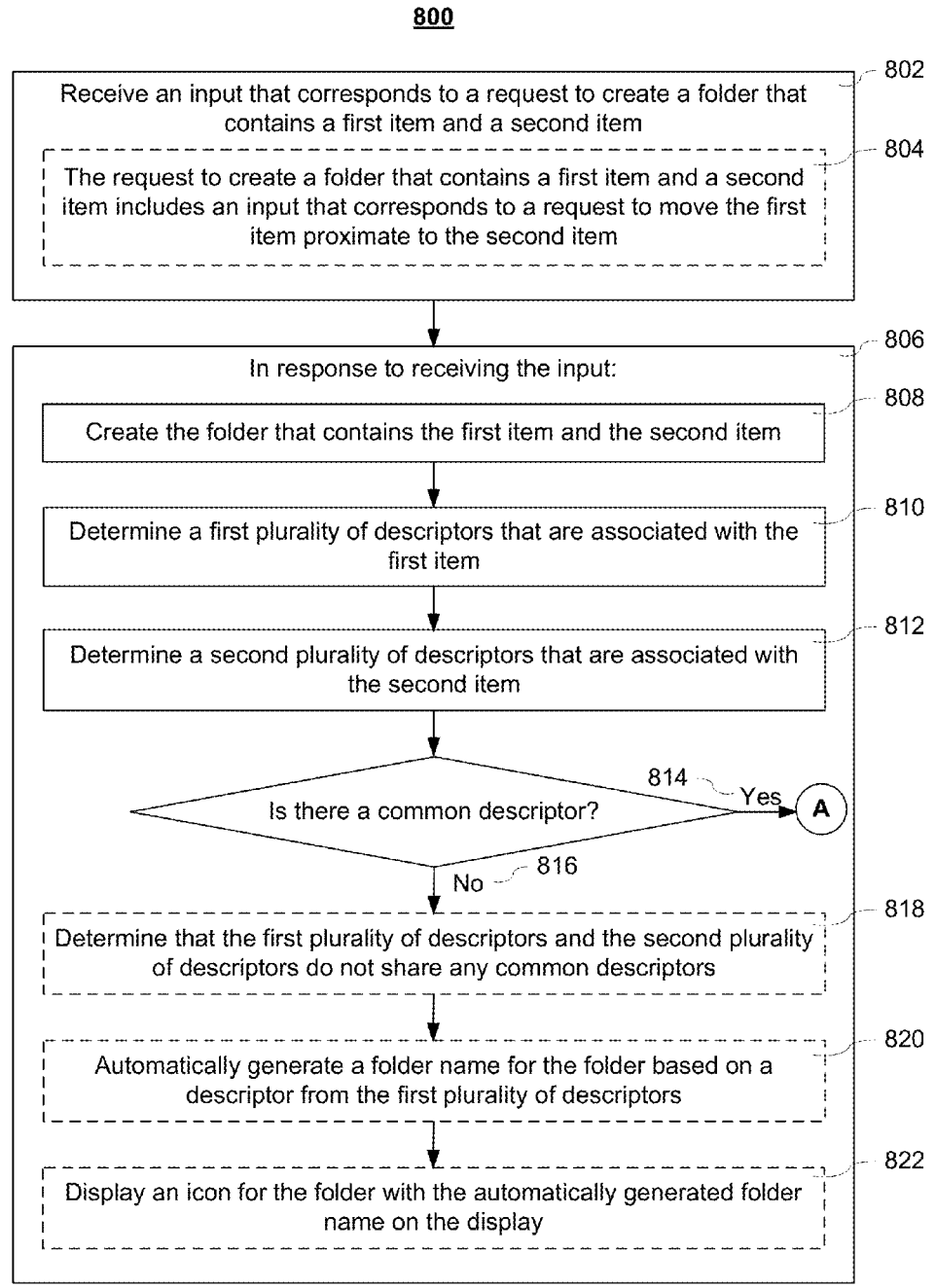
FIGS. 8A-8C are flow diagrams illustrating a method of naming a new folder in accordance with some embodiments.
Figure 8B:
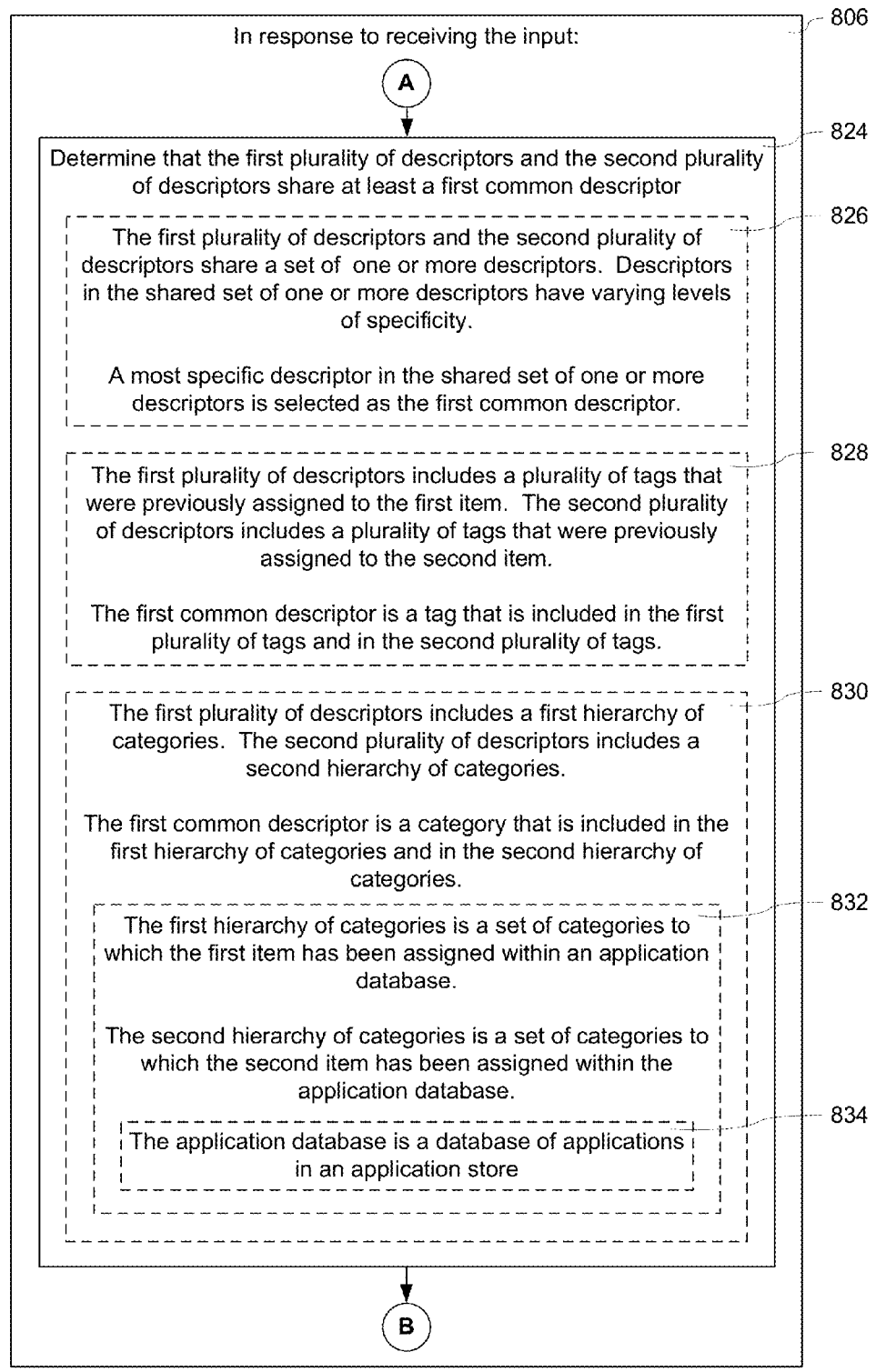
Figure 8C:
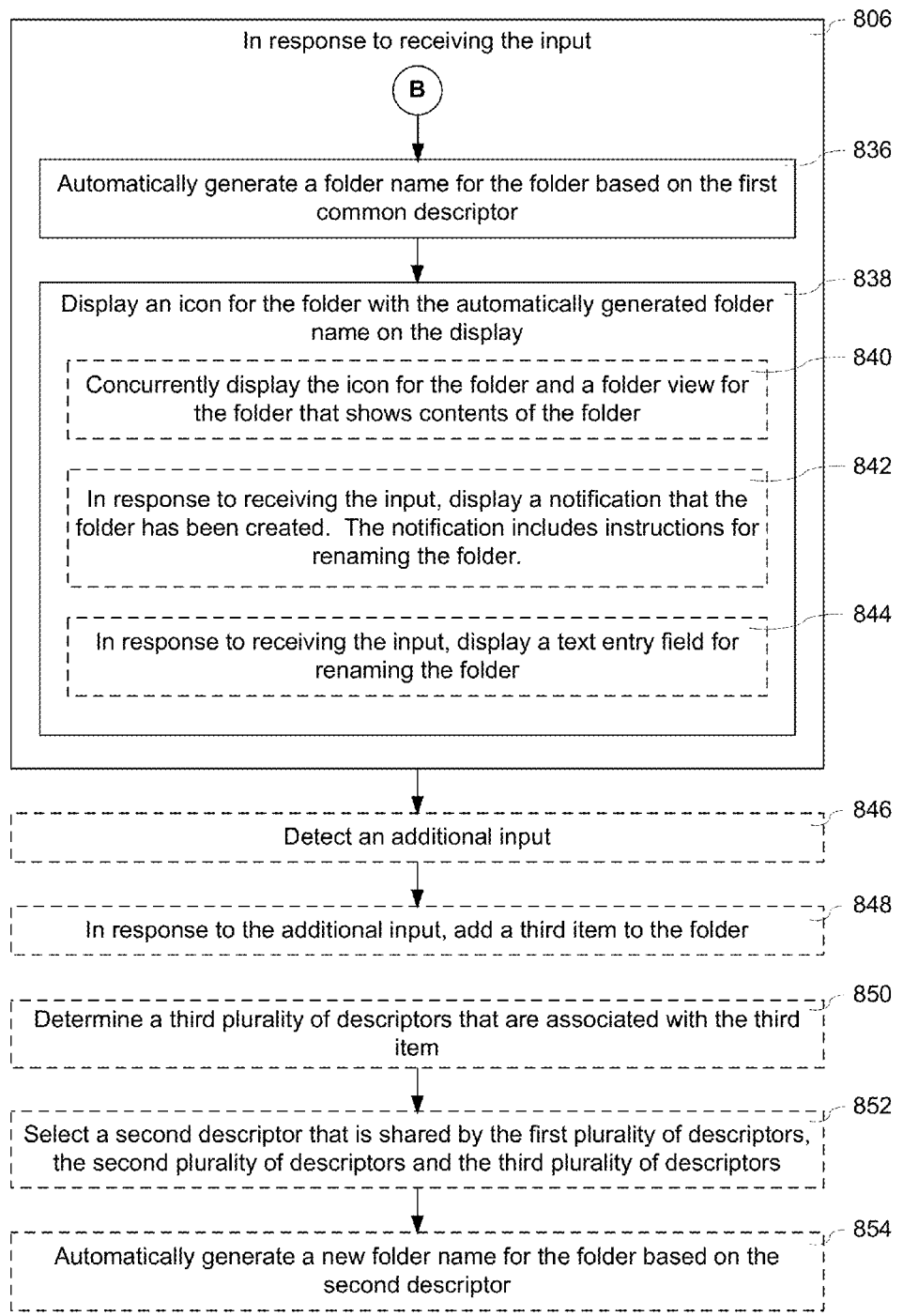

FIGS. 8A-8C are flow diagrams illustrating a method 800 of naming a new folder in accordance with some embodiments. The method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to name a new folder. The method reduces the cognitive burden on a user when naming a new folder, thereby creating a more efficient human-machine interface. For battery-operated computing devices, enabling a user to name a new folder faster and more efficiently conserves power and increases the time between battery charges.

The device receives (802) an input that corresponds to a request to create a folder that contains a first item and a second item (e.g., the items may be applications, software programs, or files that correspond to icons or other selectable user interface objects on the display). In some embodiments, the folder initially contains just the first item and the second item (i.e., the first item and the second item are the first two items in the folder). In some embodiments, the request to create a folder that contains a first item and a second item includes (804) an input that corresponds to a request to move the first item proximate to the second item or a request to drag a first item on top of a second item (e.g., as described in greater detail above with reference method 600). For example, in FIG. 5M the device detects a contact 5040 at a location on the touch-sensitive surface (e.g., a first contact location 5040-*a* on touch screen 112 in FIG. 5M) that corresponds to a location of a solitaire application icon 5002-4 on the display (e.g., touch screen 112) and subsequent movement 5042 of the contact across the touch-sensitive surface (e.g., movement of the contact across the touch screen 112 to a second location 5040-*b* in FIG. 5N). In response to detecting the input the device moves the solitaire application icon 5002-4 proximate to (or on top of) a racing application icon 5002-13, as illustrated in FIG. 5N. In this example, the device detects a pre-determined folder creation criteria (e.g., termination of the contact 5040-*b* in FIG. 5N) and creates a folder including the solitaire application icon 5002-4 and the racing application icon 5002-13, and displays a folder icon 5004-7 for the folder, on the display (e.g., touch screen 112) as illustrated in FIGS. 5O and 5S. As another example, the device could receive a first input selecting a first item, a second input selecting a second item and a third input corresponding to a command to perform a new folder creation operation (e.g., a click on a "new folder" command in a file browser or a contextual menu, etc.).

Operations 808-844 are performed (806) in response to receiving the input. The device creates (808) the folder that contains the first item and the second item. The device determines (810) a first plurality of descriptors that are associated with the first item (e.g., "Game," "Card Game" "Solitaire Game"). The device also determines (812) a second plurality of descriptors that are associated with the second item (e.g., "Game," "Action Game," "Racing Game"). In some embodiments, the device determines whether there is a common descriptor that is shared by the first plurality of descriptors and the second plurality of descriptors. Continuing the example, from above, both the solitaire application and the racing application are associated with the common descriptor "Game." When there is (814) a common descriptor, the device performs operations 824-844, as described in greater detail below.

In some embodiments, when there is not (816) a common descriptor, the device determines that the first plurality of descriptors and the second plurality of descriptors do not (818) share any common descriptors: the device automatically generates (820) a folder name for the folder based on a descriptor from the first plurality of descriptors; and displays (822) an icon for the folder with the automatically generated folder name on the display. In other words, the folder name for the folder is determined based on descriptors of only one of the two items that are initially added to the folder. In some embodiments the descriptors are descriptors of a first item selected to be added to the folder (e.g., if more than one item is selected before the folder has been created). In some embodiments, the descriptors are descriptors of a first item added to the folder. For example, in FIG. 5O, the camera application that is associated with the camera application icon 5002-12 is associated with descriptors such as "Photography" and "Camera Management," while the stocks application that is associated with the stocks application icon 5002-9 has descriptors such as "Utilities," and "Financial Management." In this example, the two application icons are associated with applications do not share any descriptors. Thus, in this example, the folder created by dragging the camera application icon 5002-12 proximate to the stocks application icon 5002-9 is named the "Photography" folder 5004-10, while the folder created by dragging the stocks application icon 5002-9 proximate to the camera application icon 5002-12 is named the "Utilities" folder 5004-11. In other words, in some embodiments, when the two items do not share any common descriptors are used to create a folder, the name of the resulting folder depends on an order in which the items (e.g., the icons associated with the applications) are selected.

When the device determines (824) that the first plurality of descriptors and the second plurality of descriptors share at least a first common descriptor. For example, in FIG. 5O, the solitaire application that is associated with the solitaire application icon 5002-4 is associated with descriptors such as "Game," "Card Game" "Solitaire Game," while the racing application that is associated with the racing application icon 5002-13 has descriptors such as "Game," "Action Game," "Racing Game." In this example, the two application icons are associated with applications that share only a single descriptor (e.g., "Game") and thus that descriptor is selected as the common descriptor. In some embodiments, the first plurality of descriptors and the second plurality of descriptors share a set of one or more descriptors; descriptors in the shared set of one or more descriptors have varying levels of specificity; and a most specific descriptor in the shared set of one or more descriptors is selected (826) by the device as the first common descriptor. For example, in FIG. 5O, the car race application that is associated with the car race application icon 5002-17 is associated with descriptors such as "Game," "Action Game" "Racing Game," while the air race application that is associated with the racing application icon 5002-18 has descriptors such as "Game," "Action Game," "Racing Game." In this example, the two application icons are associated with applications that share multiple descriptor (e.g., "Game") and thus the most specific descriptor (e.g., "Racing Game") is selected as the common descriptor.

In some embodiments, the first plurality of descriptors includes a plurality of tags that were previously assigned to the first item; the second plurality of descriptors includes a plurality of tags that were previously assigned to the second item; and the first common descriptor is (828) a tag that is included in the first plurality of tags and in the second plurality of tags. In some embodiments, the tags are assigned by a user of the device to respective items, and apply only to locally stored items. In some embodiments, the tags are assigned at a remote server and are sent to the device by the remote server.

In some embodiments, the first plurality of descriptors includes a first hierarchy of categories; the second plurality of descriptors includes a second hierarchy of categories; and the first common descriptor is (830) a category that is included in the first hierarchy of categories and in the second hierarchy of categories (e.g., "Games">"Card Game">"Solitaire Game" or "Games">"Action Game">"Racing Game"). In some embodiments, the first hierarchy of categories is (832) a set of categories to which the first item has been assigned within an application database (e.g., a database of applications in an application store), and the second hierarchy of categories is a set of categories to which the second item has been assigned within the application database. In some embodiments, the application database is (834) a database of applications in an application store. For example, in some embodiments, the descriptors are based at least in part on the category names for applications in a dedicated application store for a mobile device (e.g., the App Store for the Apple iPhone). In some embodiments these category names are supplemented by additional tags that indicate additional information about the items (e.g., a name of a creator of the item, a date/time of creation of the item, etc.).

When the first plurality of descriptors and the second plurality of descriptors share at least a first common descriptor, the device automatically generates (836) a folder name for the folder based on the first common descriptor. After generating the folder name, the device displays (838) an icon for the folder with the automatically generated folder name on the display. Continuing the example from above, the folder created by dragging the solitaire application icon 5002-4 proximate to the racing application icon 5002-13 is named the "Games" folder 5004-7, as illustrated in FIGS. 5O and 5S.

In some embodiments, the device concurrently displays (840) the icon for the folder and a folder view for the folder that shows contents of the folder. For example, in response to detecting the input (e.g., contact 5040 and movement 5042 in FIG. 5M) that caused the device to create the folder (e.g., folder 5004-7 in FIG. 5S), the device automatically displays a folder view 5092 in FIG. 5Y for the folder. In other words, the device automatically, without any further intervention from the user, transitions from the user interface illustrated in FIG. 5M (where the folder creation input is detected) to the user interface illustrated in FIG. 5S (where the folder is created and a folder icon 5004-7 is displayed) and the user interface illustrated in FIG. 5Y (where a folder view 5092 for the folder is displayed).

In some embodiments, in response to receiving the input, the device displays (842) a notification that the folder has been created, wherein the notification includes instructions for renaming the folder. For example in FIG. 5P, after creating the folder the device displays a name confirmation dialogue 5064 that provides the user with options for confirming creation of the folder, renaming the folder and cancelling creation of the folder, as discussed in greater detail above. In some embodiments, in response to receiving the input, the device displays (844) a text entry field for renaming the folder. For example in FIG. 5P, if the device detects an input that corresponds to a request to rename the folder (e.g., tap gesture 5070 on a renaming button) the device displays a dialogue 5072 for changing the name of the new folder (e.g., from "games" to "fun" as illustrated in FIG. 5Q). As another example, in response to detecting an input (e.g., tap gesture 5098 in FIG. 5Y) that corresponds to a request to activate a folder renaming button, the device displays a folder renaming region 5108 that includes a text entry field, as illustrated in FIG. 5DD.

In some embodiments, the device detects (846) an additional input, and in response to detecting the additional input the device adds (848) a third item to the folder. In some of these embodiments, the device determines (850) a third plurality of descriptors that are associated with the third item. In some of these embodiments, the device selects (852) a second descriptor that is shared by the first plurality of descriptors, the second plurality of descriptors and the third plurality of descriptors. In some of these embodiments, the device automatically generates (854) a new folder name for the folder based on the second descriptor. In other words, in these embodiments, the name of the folder changes when the contents of the folder change. For example, if the solitaire application icon 5002-4 were to be added to the folder associated with the racing games folder icon 5004-8, the device would change the name of the racing games folder icon 5004-8 to a new name (e.g., from "Racing Games" to "Games") where the new name is based at least in part on a descriptor that is shared by all three of the items within the folder (e.g., solitaire application icon 5002-4, car race application icon 5002-17 and air race application icon 5002-18). In contrast, in some embodiments, the folder name is fixed when the folder is created, and thus adding new items to the folder does not change the folder name.

Note that details of other processes described herein with respect to methods 600, 700, 900, 1000, 1100, 1200 (e.g., FIGS. 6A-6E, 7A-7C, 9A-9B, 10A-10B, 11A-11C, 12A-12E and 5A-5PPP) are also applicable in an analogous manner to the method 800 described above. For example, the items (e.g., action icons 5002 and folder icons 5004) described with reference to FIGS. 8A-8C may have one or more of the characteristics of the various selectable user interface objects/icons/items (e.g., action icons 5002 and folder icons 5004) described herein with reference to any of methods 600, 700, 900, 1000, 1100, or 1200. For brevity, these details are not repeated here.

Figure 9A:
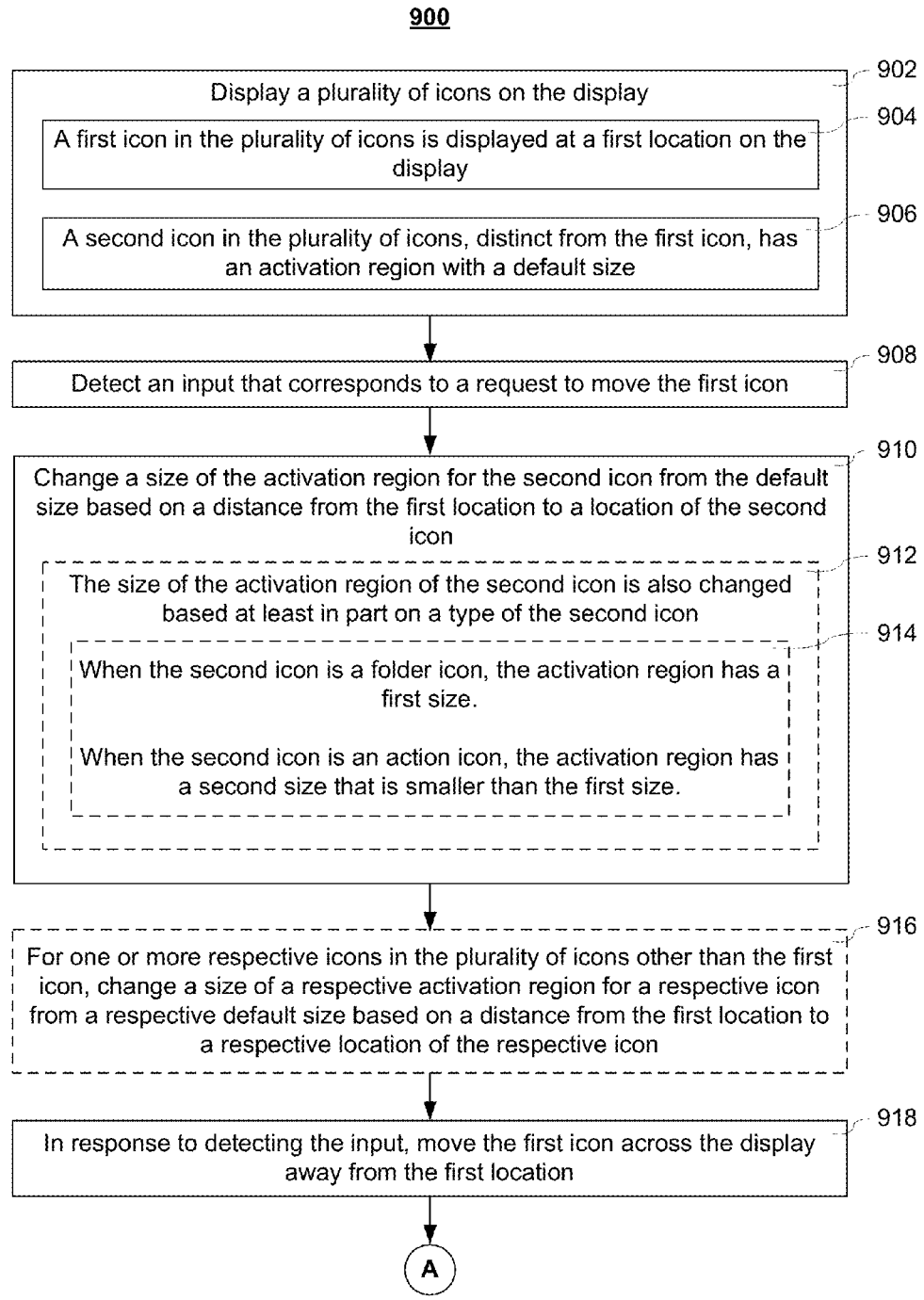
FIGS. 9A-9B are flow diagrams illustrating a method of adjusting an activation region for a selectable user interface object in response to an icon management input in accordance with some embodiments.
Figure 9B:
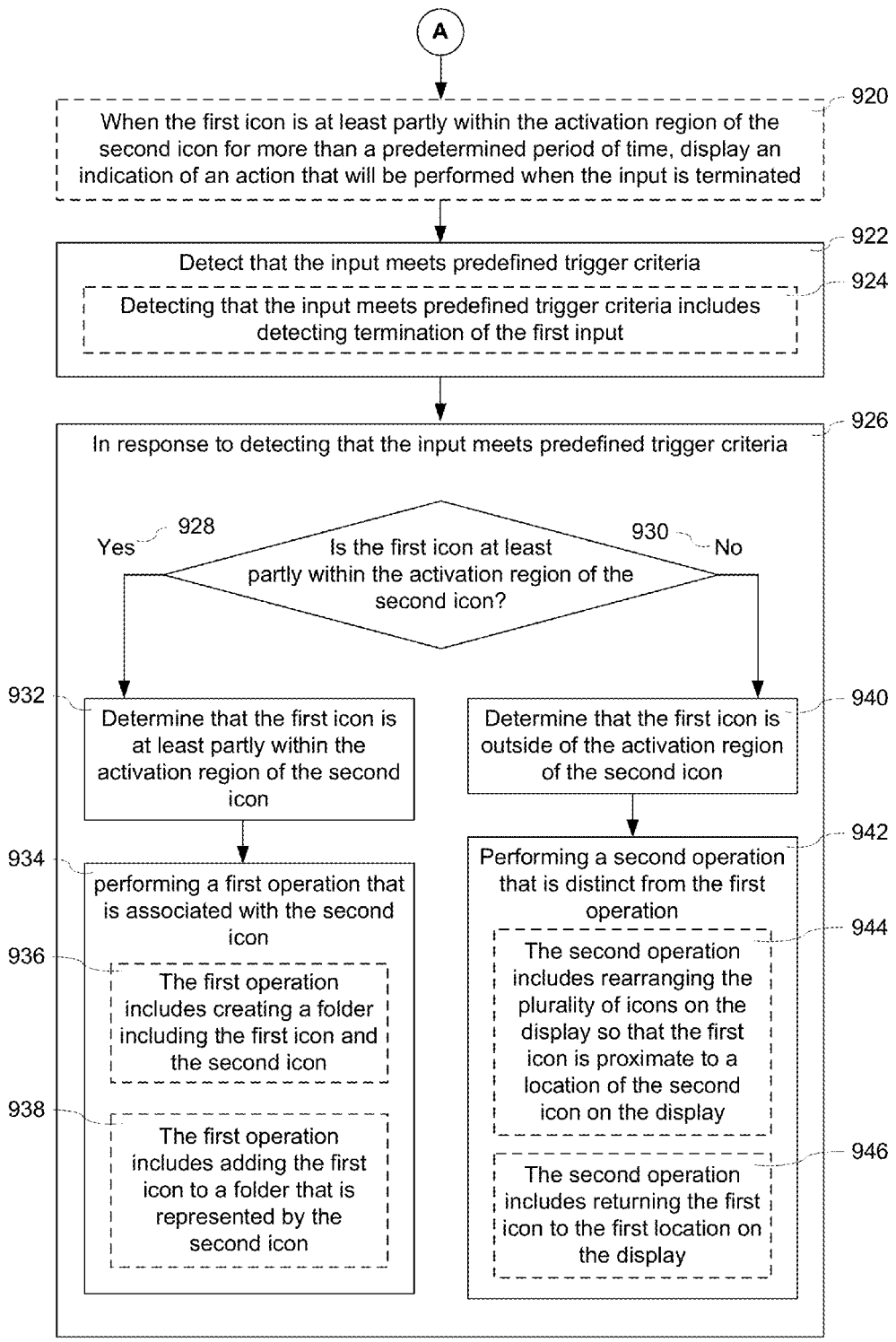

FIGS. 9A-9B are flow diagrams illustrating a method 900 of adjusting an activation region for a selectable user interface object in response to an icon management input in accordance with some embodiments. The method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to manage icons. The method reduces the cognitive burden on a user when managing icons, thereby creating a more efficient human-machine interface. For battery-operated computing devices, enabling a user to manage icons faster and more efficiently conserves power and increases the time between battery charges.

The device displays (902) a plurality of icons on the display (e.g., selectable user interface objects such as application icons 5002 and/or folder icons 5004 on touch screen 112). A first icon (e.g., an action icon or a folder icon) in the plurality of icons is displayed (904) at a first location on the display (e.g., touch screen 112). A second icon (e.g., an action icon or a folder icon) in the plurality of icons that is distinct from the first icon, has (906) an activation region with a default size that is at a second location on the display (e.g., touch screen 112), the second location is distinct from the first location. For example, in FIG. 5KK the first icon (e.g., stocks application icon 5002-9) is displayed on the right side of the second row of selectable user interface objects. In this example, a second icon 5004-7 initially has a default activation region (e.g., 5122-13-*a* in FIG. 5KK). In some embodiments each of the icons (e.g., action icons 5002 and folder icons 5004) has an activation region that is a default size (e.g., activation regions 5122 in FIG. 5KK). In some embodiments the activation regions 5122 are hidden activation regions (e.g., the activation regions are not displayed on the display).

The device detects (908) an input that corresponds to a request to move the first icon. For example, as illustrated in FIG. 5KK, the device detects a finger contact 5120 at a location on a touch-sensitive surface that corresponds to the first icon (e.g., stocks application icon 5002-9 in FIG. 5KK) and movement 5121 of the finger contact across the touch-sensitive surface (e.g., from a first location 5120-*a* in FIG. 5KK to a second location 5120-*b* in FIG. 5LL to a third location 5120-*c* in FIG. 5MM on the touch screen 112). After detecting the input, the device changes (910) a size of the activation region for the second icon from the default size based on a distance from the first location to a location of the second icon. For example, in FIG. 5KK the device changes a size of the activation region 5122-13 for the second icon (e.g., games folder icon 5004-7) from a default activation region 5122-13-*a* in FIG. 5KK to an enlarged activation region 5122-13-*b* in FIGS. 5LL-5MM. In some embodiments, the size of the activation region is changed in response to detecting a contact at a location on a touch-sensitive surface (e.g., touch screen 112) that corresponds to a location of the first icon (e.g., the device changes the activation region 5122-13-*a* to activation region 5122-13-*b* in response to simply detecting contact 5120 in FIG. 5KK) on the display (e.g., touch screen 112). In some embodiments, the size of the activation region is changed in response to detecting movement of the contact away from a location on a touch-sensitive surface (e.g., touch screen 112) that corresponds to a location of the first icon (e.g., the device changes the activation region 5122-13-*a* to activation region 5122-13-*b* only after detecting at least some movement 5121 of contact 5120, as illustrated in FIG. 5LL) on the display (e.g., touch screen 112).

In some embodiments, the size of the activation region of the second icon is also changed (912) based at least in part on a type of the second icon. In some embodiments, when the second icon is a folder icon, the activation region has (914) a first size (e.g., because and the first operation is adding the first icon to the folder represented by the second icon). In some of these embodiments, when the second icon is an action icon, the activation region has a second size that is smaller than the first size (e.g., because the first operation is creating a folder including the first icon and the second icon. In other words, the activation regions are adjusted so as to make it easiest to move an icon, next easiest to an add icon to a preexisting folder, hardest to create new folder from two activation icons).

In some embodiments, for one or more respective icons in the plurality of icons other than the first icon, the device changes (916) a size of a respective activation region for a respective icon from a respective default size based on a distance from the first location to a respective location of the respective icon (e.g., in response to detecting a contact at a location on a touch-sensitive surface that corresponds to the first icon or in response to detecting movement of the contact away from a location on a touch-sensitive surface that corresponds to the first icon). For example, in FIG. 5LL the size of the activation region for the photos application icon 5002-1 has been increased from a default size 5122-1-*a* to a larger size 5122-1-*b* based on the distance from the first location (e.g., the location of the contact 5120-*a* in FIG. 5KK) to a respective location of the photos application icon 5002-1 in FIG. 5LL. Similarly, it should be noted that, in some embodiments, the default activation regions (e.g., 5122-5-*a*, 5122-6-*a*, 5122-9-*a*, 5122-10-*a*, 5122-14-*a*, 5122-15-*a*, 5122-16-*a*, 5122-17-*a* in FIG. 5KK) for a plurality of the other icons (e.g., selectable user interface objects 5002-1, 5002-2, 5002-6, 5002-7, 5004-1-*b*, 5002-10, 5004-7, 5002-14, 5002-15. 5002-16, 5004-2, respectively in FIG. 5KK-5LL) have been adjusted, as illustrated in FIG. 5LL (e.g., by adjusted activation regions 5122-5-*b*, 5122-6-*b*, 5122-9-*b*, 5122-10-*b*, 5122-14-*b*, 5122-15-*b*, 5122-16-*b*, 5122-17-*b*, respectively in FIG. 5LL).

In response to detecting the input, the device moves (918) the first icon across the display (e.g., touch screen 112) away from the first location. For example, in FIG. 5LL the device displays the stocks application icon 5002-9 moving away from the first location (e.g., the location of the stocks application icon 5002-9 in FIG. 5KK). In some embodiments, when the first icon is at least partly within the activation region of the second icon for more than a predetermined period of time, the device displays (920) an indication of an action that will be performed when the input is terminated (e.g., an animation indicating that a new folder will be created or an animation indicating that the first icon will be added to a folder represented by the second icon). For example, when the second icon is a folder icon the device may highlight the folder icon so as to indicate that the first icon will be added to a folder. As another example, when the second icon is an action icon, the device may highlight the action icon to indicate that a folder will be created that includes the first icon and the second icon.

The device detects (922) that the input meets predefined trigger criteria (e.g., detecting lift off of the finger contact). In some embodiments, detecting that the input meets predefined trigger criteria includes detecting (924) termination of the first input. For example, termination of a first input is detected when the device detects a liftoff of contact 5120-*c* from the touch-sensitive surface (e.g., touch screen 112).

Operations 928-946 are performed (926) in response to detecting that the input meets predefined trigger criteria. In some embodiments the device determines whether the first icon is at least partly within the activation region of the second icon. When the first icon is (928) at least partly within the activation region of the second icon, the device performs operations 932-938, as discussed in greater detail below. In contrast, when the first icon is (930) not at least partly within the activation region of the second icon, the device performs operations 940-946, as discussed in greater detail below.

When the device determines (932) that first icon is at least partly within the activation region (e.g., 5122-13-*b* in FIG. 5MM) of the second icon, the device performs (934) a first operation that is associated with the second icon. In some embodiments, the first operation includes creating (936) a folder including the first icon and the second icon (e.g., as described in greater detail above with reference to method 600). For example, in FIG. 5MM the device detects termination of the input (e.g., liftoff of contact 5120-*c*) and in response to detecting termination of the input, the device adds the stocks application icon 5002-9 to the folder that is represented by the games folder icon 5004-7, as illustrated in FIG. 5NN. In some embodiments the first operation includes adding (938) the first icon to a folder that is represented by the second icon. For example, if the device detected termination of the input when the stocks application icon 5002-9 was at least partly within the activation region for another action icon, the device would create a folder including the stocks application icon 5002-9 and the other action icon, as described in greater detail above with reference to FIGS. 5M-5N.

When the device determines (940) that the first icon is outside of the activation region of the second icon, the device performs (942) a second operation that is distinct from the first operation. In some embodiments, the second operation includes rearranging (944) the plurality of icons on the display (e.g., touch screen 112) so that the first icon is proximate to a location of the second icon on the display. For example, in FIG. 5OO the device detects an input (e.g., contact 5124 and movement 5126 of the contact) and detects that predefined trigger criteria have been met (e.g., that the contact 5124 has paused for more than a predetermined period of time) at a location 5124-*b* that is outside of an activation region 5128-11 of a second icon (e.g., games folder icon 5004-7 in FIG. 5OO). Continuing this example, in response to determining that the predefined criteria have been met, the device rearranges the icons (e.g., so that all of the icons on the third row of the arrangement are shifted one space to the left). In some embodiments, the second operation includes returning (946) the first icon to the first location on the display. For example, if the device were to detect termination of the contact 5120-*c* in FIG. 5MM while the stocks application icon 5002-9 is outside of the activation region 5122-13-*b* for the games folder icon 5004-7, the device would return the stocks application icon 5002-9 to its previous location (e.g., the location of the stocks application icon 5002-9 in FIG. 5LL).

It should be understood that in some embodiments, one advantage of adjusting the size of activation regions for icons on the display (e.g., touch screen 112) based on a distance of the icon is that it provides a larger target for icons that are further away from the icon that is being moved. Typically when a touch gesture occurs over a longer distance, the gesture will include movement that is faster than would be part of a touch gesture that occurred over a shorter distance. Additionally, typically touch gestures that include faster movement are less accurate than touch gestures that include slower movement. Thus, by increasing the size of activation regions for icons that are further away from the starting point of the touch gesture the device compensates for the decreased accuracy of touch gestures that must traverse a longer distance across a touch-sensitive surface (e.g., touch screen 112) to reach the icons that are further away from the starting point, thereby improving the user-machine interface.

Note that details of other processes described herein with respect to methods 600, 700, 800, 1000, 1100, 1200 (e.g., FIGS. 6A-6E, 7A-7C, 8A-8C, 10A-10B, 11A-11C, 12A-12E and 5A-5PPP) are also applicable in an analogous manner to the method 900 described above. For example, the icons (e.g., action icons 5002 and folder icons 5004) described with reference to FIGS. 9A-9B may have one or more of the characteristics of the various selectable user interface objects/icons/items (e.g., action icons 5002 and folder icons 5004) described herein with reference to any of methods 600, 700, 800, 1000, 1100, or 1200. For brevity, these details are not repeated here.

Figure 10A:
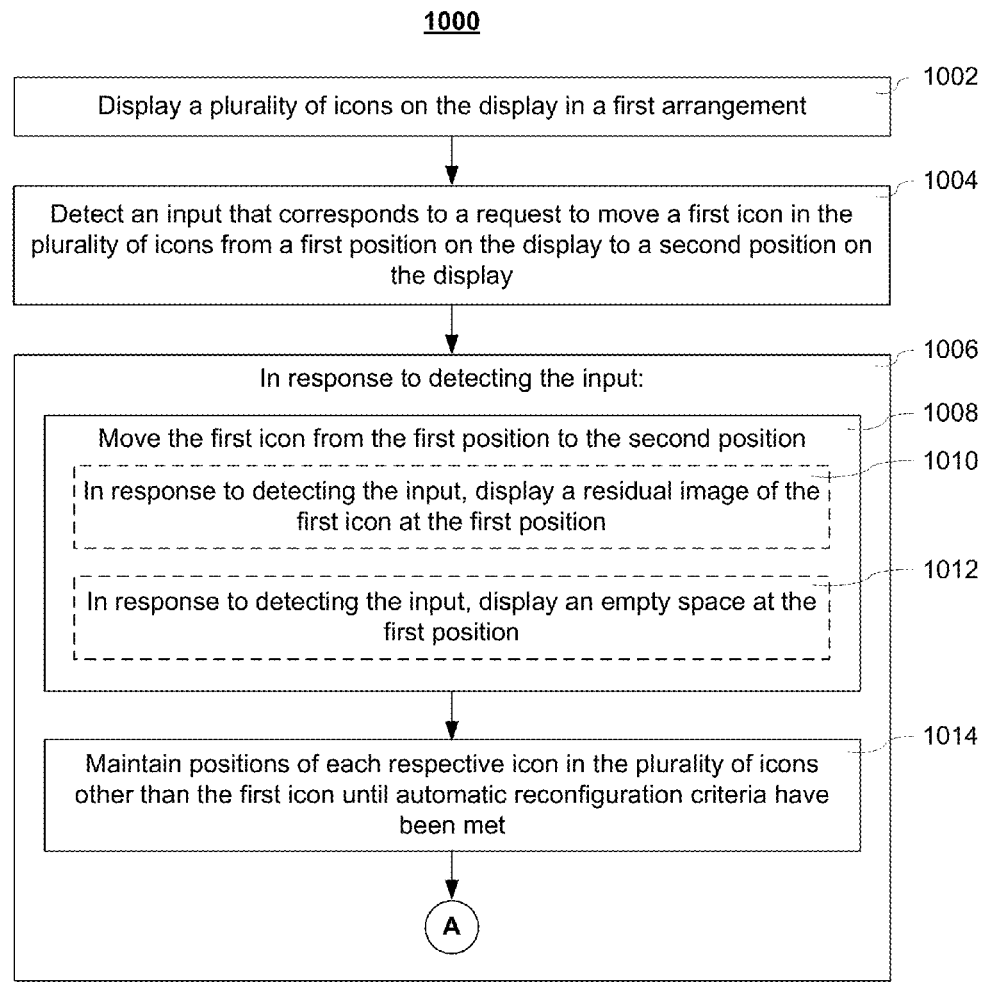
FIGS. 10A-10B are flow diagrams illustrating a method of reconfiguring icons on a display in response to an icon management input in accordance with some embodiments.
Figure 10B:
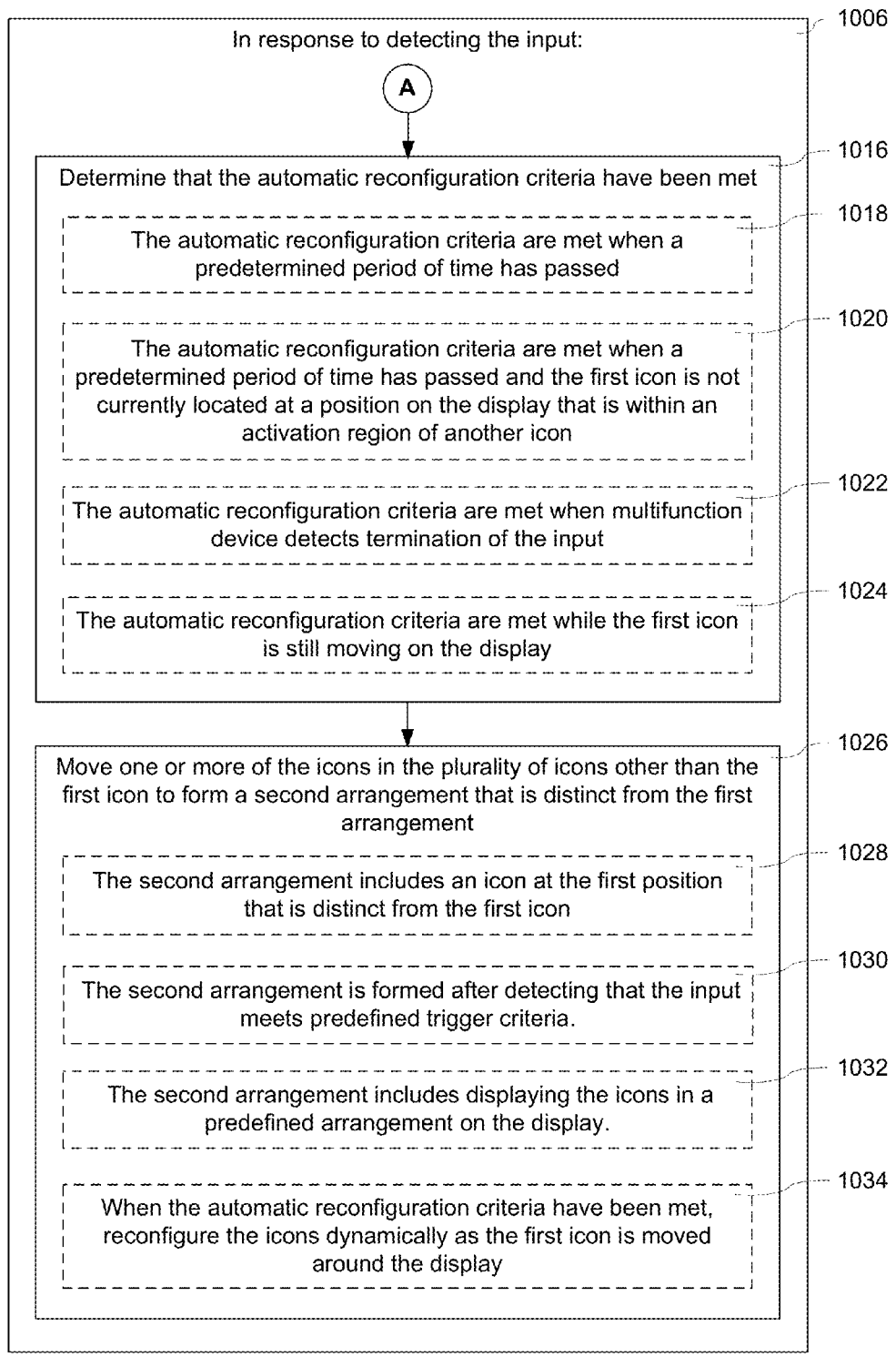

FIGS. 10A-10B are flow diagrams illustrating a method 1000 of reconfiguring icons on a display in response to an icon management input in accordance with some embodiments. The method 1000 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to manage icons. The method reduces the cognitive burden on a user when managing icons, thereby creating a more efficient human-machine interface. For battery-operated computing devices, enabling a user to manage icons faster and more efficiently conserves power and increases the time between battery charges.

The device displays (1002) a plurality of icons on the display (e.g., touch screen 112) in a first arrangement (e.g., action icons 5002 and folder icons 5004 in FIG. 5KK). The device detects (1004) an input that corresponds to a request to move a first icon in the plurality of icons from a first position on the display (e.g., touch screen 112) to a second position on the display. For example, the device detects a contact 5120 at a location on the touch-sensitive surface (e.g., touch screen 112) that corresponds to a location of a stocks application icon 5002-9 on the display (e.g., touch screen 112) and subsequent movement 5121 of the contact (e.g., from a first location 5120-*a* in FIG. 5KK to a second location 5120-*b* in FIG. 5LL to a third location 5120-*c* in FIG. 5MM on the touch screen 112), which corresponds to a request to move the stocks application icon 5002-9 from its initial location in FIG. 5KK to a location that is proximate to the games folder icon 5004-7 in FIG. 5KK on the display (e.g., touch screen 112).

Operations 1008-1034 are performed (1006) in response to detecting the input. The device moves (1008) the first icon from the first position to the second position. For example, as illustrated in FIGS. 5KK-5MM the device moves the stocks application icon 5002-9 across the display (e.g., touch screen 112) towards the games folder icon 5004-7. In some embodiments, in response to detecting the input, the device displays (1010) a residual image of the first icon at the first position. In these embodiments, the residual image of the first icon is visually distinct from the first icon. In some embodiments, the residual image of the first icon is a grayed-out, translucent, semi-transparent, reduced contrast, or ghost image of the first icon. In some embodiments, in response to detecting the input, the device displays (1012) an empty space at the first position (e.g., as illustrated in FIGS. 5LL-5MM, where an empty space is displayed at the right end of the second row of icons).

The device maintains (1014) positions of each respective icon in the plurality of icons other than the first icon until automatic reconfiguration criteria have been met. For example, in FIGS. 5LL-5MM, the device continues to display all of the icons other than the stocks application icon 5002-9 in the same positions on the display (e.g., touch screen 112), even though there is an empty space in the arrangement of icons where the stocks application icon 5002-9 was previously located.

The device determines (1016) that the automatic reconfiguration criteria have been met (e.g., at some later point in time). In some embodiments, the automatic reconfiguration criteria are met when a predetermined period of time (e.g., 0.5 seconds, 1 second, 2 seconds, etc.) has passed (1018) since the input (or a beginning of the input) was detected. In some embodiments the predetermined period of time is measured from a beginning of the input. In some embodiments the predetermined period of time is measured from an end of the input. In some embodiments, the automatic reconfiguration criteria are met when a predetermined period of time has passed (1020) and the first icon is not currently located at a position on the display (e.g., touch screen 112) that is within an activation region of another icon. In other words, in these embodiments, in addition to the predetermined period of time having passed, the first icon must be displayed at a location on the display (e.g., touch screen 112) that is outside of any of the activation regions of other icons. In some embodiments, the automatic reconfiguration criteria are met when device detects (1022) termination of the input. For example, in FIG. 5MM the device detects a liftoff of contact 5120-*c* and in response the device adds the stocks application icon 5002-9 to the folder associated with the games folder icon 5004-7 as illustrated in FIG. 5NN and subsequently rearranges the icons, as illustrated in FIG. 5OO. In some embodiments, the automatic reconfiguration criteria are met while the first icon is still moving (1024) on the display. In other words, in some embodiments, the predetermined period of time elapses while the input continues to be detected by the device (e.g., before detecting liftoff of the contact from the touch-sensitive surface).

In response to determining that the automatic reconfiguration criteria have been met, the device moves (1026) one or more of the icons in the plurality of icons other than the first icon to form a second arrangement that is distinct from the first arrangement. For example, the folder icon 5004-1-*b* is shifted from the third row in the arrangement of FIG. 5NN to the second row in the arrangement of FIG. 5OO, while action icons 5002-10, 5002-11 and 5002-12 are shifted to the left and games folder 5004-7 is shifted up from the fourth row in the arrangement of FIG. 5NN to the third row in the arrangement of FIG. 5OO. In some embodiments, the second arrangement includes (1028) an icon at the first position that is distinct from the first icon. For example, in FIG. 5OO the device displays a folder icon 5004-1-*b* at the location that was previously occupied by the stocks application 5002-9 in FIG. 5KK. In some embodiments, the first icon (e.g., stocks application icon 5002-9) has been moved to a different position within the icons. In some embodiments, the first icon (e.g., stocks application icon 5002-9) has been removed from the plurality of icons (e.g., by being added to a folder 5004-7).

In some embodiments, the second arrangement is formed (1030) after (or in response to) detecting that the input meets predefined trigger criteria (e.g., detecting termination of the input) and the second arrangement includes displaying (1032) the icons in a predefined arrangement on the display (e.g., a two-dimensional grid or other regularly-spaced arrangement on the touch screen 112). In some embodiments, when the automatic reconfiguration criteria have been met, reconfiguring (1034) the icons dynamically as the first icon is moved around the display (e.g., so as to avoid overlap between the first icon and other icons on the touch screen 112). In other words, in some embodiments, the device moves a second icon from a respective initial position to a respective new position when the second position of the first icon at least partially overlaps with the respective initial position of the second icon, so as to accommodate display of the first icon at the second position in the first area. For example, rearranging the icons includes swapping positions of the first icon with positions of other icons as the first icon is moved around the display (e.g., while continuing to detect the contact on the touch screen 112).

Note that details of other processes described herein with respect to methods 600, 700, 800, 900, 1100, 1200 (e.g., FIGS. 6A-6E, 7A-7C, 8A-8C, 9A-9B, 11A-11C, 12A-12E and 5A-5PPP) are also applicable in an analogous manner to the method 1000 described above. For example, the icons (e.g., action icons 5002 and folder icons 5004) described with reference to FIGS. 10A-10B may have one or more of the characteristics of the various selectable user interface objects/icons/items (e.g., action icons 5002 and folder icons 5004) described herein with reference to any of methods 600, 700, 800, 900, 1100, or 1200. For brevity, these details are not repeated here.

Figure 11B:
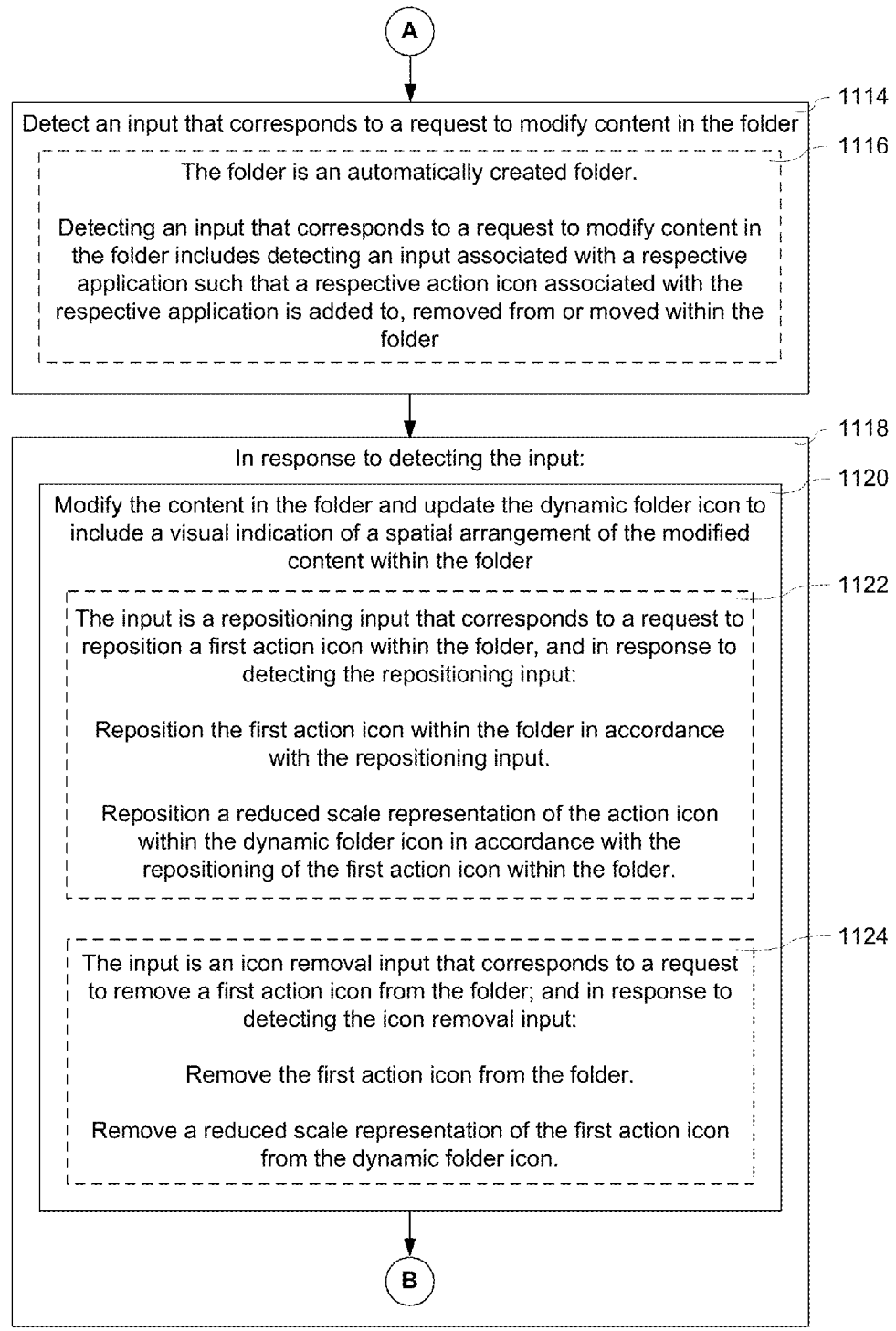
Figure 11C:
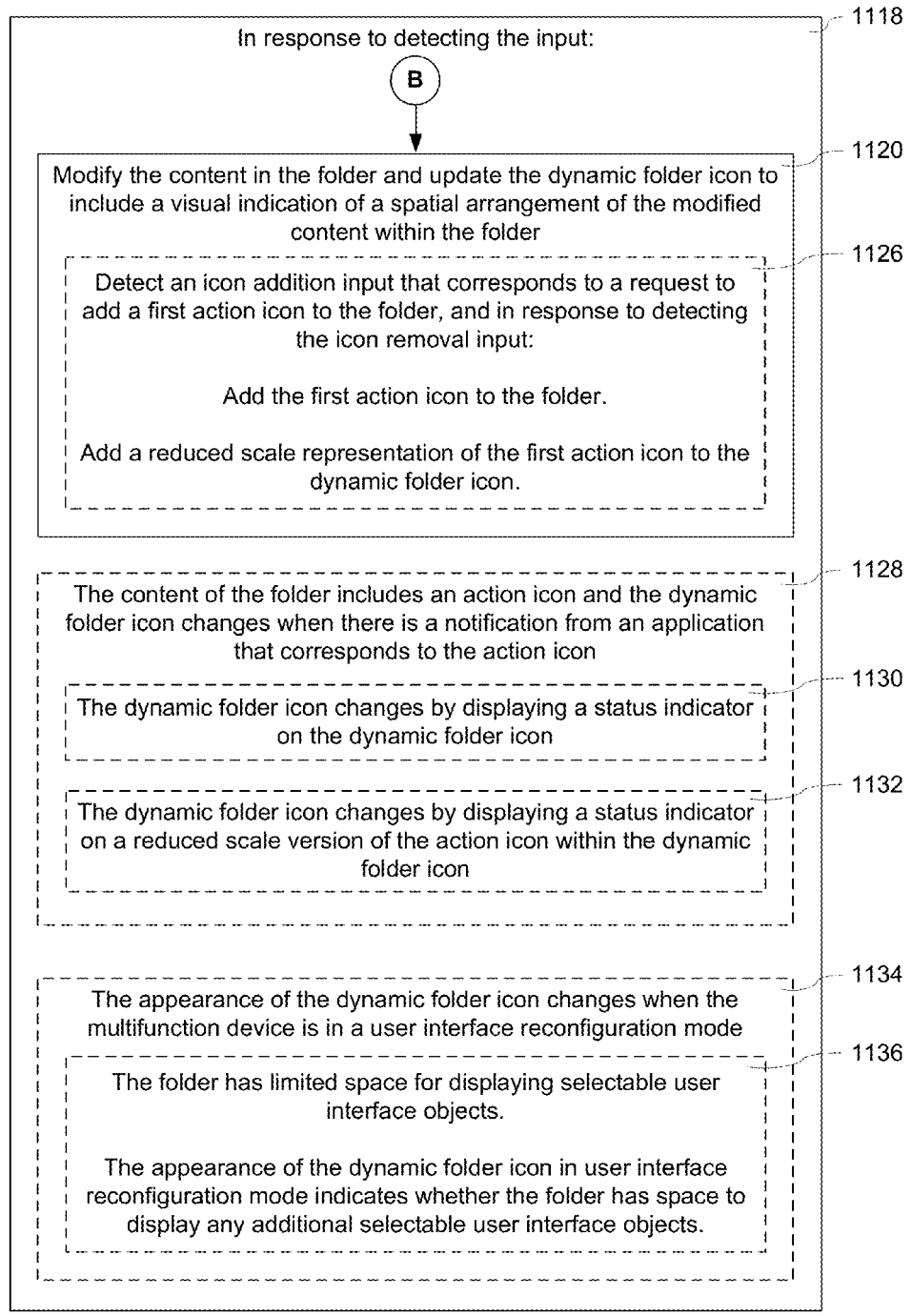
Figure 12B:
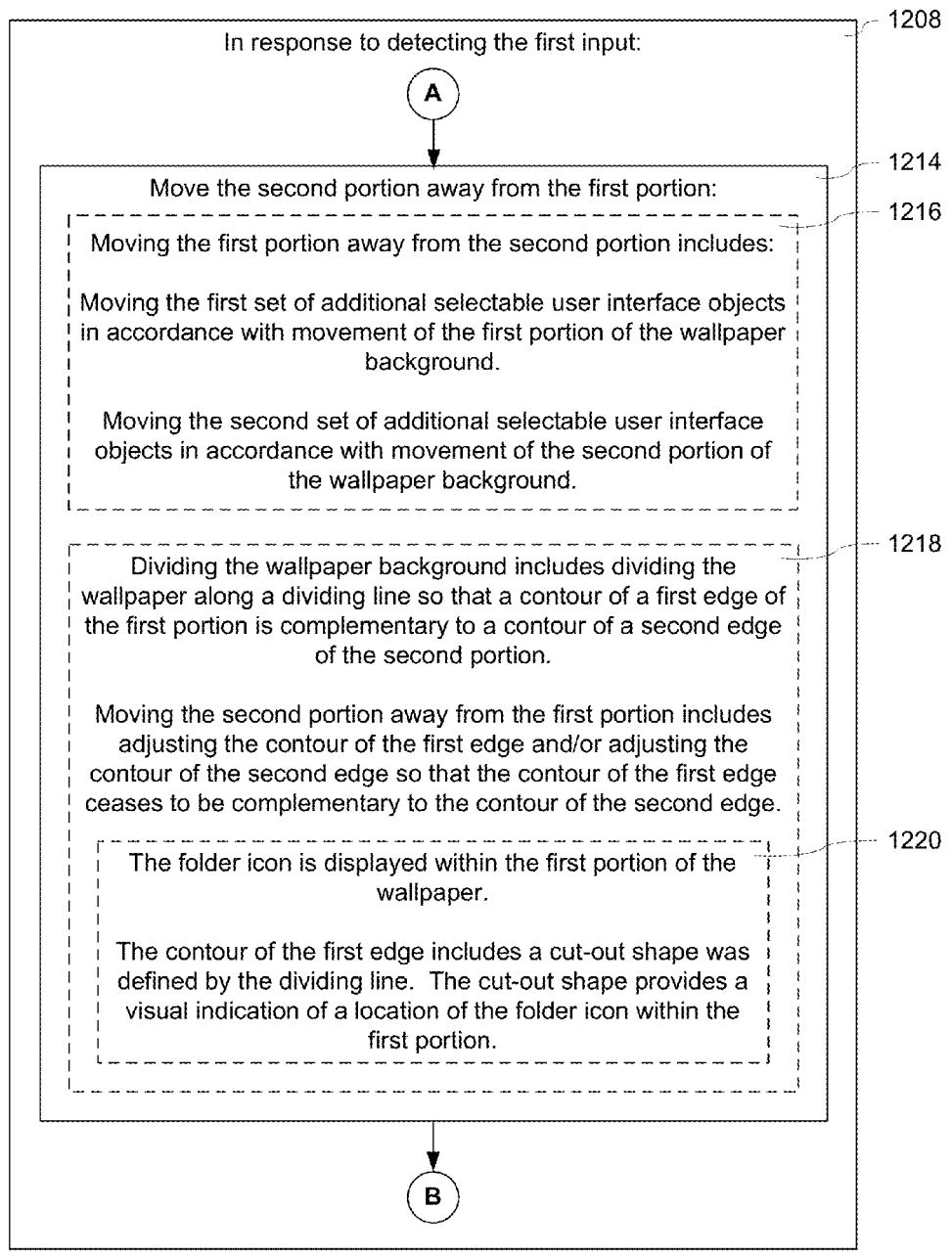
Figure 12C:
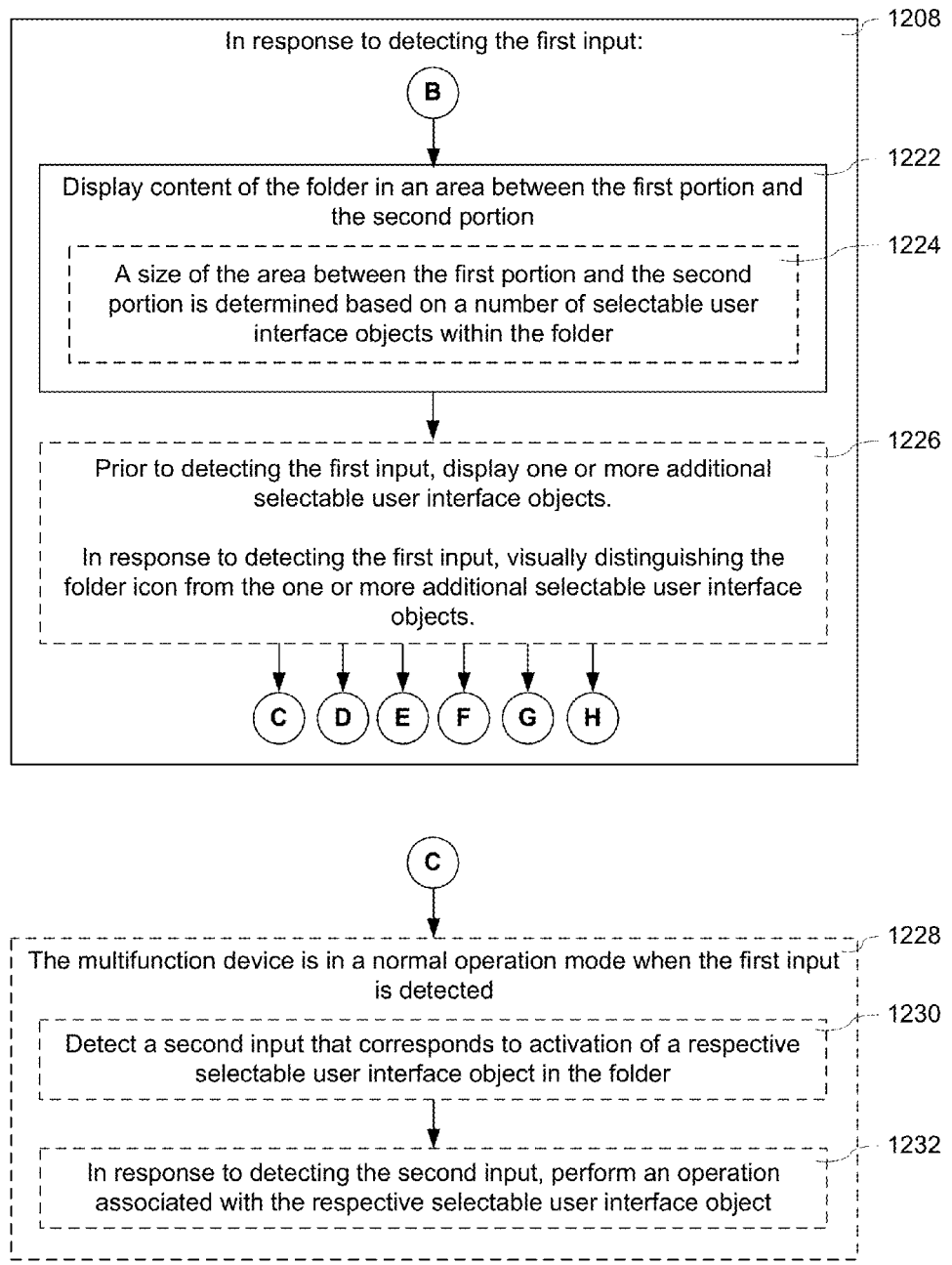
Figure 12D:
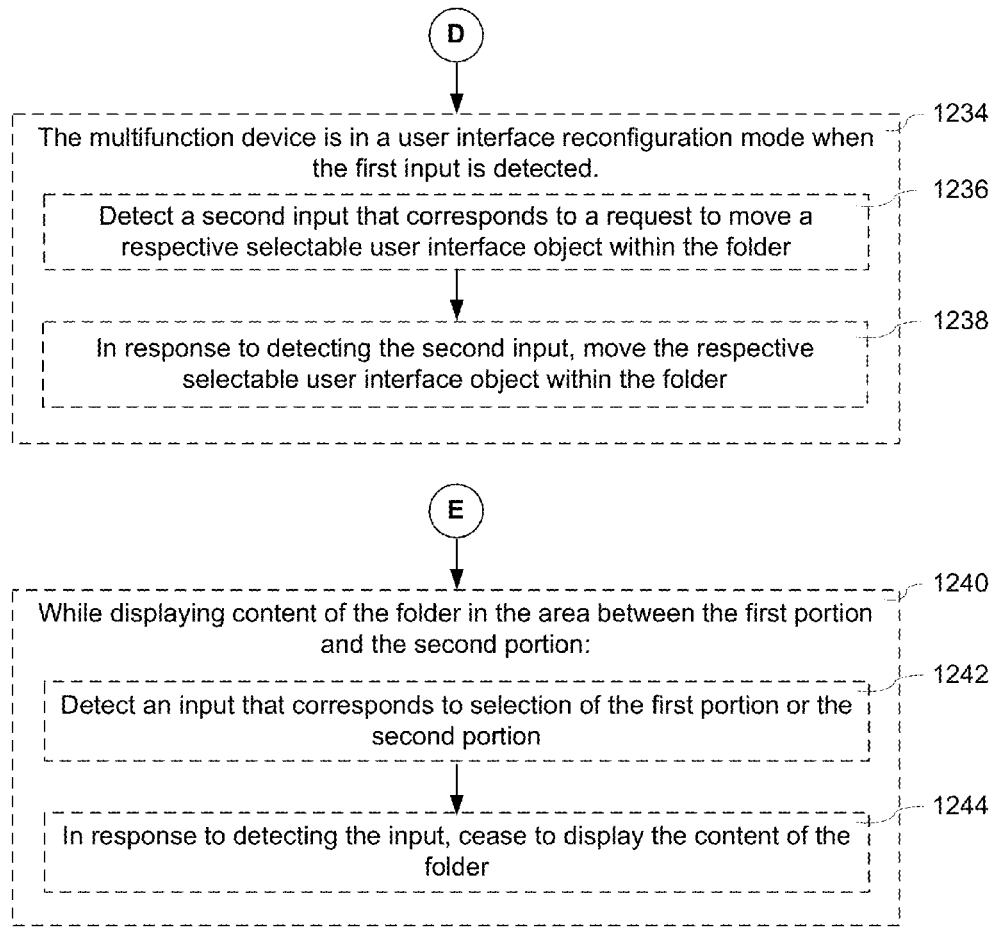
Figure 12E:
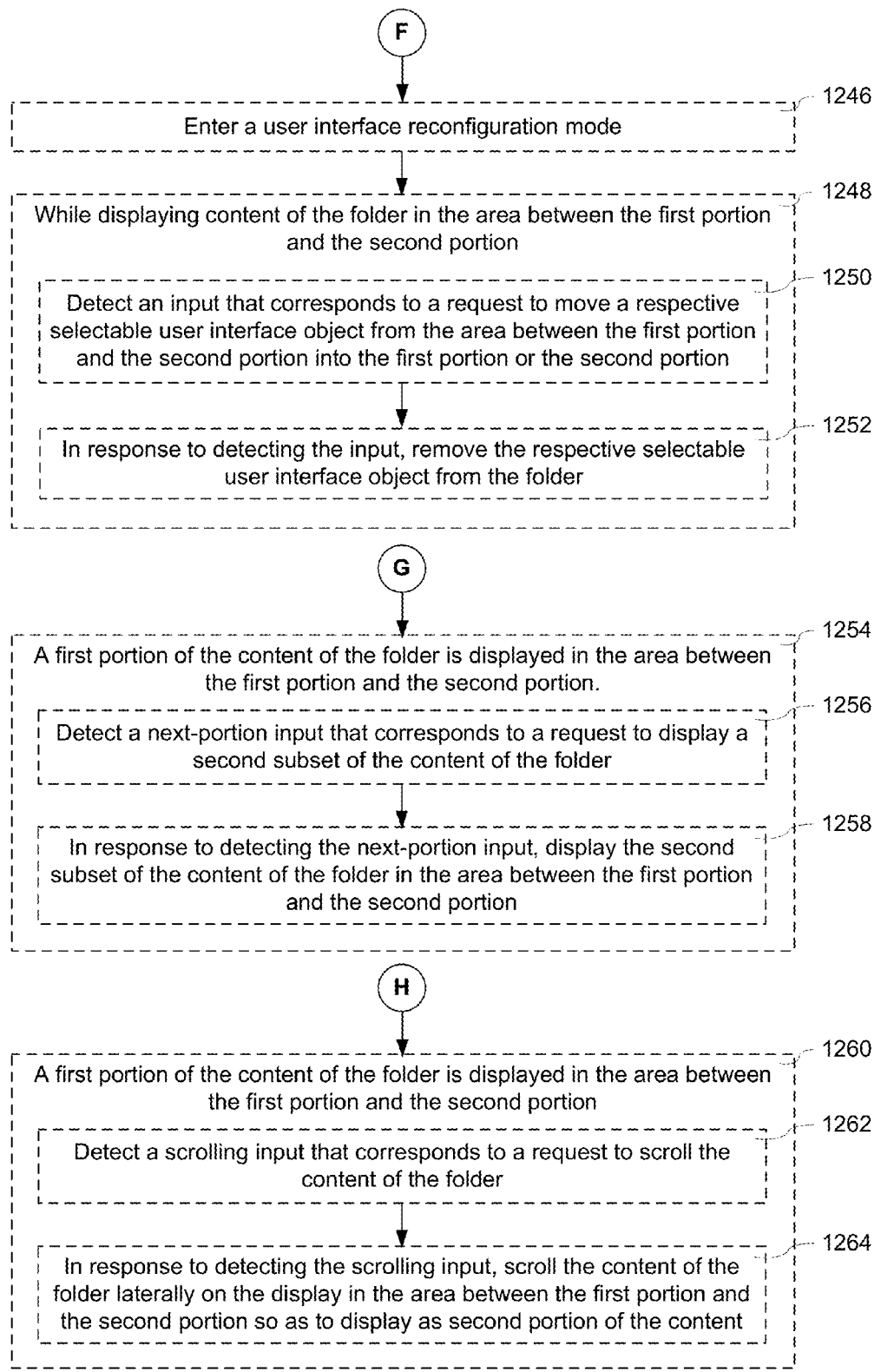

FIGS. 11A-11C are flow diagrams illustrating a method 1100 of updating a dynamic folder icon to provide a visual indication as to the contents of a folder associated with the dynamic folder icon in accordance with some embodiments. The method 1100 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to manage a folder. The method reduces the cognitive burden on a user when managing folders, thereby creating a more efficient human-machine interface. For battery-operated computing devices, enabling a user to manage folders faster and more efficiently conserves power and increases the time between battery charges.

The device displays (1102) a dynamic folder icon (e.g., games folder icon 5004-7 in FIG. 5SS). The dynamic folder icon (e.g., 5004-7 in FIG. 5SS) includes a visual indication (e.g., "O," "R," "S," and "M" in games folder icon 5004-7 in FIG. 5SS) of current content in a folder that is associated with the dynamic folder icon. In some embodiments, the dynamic folder icon indicates (1104) a number of action icons that are contained within the folder associated with the dynamic folder icon. For example, the games folder icon 5004-7 in FIG. 5SS includes four reduced scale representations of selectable user interface objects that are within the folder associated with the folder icon (e.g., the boxes containing "O," "R," "S," and "M" in the games folder icon 5004-7).

In some embodiments, the content has (1106) a spatial arrangement within the folder and the dynamic folder icon (e.g., 5004-7 in FIG. 5TT) provides a visual indication as to the spatial arrangement of the content within the folder. In some embodiments, the content includes a plurality of action icons (e.g., 5002-4, 5002-13, 56002-9, 5002-8 in FIG. 5TT), the spatial arrangement is a predefined grid of action icons (e.g., a one-by-four grid of action icons as illustrated in folder view 5138 of FIG. 5TT), and a plurality of respective action icons each has (1108) one or more horizontally adjacent neighboring action icons. In some embodiments, the dynamic folder icon (e.g., 5004-7 in FIG. 5TT) includes reduced scale representations (e.g., the boxes containing "O," "R," "S," and "M" in the games folder icon 5004-7) of at least a subset of the plurality of action icons, and the reduced scale representations are arranged (1110) so that, for a plurality of the reduced scale representations, each reduced scale representation of a respective action icon is horizontally adjacent to a reduced scale representation of one of the neighboring action icons for the respective action icon. In some embodiments, the folder includes a plurality of action icons having a first scale; and displaying the dynamic folder icon includes displaying (1112) reduced scale representations of one or more of action icons in the plurality of action icons at a second scale within the dynamic folder icon, the second scale being smaller than the first scale.

For example, in FIG. 5TT, in response to a folder display input (e.g., tap gesture 5136 in FIG. 5SS), the device displays a folder view 5138 for a folder associated with the games folder icon 5004-7. As illustrated in FIG. 5TT the folder view includes four selectable user interface objects including a solitaire application icon 5002-4, a racing application icon 5002-13, a stocks application icon 5002-9 and a maps application icon 5002-8, with a spatial arrangement in a line from left to right. In this example, the games folder icon 5004-7 provides a visual indication of the spatial arrangement of these action icons by displaying the reduced scale representations of the content in an order that is based on the order of the action icons within the folder view. In particular, the racing application icon 5002-13 is in between the solitaire application icon 5002-4 (on the left) and the stocks application icon 5002-9 (on the right), and the reduced scale representation of the racing application icon (e.g., "R" in the games folder icon 5004-7 in FIG. 5TT) is in between the reduced scale representation of the solitaire application icon (e.g., "O" in the games folder icon 5004-7 in FIG. 5TT) and the reduced scale representation of the solitaire application icon (e.g., "S" in the games folder icon 5004-7 in FIG. 5TT).

The device detects (1114) an input that corresponds to a request to modify content in the folder. For example, in FIG. 5TT the device detects a contact 5140 at a location on the touch-sensitive surface (e.g., touch screen 112) that corresponds to a location of the stocks application icon 5002-9 on the display (e.g., touch screen 112) and subsequent movement 5142 of the contact to a location on the touch-sensitive surface (e.g., touch screen 112) that corresponds to a location on the display (e.g., touch screen 112) that is within the folder view 5138. In some embodiments, the folder is an automatically created folder; and detecting an input that corresponds to a request to modify content in the folder includes detecting (1116) an input associated with a respective application such that a respective action icon associated with the respective application is added to, removed from or moved within the folder (e.g., the folder is a recently added application folder, and the input is that a new application has been added to the device, or the folder is a most frequently used application folder, and the input is the use of an application that renders that application the most frequently used application). For example, when a user launches an application, an application icon associated with the application is moved into a "recently used applications" folder.

Operations 1120-1136 are performed (1118) in response to detecting the input. The device modifies (1120) the content in the folder; and updates the dynamic folder icon (e.g., 5004-7 in FIG. 5UU) to include a visual indication of a spatial arrangement of the modified content within the folder. It should be understood that the modification of the content in the folder can include repositioning content within the folder, deleting content from the folder and/or adding content to the folder.

In some embodiments, the device detects a repositioning input that corresponds to a request to reposition a first action icon within the folder; and in response to detecting the repositioning input: the device repositions (1122) the first action icon within the folder in accordance with the repositioning input; and repositions a reduced scale representation of the action icon within the dynamic folder icon in accordance with the repositioning of the first action icon within the folder. For example, in FIG. 5TT the device detects a repositioning input including a contact 5140 at a location on the touch-sensitive surface (e.g., touch screen 112) that corresponds to a location of the stocks application icon 5002-9 on the display (e.g., touch screen 112) and subsequent movement 5142 of the contact to a location on the touch-sensitive surface (e.g., touch screen 112) that corresponds to a location on the display (e.g., touch screen 112) that is within the folder view 5138. In this example, in response to detecting the repositioning input, the device moves the stocks application icon 5002-9 to a new position within the folder view 5138 as illustrated in FIG. 5UU (e.g., so that the solitaire application icon 5002-4 is displayed in between the stocks application icon 5002-9 and the racing application icon 5002-13). Additionally, in this example, the device rearranges the reduced scale representations within the games folder icon 5004-7, as illustrated in FIG. 5UU, so that the reduced scale representations provide a visual indication as to the updated spatial arrangement of content within the folder. In particular, the reduced scale representation of the solitaire application icon (e.g., "O" in the games folder icon 5004-7 in FIG. 5UU) is in between the reduced scale representation of the stocks application icon (e.g., "S" in the games folder icon 5004-7 in FIG. 5UU) and the reduced scale representation of the racing application icon (e.g., "R" in the games folder icon 5004-7 in FIG. 5UU).

In some embodiments, the device detects an icon removal input that corresponds to a request to remove a first action icon from the folder; and in response to detecting the icon removal input: the device removes (1124) the first action icon from the folder; and removes a reduced scale representation of the first action icon from the dynamic folder icon. For example, in FIG. 5EE the device detects an icon removal input that includes a contact 5112 at a location that corresponds to a solitaire application icon 5002-4 and subsequent movement 5114 of the contact out of the folder view 5106 into a first portion 5108 of the background that is an object removal region. In response to this icon removal input, the device removes the solitaire application icon 5002-4 from the folder view 5106, as illustrated in FIG. 5FF. Additionally, in this example, while the device previously displayed a reduced scale representation of the solitaire application icon (e.g., "O" in play folder icon 5004-7 in FIG. 5EE) in the folder icon 5004-7 associated with the folder view 5106, the device ceases to display the reduced scale representation of the solitaire application icon (e.g., in FIG. 5FF "O" is no longer displayed in the play folder icon 5004-7).

In some embodiments, the device detects an icon addition input that corresponds to a request to add a first action icon to the folder; and in response to detecting the icon removal input: the device adds (1126) the first action icon to the folder; and adds a reduced scale representation of the first action icon to the dynamic folder icon. For example, in FIGS. 5OO-5PP the device detects an icon addition input that includes a contact 5124-*a* at a location on the touch-sensitive surface (e.g., touch screen 112) that corresponds to a location of a maps application icon 5002-8 on the display (e.g., touch screen 112) in FIG. 5OO and subsequent movement (e.g., 5126 and 5130) of the contact on the touch-sensitive surface (e.g., touch screen 112) to a location that corresponds to a location on the display (e.g., touch screen 112) of an activation region 5128-11 of a games folder icon 5004-7. In response to this icon addition input, the device adds the maps application icon 5002-8 to the folder associated with the games folder icon 5004-7, as illustrated in FIG. 5TT. Additionally, in this example, while the device previously did not display any reduced scale representation of the maps application icon in the folder icon 5004-7 (e.g., as illustrated in FIGS. 5OO-5PP), after (or in conjunction with) adding the maps application icon 5002-8 to the games folder icon 5004-7, the device displays a reduced scale representation of the maps application icon (e.g., in FIG. 5QQ "M") within the games folder icon 5004-7.

In some embodiments, content of the folder includes an action icon and the dynamic folder icon changes (1128) when there is a notification from an application that corresponds to the action icon. In some embodiments, the dynamic folder icon changes by displaying (1130) a status indicator on the dynamic folder icon. For example in FIG. 5B, a folder icon 5004-1-b displays a notification badge 5012 indicating that one of the applications that are associated with an application icon within the folder represented by the folder icon 5004-1-b has a notification. In some embodiments, the dynamic folder icon changes by displaying (1132) a status indicator on a reduced scale version of the action icon within the dynamic folder icon. For example in FIG. 5B, a folder icon 5004-1-b displays a notification badge 5014 on a reduced scale representation (e.g., "x7") within the folder icon 5004-1-b, which indicates that the application associated with the reduced scale representation has a notification (e.g., if the application associated with "x7" is an email application, then the notification typically will indicate that a new email has arrived).

In some embodiments, the appearance of the dynamic folder icon changes (1134) when the device is in a user interface reconfiguration mode. In some embodiments, the folder has limited space (e.g., 9 slots, 12 slots, 16 slots, or any other reasonable number) for displaying selectable user interface objects (e.g., selectable user interface objects such as application icons and/or file icons) and the appearance of the dynamic folder icon in user interface reconfiguration mode indicates (1136) whether the folder has space to display any additional selectable user interface objects (e.g., by displaying room for extra reduced scale representations of action icons).

For example, in FIG. 5A, while the device is in a normal operation mode, a dynamic folder icon 5004-1-a displays reduced scale representations (e.g., "x1," "x2," "x3," "x4," "x5," and "x6") which represent contents (e.g., action icons 5002) within the folder. However, in this example there are more than six action icons 5002 within the folder, and thus the device only displays reduced scale representations of the first six action icons within the dynamic folder icon. Continuing this example, when the device enters a user interface reconfiguration mode (e.g., in response to detecting press and hold gesture 5008 in FIG. 5A) the device changes the dynamic folder icon (e.g., from dynamic folder icon 5004-1-b in FIG. 5A to dynamic folder icon 5004-1-b in FIG. 5B) shifts the reduced scale representations within the dynamic icon upwards to reveal an additional reduced scale representation (e.g., "x7" in the folder icon 5004-1-b) within the folder icon 5004-1-b while ceasing to display the first three reduced scale representations of folder icons (e.g., "x1," "x2," and "x3") within the folder icon 5004-1-b. In this example, the dynamic folder icon also displays two empty spaces next to the new reduced scale representation. In addition to providing an indication that there are more than six items in the folder associated with the folder icon 5004-1-b, changing the dynamic folder icon by showing two empty spaces next to the new reduced scale representation also provides a visual indication that there is room to display additional action icons within the folder view.

Note that details of other processes described herein with respect to methods 600, 700, 800, 900, 1000, 1200 (e.g., FIGS. 6A-6E, 7A-7C, 8A-8C, 9A-9B, 10A-10B, 12A-12E and 5A-5PPP) are also applicable in an analogous manner to the method 1100 described above. For example, the selectable user interface objects (e.g., action icons 5002 and folder icons 5004) described with reference to FIGS. 11A-11C may have one or more of the characteristics of the various selectable user interface objects/icons/items (e.g., action icons 5002 and folder icons 5004) described herein with reference to any of methods 600, 700, 800, 900, 1000, or 1200. For brevity, these details are not repeated here.

FIGS. 12A-12E are flow diagrams illustrating a method 1200 of providing contextual information in conjunction with displaying content of a folder in accordance with some embodiments. The method 1200 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, the method 1200 provides an intuitive way to display content of a folder. The method reduces the cognitive burden on a user when managing folders by providing contextual information in conjunction with displaying content of a folder, thereby creating a more efficient human-machine interface. For battery-operated computing devices, enabling a user to manage folders faster and more efficiently conserves power and increases the time between battery charges.

The device displays (1202) a folder icon (e.g., folder icon 5004-7 in FIG. 5S) over a wallpaper background on the display (e.g., touch screen 112), the folder icon corresponding to a folder that contains content, the content including one or more selectable user interface object (e.g., application icons, bookmark icons, and/or document icons). In some embodiments, prior to detecting the first input, the device displays (1204) one or more additional selectable user interface objects (e.g., action icons 5002-1, 5002-2, 5002-3, 5002-5, 5002-6, 5002-7, 5002-8, 5002-9, 5002-10, 5002-11, 5002-12, 5002-14, 5002-15, 5002-16 and folder icons 5004-1-b and 5004-2 in FIG. 5S).

The device detects (1206) a first input (e.g., tap gesture 5076 in FIG. 5S) that corresponds to a request to display content of the folder (e.g., the folder associated with folder icon 5004-7 in FIG. 5S).

Operations 1210-1226 are performed (1208) in response to detecting the first input (e.g., tap gesture 5076 in FIG. 5S). The device divides (1210) the wallpaper background into a first portion (e.g., 5084 in FIGS. 5X-5AA) and a second portion (e.g., 5086 in FIGS. 5X-5AA). In some embodiments, the one or more additional selectable user interface objects include: a first set of additional selectable user interface objects (e.g., action icons 5002-1, 5002-2, 5002-3, 5002-5, 5002-6, 5002-7, 5002-8, 5002-9, 5002-10, 5002-11, 5002-12 and folder icon 5004-1-b in FIGS. 5X-5AA) that have predefined locations on the first portion 5084 of the wallpaper background; and a second set of additional selectable user interface objects (e.g., 5002-14, 5002-15, 5002-16 and folder icon 5004-2 in FIGS. 5X and 5AA) that have predefined locations on the second portion 5086 of the wallpaper background (1204).

In some embodiments, the folder icon (e.g., 5004-7 in FIGS. 5X-5AA) is displayed (1212) within the first portion (e.g., 5084 in FIGS. 5X-5AA) of the wallpaper. In some embodiments, when the folder icon (e.g., 5004-2 in FIGS. 5CCC-5FFF) is one of a plurality of selectable user interface objects in a dock area (e.g., 5006 in FIGS. 5CCC-5FFF) of the display (e.g., touch screen 112), the first portion (e.g., 5172 in FIGS. 5DDD-5FFF) includes the dock area of the display. In contrast, in these embodiments, when the folder icon (e.g., 5004-7 in FIGS. 5X-5AA) is one of a plurality of selectable user interface objects outside of the dock area (e.g., 5006 in FIGS. 5X-5AA) of the display (e.g., touch screen 112), the second portion (e.g., 5086 in FIGS. 5X-5AA) includes the dock area (e.g., 5006 in FIGS. 5X-5AA) of the display. In other words, in accordance with these embodiments, the wallpaper splits above the folder icon when the folder icon is in a dock (e.g., as illustrated in FIGS. 5CCC-5FFF), and the wallpaper splits below the folder icon when the folder icon is in a navigation area above the dock (e.g., as illustrated in FIG. 5X-5AA). In some embodiments, the navigation area (e.g., the home screen with the plurality of selectable user interface objects) has a plurality of pages (e.g., which can be navigated through in response to detecting horizontal swipe gestures), and the dock region stays in a fixed location even while the device scrolls through the arrangement of selectable user interface objects in the navigation area.

The device moves (1214) the second portion away from the first portion. For example in FIGS. 5X-5Y the second portion 5086 is moved away from the first portion 5084. As another example, in FIG. 5DD the second portion 5174 is being moved away from the first portion 5172. In some embodiments, the first portion is also moved away from the second portion. For example in FIG. 5VV-5WW the device moves both the upper portion of the wallpaper background and the lower portion of the wallpaper background away from each other. In some embodiments, moving the first portion away from the second portion includes moving (1216) the first set of additional selectable user interface objects in accordance with movement of the first portion of the wallpaper background and moving the second set of additional selectable user interface objects in accordance with movement of the second portion of the wallpaper background. For example as illustrated in FIG. 5X-5Y, the selectable user interface objects (e.g., 5002-14, 5002-15, 5002-16, and 5004-2 in FIG. 5X) in the second portion 5086 are moved off the display (e.g., touch screen 112) as the second portion 5086 is moved away from the first portion 5084.

In some embodiments, dividing the wallpaper background includes dividing (1218) the wallpaper along a dividing line so that a contour of a first edge (e.g., 5088 in FIG. 5X) of the first portion is complementary to a contour of a second edge (e.g., 5090 in FIG. 5X) of the second portion (e.g., the first edge of the first portion and the second edge of the second portion fit together like puzzle pieces), and moving the second portion away from the first portion includes adjusting the contour of the first edge and/or adjusting the contour of the second edge so that the contour of the first edge ceases to be complementary to the contour of the second edge (e.g., after the portions have moved apart, the first portion and the second portion no longer fit together like puzzle pieces). For example, as illustrated in FIG. 5X the contour of the first edge 5088 is initially complementary to the contour of the second edge 5090, while in FIG. 5Y the contour of the first edge 5088 is no longer complementary to the contour of the second edge 5090. In some embodiments, the folder icon is displayed within the first portion of the wallpaper; and the contour of the first edge includes (1220) a cut-out shape (e.g., 5094 in FIGS. 5X-5Y) was defined by the dividing line. In some of these embodiments, the cut-out shape provides a visual indication of a location of the folder icon within the first portion. For example in FIGS. 5X-5Y the cut-out shape 5094 points to the folder icon 5004-7 that is associated with the folder view 5092.

The device displays (1222) content of the folder in an area between the first portion and the second portion. For example, the content of the folder includes a plurality of application icons (e.g., 5002-4 and 5002-13 in FIG. 5Y or 5002-26, 5002-27, 5002-28, 5002-29, 5002-30, 5002-31, 5002-32, 5002-33, 5002-34, 5002-35, 5002-36, and 5002-37 in FIG. 5EEE) and the application icons are revealed as though they were underneath the wallpaper (e.g., as though the wallpaper is a sliding door that has opened to reveal the application icons behind the wallpaper), as illustrated in FIGS. 5X-5Y and FIGS. 5CCC-5EEE

In some embodiments, a size of the area between the first portion and the second portion is determined (1224) based on a number of selectable user interface objects within the folder. For example, in FIG. 5Y the folder only includes two selectable user interface objects and thus the folder view 5092 takes up substantially less than half of the display. As another example, in FIG. 5EEE where the folder includes at least twelve selectable user interface objects, the folder view 5170 takes up more than half of the display. Thus, the folder view (e.g., 5092 or 5170) takes up only as much room on the display (e.g., touch screen 112) as necessary, thereby leaving more room on the display (e.g., touch screen 112) to show contextual information (e.g., other selectable user interface objects outside of the folder view).

In some embodiments, prior to detecting the first input, the device displays one or more additional selectable user interface objects (e.g., action icons 5002-1, 5002-2, 5002-3, 5002-5, 5002-6, 5002-7, 5002-8, 5002-9, 5002-10, 5002-11, 5002-12 and folder icon 5004-1-b in FIGS. 5X-5AA); and, in response to detecting the first input, the device visually distinguishes (1226) (e.g., by highlighting) the folder icon from the one or more additional selectable user interface objects (e.g., by changing the brightness, contrast, hue, saturation, color, etc. of the additional selectable user interface objects as compared to the brightness, contrast, hue, saturation, color, etc. of the folder icon). In some embodiments, the initial brightness, contrast, hue, saturation, color, etc. (e.g., prior to detecting the first input) of the additional selectable user interface objects is the same as the brightness, contrast, hue, saturation, color, etc. of the folder icon. For example in FIGS. 5Y-5V the device displays the folder icon 5004-7 at a normal opacity and saturation while in the other selectable user interface objects (e.g., action icons 5002-1, 5002-2, 5002-3, 5002-5, 5002-6, 5002-7, 5002-8, 5002-9, 5002-10, 5002-11, 5002-12 and folder icon 5004-1-b in FIGS. 5X-5AA) are displayed at reduced opacity and saturation.

In some embodiments, operations 1230-1232 are performed while the device is (1228) in a normal operation mode when the first input is detected. In some of these embodiments, the device detects (1230) a second input that corresponds to activation of a respective selectable user interface object in the folder; and, in response to detecting the second input, the device performs (1232) an operation associated with the respective selectable user interface object. For example, in FIG. 5PPP the device displays a folder view 5212 while the device is in a normal operation mode. In this example, the device detects a second input (e.g., tap gesture 5214) at a location that corresponds to a stocks application icon 5002-9 and in response to the second input the device activates (e.g., launches or displays a view for) a stocks application.

In some embodiments, operations 1236-1238 are performed while the device is (1234) in a user interface reconfiguration mode when the first input is detected. In some of these embodiments, the device detecting (1236) a second input that corresponds to a request to move a respective selectable user interface object within the folder; and in response to detecting the second input, the device moves (1238) the respective selectable user interface object within the folder. For example, in FIG. 5TT the device displays a folder view 5138 while the device is in a user interface reconfiguration mode. In this example, the device detects a second input (e.g., contact 5140 at a location on the touch screen 112 that corresponds to a location of a stocks application icon 5002-9 and movement 5142 of the contact across the touch screen 112) and in response to the second input the device moves the stocks application icon 5002-9 in the folder view 5138 in accordance with the input to a new location within the folder view, as illustrated in FIG. 5SS.

In some embodiments, operations 1242-1244 are performed while displaying (1240) content of the folder in the area between the first portion and the second portion: detecting (1242) an input that corresponds to selection of the first portion or the second portion. In some embodiments, in response to detecting the input, the device ceases (1244) to display the content of the folder (e.g., collapsing the area by moving the first portion and the second portion together). For example in FIG. 5UU, while the device is displaying a folder view 5138 including content (e.g., action icons 5002-9, 5002-4, 5002-13 and 5002, the device detects a second input (e.g., tap gesture 5144) at a location on the touch-sensitive surface (e.g., touch screen 112) that corresponds to a location on the display (e.g., touch screen 112) that is outside of the folder view 5138 and in response to detecting the second input the device ceases to display the folder view 5138, as illustrated in FIG. 5VV.

In some embodiments, the device enters (1246) a user interface reconfiguration mode; and, while displaying (1248) content of the folder in the area between the first portion and the second portion: the device detects (1250) an input that corresponds to a request to move a respective selectable user interface object from the area between the first portion and the second portion into the first portion or the second portion. In some of these embodiments, in response to detecting the input, the device removes (1252) the respective selectable user interface object from the folder. In some embodiments, in response to moving the selectable user interface object out of the folder, the folder view ceases to be displayed (e.g., by collapsing the area by moving the first portion and the second portion together). For example in FIG. 5YY, while the device is displaying a folder view 5148 the device detects an input that corresponds to a request to move a selectable user interface out of the folder view 5148. In particular, the device detects a contact 5162 at a location (e.g., a first location 5162-*a* in FIG. 5YY) on the touch-sensitive surface (e.g., touch screen 112) that corresponds to a location of an app-4 application icon 5002-22 on the display (e.g., touch screen 112) and subsequent movement 5164 of the contact to a location on the touch-sensitive surface (e.g., touch screen 112) that corresponds to a location on the display (e.g., touch screen 112) that is outside of the folder view (e.g., to a second location 5162-*b* as illustrated in 5ZZ). In this example, after detecting a pause in the movement for more than a predetermined period of time the device ceases to display the folder view as illustrated in FIG. 5AAA. Subsequently, the selectable user interface object (e.g., app-4 application icon 5002-22 is removed from the folder and displayed in the arrangement of selectable user interface objects outside of the folder view, as illustrated in FIG. 5CCC.

In some embodiments, a first portion of the content of the folder is displayed (1254) in the area (e.g., folder view 5170 in FIG. 5EEE) between the first portion and the second portion. In some of these embodiments, the device detecting (1256) a next-portion input that corresponds to a request to display a next portion of the content of the folder; and in response to detecting the next-portion input, the device displays (1258) a second portion of the content of the folder in the area between the first portion and the second portion. (e.g., detecting a flick gesture to the left or to the right causes a next page of application icons or a previous page of application icons to be displayed in the area). For example, in FIG. 5EEE the device displays a first portion of content of the folder that includes a first plurality of selectable user interface objects (e.g., or 5002-26, 5002-27, 5002-28, 5002-29, 5002-30, 5002-31, 5002-32, 5002-33, 5002-34, 5002-35, 5002-36, and 5002-37 in FIG. 5EEE) within a folder view 5170. In response to detecting a swipe gesture (e.g., contact 5176 and movement 5178 of the contact to the left at a location on the touch screen 112 that corresponds to a location within the folder view 5170) the device displays a second portion of content of the folder that includes a second plurality of selectable user interface objects (e.g., or 5002-38, 5002-39, 5002-40, 5002-41, 5002-42, 5002-43 in FIG. 5FFF) within the folder view 5170 on the display (e.g., touch screen 112) in FIG. 5FFF.

In some embodiments, a first portion of the content of the folder is displayed (1260) in the area between the first portion and the second portion. In some of these embodiments, the device detects (1262) a scrolling input that corresponds to a request to scroll the content of the folder; and in response to detecting the scrolling input, the device scrolls (1264) the content of the folder laterally on the display (e.g., touch screen 112) in the area between the first portion and the second portion so as to display a second portion of the content. In other words, in some embodiments, instead of distinct portions of the contents of the folder, a list or array of selectable user interface objects can be continuously scrolled through by the device in response to detecting scrolling inputs (e.g., a flick gesture including contact 5176 and subsequent movement 5178 of the contact on a touch screen 112 that corresponds to a location within the folder view, as illustrated in FIG. 5EEE).

Note that details of other processes described herein with respect to methods 600, 700, 800, 900, 1000, 1100 (e.g., FIGS. 6A-6E, 7A-7C, 8A-8C, 9A-9B, 10A-10B, 11A-11C and 5A-5PPP) are also applicable in an analogous manner to the method 1100 described above. For example, the selectable user interface objects (e.g., action icons 5002 and folder icons 5004) described with reference to FIGS. 12A-12E may have one or more of the characteristics of the various selectable user interface objects/icons/items (e.g., action icons 5002 and folder icons 5004) described herein with reference to any of methods 600, 700, 800, 900, 1000, or 1100. For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6E, 7A-7C, 8A-8C, 9A-9B, 10A-10B, 11A-11C, 12A-12E may be implemented by components depicted in FIGS. 1A-1C. For example, detection operation 608, object movement operation 612, and folder creation operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A multifunction device, comprising:
a display;
one or more processors;
memory; and
one or more programs, wherein the one or more programs are stored in the memory and configured to be executed by the one or more processors, the one or more programs including instructions for:
receiving an input that corresponds to a request to create a folder that contains a first item and a second item, the first item having a name and a plurality of category descriptors and the second item having a name and a plurality of category descriptors;
in response to receiving the input:
creating the folder that contains the first item and the second item;
determining a first plurality of category descriptors that are associated with the first item;
determining a second plurality of category descriptors that are associated with the second item;
determining that the first plurality of category descriptors and the second plurality of category descriptors share at least a first common category descriptor;
in response to determining that the first plurality of category descriptors and the second plurality of category descriptors share at least a first common category descriptor:
automatically generating a folder name for the folder based on the first common category descriptor; and
displaying an icon for the folder with the automatically generated folder name on the display.

2. The device of claim 1, wherein:
the first plurality of category descriptors includes a plurality of tags that were previously assigned to the first item;
the second plurality of category descriptors includes a plurality of tags that were previously assigned to the second item; and
the first common category descriptor is a tag that is included in the first plurality of tags and in the second plurality of tags.

3. The device of claim 1, wherein:
the first plurality of category descriptors includes a first hierarchy of categories;
the second plurality of category descriptors includes a second hierarchy of categories; and
the first common category descriptor is a category that is included in the first hierarchy of categories and in the second hierarchy of categories.

4. The device of claim 2, wherein:
the first hierarchy of categories is a set of categories to which the first item has been assigned within an application database;
the second hierarchy of categories is a set of categories to which the second item has been assigned within the application database.

5. The device of claim 4, wherein the application database is a database of applications in an application store.

6. The device of claim 1, wherein:
the first plurality of category descriptors and the second plurality of category descriptors share a set of one or more category descriptors;
category descriptors in the shared set of one or more category descriptors have varying levels of specificity; and
a most specific category descriptor in the shared set of one or more category descriptors is selected as the first common category descriptor.

7. The device of claim 1, including instructions for:
when the first plurality of category descriptors and the second plurality of category descriptors do not share any common category descriptors:
automatically generating a folder name for the folder based on a category descriptor from the first plurality of category descriptors; and
displaying an icon for the folder with the automatically generated folder name on the display.

8. A method comprising:
at a multifunction device with a display:
receiving an input that corresponds to a request to create a folder that contains a first item and a second item, the first item having a name and a plurality of category descriptors and the second item having a name and a plurality of category descriptors;
in response to receiving the input:
creating the folder that contains the first item and the second item;
determining a first plurality of category descriptors that are associated with the first item;
determining a second plurality of category descriptors that are associated with the second item;

determining that the first plurality of category descriptors and the second plurality of category descriptors share at least a first common category descriptor;

in response to determining that the first plurality of category descriptors and the second plurality of category descriptors share at least a first common category descriptor:
- automatically generating a folder name for the folder based on the first common category descriptor; and
- displaying an icon for the folder with the automatically generated folder name on the display.

9. The method of claim 8, wherein:
the first plurality of category descriptors includes a plurality of tags that were previously assigned to the first item;
the second plurality of category descriptors includes a plurality of tags that were previously assigned to the second item; and
the first common category descriptor is a tag that is included in the first plurality of tags and in the second plurality of tags.

10. The method of claim 8, wherein:
the first plurality of category descriptors includes a first hierarchy of categories;
the second plurality of category descriptors includes a second hierarchy of categories; and
the first common category descriptor is a category that is included in the first hierarchy of categories and in the second hierarchy of categories.

11. The method of claim 9, wherein:
the first hierarchy of categories is a set of categories to which the first item has been assigned within an application database;
the second hierarchy of categories is a set of categories to which the second item has been assigned within the application database.

12. The method of claim 11, wherein the application database is a database of applications in an application store.

13. The method of claim 8, wherein:
the first plurality of category descriptors and the second plurality of category descriptors share a set of one or more category descriptors;
category descriptors in the shared set of one or more category descriptors have varying levels of specificity; and
a most specific category descriptor in the shared set of one or more category descriptors is selected as the first common category descriptor.

14. The method of claim 8, including:
when the first plurality of category descriptors and the second plurality of category descriptors do not share any common category descriptors:
- automatically generating a folder name for the folder based on a category descriptor from the first plurality of category descriptors; and
- displaying an icon for the folder with the automatically generated folder name on the display.

15. A non-transitory computer readable storage medium storing one or more programs, the one or more programs comprising instructions, which when executed by a multifunction device with a display, cause the device to:
receive an input that corresponds to a request to create a folder that contains a first item and a second item, the first item having a name and a plurality of category descriptors and the second item having a name and a plurality of category descriptors;
in response to receiving the input:
create the folder that contains the first item and the second item;
determine a first plurality of category descriptors that are associated with the first item;
determine a second plurality of category descriptors that are associated with the second item;
determine that the first plurality of category descriptors and the second plurality of category descriptors share at least a first common category descriptor;
in response to determining that the first plurality of category descriptors and the second plurality of category descriptors share at least a first common category descriptor:
- automatically generate a folder name for the folder based on the first common category descriptor; and
- display an icon for the folder with the automatically generated folder name on the display.

16. The non-transitory computer readable storage medium of claim 15, wherein:
the first plurality of category descriptors includes a plurality of tags that were previously assigned to the first item;
the second plurality of category descriptors includes a plurality of tags that were previously assigned to the second item; and
the first common category descriptor is a tag that is included in the first plurality of tags and in the second plurality of tags.

17. The non-transitory computer readable storage medium of claim 15, wherein:
the first plurality of category descriptors includes a first hierarchy of categories;
the second plurality of category descriptors includes a second hierarchy of categories; and
the first common category descriptor is a category that is included in the first hierarchy of categories and in the second hierarchy of categories.

18. The non-transitory computer readable storage medium of claim 16, wherein:
the first hierarchy of categories is a set of categories to which the first item has been assigned within an application database;
the second hierarchy of categories is a set of categories to which the second item has been assigned within the application database.

19. The non-transitory computer readable storage medium of claim 18, wherein the application database is a database of applications in an application store.

20. The non-transitory computer readable storage medium of claim 15, wherein:
the first plurality of category descriptors and the second plurality of category descriptors share a set of one or more category descriptors;
category descriptors in the shared set of one or more category descriptors have varying levels of specificity; and
a most specific category descriptor in the shared set of one or more category descriptors is selected as the first common category descriptor.

21. The non-transitory computer readable storage medium of claim 15, including instructions which cause the device to:
when the first plurality of category descriptors and the second plurality of category descriptors do not share any common category descriptors:
- automatically generate a folder name for the folder based on a category descriptor from the first plurality of category descriptors; and display an icon for the folder with the automatically generated folder name on the display.

* * * * *